United States Patent
Omatsu et al.

(10) Patent No.: US 9,354,356 B2
(45) Date of Patent: *May 31, 2016

(54) POLYMER FILM, AND OPTICALLY-COMPENSATORY FILM, POLARIZER AND LIQUID-CRYSTAL DISPLAY DEVICE COMPRISING THE SAME

(71) Applicant: FUJIFILM Corporation, Minato-ku (JP)

(72) Inventors: Tadashi Omatsu, Minami-Ashigara (JP); Hajime Nakayama, Minami-Ashigara (JP); Akihiro Matsufuji, Minami-Ashigara (JP); Osamu Takahashi, Minami-Ashigara (JP); Shigeaki Nimura, Minami-Ashigara (JP); Yousuke Nishiura, Odawara (JP)

(73) Assignee: FUJIFILM Corporation, Tokyo (JP)

(*) Notice: Subject to any disclaimer, the term of this patent is extended or adjusted under 35 U.S.C. 154(b) by 471 days.

This patent is subject to a terminal disclaimer.

(21) Appl. No.: 13/890,398

(22) Filed: May 9, 2013

(65) Prior Publication Data
US 2013/0253182 A1    Sep. 26, 2013

Related U.S. Application Data

(63) Continuation of application No. 11/659,705, filed as application No. PCT/JP2005/014795 on Aug. 5, 2005, now Pat. No. 9,091,804.

(30) Foreign Application Priority Data

Aug. 9, 2004 (JP) .................. 2004-232105
Sep. 27, 2004 (JP) .................. 2004-279549
Sep. 27, 2004 (JP) .................. 2004-279982

(51) Int. Cl.
*G02B 1/08* (2006.01)
*C08J 7/12* (2006.01)
*G02B 5/30* (2006.01)

(52) U.S. Cl.
CPC ...... *G02B 1/08* (2013.01); *C08J 7/12* (2013.01); *G02B 5/3016* (2013.01); *C08J 2301/10* (2013.01); *Y10T 428/1041* (2015.01); *Y10T 428/31* (2015.01)

(58) Field of Classification Search
None
See application file for complete search history.

(56) References Cited

U.S. PATENT DOCUMENTS 6,208,396 B1   3/2001   Shimizu et al.
6,245,398 B1 * 6/2001   Matsuoka ............ G02B 5/3016
                                                    349/117

(Continued)

FOREIGN PATENT DOCUMENTS

EP    1 160 591 A1    12/2001
JP    06-034816 A     2/1994

(Continued)

OTHER PUBLICATIONS

Office Action from Japanese Patent Office issued in Applicant's corresponding Japanese Patent Application No. 2005-211479 dated Nov. 2, 2010, with English translation.

(Continued)

*Primary Examiner* — J. L. Yang
(74) *Attorney, Agent, or Firm* — Buchanan, Ingersoll & Rooney PC

(57) ABSTRACT

A polymer film that has an in-plane retardation $Re_{(\lambda)}$ and a thickness-direction retardation $Rth_{(\lambda)}$ satisfying formula (i) and (ii), and that further has a surface energy of at least one surface is from 50 mN/m to 80 mN/m:

$$0 \leq Re_{(630)} \leq 10, \text{ and } |Rth_{(630)}| \leq 25; \quad (i)$$

and $$|Re_{(400)} - Re_{(700)}| \leq 10, \text{ and } |Rth_{(400)} - Rth_{(700)}| \leq 35. \quad (ii)$$

in the formulae, $Re_{(\lambda)}$ and $Rth_{(\lambda)}$ are measurement values at the wavelength of $\lambda$ nm, and an optically-compensatory film, an optical material such as a polarizer and a liquid-crystal display device using the polymer film.

20 Claims, 3 Drawing Sheets

(56) References Cited

U.S. PATENT DOCUMENTS

| | | | |
|---|---|---|---|
| 6,512,562 | B1 | 1/2003 | Kobayashi et al. |
| 9,091,804 | B2 * | 7/2015 | Omatsu ..................... C08J 7/12 |
| 2002/0192397 | A1 | 12/2002 | Tsujimoto |
| 2003/0031848 | A1 | 2/2003 | Sawada et al. |
| 2003/0147140 | A1 | 8/2003 | Ito |
| 2003/0151707 | A1 | 8/2003 | Kobayashi et al. |
| 2003/0224113 | A1 | 12/2003 | Nakamura et al. |
| 2004/0212892 | A1 | 10/2004 | Tsujimoto |
| 2006/0055853 | A1 | 3/2006 | Murakami et al. |
| 2007/0058111 | A1 | 3/2007 | Kobayashi et al. |

FOREIGN PATENT DOCUMENTS

| | | |
|---|---|---|
| JP | 10-307291 | 11/1998 |
| JP | 2000-63560 A | 2/2000 |
| JP | 2000-356714 A | 12/2000 |
| JP | 2001-247717 A | 9/2001 |
| JP | 2001-296423 A | 10/2001 |
| JP | 2001-318233 A | 11/2001 |
| JP | 2002-146047 A | 5/2002 |
| JP | 2002-249599 A | 9/2002 |
| JP | 2002-328224 A | 11/2002 |
| JP | 2002-328233 A | 11/2002 |
| JP | 2002-361769 A | 12/2002 |
| JP | 2003-055477 A | 2/2003 |
| JP | 2003-131036 A | 5/2003 |
| JP | 2004-009380 A | 1/2004 |
| JP | 2004-054257 A | 2/2004 |
| JP | 2004-078203 A | 3/2004 |
| JP | 2004-163606 A | 6/2004 |
| JP | 2004-212863 A | 7/2004 |
| KR | 2001-0101475 A | 11/2001 |
| KR | 2004-0063760 A | 7/2004 |
| WO | WO 01/37007 A1 | 5/2001 |
| WO | WO 2004/038477 A1 | 5/2004 |

OTHER PUBLICATIONS

Offer of Publication, etc. from Japanese Patent Office issued in corresponding Japanese Patent Application No. 2005-211479 dated Nov. 30, 2010, with an English Translation.

Notice of Publication from Japanese Patent Office issued in corresponding Japanese Patent Application No. 2005-211479 dated Dec. 7, 2010, with an English Translation.

Notification from Japanese Patent Office issued in corresponding Japanese Patent Application No. 2005-211479 dated Mar. 29, 2011, with an English translation.

Information Statement from Japanese Patent Office issued in corresponding Japanese Patent Application No. 2005-211479 dated Feb. 28, 2011, with an English translation.

Office Action (Notification of Reasons for Refusal) from Japanese Patent Office issued in corresponding Japanese Patent Application No. 2005-211479 dated Oct. 25, 2011, with an English translation.

Notification for Submission of Argument issued Mar. 29, 2012, by the Korean Patent Office in corresponding Korean Patent Application No. 2007-7003161, with an English translation.

Final Office Action dated Nov. 29, 2012 in corresponding Korean application No. 2007-7003161, together with an English translation thereof.

Office Action issued Feb. 19, 2013, in corresponding Japanese Patent Application No. 2011-284378, and an English translation thereof.

* cited by examiner

POLYMER FILM, AND OPTICALLY-COMPENSATORY FILM, POLARIZER AND LIQUID-CRYSTAL DISPLAY DEVICE COMPRISING THE SAME

TECHNICAL FIELD

The present invention relates to a polymer film useful in liquid-crystal display devices. The invention also relates to optical materials such as optically-compensatory film and polarizer as well as liquid-crystal display devices that comprise the polymer film.

BACKGROUND ART

Heretofore, cellulose acylate films have been used in photographic supports and various optical materials because of their good toughness and flame retardancy. In particular, recently they have become much used for optical transparent films for liquid-crystal display devices. As having high optical transparency and high optical isotropy, cellulose acylate films are excellent as optical materials for devices for polarization such as liquid-crystal display devices. Heretofore, they are used as protective films for polarizers and supports for optically-compensatory films capable of bettering the display images in the oblique direction (as viewing angle compensation).

A polarizer, a part of a liquid-crystal display device comprises a polarizing element and a protective film for the element attached to at least one side of the element. In general, a polarizing element is obtained by coloring an oriented polyvinyl alcohol (PVA) film with iodine or a dichroic dye. In many cases, a cellulose acylate film, especially a triacetyl cellulose film is used for the protective film for a polarizing element, as the film can be directly stuck to PVA. In attaching a protective film to a polarizing element, the surface of the protective film that is to be stuck to a polarizing element is subjected to surface treatment for hydrophilication for the purpose of bettering the adhesiveness of the film surface to a polarizing element. For the hydrophilication treatment, generally employed is alkali treatment, plasma treatment or corona treatment (for example, JP-A 2002-328224, JP-A 2000-356714). It is important that the protective film for a polarizing element has good optical isotropy, and the optical properties of the protective film for a polarizing element have significant influences on the properties of the polarizer that comprises the protective film.

Recently, liquid-crystal display devices have been much more required to have further improved viewing angle characteristics, and the optical transparent films for the protective films for polarizing elements and for the supports for optically-compensatory films are also required to have further increased optical isotropy. For the optical isotropy, it is important that the retardation, which is represented by the product of the birefringence and the thickness of an optical film, is small. In particular, for bettering the image display in the oblique direction, not only the retardation in the in-plane direction (Re) but also the retardation in the film thickness direction (Rth) must be reduced. Concretely, when the optical properties of an optical transparent film are evaluated, it is important that Re measured in the in-plane direction of the film is small and Re does not change even when measured in different angles.

Heretofore, cellulose acylate films having a reduced in-plane Re are known. However, cellulose acylate films of which the angle-dependent Re change is reduced, or that is, those having a reduced Rth are difficult to produce. Given that situation, optical transparent films having a reduced angle-dependent Re change have been proposed by the use of polycarbonate films or thermoplastic cyclo-olefin films in place of cellulose acylate films (for example, JP-A 2001-318233 and JP-A 2002-328233; commercial products of ZEONOR (by Nippon Zeon), ARTON (by JSR)). However, when these optical transparent films are used for protective films for polarizers, they are problematic in point of their adhesiveness to PVA as they are hydrophobic. Another problem with them is that the overall in-plane optical properties of the films are not uniform.

For solving the problems, it is strongly desired to improve the adhesiveness to PVA of optical transparent films of optical isotropy. Concretely, the optical anisotropy of cellulose acylate films is lowered, and more concretely, the in-plane Re of cellulose acylate films is reduced to almost zero, and the angle-dependent retardation thereof is reduced, or that is, Rth of the films is reduced to almost zero. As a result, the thus-improved films could be optical transparent films of optical isotropy, and their adhesiveness to PVA is desired to be further improved.

In producing cellulose acylate films, a compound serving as a plasticizer is generally added for the purpose of bettering the film-forming property of the film materials. Some plasticizers are disclosed, including, for example, phosphoric acid triesters such as triphenyl phosphate, biphenyldiphenyl phosphate, and phthalates (for example, *Lecture of Plastic Materials*, Vol. 17, by Nikkan Kogyo Shinbun, "Cellulose Resins", p. 121 (1970)). Of those plasticizers, it is known that some are effective for lowering the optical anisotropy of cellulose acylate films. For example, specific fatty acid esters are disclosed (for example, JP-A 2001-247717). However, the effect of such known compounds for lowering the optical anisotropy of cellulose acylate films is not satisfactory.

Recent liquid-crystal display devices have become further required to have improved color display capability. For this, the optical transparent films for the protective films for polarizers and for the supports for optically-compensatory films must be so improved that not only their Re and Rth in the visible right region falling within a wavelength range of from 400 to 800 nm but also the wavelength-dependent Re and Rth change, or that is, the wavelength-dependent Re and Rth distribution of the films could be small.

DISCLOSURE OF THE INVENTION

A first object of the invention is to provide a polymer film of which the advantages are that its optical anisotropy (Re, Rth) is small and the film is substantially optically isotropic, the wavelength-dependent optical anisotropy (Re, Rth) distribution is small, its surface adhesive suitability is imparted by controlling its surface energy so that the film is suitable to image display devices such as liquid-crystal display devices.

A second object of the invention is to indicate that optical materials such as optically-compensatory films and polarizers that comprise the polymer film having a reduced optical anisotropy and a reduced wavelength-dependent anisotropy distribution have excellent viewing angle characteristics, and to provide an image display device such as a liquid-crystal display device that comprises the optical material.

When the polymer film having a reduced optical anisotropy and a reduced wavelength-dependent anisotropy distribution is used as a protective film of a polarizer, then the optical properties of the polarizer may be bettered. When the film is used as a support for an optically-compensatory film, then the optically-compensatory film can exhibit its own optical properties directly as they are. When the polarizer or the optically-compensatory film is used in a liquid-crystal display device, then the display contrast and the display color may be bettered.

We, the present inventors have assiduously studied and, as a result, have found that, when a compound capable of controlling the in-plane and thickness-direction orientation in a polymer film is used so as to fully lower the optical anisotropy of a polymer film and when Re of the film as well as Rth thereof is controlled to be nearly zero, and further when the polymer film is subjected to surface treatment such as alkali saponification, plasma treatment or corona treatment so as to suitably control the surface energy of the film to thereby prevent the reduction in the surface energy of the film owing to the use of the compound in the film, then the polymer film may have good adhesiveness to a polarizing element, and therefore when the film is used as a protective film for a polarizer, then the durability of the polarizer can be improved. In particular, in the alkali saponification of the polymer film, it is desirable that the film can still maintain its optical properties, that the additives in the film are prevented from dissolving out into the alkali saponification-processing solution and that the processing capability of the processing solution is prevented from being lowered owing to the additive dissolution and to the decomposition and deposition of the dissolved ingredients. For this, it is desirable to use an additive compound having a large pKa value or having a reduced solubility in an alkali saponification-processing solution. Accordingly, we have further found that, when the compound of the type is used in the polymer film, then it is possible to provide a protective film for polarizers that is free from optical capability change or unevenness before and after the treatment, and, in addition, the processing solution is prevented from being contaminated and the running cost for the treatment may be thereby reduced.

The objects of the invention are attained by the polymer film mentioned below.

(1) A polymer film that has an in-plane retardation $Re_{(\lambda)}$ and a thickness-direction retardation $Rth_{(\lambda)}$ (where $\lambda$ indicates a wavelength (nm)) satisfying formula (i) and (ii), and that further has a surface energy of at least one surface is from 50 mN/m to 80 mN/m:

$$0 \leq Re_{(630)} \leq 10, \text{ and } |Rth_{(630)}| \leq 25; \quad (i)$$

and $$|Re_{(400)} - Re_{(700)}| \leq 10, \text{ and } |Rth_{(400)} - Rth_{(700)}| \leq 35. \quad (ii)$$

(2) The polymer film as described in (1) above,
wherein an in-plane distribution of the surface energy of the polymer film, $\Delta E$ is 10 or less.

(3) The polymer film as described in (1) or ($\lambda$) above,
wherein at least one surface of the polymer film is surface-treated, and a surface energy of the surface-treated surface is from 30 mN/m to 50 mN/m before a surface treatment, and a surface energy of the surface-treated surface is from 50 mN/m to 80 mN/m after the surface treatment.

(4) The polymer film as described in any of (1) to (3) above,
wherein an in-plane distribution of $Re_{(\lambda)}$ and $Rth_{(\lambda)}$, $\Delta Re_{(\lambda)}$ and $\Delta Rth_{(\lambda)}$ satisfy formula (iii) and (iv):

$$\Delta Re_{(\lambda)} \leq 5; \quad (iii)$$

and $$\Delta Rth_{(\lambda)} \leq 10. \quad (iv)$$

(5) The polymer film as described in (3) or (4) above,
wherein a Re and Rth change before and after the surface treatment satisfy formula (v) and (vi):

$$|Re - Re'| \leq 10; \quad (v)$$

and $$|Rth - Rth'| \leq 20, \quad (vi)$$

wherein Re indicates an in-plane retardation (nm) of the film before the surface treatment;
Re' indicates an in-plane retardation (nm) of the film after the surface treatment;
Rth indicates a thickness-direction retardation (nm) of the film before the surface treatment; and
Rth' indicates a thickness-direction retardation (nm) of the film after the surface treatment.

(6) The polymer film as described in any of (1) to (5) above, which comprises at least one compound capable of lowering an optical anisotropy.

(7) The polymer film as described in (6) above, which comprises the at least one compound capable of lowering an optical anisotropy that satisfies formula (vii) within a range satisfying formula (viii):

$$(Rth_A - Rth_0)/A \leq -1.0, \quad (vii)$$

$$0.01 \leq A \leq 30, \quad (viii)$$

wherein $Rth_A$ indicates Rth (nm) of a film containing A % by mass of the at least one compound;
$Rth_0$ indicates Rth (nm) of a film not containing the at least one compound; and
A indicates a mass % of the at least one compound relative to a mass of a starting polymer for a film as 100.

(8) The polymer film as described in (6) or (7) above, which comprises a compound that has an octanol-water partition coefficient (log P) of from 0 to 7 as the compound capable of lowering an optical anisotropy.

(9) The polymer film as described in any of (1) to (8) above, which comprises at least one compound capable of lowering $|Re_{(400)} - Re_{(700)}|$ and $|Rth_{(400)} - Rth_{(700)}|$.

(10) The polymer film as described in any of (3) to (9) above,
wherein the surface treatment is an alkali saponification.

(11) The polymer film as described in any of (6) to (8) above,
wherein a degree of dissolution of the at least one compound capable of lowering an optical anisotropy in an alkali solution in an alkali saponification treatment of the polymer film is 20% by mass or less.

(12) The polymer film as described in (10) or (11) above,
wherein an absorbance at 450 nm of an alkali solution after the alkali saponification treatment of the film surface is 0.1 or less.

(13) The polymer film as described in any of (10) to (12) above,
wherein when a surface of a surface-untreated film is treated with an alkali saponification treatment using 1.5 N of NaOH at a temperature condition 55° C., a time necessary to make a surface energy 50 mN/m or more is within 1 minute.

(14) The polymer film as described in any of (1) to (13) above,
wherein a pKa of the at least one compound capable of lowering an optical anisotropy is 14 or more.

(15) The polymer film as described in any of (3) to (9) above,
wherein the surface treatment is a plasma treatment.

(16) The polymer film as described in any of (3) to (9) above,
wherein the surface treatment is a corona treatment.

(17) The polymer film as described in any of (1) to (16) above,
wherein a polymer material to form the film comprises a cellulose acylate.

(18) The polymer film as described in (17) above,
wherein a degree of acyl substitution of the cellulose acylate is from 2.50 to 3.00.

(19) The polymer film as described in (17) above,
wherein an acyl substituent in the cellulose acylate is substantially an acetyl group alone, a total degree of substitution is from 2.80 to 2.99, and a mean degree of polymerization of the polymer is from 180 to 550.

(20) The polymer film as described in (17) above,
wherein an acyl substituent in the cellulose acylate comprises substantially at least two of acetyl group/propionyl group/butanoyl group, and a total degree of acyl substitution of the cellulose acylate is from 2.50 to 3.00.

(21) The polymer film as described in any of (1) to (20) above,
wherein a slow axis in an in-plane direction of the cellulose acylate is in a machine conveying direction (MD) of the film or is perpendicular (transverse direction, TD) to the machine conveying direction (MD) of the film.

(22) The polymer film as described in any of (1) to (21) above,
wherein a thickness of the polymer film is from 10 to 120 μm.

(23) The polymer film as described in any of (1) to (22) above,
wherein a width of the polymer film is 1350 mm or more.

(24) The polymer film as described in any of (1) to (23) above,
wherein the polymer film is a long film having a length of 1500 m or more.

(25) An adhesive layer-attached polymer film, which comprises an adhesive layer formed on at least one surface having a surface energy of from 50 mN/m to 80 mN/m of a polymer film as described in any of (1) to (24) above.

(26) An optically-compensatory film, which comprises an optically-anisotropic layer formed on a polymer film as described in any of (1) to (25) above, and wherein the optically-anisotropic layer satisfies formula (ix):

$$Re=0 \text{ to } 200 \text{ (nm), and } |Rth|=0 \text{ to } 400 \text{ (nm).} \qquad \text{(ix)}$$

(27) The optically-compensatory film as described in (26) above,
wherein the optically-anisotropic layer comprises a discotic liquid-crystalline compound.

(28) The optically-compensatory film as described in (26) or (27) above,
wherein the optically-anisotropic layer comprises a rod-shaped liquid-crystalline compound.

(29) The optically-compensatory film as described in any of (26) to (28) above,
wherein the optically-anisotropic layer is formed of a polymer film having a birefringence.

(30) The optically-compensatory film as described in (29) above,
wherein the polymer film that forms the optically-anisotropic layer comprises at least one polymer material selected from a group consisting of polyamide, polyimide, polyester, polyether-ketone, polyamidimide-polyester-imide and polyaryl-ether-ketone.

(31) A polarizer which comprises, as a protective film for a polarizing element, at least one sheet of a polymer film as described in any of (1) to (25) above and an optically-compensatory film as described in any of (26) to (30) above.

(32) The polarizer as described in (31) above, which comprises at least one layer of a hard coat layer, an antiglare layer and an antireflection layer formed on a surface.

(33) A liquid-crystal display device, which comprises any of a polymer film as described in any of (1) to (25) above, an optically-compensatory film as described in any of (26) to (30) above and a polarizer as described in (31) or (32) above.

(34) A VA or IPS liquid-crystal display device, which comprises any of a polymer film as described in any of (1) to (25) above, an optically-compensatory film as described in any of (26) to (30) above and a polarizer as described in (31) or (32) above.

BEST MODE FOR CARRYING OUT THE INVENTION

Figure 1:
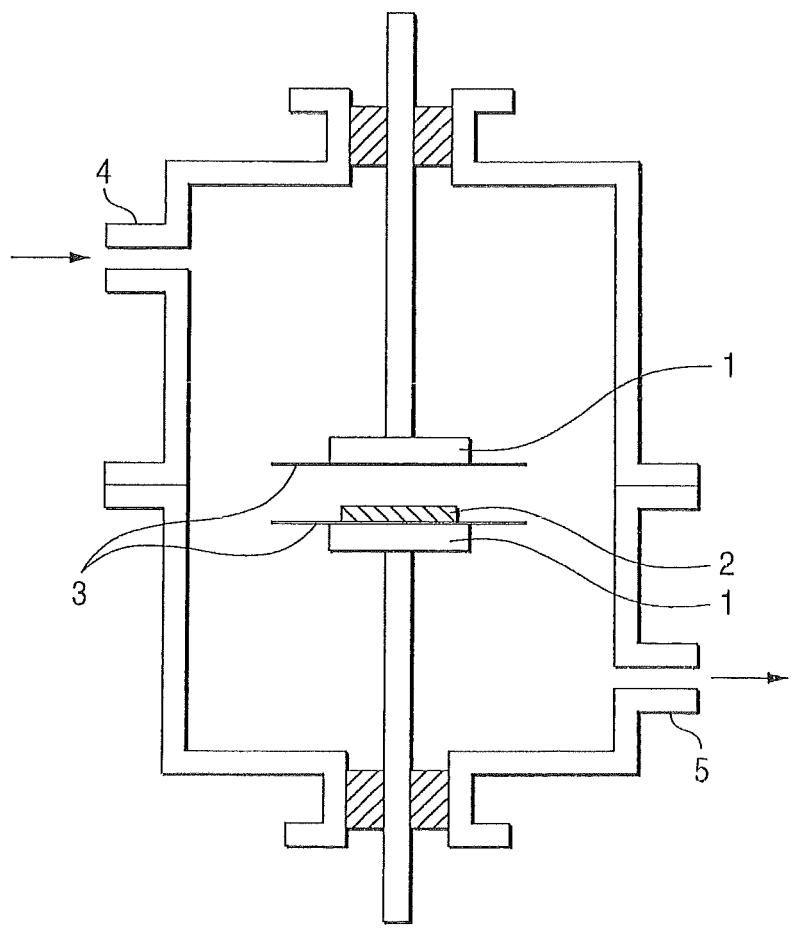
FIG. 1 is a cross-sectional view showing an example of an atmospheric plasma treatment device applicable to the plasma treatment in the invention.

The polymer film of the invention is described in detail hereinunder.

[Material of Polymer Film]

The material to form the polymer film of the invention is preferably a polymer having good optical properties, good transparency, good mechanical strength, good heat stability, good waterproofness and good isotropy. Any and every material can be used so far as its Re and Rth fall within the ranges satisfying the above-mentioned formulae (i) and (ii). For example, it includes polycarbonate polymers; polyester polymers such as polyethylene terephthalate, polyethylene naphthalate; acrylic polymers such as polymethyl methacrylate; and styrenic polymers such as polystyrene, acrylonitrile/styrene copolymer (AS resin). Other examples of the polymer material are polyolefins such as polyethylene, polypropylene; polyolefin copolymers such as ethylene/propylene copolymer; vinyl chloride polymers; amide polymers such as nylon, aromatic polyamide; imide polymers, sulfone polymers, polyether-sulfone polymers, polyether-ether-ketone polymers, polyphenylene sulfide polymers, vinylidene chloride polymers, vinyl alcohol polymers, vinyl butyral polymers, arylate polymers, polyoxymethylene polymers, epoxy polymers, and mixtures of the polymers mentioned above. The transparent film of the invention may be formed as a cured layer of an acrylic, urethane, acrylurethane, epoxy or silicone-type UV-curable or thermosetting resin.

For the material to form the polymer film of the invention, a thermoplastic norbornene-type resin is also preferably used. The thermoplastic norbornene-type resin includes ZEONEX and ZEONOA by Nippon Zeon, and ARTON by JSR.

For the material to form the polymer film of the invention, also preferred is a cellulose-type polymer such as typically triacetyl cellulose (hereinafter this is referred to as cellulose acylate) that has heretofore been used as a transparent protective film for polarizers. The cellulose acylate is described in detail hereinunder.

[Raw Material Cellulose for Cellulose Acylate]

The raw material cellulose for cellulose acylate includes cotton linter, wood pulp (hardwood pulp, softwood pulp). Any and every type of cellulose acylate obtainable from any and every type of such raw material cellulose is usable herein. As the case may be, they may be mixed for use herein. The raw material cellulose is described in detail, for example, in Maruzawa & Uda, Plastic Material Lecture (17) Cellulosic Resin, by Nikkan Kogyo Shinbun (1970); and Hatsumei Kyokai, Disclosure Bulletin No. 2001-1745 (pp. 7-8). Celluloses described in these may be used for the cellulose acylate film of the present invention with no specific limitation thereon.

[Degree of Substitution in Cellulose Acylate]

The cellulose acylate for use in the invention, which is produced from the above-mentioned cellulose material, is described below. The cellulose acylate for use in the invention is produced by acylating the hydroxyl group in cellulose, in which the substituent may be any acyl group having from 2 (acetyl group) to 22 carbon atoms. The degree of substitution of hydroxyl group in cellulose with acyl group to give the cellulose acylate for use herein is not specifically defined. For example, it may be determined by measuring the degree of bonding of acetic acid and/or fatty acids having from 3 to 22 carbon atoms that substitute for the hydroxyl group in cellulose, followed by calculating the resulting data. For the measurement, for example, employable is a method of ASTM D-817-91.

As so mentioned hereinabove, the degree of substitution of hydroxyl group in cellulose with acyl group to give the cellulose acylate for use in the invention is not specifically defined. Preferably, however, the degree of acyl substitution of hydroxyl group in cellulose to give the cellulose acylate is from 2.50 to 3.00, more preferably from 2.75 to 3.00, even more preferably from 2.85 to 3.00.

Of acetic acid and/or fatty acids having from 3 to 22 carbon atoms that substitute for the hydroxyl group in cellulose, the acyl group having from 2 to 22 carbon atoms may be any of aliphatic group or allyl group, and are not specifically defined. It may be a single group or may be a mixture of two or more different groups. They are, for example, cellulose alkylcarbonyl esters, alkenylcarbonyl esters, aromatic carbonyl esters or aromatic alkylcarbonyl esters, which may be further substituted. Preferred examples of the acyl group of the type are acetyl, propionyl, butanoyl, heptanoyl, hexanoyl, octanoyl, decanoyl, dodecanoyl, tridecanoyl, tetradecanoyl, hexadecanoyl, octadecanoyl, iso-butanoyl, t-butanoyl, cyclohexanecarbonyl, oleoyl, benzoyl, naphthylcarbonyl and cinnamoyl groups. Of those, preferred are acetyl, propionyl, butanoyl, dodecanoyl, octadecanoyl, t-butanoyl, oleoyl, benzoyl, naphthylcarbonyl and cinnamoyl groups; and more preferred are acetyl, propionyl and butanoyl groups.

As a result of our assiduous studies, we, the present inventors have found that, of the above-mentioned acyl substituents that substitute for the hydroxyl group in cellulose, at least two of substantially acetyl group/propionyl group/butanoyl group may lower the optical anisotropy of the cellulose acylate when the total degree of substitution with them is from 2.50 to 3.00. More preferably, the degree of acyl substitution is from 2.60 to 3.00, even more preferably from 2.65 to 3.00.

When the acyl substituent that substitute for the hydroxyl group in cellulose is an acetyl group alone, then the total degree of substitution with it is preferably from 2.80 to 2.99, more preferably from 2.85 to 2.95 from the viewpoint that the optical anisotropy of the film may be lowered and, in addition, the compatibility of the cellulose acylate with additives as well as the solubility thereof in organic solvent used is good.

[Degree of Polymerization of Cellulose Acylate]

Regarding the degree of polymerization of the cellulose acylate preferably used in the invention, it is desirable that the viscosity-average degree of polymerization of the cellulose acylate is from 180 to 700, more preferably from 180 to 550, even more preferably from 180 to 400, still more preferably from 180 to 350. If the degree of polymerization thereof is too high, then the viscosity of the dope solution of cellulose acylate may be too high, and film formation by casting may be difficult. If the degree of polymerization is too low, then the strength of the film formed may be low. The mean degree of polymerization may be determined according to an Uda et all's limiting viscosity method (Kazuo Uda & Hideo Saito, the Journal of Fiber Society of Japan, Vol. 18, No. 1, pp. 105-120, 1962). This is described in detail in JP-A 9-95538.

The molecular weight distribution of the cellulose acylate preferably used in the invention may be evaluated through gel permeation chromatography. It is desirable that the polydispersion index Mw/Mn (Mw indicates the mass-average molecular weight, and Mn indicates the number-average molecular weight) is smaller and the molecular weight distribution is narrower. Concretely, Mw/Mn is preferably from 1.0 to 3.0, more preferably from 1.0 to 2.0, most preferably from 1.0 to 1.6.

When low-molecular components are removed, then the mean molecular weight (degree of polymerization) of the cellulose acylate may be high, but the viscosity thereof may be lower than that of ordinary cellulose acylate and therefore, the cellulose acylate is useful. The cellulose acylate having a reduced content of low-molecular components may be obtained by removing low-molecular components from the cellulose acylate produced in an ordinary method. Removing low-molecular components may be carried out by washing the cellulose acylate with a suitable organic solvent. When a cellulose acylate having a reduced content of low-molecular components is produced, then the amount of the sulfuric acid catalyst in acylation is preferably controlled to be from 0.5 to 25 parts by mass relative to 100 parts by mass of cellulose. (In this specification, parts by mass and % by mass are equal to parts by weight and % by weight respectively.) When the amount of the sulfuric acid catalyst is defined to fall within the range, then it is desirable in point of the molecular weight distribution of the resulting cellulose acylate, or that is, a cellulose acylate having a uniform molecular weight distribution can be produced. Preferably, the water content of the cellulose acylate for use in the invention is at most 2% by mass, more preferably at most 1% by mass, even more preferably at most 0.7% by mass. Ordinary cellulose acylate generally contains water and its water content is known to be from 2.5 to 5% by mass. Therefore, in order that the cellulose acylate for use in the invention is made to have a water content falling within the range as above, the cellulose acylate must be dried. The drying method for it is not specifically defined, so far as the dried cellulose acylate may have the intended water content. The cellulose acylate for use in the invention as well as its starting material cellulose and its production method is described in detail, for example, in Hatsumei Kyokai, Disclosure Bulletin No. 2001-1745 (issued Mar. 15, 2001, by Hatsumei Kyokai), pp. 7-12.

The type of substituent, the degree of substitution, the degree of polymerization and the molecular weight distribution of the cellulose acylate for use in the invention may fall within the ranges as above, and one or more such cellulose acylates may be used herein either singly or as combined.

[Additives to Cellulose Acylate]

In accordance with their use, various additives may be added to the cellulose acylate solution for use in the invention, during the process of producing the solution. The additives include, for example, optical anisotropy-lowering compound, wavelength-dependent anisotropy distribution improver, UV inhibitor, plasticizer, antioxidant, fine particles, optical property improver, and these are described hereinunder. The time when the additives are added to the solution may be any one in the process of dope preparation. As the case may be, the additives may be added to the dope solution in the final step of dope preparation.

[Compound Capable of Lowering the Optical Anisotropy]

A compound capable of lowering the optical anisotropy of the polymer film of the present invention such as cellulose acylate film etc. is first described. As a result of our assiduous studies, we, the present inventors have found that, when a compound capable of retarding the in-plane and thickness-direction orientation of polymer, for example cellulose acylate molecules in a film is used, then the optical anisotropy of the cellulose acylate film may be lowered and both Re and Rth of the film could be nearly zero. For this, it is desirable that the compound capable of lowering the optical anisotropy of the film is highly compatible with polymer, for example cellulose acylate and the compound itself has neither a rod-shaped structure nor a plane-shaped structure. When the compound has plural plane-shaped functional groups such as aromatic groups, then it is desirable that the functional groups are not on one and the same plane but on different planes.

Preferably, the polymer film of the invention contains at least one compound capable of lowering the optical anisotropy, especially the thickness-direction retardation Rth of the film within a range that satisfies the following formulae (vii) and (viii):

$$(Rth_A - Rth_0)/A \leq -1.0, \quad \text{(vii)}$$

$$0.01 \leq A \leq 30. \quad \text{(viii)}$$

More preferably, $(Rth_A - Rth_0)/A \leq -2.0$ and $0.05 \leq A \leq 25$; even more preferably, $(Rth_A - Rth_0)/A \leq -3.0$ and $0.1 \leq A \leq 20$.

In the above, $Rth_A$ indicates Rth (nm) of the film that contains A % by mass of the compound; $Rth_0$ indicates Rth (nm) of the film not containing the compound; A indicates the mass (%) of the compound relative to the mass, 100, of the starting polymer for the film.

Within the ranges as above, the film retardation may be controlled to fall within a specific range and the dissolution of low-molecular compounds in alkali solution could be controlled within a range not causing any problem. Accordingly, the ranges as above are desirable.

(Log P)

In producing the cellulose acylate film for use in the invention, it is desirable to use the compound capable of retarding the in-plane and thickness-direction orientation of cellulose acylate in the film as so mentioned hereinabove to thereby lower the optical anisotropy of the film. Of the compound of the type, preferred is one having an octanol-water partition coefficient (log P value) of from 0 to 7. The compound of which the log P is over 7 is poorly compatible with cellulose acylate and it may therefore cause film whitening and dusting. On the other hand, the compound of which the log P is smaller than 0 is highly hydrophilic and it may worsen the water resistance of the cellulose acylate film. The log P is more preferably from 1 to 6, even more preferably from 1.5 to 5.

The octanol-water partition coefficient (log P) may be determined according to the flask dipping method of JIS Z7260-107 (2000). In place of actually measuring it, the octanol-water partition coefficient (long P) may be estimated according to a calculative chemical method or an experiential method. For the calculative method, preferred are a Crippen's fragmentation method (*J. Chem. Inf. Comput. Sci.*, 27, 21 (1987)); Viswanadhan's fragmentation method (*J. Chem. Inf. Comput. Sci.*, 29, 163 (1989)); Broto's fragmentation method (*Eur. J. Med. Chem.-Chim. Theor.*, 19, 71 (1984)). Of those, more preferred is a Crippen's fragmentation method (*J. Chem. Inf. Comput. Sci.*, 27, 21 (1987)). When the log P of a compound differs depending on the measurement method or the calculation method, then the compound is preferably judged as to whether it falls within the range of the invention according to the Crippen's fragmentation method.

(Determination of pKa and Solubility in Aqueous NaOH Solution)

In order that the cellulose acylate film is used for a protective film for polarizers, then the distribution of the properties such as the in-plane optical properties and the surface energy of the film must be reduced. For this, it is necessary that the properties of the film are stably and uniformly kept within the desired ranges in each step of the dope-casting step for film formation, the surface treatment step, the adhesive application step and the lamination step. In particular, in the surface treatment step, alkali saponification is generally employed in view of the producibility and this is often problematic for the following reasons. The compound capable of lowering the optical anisotropy of cellulose acylate film is highly hydrophilic in order that its compatibility with cellulose acylate may be good. Therefore, in the alkali saponification step, the saponification-processing solution may penetrate into the film and the dissolution of the compound into the solution may be promoted, and as a result, the properties of the film may be unstable. In particular, the film surface may be uneven and the surface properties may be also uneven. This must be prevented. We, the present inventors have assiduously studied, standing on this viewpoint, and, as a result, have found that, when the physical properties of the compound capable of lowering the optical anisotropy of cellulose acylate film are specifically controlled especially in point of the dissociation of the compound in alkali solution and the dissolution thereof in alkali solution, then the in-plane properties of the film can be kept uniform.

For the reason as above regarding the stability of the film against alkali saponification, the preferred range of the pKa of the compound for use in the invention for lowering the optical anisotropy of the cellulose acylate film is at least 14, more preferably at least 15, even more preferably at least 16. Since the pH of the alkali saponification-processing solution is generally from 13 to 14 or so, the compound having pKa of less than 14 may readily cause uneven optical properties and uneven surface energy of the alkali-saponified film. In particular, the compound having a lower pKa further lowers the in-plane uniformity of the optical properties of the film. The pKa of the compound may be obtained generally through titration. In the invention, it may be determined as follows: The compound to be analyzed is dissolved in 50 ml of a solvent system of DMSO/water=7/3, in a concentration of $5 \times 10^{-5}$ mol/liter, and then 0.5 ml of 0.25 N HCl is added to it so as to make its pH acidic. Next, using 0.5 N NaOH at 25° C., the titration curve is obtained through potentiometric titration. The pKa of the compound may be obtained through curve fitting, using a least square method combined with the theoretical equation of acid dissociation equilibrium.

Similarly for the same reason as above regarding the stability of the film against alkali saponification but in another aspect different from the aspect of the above-mentioned pKa value of the compound, the solubility in aqueous alkali solution of the compound usable in the invention for lowering the optical anisotropy of the cellulose acylate film is preferably at most 1.0% in terms of the solubility of the compound in an aqueous NaOH solution having a concentration of 1.5 mol/liter at 55° C., more preferably at most 0.1%, even more preferably at most 0.01%. If the solubility of the compound in the alkali saponification-processing solution is higher than 1.0%, then the optical properties and the surface energy of the film may readily fluctuate through alkali saponification treatment. The compound having a higher solubility lowers the uniformity of the in-plane optical properties of the film to a higher degree. The solubility of the compound may be visually determined.

[Physical Properties of Compound Capable of Lowering Optical Anisotropy]

The compound having the ability to lower the optical anisotropy of film may have or may not have an aromatic group. Preferably, the compound having the ability to lower the optical anisotropy of film has a molecular weight of 3000 or less, more preferably from 150 to 3000, further more preferably from 170 to 2000, still further more preferably from 200 to 1000. So far as having a molecular weight that falls within the range, the compound may have a specific monomer structure or may have an oligomer structure or a polymer structure with a plurality of such monomer units bonding to each other.

Preferably, the compound having the ability to lower the optical anisotropy of film is liquid at 25° C., or is a solid having a melting point of from 25 to 250° C., more preferably it is liquid at 25° C., or is a solid having a melting point of from 25 to 200° C. Preferably, the compound having the ability to lower the optical anisotropy of film does not evaporate away in the dope-casting and drying process of cellulose acylate film formation.

The amount of the optical anisotropy-lowering compound to be added to the film-forming dope in the invention is preferably from 0.01 to 30% by mass of cellulose acylate, more preferably from 1 to 25% by mass, even more preferably from 5 to 20% by mass.

One or more different types of optical anisotropy-lowering compounds may be used herein either singly or as combined in any desired ratio.

The time when the optical anisotropy-lowering compound is added to the film-forming dope may be any one during the process of dope preparation, and the compound may be added to the done in the final step of the dope preparation.

Regarding the content of the optical anisotropy-lowering compound in the cellulose acylate film in the invention, the mean content of the compound in the part of up to 10% of the overall thickness of the film from at least one surface side of the film is from 80 to 99% of the mean content of the compound in the center part of the film. The amount of the compound in the film in the invention may be determined by measuring the amount thereof in the surface part of the film and that in the center part thereof through IR absorption spectrometry as in JP-A 8-57879

Firstly, general formulae (1) to (19) mentioned below are examples of the compound having the ability to lower the optical anisotropy of cellulose acylate film in the invention, to which, however, the invention should not be limited.

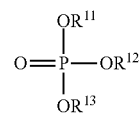

Formula (1)

In the formula, $R^{11}$ to $R^{13}$ each independently represents an aliphatic group having from 1 to 20 carbon atoms, and $R^{11}$ to $R^{13}$ may bond to each other to form a ring.

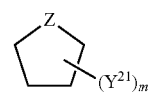

Formula (2)

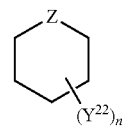

Formula (3)

In formulae (2) and (3), Z represents a carbon atom, an oxygen atom, a sulfur atom or $-NR^{25}-$; $R^{25}$ represents a hydrogen atom or an alkyl group; the 5- or 6-membered ring constituted with Z may have a substituent; $Y^{21}$ and $Y^{22}$ each independently represents an ester group, an alkoxycarbonyl group, an amido group or a carbamoyl group having from 1 to 20 carbon atoms, and $Y^{21}$'s and $Y^{22}$'s may bond to each other to form a ring; m indicates an integer of from 1 to 5; and n indicates an integer of from 1 to 6.

Formula (4)

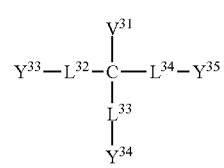

Formula (5)

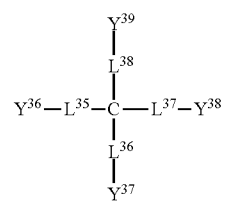

Formula (6)

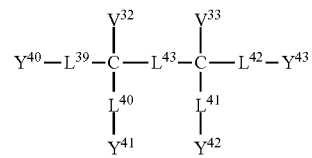

Formula (7)

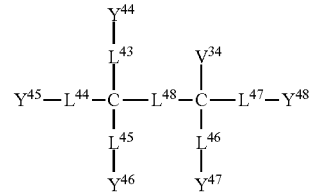

Formula (8)

Formula (9)

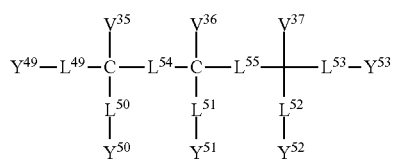

Formula (10)

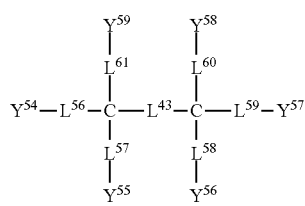

Formula (11)

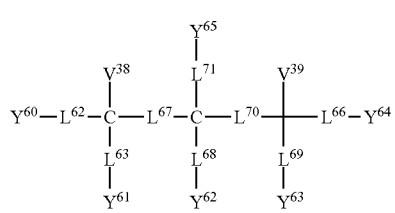

Formula (12)

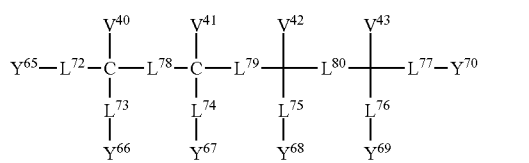

In formulae (4) to (12), $Y^{31}$ to $Y^{70}$ each independently represents an ester group having from 1 to 20 carbon atoms, an alkoxycarbonyl group having from 1 to 20 carbon atoms, an amido group having from 1 to 20 carbon atoms, a carbamoyl group having from 1 to 20 carbon atoms, or a hydroxyl group; $V^{31}$ to $V^{43}$ each independently represents a hydrogen atom, or an aliphatic group having from 1 to 20 carbon atoms; $L^{31}$ to $L^{80}$ each independently represents a divalent saturated linking group having from 0 to 40 atoms and having from 0 to 20 carbon atoms; $L^{31}$ to $L^{80}$ having 0 (zero) atom mean that the groups existing on both sides of the linking group directly form a single bond; $V^{31}$ to $V^{43}$ and $L^{31}$ to $L^{80}$ may have any other substituent.

Formula (13)

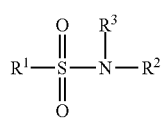

In the formula, $R^1$ represents an alkyl group or an aryl group; $R^2$ and $R^3$ each independently represents a hydrogen atom, an alkyl group or an aryl group; the total of the carbon atoms of $R^1$, $R^2$ and $R^3$ is at least 10; and the alkyl group and the aryl group may have a substituent.

Formula (14)

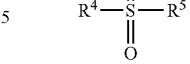

In the formula, $R^4$ and $R^5$ each independently represents an alkyl group or an aryl group; the total of the carbon atoms of $R^4$ and $R^5$ is at least 10; and the alkyl group and the aryl group may have a substituent.

Formula (15)

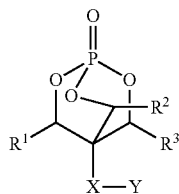

In the formula, $R^1$, $R^2$ and $R^3$ each independently represents a hydrogen atom or an alkyl group; X represents a divalent linking group formed of at least one group selected from the following linking group 1;

Y represents a hydrogen atom, an alkyl group, an aryl group or an aralkyl group:

(linking group 1) single bond, —O—, —CO—, —NR⁴—, alkylene group or arylene group, in which $R^4$ represents a hydrogen atom, an alkyl group, an aryl group or an aralkyl group.

Formula (16)

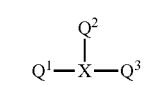

In the formula, $Q^1$, $Q^2$ and $Q^3$ each independently represents a 5- or 6-membered ring; X represents B, C—R (where R represents a hydrogen atom or a substituent), N, P or P═O.

Formula (17)

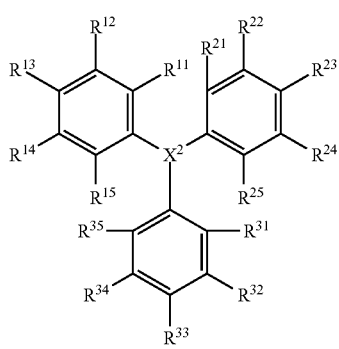

In the formula, $X^2$ represents B, C—R (where R represents a hydrogen atom or a substituent), or N; $R^{11}$, $R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}$, $R^{34}$ and $R^{35}$ each independently represents a hydrogen atom or a substituent.

Formula (18)

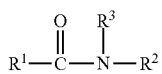

In the formula, R1 represents an alkyl group or an aryl group; R2 and R3 each independently represents a hydrogen atom, an alkyl group or an aryl group; and the alkyl group and the aryl group may have a substituent.

Of the compounds of formula (18), preferred are those of the following formula (19):

Formula (19)

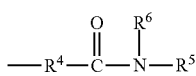

In formula (19), R4, R5 and R6 each independently represents an alkyl group or an aryl group. The alkyl group may be linear, branched or cyclic, but preferably has from 1 to 20 carbon atoms, more preferably from 1 to 15 carbon atoms, most preferably from 1 to 12 carbon atoms. For the cyclic alkyl group, especially preferred is a cyclohexyl group. The aryl group preferably has from 6 to 36 carbon atoms, more preferably from 6 to 24 carbon atoms.

The alkyl group and the aryl group may have a substituent. For the substituent, preferred are a halogen atom (e.g., chlorine, bromine, fluorine and iodine), an alkyl group, an aryl group, an alkoxy group, an aryloxy group, an acyl group, an alkoxycarbonyl group, an aryloxycarbonyl, an acyloxy group, a sulfonylamino group, a hydroxyl group, a cyano group, an amino group and an acylamino group; more preferred are a halogen atom, an alkyl group, an aryl group, an alkoxy group, an aryloxy group, a sulfonylamino group and an acylamino group; even more preferred are an alkyl group, an aryl group, a sulfonylamino group and an acylamino group.

The compounds of formulae (1) to (19) for use in the invention, having the ability to lower the optical anisotropy of cellulose acylate, are described below for their specific examples, to which, however, the invention should not be limited.

The compounds of formula (1) are described.

Formula (1)

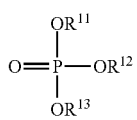

In formula (1), $R^{11}$ to $R^{13}$ each independently represents an aliphatic group having from 1 to 20 carbon atoms, and $R^{11}$ to $R^{13}$ may bond to each other to form a ring.

$R^{11}$ to $R^{13}$ are described in detail. Preferably, $R^{11}$ to $R^{13}$ each are an aliphatic group having from 1 to 20 carbon atoms, more preferably from 1 to 16 carbon atoms, even more preferably from 1 to 12 carbon atoms. The aliphatic group as referred to herein is preferably an aliphatic hydrocarbon group, more preferably an alkyl group (including linear, branched and cyclic alkyl groups), an alkenyl group or an alkynyl group. Examples of the alkyl group are methyl, ethyl, n-propyl, isopropyl, n-butyl, isobutyl, sec-butyl, t-butyl, n-pentyl, t-amyl, n-hexyl, n-octyl, decyl, dodecyl, eicosyl, 2-ethylhexyl, cyclopentyl, cyclohexyl, cycloheptyl, 2,6-dimethylcyclohexyl, 4-t-butylcyclohexyl, cyclopentyl, 1-adamantyl, 2-adamantyl, bicyclo[2.2.2]octan-3-yl. The alkenyl group include, for example, vinyl, allyl, prenyl, geranyl, oleyl, 2-cyclopenten-1-yl, 2-cyclohexen-1-yl. The alkynyl group includes, for example, ethynyl, propargyl.

The aliphatic group represented by $R^{11}$ to $R^{13}$ may be substituted. Examples of the substituent for it are a halogen atom (fluorine atom, chlorine atom, bromine atom, iodine atom), an alkyl group (linear, branched or cyclic alkyl group, including bicycloalkyl group and active methine group), an alkenyl group, an alkynyl group, an aryl group, a heterocyclic group (its bonding position is not specifically defined), an acyl group, an alkoxycarbonyl group, an aryloxycarbonyl group, a heterocyclic-oxycarbonyl group, a carbamoyl group, an N-acylcarbamoyl group, an N-sulfonylcarbamoyl group, an N-carbamoylcarbamoyl group, an N-sulfamoylcarbamoyl group, a carbazoyl group, a carboxyl group or its salt, an oxalyl group, an oxamoyl group, a cyano group, an carbonimidoyl group (carbonimidoyl group), a formyl group, a hydroxy group, an alkoxy group (including those with repetitive ethyleneoxy or propyleneoxy units), an aryloxy group, a heterocyclic-oxy group, an acyloxy group, an (alkoxy or aryloxy)carbonyloxy group, a carbamoyloxy group, a sulfonyloxy group, an amino group, an (alkyl, aryl or heterocyclic) amino group, an acylamino group, a sulfonamido group, an ureido group, a thioureido group, an imido group, an (alkoxy or aryloxy)carbonylamino group, a sulfamoylamino group, a semicarbazido group, an ammonio group, an oxamoylamino group, an N-(alkyl or aryl)sulfonylureido group, an N-acylureido group, an N-acylsulfamoylamino group, a quaternated nitrogen-containing heterocyclic group (e.g., pyridinio group, imidazolio group, quinolinio group, isoquinolinio group), an isocyano group, an imino group, an (alkyl or aryl) sulfonyl group, an (alkyl or aryl)sulfinyl group, a sulfo group or its salt, a sulfamoyl group, an N-acylsulfamoyl group, an N-sulfonylsulfamoyl group or its salt, a phosphino group, a phosphinyl group, a phosphinyloxy group, a phosphinylamino group, and a silyl group.

These groups may be combined to form a hetero-substituent. Examples of the substituent of the type are an ethoxyethoxyethyl group, a hydroxyethoxyethyl group, an ethoxycarbonylethyl group. $R^{11}$ to $R^{13}$ may have, a phosphate group as a substituent. The compounds of formula (1) may have plural phosphate groups in one molecule.

Hereafter, examples (C-1 to C-76) of the compounds represented by formula (1) are mentioned below, to which, however, the invention should not be limited. The value of log P is shown in the following Tables for each compound. This was obtained according to the Crippen's fragmentation method (J. Chem. Inf. Comput. Sci., 27, 21 (1987)).

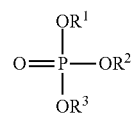

(In the formula, $R^1$ to $R^3$ have the same meanings as $R^{11}$ to $R^{13}$ in formula (1), and their examples are in the following C-1 to C76.)

| compound | R¹ | R² | R³ | logP |
|---|---|---|---|---|
| C-1 | $CH_3$ | $C_2H_5$ | $C_2H_5$ | 1.24 |
| C-2 | $C_2H_5$ | $C_2H_5$ | $C_2H_5$ | 1.58 |
| C-3 | $C_3H_7$ | $C_3H_7$ | $C_3H_7$ | 2.99 |
| C-4 | i-$C_3H_7$ | i-$C_3H_7$ | i-$C_3H_7$ | 2.82 |
| C-5 | $C_4H_9$ | $C_4H_9$ | $C_4H_9$ | 4.18 |
| C-6 | i-$C_4H_9$ | i-$C_4H_9$ | i-$C_4H_9$ | 4.2 |
| C-7 | s-$C_4H_9$ | s-$C_4H_9$ | s-$C_4H_9$ | 4.23 |
| C-8 | t-$C_4H_9$ | t-$C_4H_9$ | t-$C_4H_9$ | 3.06 |
| C-9 | $C_5H_{11}$ | $C_5H_{11}$ | $C_5H_{11}$ | 5.37 |
| C-10 | $CH_2C(CH_3)_3$ | $CH_2C(CH_3)_3$ | $CH_2C(CH_3)_3$ | 5.71 |
| C-11 | c-$C_5H_9$ | c-$C_5H_9$ | c-$C_5H_9$ | 4.12 |
| C-12 | 1-ethylpropyl | 1-ethylpropyl | 1-ethylpropyl | 5.63 |
| C-13 | $C_6H_{13}$ | $C_6H_{13}$ | $C_6H_{13}$ | 6.55 |
| C-14 | c-$C_6H_{11}$ | c-$C_6H_{11}$ | c-$C_6H_{11}$ | 5.31 |
| C-15 | $C_7H_{15}$ | $C_7H_{15}$ | $C_7H_{15}$ | 7.74 |
| C-16 | 4-methylcyclohexyl | 4-methylcyclohexyl | 4-methylcyclohexyl | 6.3 |
| C-17 | 4-t-butylcyclohexyl | 4-t-butylcyclohexyl | 4-t-butylcyclohexyl | 9.78 |
| C-18 | $C_8H_{17}$ | $C_8H_{17}$ | $C_8H_{17}$ | 8.93 |
| C-19 | 2-ethylhexyl | 2-ethylhexyl | 2-ethylhexyl | 8.95 |
| C-20 | 3-methylbutyl | 3-methylbutyl | 3-methylbutyl | 5.17 |
| C-21 | 1,3-dimethylbutyl | 1,3-dimethylbutyl | 1,3-dimethylbutyl | 6.41 |
| C-22 | 1-isopropyl-2-methylpropyl | 1-isopropyl-2-methylpropyl | 1-isopropyl-2-methylpropyl | 8.05 |
| C-23 | 2-ethylbutyl | 2-ethylbutyl | 2-ethylbutyl | 6.57 |
| C-24 | 3,5,5-trimethylhexyl | 3,5,5-trimethylhexyl | 3,5,5-trimethylhexyl | 9.84 |
| C-25 | cyclohexylmethyl | cyclohexylmethyl | cyclohexylmethyl | 6.25 |
| C-26 | $CH_3$ | $CH_3$ | 2-ethylhexyl | 3.35 |
| C-27 | $CH_3$ | $CH_3$ | 1-adamantyl | 2.27 |
| C-28 | $CH_3$ | $CH_3$ | $C_{12}H_{25}$ | 4.93 |
| C-29 | $C_2H_5$ | $C_2H_5$ | 2-ethylhexyl | 4.04 |
| C-30 | $C_2H_5$ | $C_2H_5$ | 1-adamantyl | 2.96 |
| C-31 | $C_2H_5$ | $C_2H_5$ | $C_{12}H_{25}$ | 5.62 |
| C-32 | $C_4H_9$ | $C_4H_9$ | cyclohexyl | 4.55 |
| C-33 | $C_4H_9$ | $C_4H_9$ | $C_6H_{13}$ | 4.97 |
| C-34 | $C_4H_9$ | $C_4H_9$ | $C_8H_{17}$ | 5.76 |
| C-35 | $C_4H_9$ | $C_4H_9$ | 2-ethylhexyl | 5.77 |
| C-36 | $C_4H_9$ | $C_4H_9$ | $C_{10}H_{21}$ | 6.55 |
| C-37 | $C_4H_9$ | $C_4H_9$ | $C_{12}H_{25}$ | 7.35 |
| C-38 | $C_4H_9$ | $C_4H_9$ | 1-adamantyl | 4.69 |
| C-39 | $C_4H_9$ | $C_4H_9$ | $C_{16}H_{33}$ | 8.93 |
| C-40 | $C_4H_9$ | $C_4H_9$ | dicyclopentadienyl | 4.68 |
| C-41 | $C_6H_{13}$ | $C_6H_{13}$ | $C_{14}H_{29}$ | 9.72 |
| C-42 | $C_6H_{13}$ | $C_6H_{13}$ | $C_8H_{17}$ | 7.35 |
| C-43 | $C_6H_{13}$ | $C_6H_{13}$ | 2-ethylhexyl | 7.35 |
| C-44 | $C_6H_{13}$ | $C_6H_{13}$ | $C_{10}H_{21}$ | 8.14 |
| C-45 | $C_6H_{13}$ | $C_6H_{13}$ | $C_{12}H_{25}$ | 8.93 |
| C-46 | $C_6H_{13}$ | $C_6H_{13}$ | 1-adamantyl | 6.27 |
| C-47 | 4-chlorobutyl | 4-chlorobutyl | 4-chlorobutyl | 4.18 |
| C-48 | 4-chlorohexyl | 4-chlorohexyl | 4-chlorohexyl | 6.55 |
| C-49 | 4-bromobutyl | 4-bromobutyl | 4-bromobutyl | 4.37 |
| C-50 | 4-bromohexyl | 4-bromohexyl | 4-bromohexyl | 6.74 |
| C-51 | $(CH_2)_2OCH_2CH_3$ | $(CH_2)_2OCH_2CH_3$ | $(CH_2)_2OCH_2CH_3$ | 1.14 |
| C-52 | $C_8H_{17}$ | $C_8H_{17}$ | $(CH_2)_2O(CH_2)_2OCH_2CH_3$ | 6.55 |
| C-53 | $C_6H_{13}$ | $C_6H_{13}$ | $(CH_2)_2O(CH_2)_2OCH_2CH_3$ | 4.96 |
| C-54 | $C_4H_9$ | $C_4H_9$ | $(CH_2)_2O(CH_2)_2OCH_2CH_3$ | 3.38 |
| C-55 | $C_4H_9$ | $C_4H_9$ | $(CH_2)_2O(CH_2)_2OCH_2OH$ | 2.59 |
| C-56 | $C_6H_{13}$ | $C_6H_{13}$ | $(CH_2)_2O(CH_2)_2OCH_2OH$ | 4.18 |
| C-57 | $C_8H_{17}$ | $C_8H_{17}$ | $(CH_2)_2O(CH_2)_2OCH_2OH$ | 5.76 |
| C-58 | $C_4H_9$ | $(CH_2)_2O(CH_2)_2OCH_2OH$ | $(CH_2)_2O(CH_2)_2OCH_2OH$ | 2.2 |
| C-59 | $C_4H_9$ | $C_4H_9$ | $CH_2CH=CH_2$ | 4.19 |
| C-60 | $C_4H_9$ | $CH_2CH=CH_2$ | $CH_2CH=CH_2$ | 3.64 |
| C-61 | $(CH_2)_2CO_2CH_2CH_3$ | $(CH_2)_2CO_2CH_2CH_3$ | $(CH_2)_2CO_2CH_2CH_3$ | 1.1 |
| C-62 | $(CH_2)_2CO_2(CH_2)_3CH_3$ | $(CH_2)_2CO_2(CH_2)_3CH_3$ | $(CH_2)_2CO_2(CH_2)_3CH_3$ | 3.69 |
| C-63 | $(CH_2)_2CONH(CH_2)_3CH_3$ | $(CH_2)_2CONH(CH_2)_3CH_3$ | $(CH_2)_2CONH(CH_2)_3CH_3$ | 1.74 |
| C-64 | $C_4H_9$ | $C_4H_9$ | $(CH_2)_4OP=O(OC_4H_9)_2$ | 6.66 |
| C-65 | $C_4H_9$ | $C_4H_9$ | $(CH_2)_3OP=O(OC_4H_9)_2$ | 6.21 |
| C-66 | $C_4H_9$ | $C_4H_9$ | $(CH_2)_2OP=O(OC_4H_9)_2$ | 6.16 |
| C-67 | $C_4H_9$ | $C_4H_9$ | $(CH_2)_2O(CH_2)_2OP=O(OC_4H_9)_2$ | 5.99 |
| C-68 | $C_6H_{13}$ | $C_6H_{13}$ | $(CH_2)_2O(CH_2)_2OP=O(OC_4H_9)_2$ | 7.58 |
| C-69 | $C_6H_{13}$ | $C_6H_{13}$ | $(CH_2)_4OP=O(OC_4H_9)_2$ | 8.25 |
| C-70 | c-$C_6H_{13}$ | c-$C_6H_{13}$ | $(CH_2)_2O(CH_2)_2OP=O(OC_4H_9)_2$ | 6.35 |
| C-71 | $C_6H_{12}Cl$ | $C_6H_{12}Cl$ | $(CH_2)_2O(CH_2)_2OP=O(OC_4H_9)_2$ | 7.18 |
| C-72 | $C_4H_8Cl$ | $C_4H_8Cl$ | $(CH_2)_2O(CH_2)_2OP=O(OC_4H_9)_2$ | 5.6 |
| C-73 | $C_4H_8Cl$ | $C_4H_8Cl$ | $(CH_2)_2O(CH_2)_2OP=O(OC_4H_8Cl)_2$ | 5.59 |
| C-74 | $C_4H_9$ | $C_4H_9$ | 2-tetrahydrofuranyl | 3.27 |
| C-75 | $C_4H_9$ | 2-tetrahydrofuranyl | 2-tetrahydrofuranyl | 2.36 |
| C-76 | 2-tetrahydrofuranyl | 2-tetrahydrofuranyl | 2-tetrahydrofuranyl | 1.45 |

The compounds of formulae (2) and (3) are described.

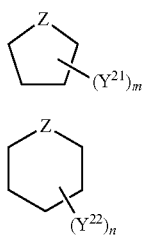

Formula (2)

Formula (3)

In formulae (2) and (3), Z represents a carbon atom, an oxygen atom, a sulfur atom or —$NR^{25}$—; $R^{25}$ represents a hydrogen atom or an alkyl group; the 5- or 6-membered ring constituted with Z may have a substituent; and plural substituents may bond to each other to form a ring. Examples of the 5- or 6-membered ring constituted with Z are tetrahydrofuran, tetrahydropyran, tetrahydrothiophene, thiane, pyrrolidine, piperidine, indoline, isoindoline, coumarone, isocoumarone, tetrahydro-2-furanone, tetrahydro-2-pyrone, 4-butanelactam, 6-hexanolactam.

The 5- or 6-membered ring constituted with Z includes a lactone structure or a lactam structure, or that is, a cyclic ester or cyclic amido structure with an oxo group bonding to the carbon atom adjacent to Z. Examples of the cyclic ester or cyclic amido structure are 2-pyrrolidone, 2-piperidone, 5-pentanolide, 6-hexanolide.

$R^{25}$ is a hydrogen atom, or an alkyl group (including linear, branched and cyclic alkyl groups) preferably having from 1 to 20 carbon atoms, more preferably from 1 to 16 carbon atoms, even more preferably from 1 to 12 carbon atoms. The alkyl group for $R^{25}$ includes methyl, ethyl, n-propyl, isopropyl, n-octyl, decyl, dodecyl, eicosyl, 2-ethylhexyl, cyclopentyl, cyclohexyl, cycloheptyl, 2,6-dimethylcyclohexyl, 4-t-butylcyclohexyl, cyclopentyl, 1-adamantyl, 2-adamantyl, bicyclo[2.2.2]octan-3-yl. The alkyl group for $R^{25}$ may have any other substituent. Examples of the substituent may be those mentioned hereinabove for $R^{11}$ to $R^{13}$.

$Y^{21}$ and $Y^{22}$ each independently represents an ester group, an alkoxycarbonyl group, an amido group or a carbamoyl group. The ester group preferably has from 1 to 20 carbon atoms, more preferably from 1 to 16 carbon atoms, even more preferably from 1 to 12 carbon atoms, including, for example, acetoxy, ethylcarbonyloxy, propylcarbonyloxy, n-butylcarbonyloxy, iso-butylcarbonyloxy, t-butylcarbonyloxy, sec-butylcarbonyloxy, n-pentylcarbonyloxy, t-amylcarbonyloxy, n-hexylcarbonyloxy, cyclohexylcarbonyloxy, 1-ethylpentylcarbonyloxy, n-heptylcarbonyloxy, n-nonylcarbonyloxy, n-undecylcarbonyloxy, benzylcarbonyloxy, 1-naphthalenecarbonyloxy, 2-naphthalenecarbonyloxy, 1-adamantanecarbonyloxy. The alkoxycarbonyl group preferably has from 1 to 20 carbon atoms, more preferably from 1 to 16 carbon atoms, even more preferably from 1 to 12 carbon atoms, including, for example, methoxycarbonyl, ethoxycarbonyl, n-propyloxycarbonyl, isopropyloxycarbonyl, n-butoxycarbonyl, t-butoxycarbonyl, iso-butyloxycarbonyl, sec-butyloxycarbonyl, n-pentyloxycarbonyl, t-amyloxycarbonyl, n-hexyloxycarbonyl, cyclohexyloxycarbonyl, 2-ethylhexyloxycarbonyl, 1-ethylpropyloxycarbonyl, n-octyloxycarbonyl, 3,7-dimethyl-3-octyloxycarbonyl, 3,5,5-trimethylhexyloxycarbonyl, 4-t-butylcyclohexyloxycarbonyl, 2,4-dimethylpentyl-3-oxycarbonyl, 1-adamantanoxycarbonyl, 2-adamantanoxycarbonyl, dicyclopentadienyloxycarbonyl, n-decyloxycarbonyl, n-dodecyloxycarbonyl, n-tetradecyloxycarbonyl, n-hexadecyloxycarbonyl. The amido group preferably has from 1 to 20 carbon atoms, more preferably from 1 to 16 carbon atoms, even more preferably from 1 to 12 carbon atoms, including, for example, acetamido, ethylcarboxamido, n-propylcarboxamido, isopropylcarboxamido, n-butylcarboxamido, t-butylcarboxamido, iso-butylcarboxamido, sec-butylcarboxamido, n-pentylcarboxamido, t-amylcarboxamido, n-hexylcarboxamido, cyclohexylcarboxamido, 1-ethylpentylcarboxamido, 1-ethylpropylcarboxamido, n-heptylcarboxamido, n-octylcarboxamido, 1-adamantanecarboxamido, 2-adamantanecarboxamido, n-nonylcarboxamido, n-dodecylcarboxamido, n-pentanecarboxamido, n-hexadecylcarboxamido. The carbamoyl group preferably has from 1 to 20 carbon atoms, more preferably from 1 to 16 carbon atoms, even more preferably from 1 to 12 carbon atoms, including, for example, methylcarbamoyl, dimethylcarbamoyl, ethylcarbamoyl, diethylcarbamoyl, n-propylcarbamoyl, isopropylcarbamoyl, n-butylcarbamoyl, t-butylcarbamoyl, iso-butylcarbamoyl, sec-butylcarbamoyl, n-pentylcarbamoyl, t-amylcarbamoyl, n-hexylcarbamoyl, cyclohexylcarbamoyl, 2-ethylhexylcarbamoyl, 2-ethylbutylcarbamoyl, t-octylcarbamoyl, n-heptylcarbamoyl, n-octylcarbamoyl, 1-adamantanecarbamoyl, 2-adamantanecarbamoyl, n-decylcarbamoyl, n-dodecylcarbamoyl, n-tetradecylcarbamoyl, n-hexadecylcarbamoyl. $Y^{21}$'s and $Y^{22}$'s may bond to each other to form a ring. $Y^{21}$ and $Y^{22}$ may have any other substituent. Examples of the substituent may be those mentioned hereinabove for $R^{11}$ to $R^{13}$.

Hereafter, examples (C-201 to C-231) of the compounds represented by formula (λ) and (3) are mentioned below, to which, however, the invention should not be limited. The value of log P is parenthesized for each compound. This was obtained according to the Crippen's fragmentation method (*J. Chem. Inf. Comput. Sci.*, 27, 21 (1987)).

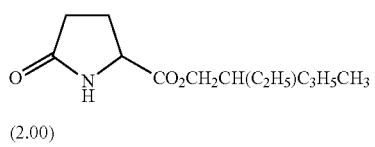

C-201

(2.00)

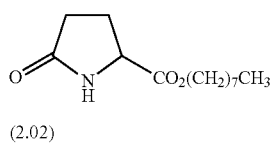

C-202

(2.02)

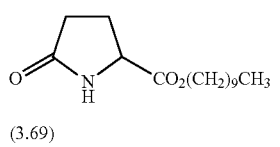

C-203

(3.69)

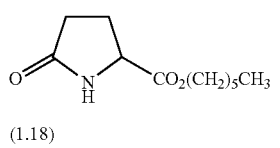

C-204

(1.18)

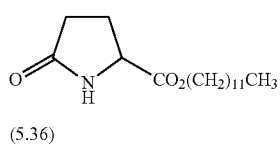

C-205

(5.36)

C-206 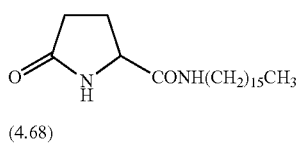
(4.68)
C-207 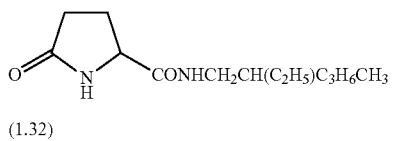
(1.32)
C-208 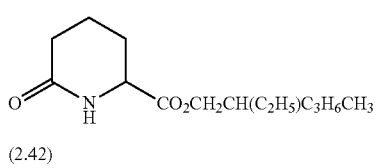
(2.42)
C-209 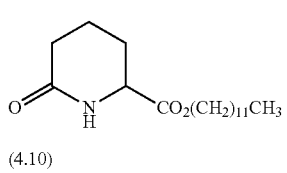
(4.10)
C-210 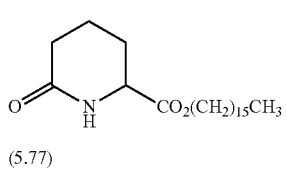
(5.77)
C-211 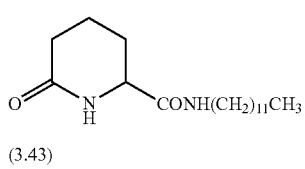
(3.43)
C-212 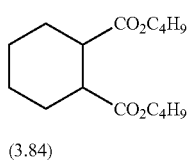
(3.84)
C-213 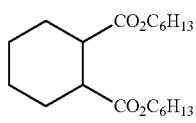
(5.51)
C-214 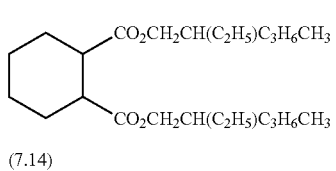
(7.14)
C-215 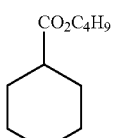
(3.84)
C-216 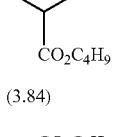
(5.51)
C-217 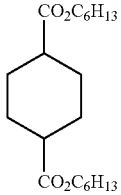
(7.14)
C-218 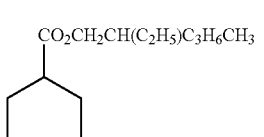
(2.98)
C-219 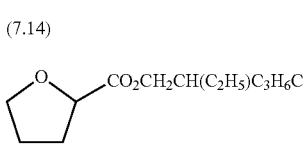
(3.70)
C-220 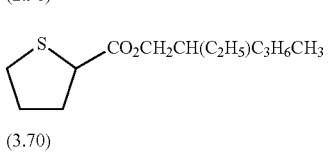
(2153)
C-221 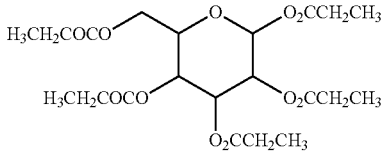
(4.45)
C-222 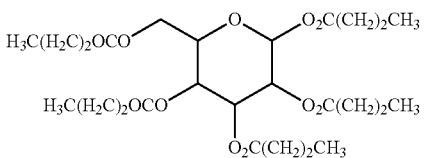
(1.27)

C-223 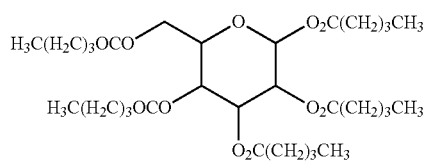
(6.53)
C-224 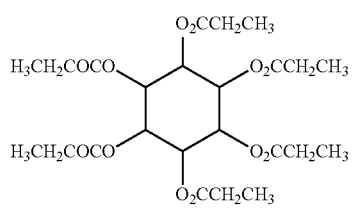
(2.23)
C-225 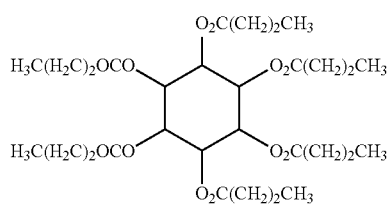
(5.01)
C-226 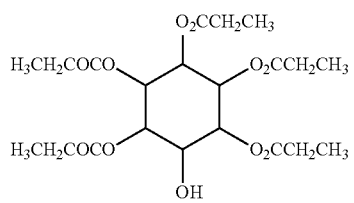
(1.31)
C-227 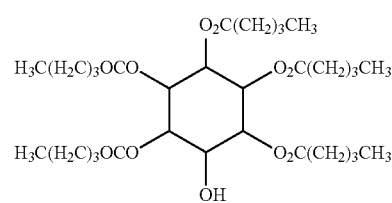
(5.69)
C-228 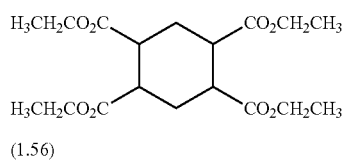
(1.56)
C-229 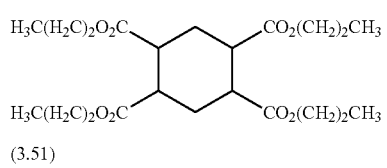
(3.51)
C-230 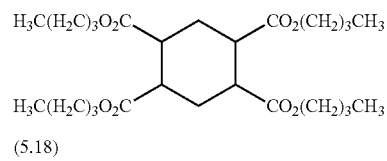
(5.18)
C-231 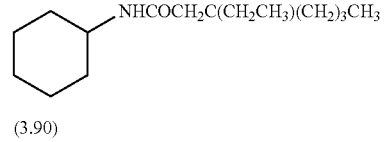
(3.90)
The compounds of formulae (4) to (12) are described.
Formula (4)
$Y^{31}-L^{31}-Y^{32}$
Formula (5)
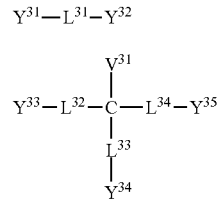
Formula (6)
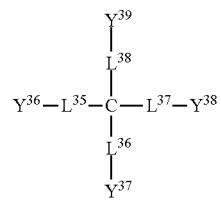
Formula (7)
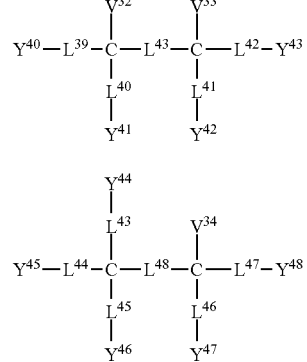
Formula (8)
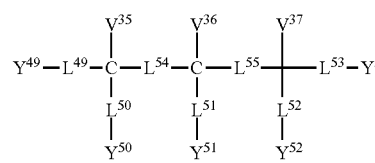
Formula (9)
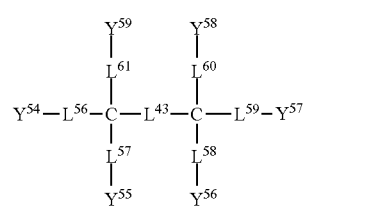
Formula (10)
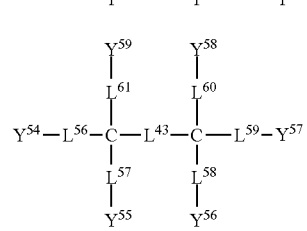

Formula (11)

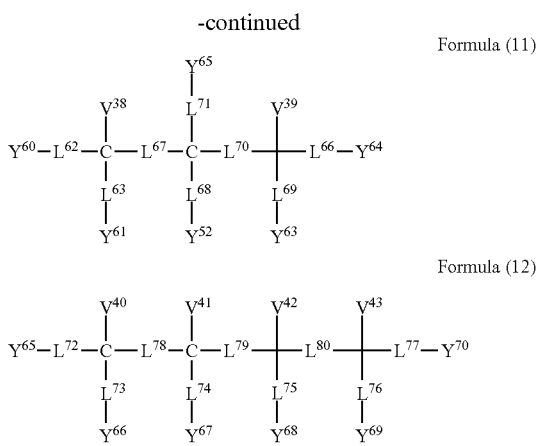

Formula (12)

In formulae (4) to (12), $Y^{31}$ to $Y^{70}$ each independently represents an ester group, an alkoxycarbonyl group, an amido group, a carbamoyl group, or a hydroxyl group. The ester group preferably has from 1 to 20 carbon atoms, more preferably from 1 to 16 carbon atoms, even more preferably from 1 to 12 carbon atoms, including, for example, acetoxy, ethylcarbonyloxy, propylcarbonyloxy, n-butylcarbonyloxy, iso-butylcarbonyloxy, t-butylcarbonyloxy, sec-butylcarbonyloxy, n-pentylcarbonyloxy, t-amylcarbonyloxy, n-hexylcarbonyloxy, cyclohexylcarbonyloxy, 1-ethylpentylcarbonyloxy, n-heptylcarbonyloxy, n-nonylcarbonyloxy, n-undecylcarbonyloxy, benzylcarbonyloxy, 1-naphthalenecarbonyloxy, 2-naphthalenecarbonyloxy, 1-adamantanecarbonyloxy. The alkoxycarbonyl group preferably has from 1 to 20 carbon atoms, more preferably from 1 to 16 carbon atoms, even more preferably from 1 to 12 carbon atoms, including, for example, methoxycarbonyl, ethoxycarbonyl, n-propyloxycarbonyl, isopropyloxycarbonyl, n-butoxycarbonyl, t-butoxycarbonyl, iso-butyloxycarbonyl, sec-butyloxycarbonyl, n-pentyloxycarbonyl, t-amyloxycarbonyl, n-hexyloxycarbonyl, cyclohexyloxycarbonyl, 2-ethylhexyloxycarbonyl, as well as 1-ethylpropyloxycarbonyl, n-octyloxycarbonyl, 3,7-dimethyl-3-octyloxycarbonyl, 3,5,5-trimethylhexyloxycarbonyl, 4-t-butylcyclohexyloxycarbonyl, 2,4-dimethylpentyl-3-oxycarbonyl, 1-adamantanoxycarbonyl, 2-adamantanoxycarbonyl, dicyclopentadienyloxycarbonyl, n-decyloxycarbonyl, n-dodecyloxycarbonyl, n-tetradecyloxycarbonyl, n-hexadecyloxycarbonyl. The amido group preferably has from 1 to 20 carbon atoms, more preferably from 1 to 16 carbon atoms, even more preferably from 1 to 12 carbon atoms, including, for example, acetamido, ethylcarboxamido, n-propylcarboxamido, isopropylcarboxamido, n-butylcarboxamido, t-butylcarboxamido, iso-butylcarboxamido, sec-butylcarboxamido, n-pentylcarboxamido, t-amylcarboxamido, n-hexylcarboxamido, cyclohexylcarboxamido, 1-ethylpentylcarboxamido, 1-ethylpropylcarboxamido, n-heptylcarboxamido, n-octylcarboxamido, 1-adamantanecarboxamido, 2-adamantanecarboxamido, n-nonylcarboxamido, n-dodecylcarboxamido, n-pentanecarboxamido, n-hexadecylcarboxamido. The carbamoyl group preferably has from 1 to 20 carbon atoms, more preferably from 1 to 16 carbon atoms, even more preferably from 1 to 12 carbon atoms, including, for example, methylcarbamoyl, dimethylcarbamoyl, ethylcarbamoyl, diethylcarbamoyl, n-propylcarbamoyl, isopropylcarbamoyl, n-butylcarbamoyl, t-butylcarbamoyl, iso-butylcarbamoyl, sec-butylcarbamoyl, n-pentylcarbamoyl, t-amylcarbamoyl, n-hexylcarbamoyl, cyclohexylcarbamoyl, 2-ethylhexylcarbamoyl, 2-ethylbutylcarbamoyl, t-octylcarbamoyl, n-heptylcarbamoyl, n-octylcarbamoyl, 1-adamantanecarbamoyl, 2-adamantanecarbamoyl, n-decylcarbamoyl, n-dodecylcarbamoyl, n-tetradecylcarbamoyl, n-hexadecylcarbamoyl. $Y^{31}$ to $Y^{70}$ may have any other substituent. Examples of the substituent may be those mentioned hereinabove for $R^{11}$ to $R^{13}$.

$V^{31}$ to $V^{43}$ each independently represents a hydrogen atom, or an aliphatic group preferably having from 1 to 20 carbon atoms, more preferably from 1 to 16 carbon atoms, even more preferably from 1 to 12 carbon atoms. The aliphatic group as referred to herein is preferably an aliphatic hydrocarbon group, more preferably an alkyl group (including linear, branched and cyclic alkyl groups), an alkenyl group or an alkynyl group. Examples of the alkyl group are methyl, ethyl, n-propyl, isopropyl, n-butyl, isobutyl, sec-butyl, t-butyl, n-pentyl, t-amyl, n-hexyl, n-octyl, decyl, dodecyl, eicosyl, 2-ethylhexyl, cyclopentyl, cyclohexyl, cycloheptyl, 2,6-dimethylcyclohexyl, 4-t-butylcyclohexyl, cyclopentyl, 1-adamantyl, 2-adamantyl, bicyclo[2.2.2]octan-3-yl. The alkenyl group include, for example, vinyl, allyl, prenyl, geranyl, oleyl, 2-cyclopenten-1-yl, 2-cyclohexen-1-yl. The alkynyl group includes, for example, ethynyl, propargyl. $V^{31}$ to $V^{43}$ may have any other substituent. Examples of the substituent may be those mentioned hereinabove for $R^{11}$ to $R^{13}$.

$L^{31}$ to $L^{80}$ each independently represents a divalent saturated linking group having from 0 to 40 atoms and having from 0 to 20 carbon atoms. $L^{31}$ to $L^{80}$ having 0 (zero) atom mean that the groups existing on both sides of the linking group directly form a single bond. Preferred examples of $L^{31}$ to $L^{77}$ are an alkylene group (e.g., methylene, ethylene, propylene, trimethylene, tetramethylene, pentamethylene, hexamethylene, methylethylene, ethylethylene), a cyclic divalent group (e.g., cis-1,4-cyclohexylene, trans-1,4-cyclohexylene, 1,3-cyclopentylidene), ether, thioether, ester, amido, sulfone, sulfoxide, sulfido, sulfonamido, ureylene, thioureylene. These divalent groups may bond to each other to form a divalent composite group. Examples of the composite substituent are —(CH$_2$)$_2$O(CH$_2$)$_2$—, —(CH$_2$)$_2$O(CH$_2$)$_2$O(CH$_2$)—, —(CH$_2$)$_2$S(CH$_2$)$_2$—, —(CH$_2$)$_2$O$_2$C(CH$_2$)$_2$—. $L^{31}$ to $L^{80}$ may have any other substituent. Examples of the substituent may be those mentioned hereinabove for $R^{11}$ to $R^{13}$.

Preferred examples of the compounds that are formed through combination of $Y^{31}$ to $Y^{70}$, $V^{31}$ to $V^{43}$, and $L^{31}$ to $L^{80}$ in formulae (4) to (12) are citrates (e.g., triethyl O-acetylcitrate, tributyl O-acetylcitrate, acetyltriethyl citrate, acetyltributyl citrate, tri(ethyloxycarbonylmethylene) O-acetylcitrate), oleates (e.g., ethyl oleate, butyl oleate, 2-ethylhexyl oleate, phenyl oleate, cyclohexyl oleate, octyl oleate), ricinoleates (e.g., methylacetyl ricinoleate), sebacates (e.g., dibutyl sebacate), glycerin carboxylates (e.g., triacetin, tributyrin), glycolates (e.g., butylphthalylbutyl glycolate, ethylphthalylethyl glycolate, methylphthalylethyl glycolate, butylphthalylbutyl glycolate, methylphthalylmethyl glycolate, propylphthalylpropyl glycolate, butylphthalylbutyl glycolate, octylphthalyloctyl glycolate), pentaerythritol carboxylates (e.g., pentaerythritol tetraacetate, pentaerythritol tetrabutyrate), dipentaerythritol carboxylates (e.g., dipentaerythritol hexaacetate, dipentaerythritol hexabutyrate, dipentaerythritol tetraacetate), trimethylolpropane carboxylates (e.g., trimethylolpropane triacetate, trimethylolpropane diacetate monopropionate, trimethylolpropane tripropionate, trimethylolpropane tributyrate, trimethylolpropane tripivalate, trimethylolpropane tri(t-butyl acetate), trimethylolpropane di-2-ethylhexanoate, trimethylolpropane tetra-2-ethylhexanoate, trimethylolpropane diacetate monooctanoate, trimethylolpropane trioctanoate, trimethylolpropane tri(cyclohexanecarboxylate)), glycerol esters described in JP-A 11-246704, diglycerol esters described in JP-A 2000-63560, citrates described in JP-A 11-92574, pyrrolidonecarboxylates (e.g., methyl 2-pyrrolidone-5-carboxylate, ethyl 2-pyrrolidone-5-carboxylate, butyl 2-pyrrolidone-5-carboxylate, 2-ethylhexyl 2-pyrrolidone-5-carboxylate), cyclohexane-dicarboxylates (e.g., dibutyl cis-1,2-cyclohexane-dicarboxylate, dibutyl trans-1,2-cyclohexane-dicarboxylate, dibutyl cis-1,4-cyclohexane-dicarboxylate, dibutyl trans-1,4-cyclohexane-dicarboxylate), xylitol carboxylates (e.g., xylitol pentaacetate, xylitol tetraacetate, xylitol pentapropionate).

Hereafter, examples of the compounds (C-401 to C-448) represented by formula (4) to (12) for use in the invention are mentioned below, to which, however, the invention should not be limited. The value of log P is parenthesized for each compound. This was obtained according to the Crippen's fragmentation method (*J. Chem. Inf. Comput. Sci.,* 27, 21 (1987)).

C-401
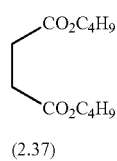
(2.37)

C-402
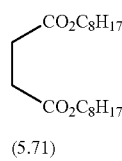
(5.71)

C-403
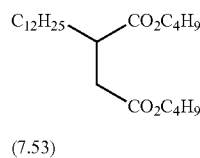
(7.53)

C-404
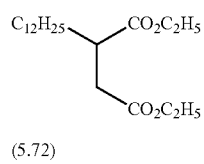
(5.72)

C-405
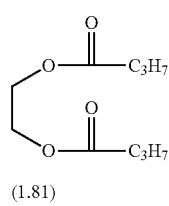
(1.81)

C-406
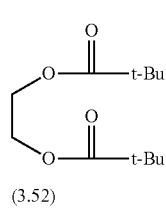
(3.52)

-continued

C-407
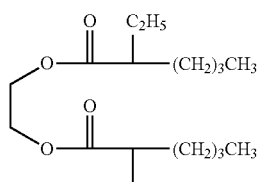
(5.45)

C-408
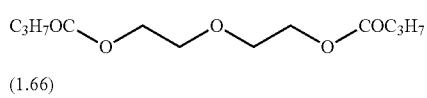
(1.66)

C-409
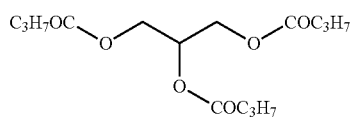
(2.58)

C-410
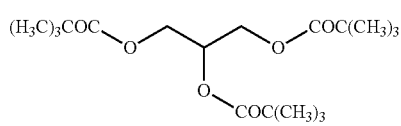
(5.14)

C-411
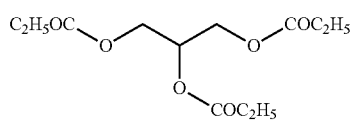
(1.32)

C-412
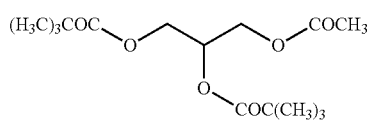
(3.22)

C-413
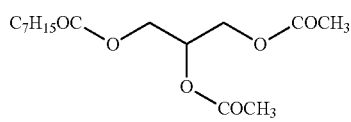
(2.10)

C-414
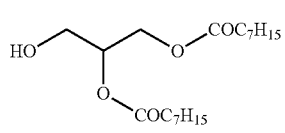
(4.61)

C-415
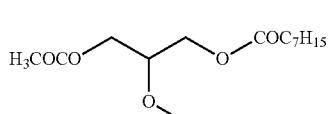
(4.84)

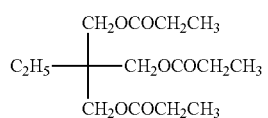
(2.43)
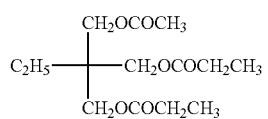
(1.78)
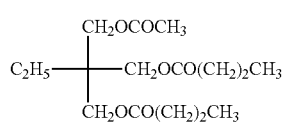
(2.61)
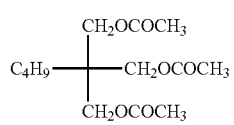
(1.31)
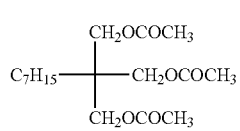
(2.56)
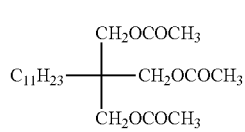
(4.23)
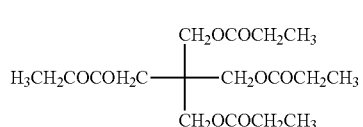
(1.84)
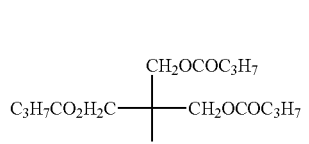
(3.51)
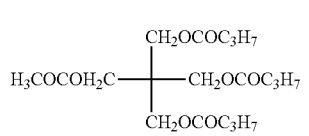
(2.44)
C-416
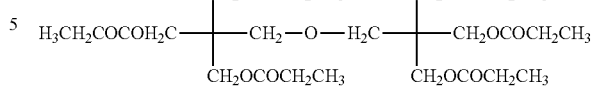
(2.54)
C-417
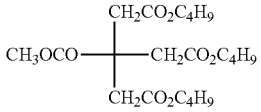
(3.01)
C-418
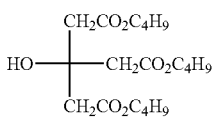
(2.78)
C-419
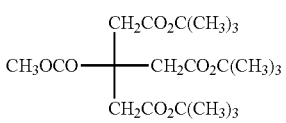
(1.91)
C-420
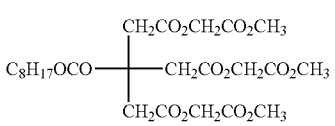
(1.03)
C-421
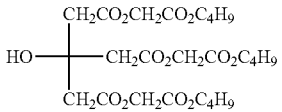
(1.36)
C-422
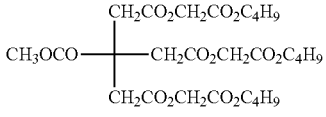
(1.59)
C-423
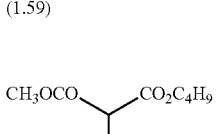
(1.52)
C-424
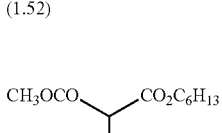
(3.19)
C-425
C-426
C-427
C-428
C-429
C-430
C-431
C-432
C-433

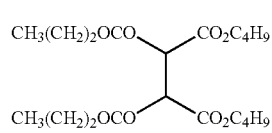
(3.66)
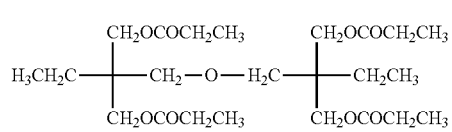
(3.73)
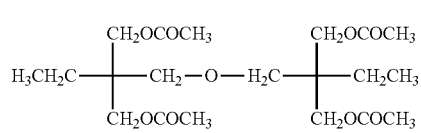
(1.12)
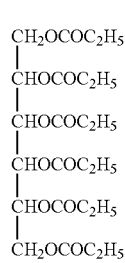
(2.36)
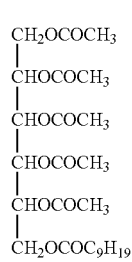
(2.02)
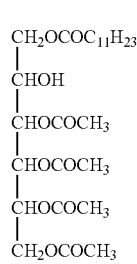
(2.62)
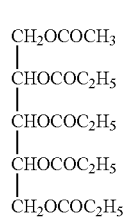
(1.36)
C-434
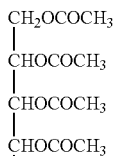
(2.32)
C-435
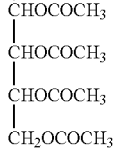
(3.16)
C-436
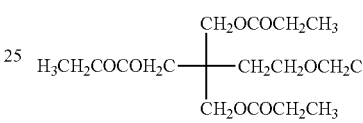
(3.37)
C-437
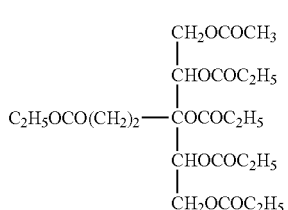
(1.63)
C-438
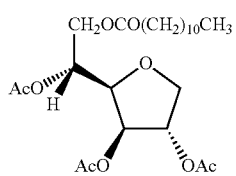
(3.03)
C-439
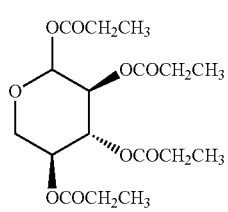
(1.69)
C-440
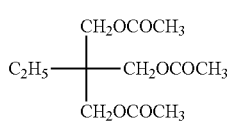
(0.47)
C-441
C-442
C-443
C-444
C-445
C-446
C-419

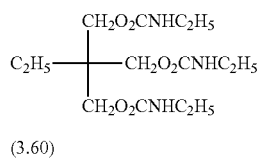

C-420

(3.60)

The compounds of formulae (13) and (14) are described.

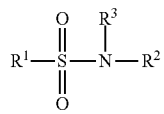

Formula (13)

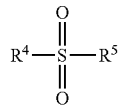

Formula (14)

In formula (13), $R^1$ represents an alkyl group or an aryl group, $R^2$ and $R^3$ each independently represents a hydrogen atom, an alkyl group or an aryl group. The total of the carbon atoms of $R^1$, $R^2$ and $R^3$ is preferably at least 10. In formula (14), $R^4$ and $R^5$ each independently represents an alkyl group or an aryl group. The total of the carbon atoms of $R^4$ and $R^5$ is at least 10, and the alkyl group and the aryl group may have a substituent. Preferred examples of the substituent are a fluorine atom, an alkyl group, an aryl group, an alkoxy group, a sulfone group, and sulfonamido group; and more preferred are an alkyl group, an aryl group, an alkoxy group, a sulfone group and a sulfonamido group. The alkyl group may be linear or branched or may be cyclic, preferably having from 1 to 25 carbon atoms, more preferably from 6 to 25 carbon atoms, even more preferably from 6 to 20 carbon atoms (e.g., methyl, ethyl, propyl, isopropyl, butyl, isobutyl, t-butyl, amyl, isoamyl, t-amyl, hexyl, cyclohexyl, heptyl, octyl, bicyclooctyl, nonyl, adamantyl, decyl, t-octyl, undecyl, dodecyl, tridecyl, tetradecyl, pentadecyl, hexadecyl, heptadecyl, octadecyl, nonadecyl, didecyl). The aryl group preferably has from 6 to 30 carbon atoms, more preferably from 6 to 24 carbon atoms (e.g., phenyl, biphenyl, terphenyl, naphthyl, binaphthyl, triphenylphenyl).

Preferred examples of the compounds of formulae (13) and (14) are mentioned below, to which, however, the invention should not be limited.

A-1

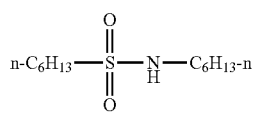

A-2

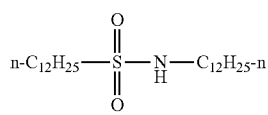

A-3

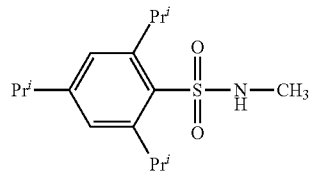

A-4

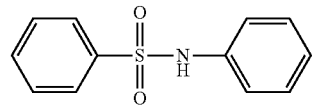

A-5

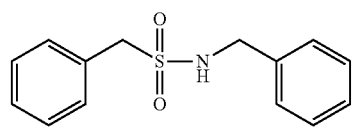

A-6

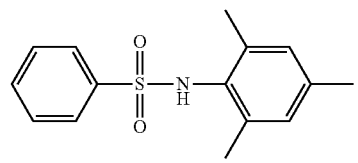

A-7

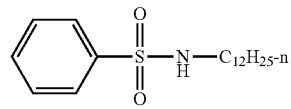

A-8

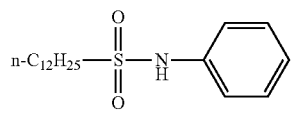

A-9

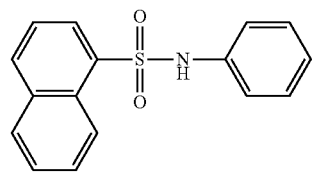

A-10

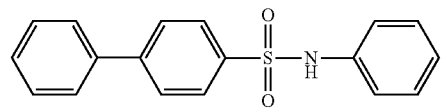

A-11

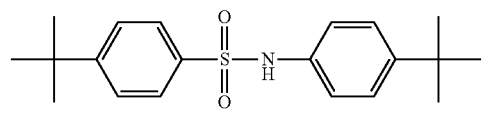

A-12

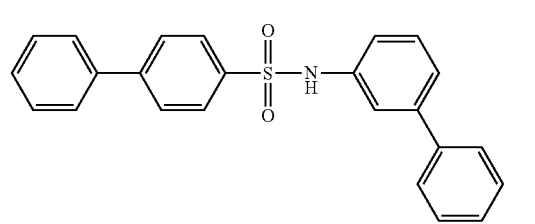

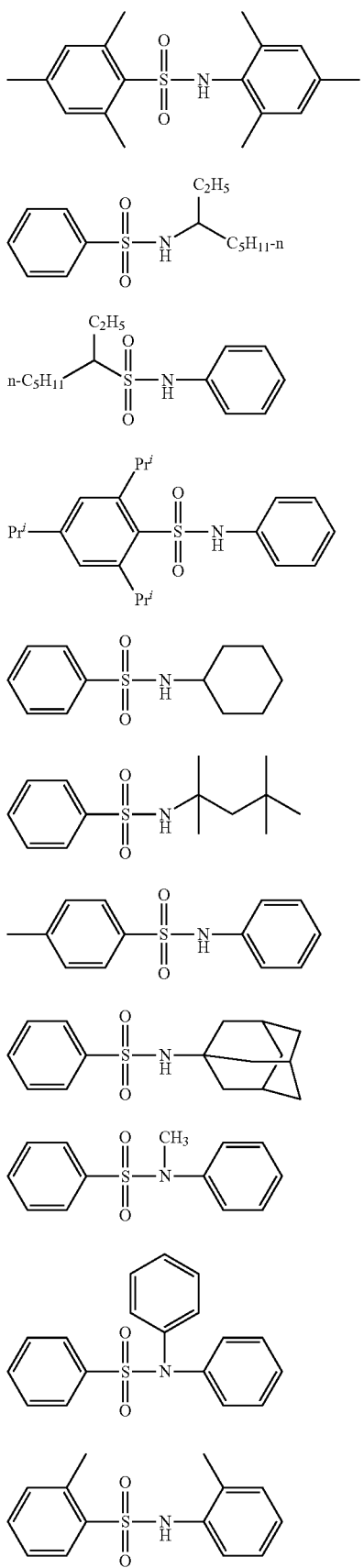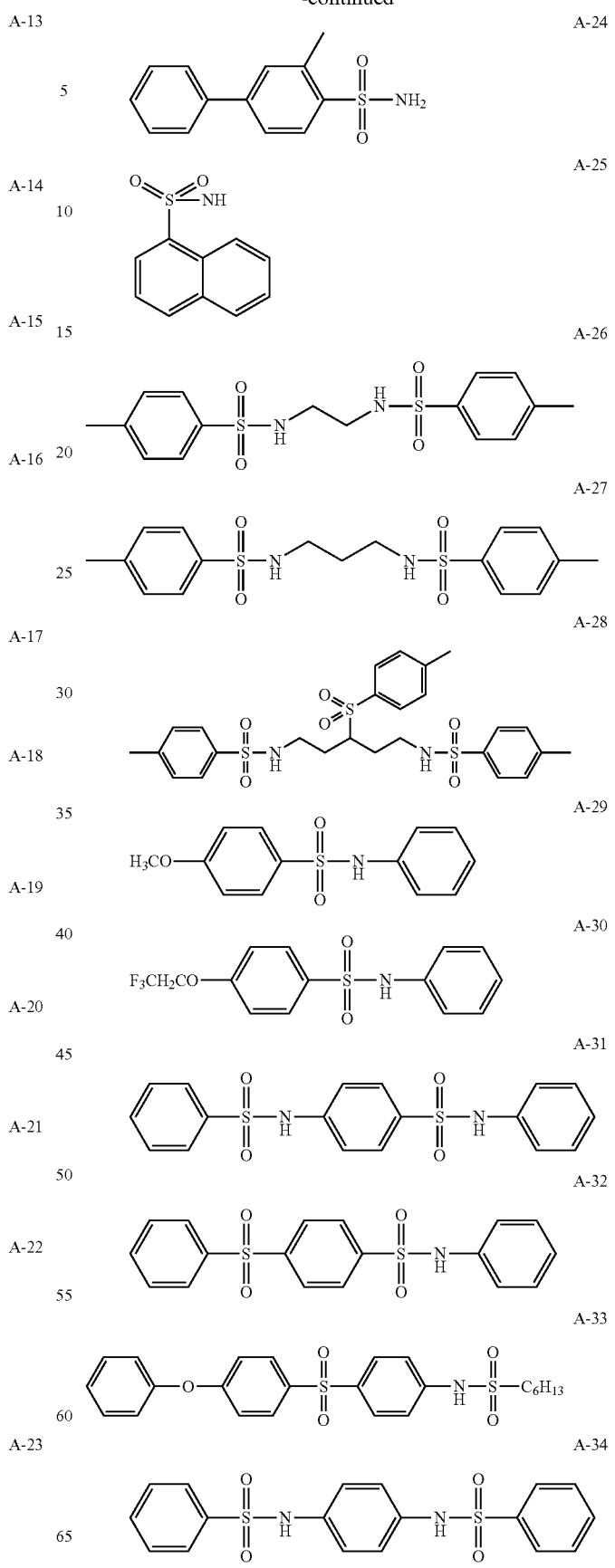

A-35 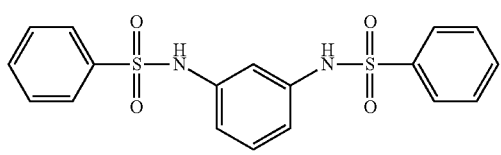
A-36 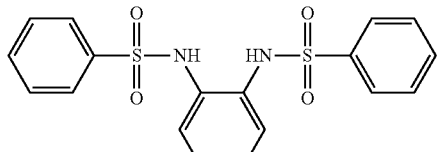
A-37 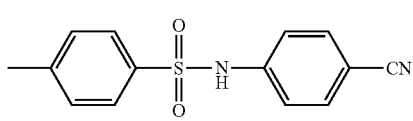
A-38 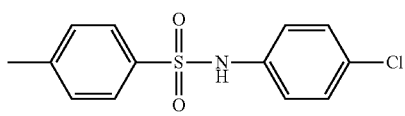
A-39 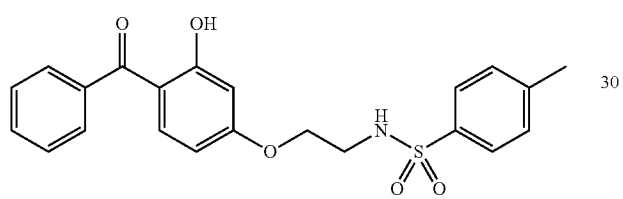
A-40 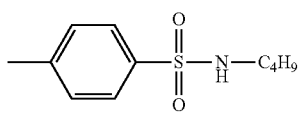
A-41 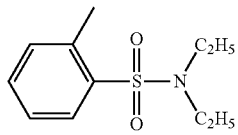
A-42 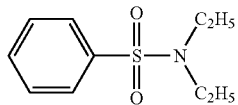
A-43 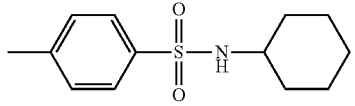
A-44 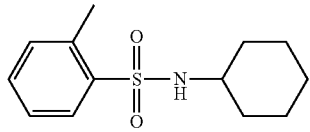
A-45 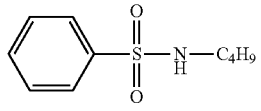
A-46 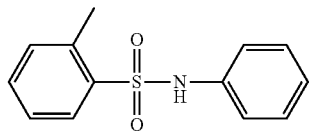
A-47 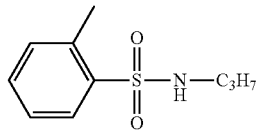
A-48 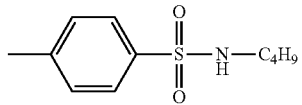
A-49 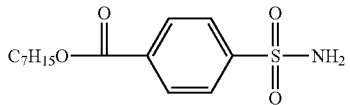
A-50 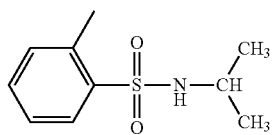
A-51 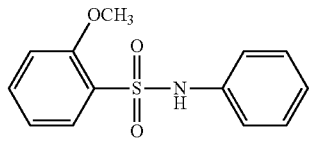
B-1 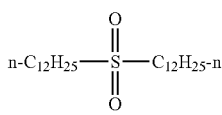
B-2 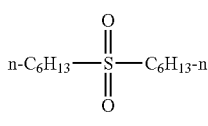
B-3 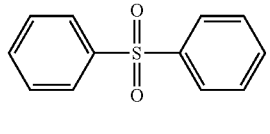
B-4 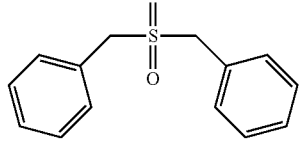
B-5 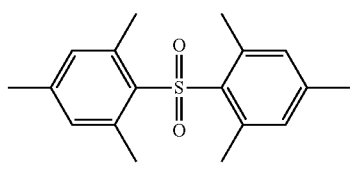

-continued
B-6
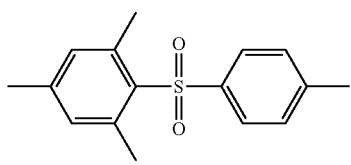
B-7
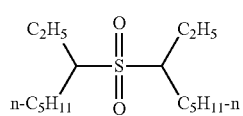
B-8
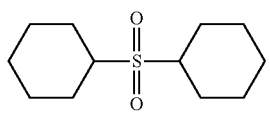
B-9
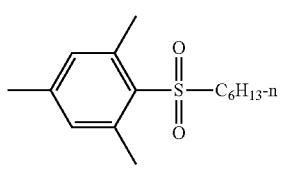
B-10
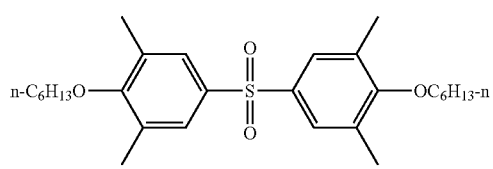
B-11
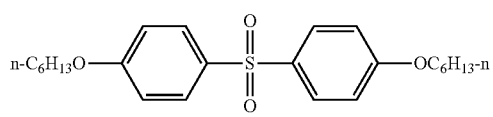
B-12
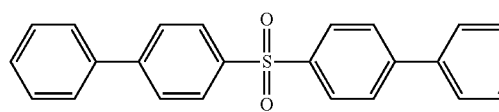
B-13
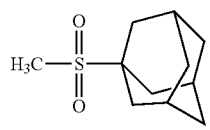
B-14
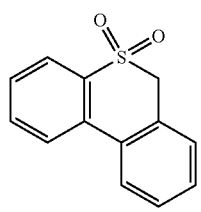
B-15
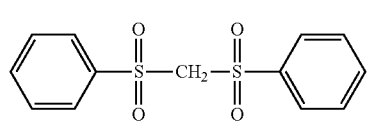
-continued
B-16
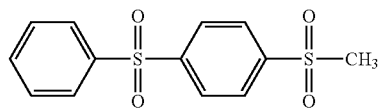
B-17
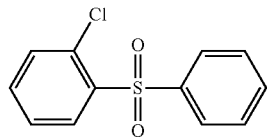
B-18
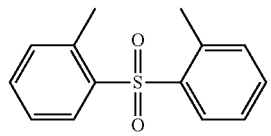
B-19
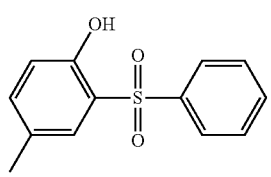
B-20
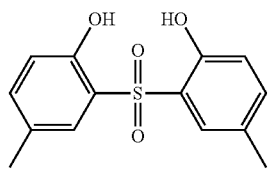
B-21
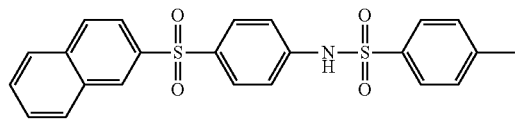
B-22
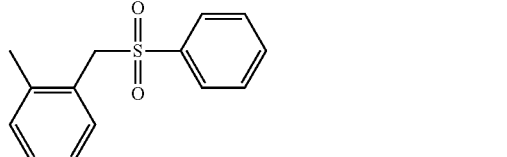
B-23
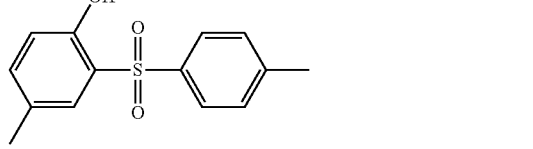
B-24
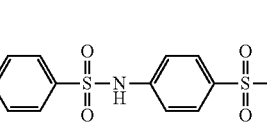
B-25
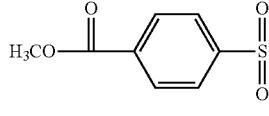

-continued

B-26
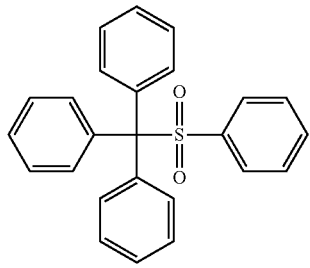

B-27
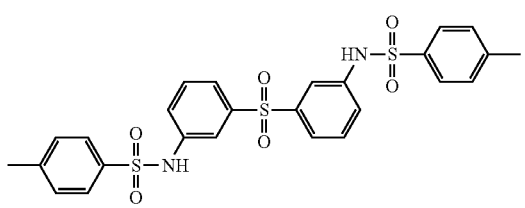

B-28
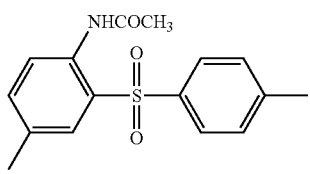

B-29
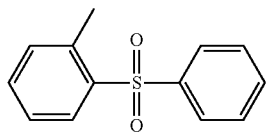

B-30
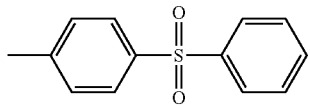

B-31
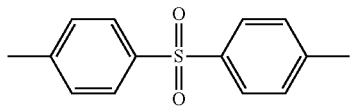

B-32
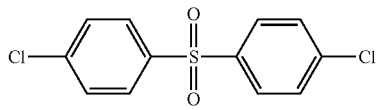

B-33
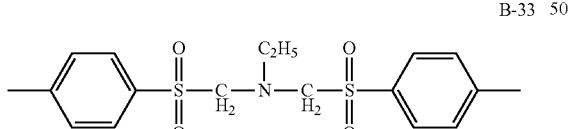

B-34
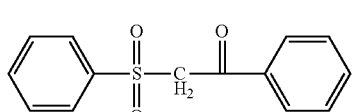

B-35
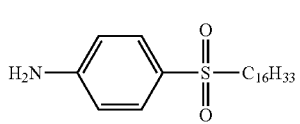

The compounds of formula (15) are described.

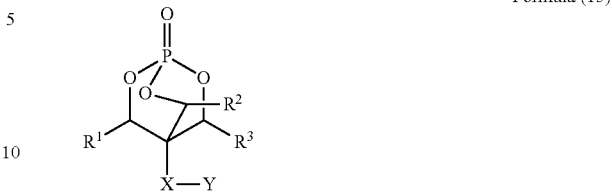

Formula (15)

In formula (15), $R^1$, $R^2$ and $R^3$ each independently represents a hydrogen atom or an alkyl group preferably having from 1 to 5 carbon atoms (e.g., methyl, ethyl, propyl, isopropyl, butyl, amyl, isoamyl). More preferably, at least one of $R^1$, $R^2$ and $R^3$ is an alkyl group having from 1 to 3 carbon atoms (e.g., methyl, ethyl, propyl, isopropyl). X is preferably a divalent linking group formed of at least one group selected from a single bond, —O—, —CO—, an alkylene group (preferably having from 1 to 6 carbon atoms, more preferably from 1 to 3 carbon atoms, e.g., methylene, ethylene, propylene), or an arylene group (preferably having from 6 to 24 carbon atoms, more preferably from 6 to 12 carbon atoms, e.g., phenylene, biphenylene, naphthylene); more preferably, X is a divalent linking group formed of at least one group selected from —O—, an alkylene group or an arylene group. Y is preferably a hydrogen atom, an alkyl group (preferably having from 2 to 25 carbon atoms, more preferably from 2 to 20 carbon atoms, e.g., ethyl, isopropyl, t-butyl, hexyl, 2-ethylhexyl, t-octyl, dodecyl cyclohexyl, dicyclohexyl, adamantyl), an aryl group (preferably having from 6 to 24 carbon atoms, more preferably from 6 to 18 carbon atoms, e.g., phenyl, biphenyl, terphenyl, naphthyl), or an aralkyl group (preferably having from 7 to 30 carbon atoms, more preferably from 7 to 20 carbon atoms, e.g., benzyl, cresyl, t-butylphenyl, diphenylmethyl, triphenylmethyl); more preferably, Y is an alkyl group, an aryl group or an aralkyl group. Regarding the combination of —X—Y, it is desirable that the total of the carbon numbers of —X—Y is from 0 to 40, more preferably from 1 to 30, most preferably from 1 to 25.

Preferred examples of the compounds of formula (15) are mentioned below, to which, however, the invention should not be limited.

PL-1
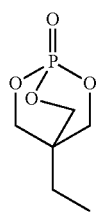

PL-=2
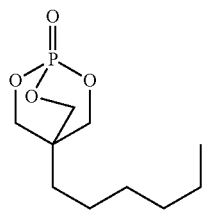

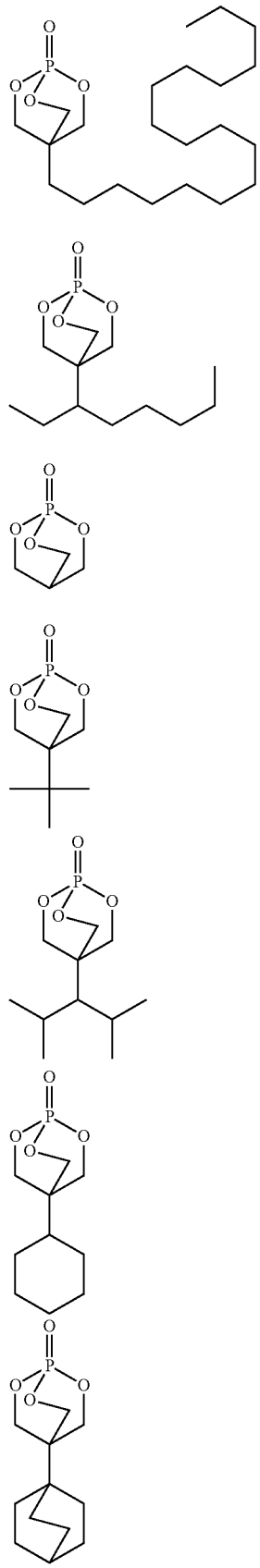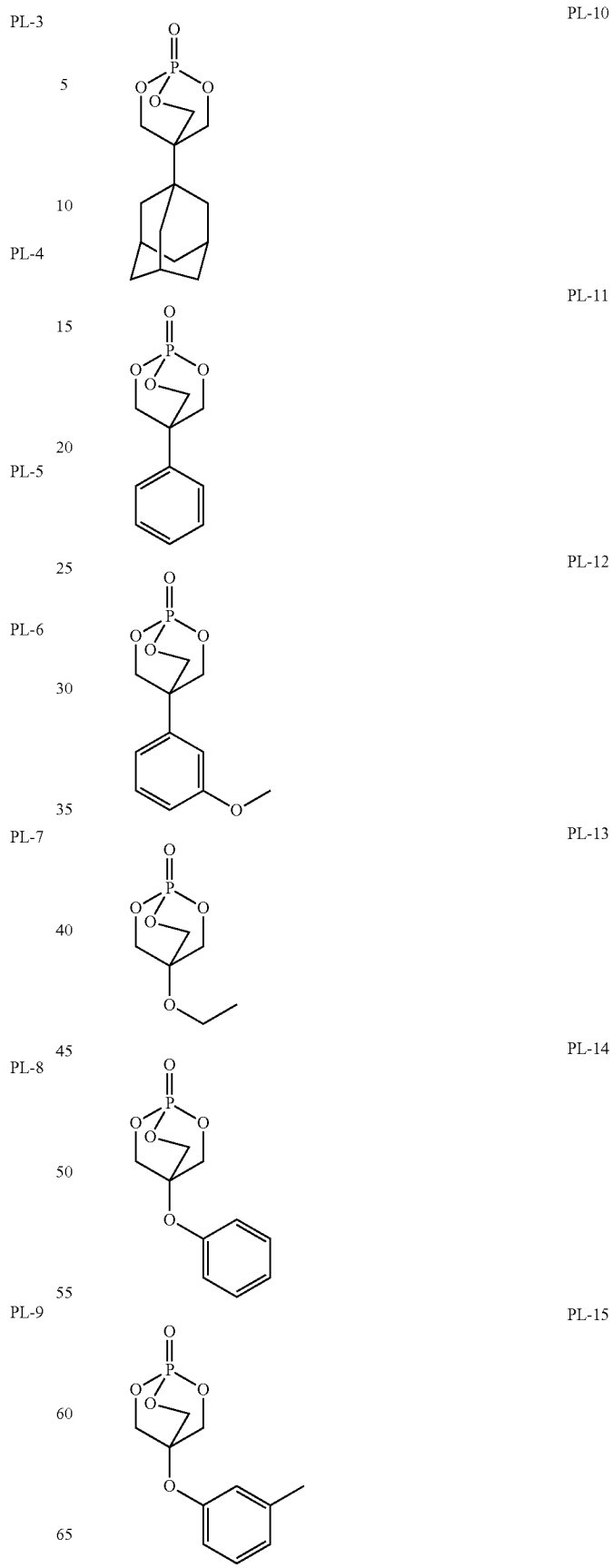

PL-16
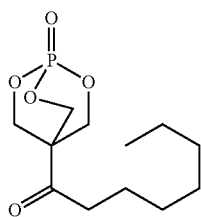
PL-17
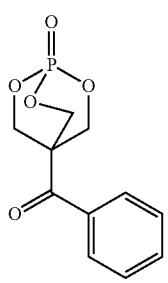
PL-18
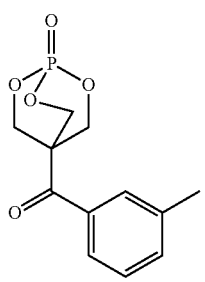
PL-19
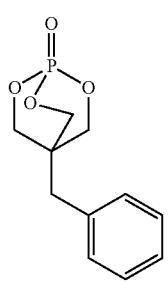
PL-20
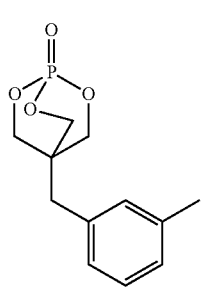
PL-21
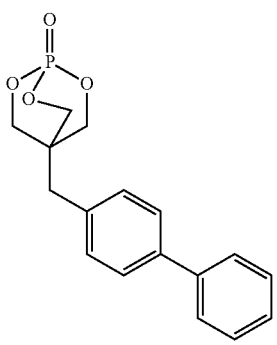
PL-22
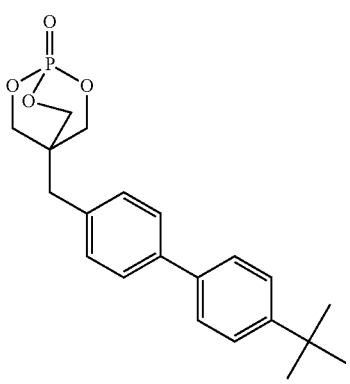
PL-23
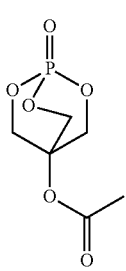
PL-24
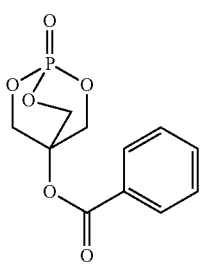
PL-25
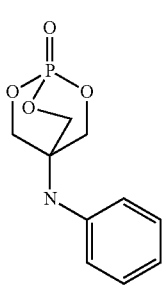

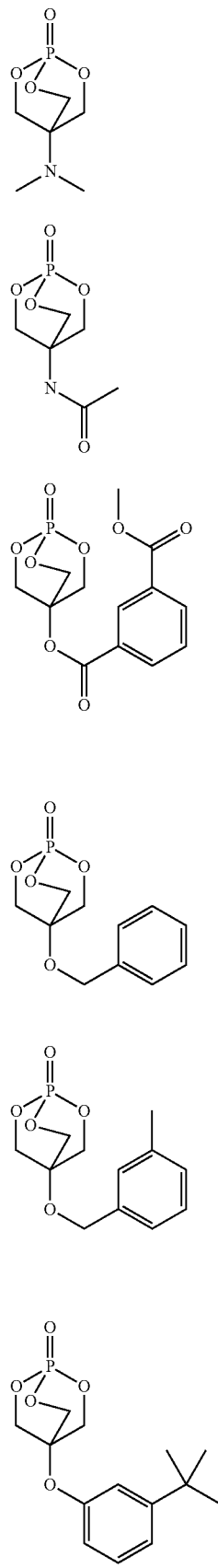
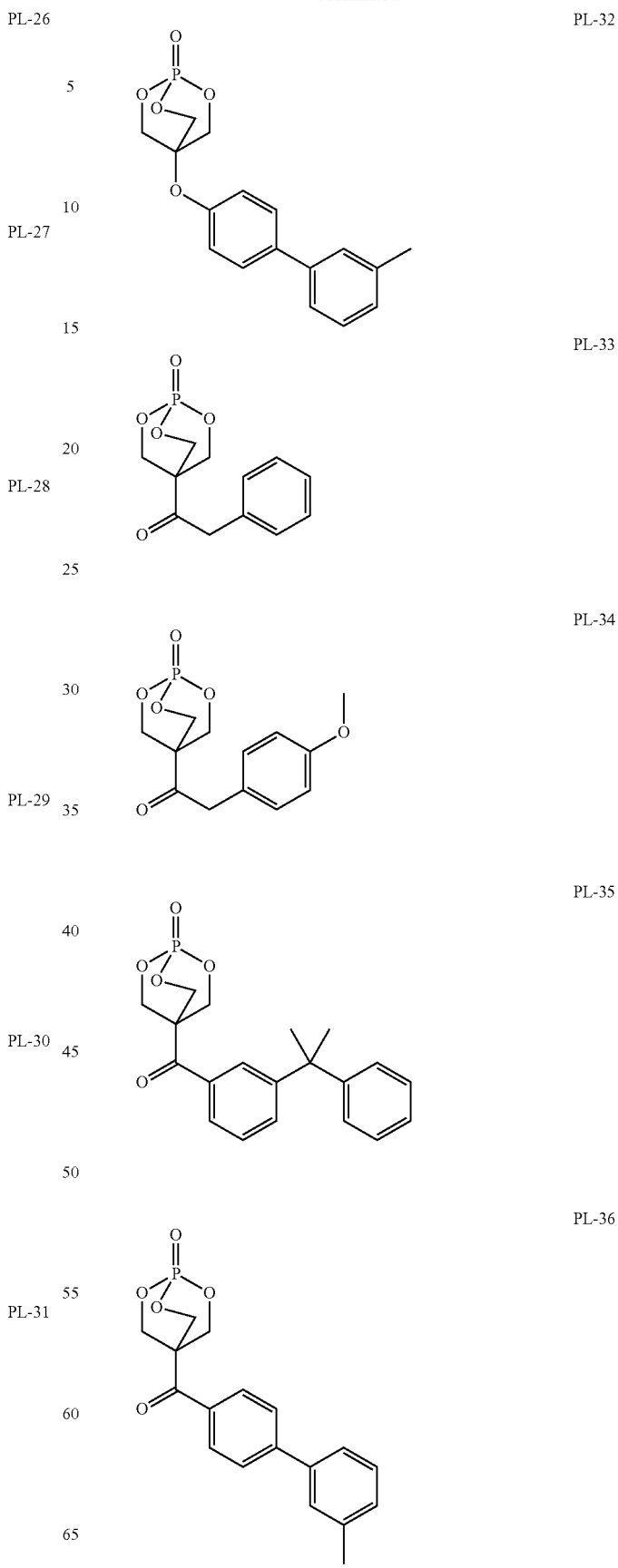

PL-37

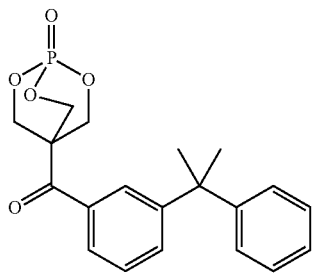

PL-38

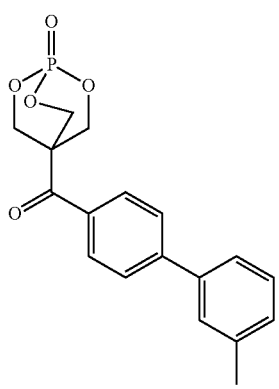

PL-39

PL-40

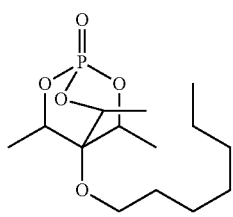

PL-421

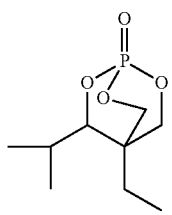

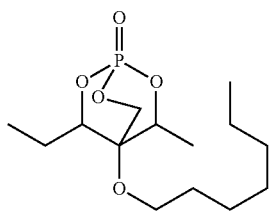

PL-42

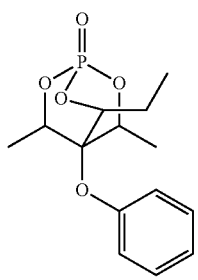

PL-43

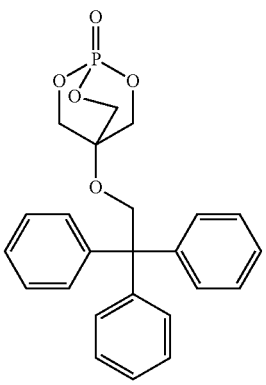

The compounds of formula (16) are described.

Formula (16)

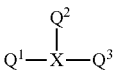

In formula (16), $Q^1$, $Q^2$ and $Q^3$ each independently represents a 5- or 6-membered ring, which may be a hydrocarbon ring or a hetero-ring and may be a single ring or may form a condensed ring with any other ring. The hydrocarbon ring is preferably a substituted or unsubstituted cyclohexane ring, a substituted or unsubstituted cyclopentane ring, or an aromatic hydrocarbon ring, more preferably an aromatic hydrocarbon ring. The hetero-ring is preferably a 5- or 6-membered ring containing at least one of oxygen atom, nitrogen atom or sulfur atom. The hetero-ring is more preferably an aromatic hetero-ring containing at least one of oxygen atom, nitrogen atom or sulfur atom.

$Q^1$, $Q^2$ and $Q^3$ are preferably an aromatic hydrocarbon ring or an aromatic hetero-ring. The aromatic hydrocarbon ring is preferably a monocyclic or bicyclic aromatic hydrocarbon ring having from 6 to 30 carbon atoms (e.g., benzene ring, naphthalene ring), more preferably an aromatic hydrocarbon ring having from 6 to 20 carbon atoms, even more preferably from 6 to 12 carbon atoms. Still more preferably, it is a benzene ring.

The aromatic hetero-ring is preferably one that contains an oxygen atom, a nitrogen atom or a sulfur atom. Examples of the hetero-ring are furan, pyrrole, thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, tetrazaindene. The aromatic hetero-ring is preferably pyridine, triazine or quinoline. $Q^1$, $Q^2$ and $Q^3$ are more preferably an aromatic hydrocarbon ring, even more preferably a benzene ring. $Q^1$, $Q^2$ and $Q^3$ may have a substituent, for which referred to are the substituents T mentioned hereinunder.

X represents B, C—R (where R represents a hydrogen atom or a substituent), N, P or P=O. X is preferably B, C—R (where R is preferably an aryl group, a substituted or unsubstituted amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a hydroxyl group, a mercapto group, a halogen atom (e.g., fluorine atom, chlorine atom, bromine atom, iodine atom), a carboxyl group; more preferably an aryl group, an alkoxy group, an aryloxy group, a hydroxyl group, or a halogen atom; even more preferably an alkoxy group or a hydroxyl group; still more preferably a hydroxyl group), or N. More preferably, X is C—R or N, even more preferably C—R.

Preferably, the compounds of formula (16) are those of the following formula (17):

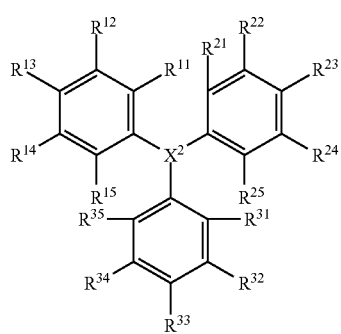

Formula (17)

In the formula, $X^2$ represents B, C—R (where R represents a hydrogen atom or a substituent), or N; $R^{11}$, $R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}$, $R^{34}$ and $R^{35}$ each independently represents a hydrogen atom or a substituent.

X represents B, C—R (where R represents a hydrogen atom or a substituent), N, P or P=O. X is preferably B, C—R (where R is preferably an aryl group, a substituted or unsubstituted amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a hydroxyl group, a mercapto group, a halogen atom (e.g., fluorine atom, chlorine atom, bromine atom, iodine atom), a carboxyl group; more preferably an aryl group, an alkoxy group, an aryloxy group, a hydroxyl group, or a halogen atom; even more preferably an alkoxy group or a hydroxyl group; still more preferably a hydroxyl group), or N or P=O. More preferably, X is C—R or N, even more preferably C—R.

$R^{11}$, $R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}$, $R^{34}$ and $R^{35}$ are a hydrogen atom or a substituent. To the substituent, applied are the substituents T mentioned hereinunder. $R^{11}$, $R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}$, $R^{34}$ and $R^{35}$ are preferably an alkyl group, an alkenyl group, an alkynyl group, an aryl group, a substituted or unsubstituted amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a sulfamoyl group, a carbamoyl group, an alkylthio group, an arylthio group, a sulfonyl group, a sulfinyl group, an ureido group, a phosphoramido group, a hydroxyl group, a mercapto group, a halogen atom (e.g., fluorine atom, chlorine atom, bromine atom, iodine atom), a cyano group, a sulfo group, a carboxyl group, a nitro group, a hydroxamic acid group, a sulfino group, a hydrazino group, an imino group, a heterocyclic group (preferably having from 1 to 30 carbon atoms, more preferably from 1 to 12 carbon atoms in which the hetero atom is any of nitrogen atom, oxygen atom or sulfur atom, concretely for example, imidazolyl, pyridyl, quinolyl, furyl, piperidyl, morpholino, benzoxazolyl, benzimidazolyl, benzothiazolyl), or a silyl group, more preferably an alkyl group, an aryl group, a substituted or unsubstituted amino group, an alkoxy group, or an aryloxy group, even more preferably an alkyl group, an aryl group or an alkoxy group.

These substituents may be further substituted. Two or substituents, if any, may be the same or different. If possible, they may bond to each other to form a ring.

The substituents T are mentioned below. The substituents T include, for example, an alkyl group (preferably having from 1 to 20 carbon atoms, more preferably from 1 to 12 carbon atoms, even more preferably from 1 to 8 carbon atoms, e.g., methyl, ethyl, iso-propyl, tert-butyl, n-octyl, n-decyl, n-hexadecyl, cyclopropyl, cyclopentyl, cyclohexyl), an alkenyl group (preferably having from 2 to 20 carbon atoms, more preferably from 2 to 12 carbon atoms, even more preferably from 2 to 8 carbon atoms, e.g., vinyl, allyl, 2-butenyl, 3-pentenyl), an alkynyl group (preferably having from 2 to 20 carbon atoms, more preferably from 2 to 12 carbon atoms, even more preferably from 2 to 8 carbon atoms, e.g., propargyl, 3-pentynyl), an aryl group (preferably having from 6 to 30 carbon atoms, more preferably from 6 to 20 carbon atoms, even more preferably from 6 to 12 carbon atoms, e.g., phenyl, p-methylphenyl, naphthyl), a substituted or unsubstituted amino group (preferably having from 0 to 20 carbon atoms, more preferably from 0 to 10 carbon atoms, even more preferably from 0 to 6 carbon atoms, e.g., amino, methylamino, dimethylamino, diethylamino, dibenzylamino), an alkoxy group (preferably having from 1 to 20 carbon atoms, more preferably from 1 to 12 carbon atoms, even more preferably from 1 to 8 carbon atoms, e.g., methoxy, ethoxy, butoxy), an aryloxy group (preferably having from 6 to 20 carbon atoms, more preferably from 6 to 16 carbon atoms, even more preferably from 6 to 12 carbon atoms, e.g., phenyloxy, 2-naphthyloxy), an acyl group (preferably having from 1 to 20 carbon atoms, more preferably from 1 to 16 carbon atoms, even more preferably from 1 to 12 carbon atoms, e.g., acetyl, benzoyl, formyl, pivaloyl), an alkoxycarbonyl group (preferably having from 2 to 20 carbon atoms, more preferably from 2 to 16 carbon atoms, even more preferably from 2 to 12 carbon atoms, e.g., methoxycarbonyl, ethoxycarbonyl), an aryloxycarbonyl group (preferably having from 7 to 20 carbon atoms, more preferably from 7 to 16 carbon atoms, even more preferably from 7 to 10 carbon atoms, e.g., phenyloxycarbonyl), an acyloxy group (preferably having from 2 to 20 carbon atoms, more preferably from 2 to 16 carbon atoms, even more preferably from 2 to 10 carbon atoms, e.g., acetoxy, benzoyloxy), an acylamino group (preferably having from 2 to 20 carbon atoms, more preferably from 2 to 16 carbon atoms, even more preferably from 2 to 10 carbon atoms, e.g., acetylamino, benzoylamino), an alkoxycarbonylamino group (preferably having from 2 to 20 carbon atoms, more preferably from 2 to 16 carbon atoms, even more preferably from 2 to 12 carbon atoms, e.g., methoxycarbonylamino), an aryloxycarbonylamino group (preferably having from 7 to 20 carbon atoms, more preferably from 7 to 16 carbon atoms, even more preferably from 7 to 12 carbon atoms, e.g., phenyloxycarbonylamino), a sulfonylamino group (preferably having from 1 to 20 carbon atoms, more preferably from 1 to 16 carbon atoms, even more preferably from 1 to 12 carbon atoms, e.g., methanesulfonylamino, benzenesulfonylamino), a sulfamoyl group (preferably having from 0 to 20 carbon atoms, more preferably from 0 to 16 carbon atoms, even more preferably from 0 to 12 carbon atoms, e.g., sulfamoyl, methylsulfamoyl, dimethylsulfamoyl, phenylsulfamoyl), a carbamoyl group (preferably having from 1 to 20 carbon atoms, more preferably from 1 to 16 carbon atoms, even more preferably from 1 to 12 carbon atoms, e.g., carbamoyl, methylcarbamoyl, diethylcarbamoyl, phenylcarbamoyl), an alkylthio group (preferably having from 1 to 20 carbon atoms, more preferably from 1 to 16 carbon atoms, even more preferably from 1 to 12 carbon atoms, e.g., methylthio, ethylthio), an arylthio group (preferably having from 6 to 20 carbon atoms, more preferably from 6 to 16 carbon atoms, even more preferably from 6 to 12 carbon atoms, e.g., phenylthio), a sulfonyl group (preferably having from 1 to 20 carbon atoms, more preferably from 1 to 16 carbon atoms, even more preferably from 1 to 12 carbon atoms, e.g., mesyl, tosyl), a sulfinyl group (preferably having from 1 to 20 carbon atoms, more preferably from 1 to 16 carbon atoms, even more preferably from 1 to 12 carbon atoms, e.g., methanesulfinyl, benzenesulfinyl), an ureido group preferably having from 1 to 20 carbon atoms, more preferably from 1 to 16 carbon atoms, even more preferably from 1 to 12 carbon atoms, e.g., ureido, methylureido, phenylureido), a phosphoramido group (preferably having from 1 to 20 carbon atoms, more preferably from 1 to 16 carbon atoms, even more preferably from 1 to 12 carbon atoms, e.g., diethylphosphoramido, phenylphosphoramido), a hydroxyl group, a mercapto group, a halogen atom (e.g., fluorine atom, chlorine atom, bromine atom, iodine atom), a cyano group, a sulfo group, a carboxyl group, a nitro group, a hydroxamic acid group, a sulfino group, a hydrazino group, an imino group, a heterocyclic group (preferably having from 1 to 30 carbon atoms, more preferably from 1 to 12 carbon atoms, in which the hetero atom is any of nitrogen atom, oxygen atom or sulfur atom, e.g., imidazolyl, pyridyl, quinolyl, furyl, piperidyl, morpholino, benzoxazolyl, benzimidazolyl, benzothiazolyl), a silyl group (preferably having from 3 to 40 carbon atoms, more preferably from 3 to 30 carbon atoms, even more preferably from 3 to 24 carbon atoms, e.g., trimethylsilyl, triphenylsilyl). These substituents may be further substituted. Two or more substituents, if any, may be the same or different. If possible, they may bond to each other to form a ring.

Specific examples of the compounds of formula (16) and (17) are mentioned below, to which, however, the invention should not be limited.

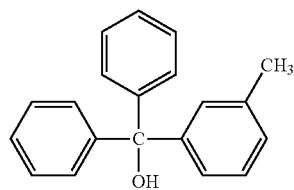

D-1

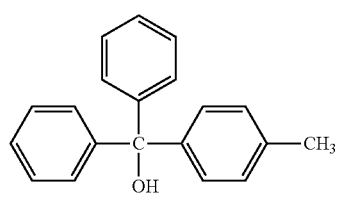

D-2

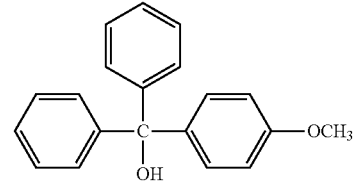

D-3

D-4

D-5

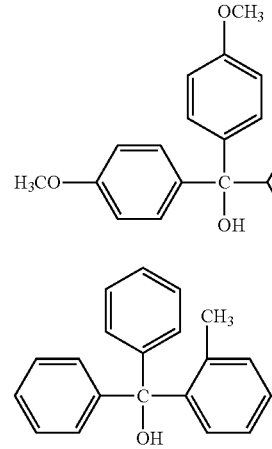

D-6

D-7

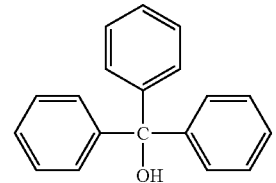

D-8

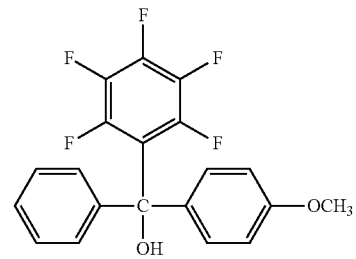

D-9

-continued
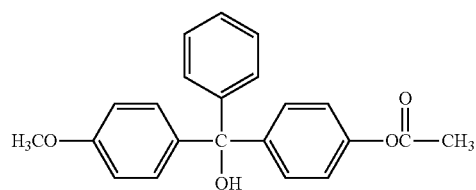
D-10
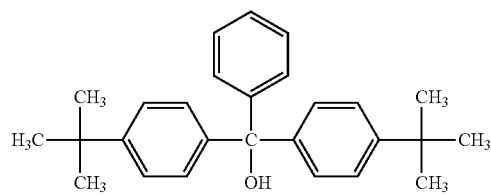
D-11
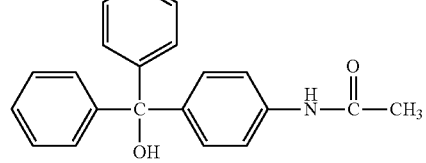
D-12
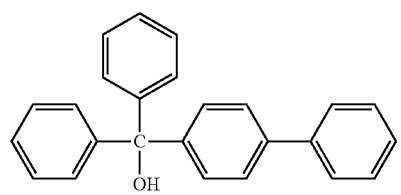
D-13
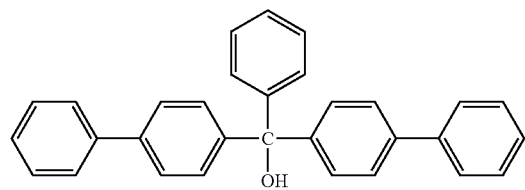
D-14
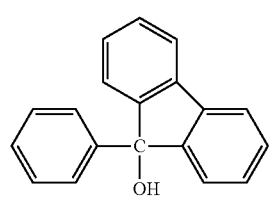
D-15
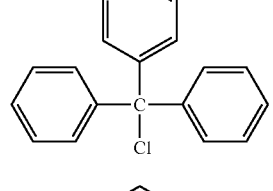
D-16
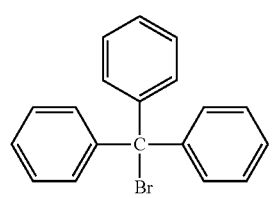
D-17
-continued
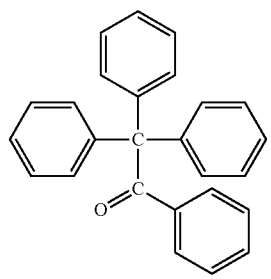
D-18
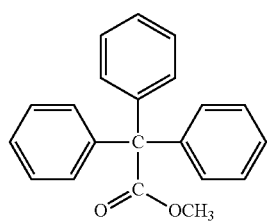
D-19
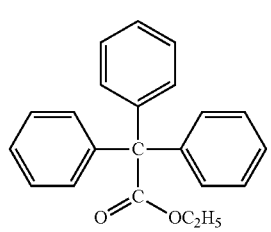
D-20
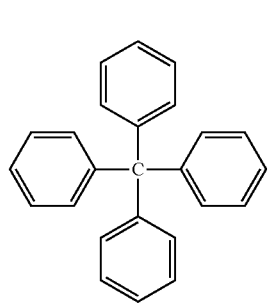
D-21
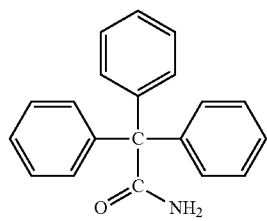
D-22
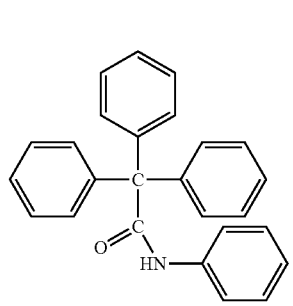
D-23

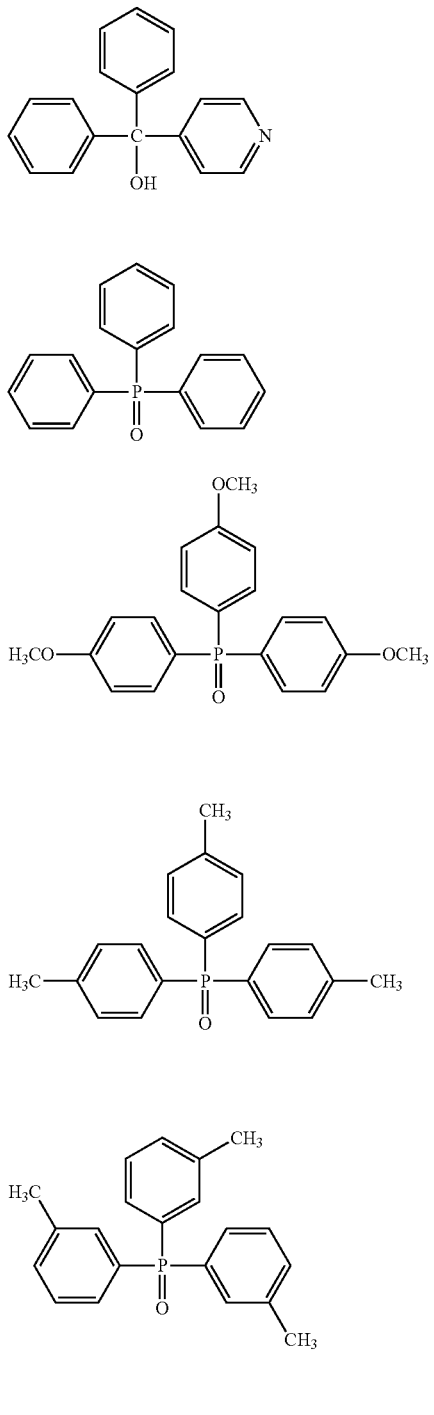
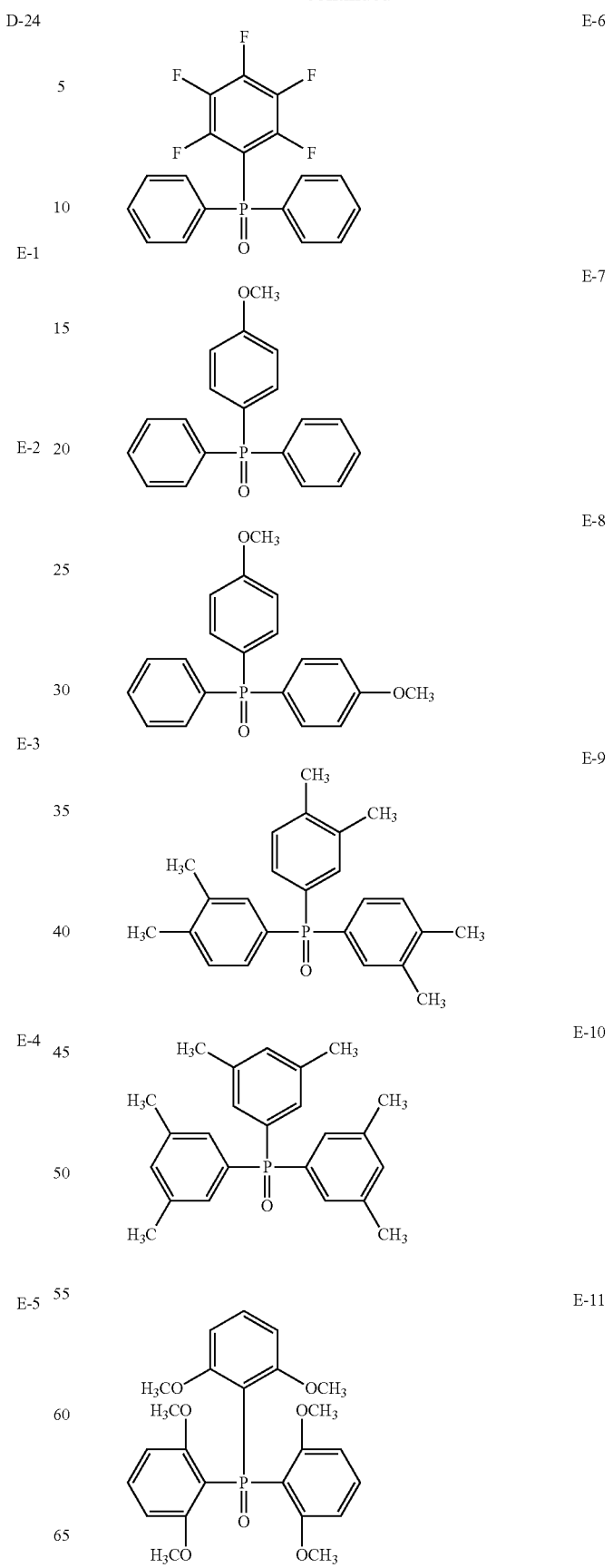

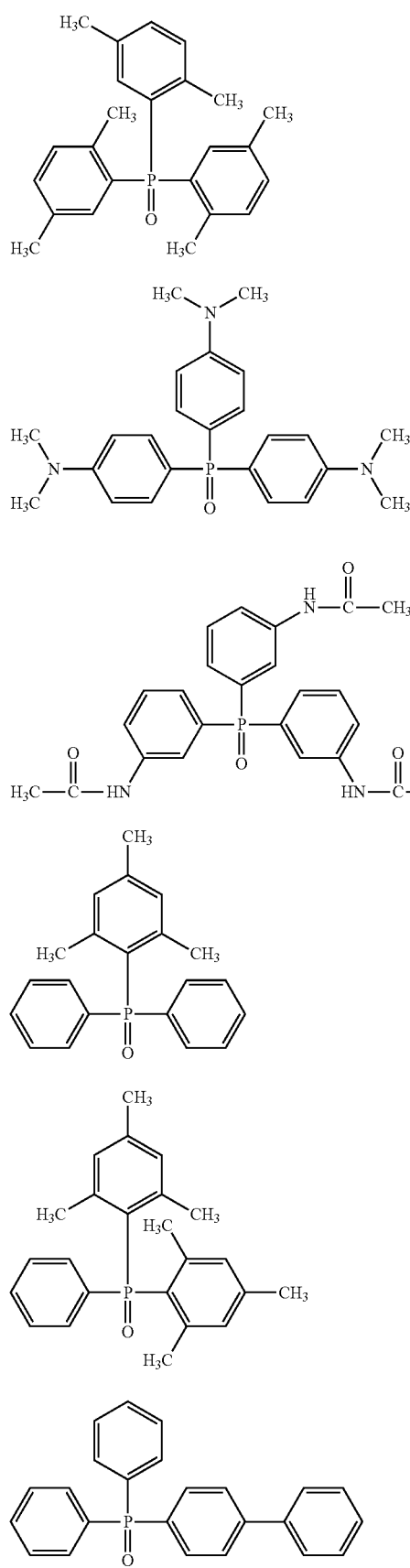
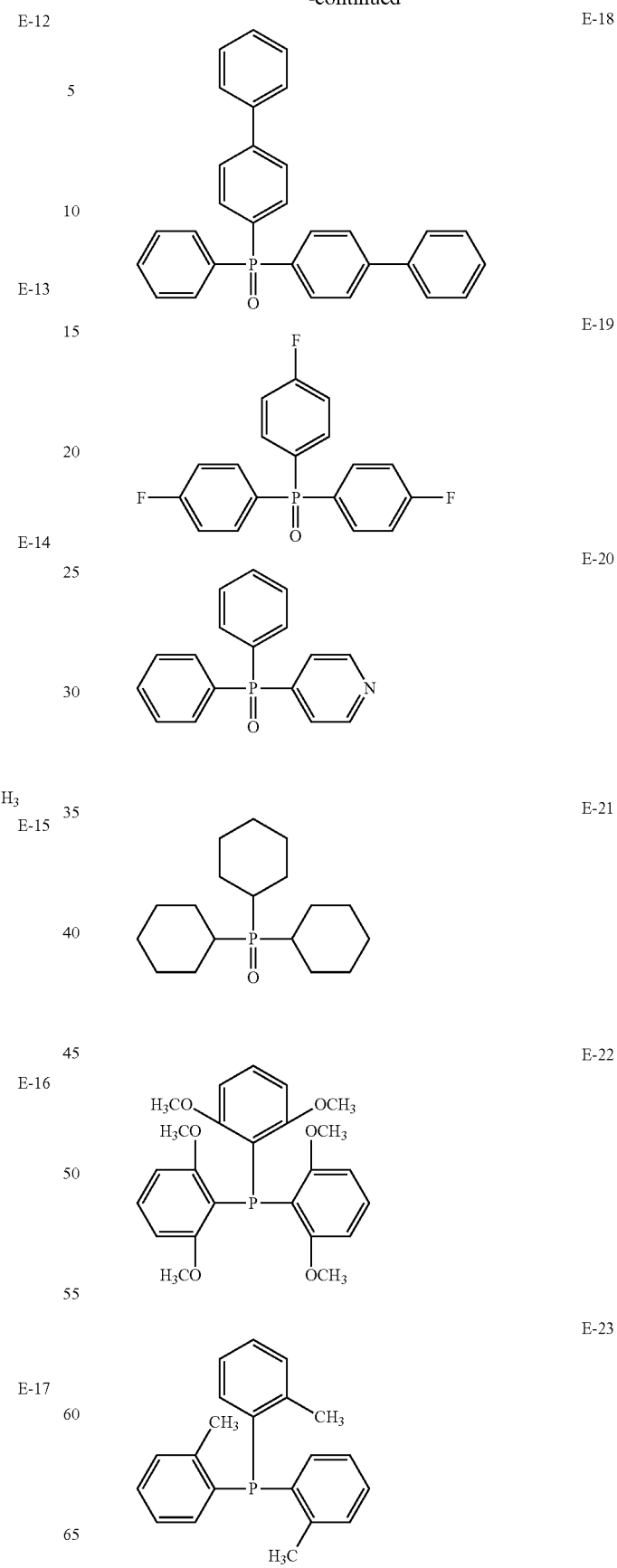

-continued

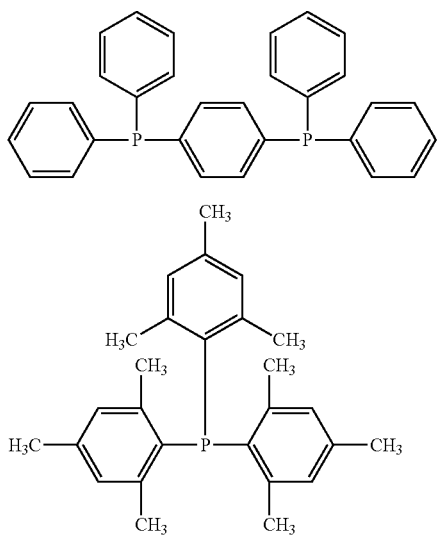

E-24
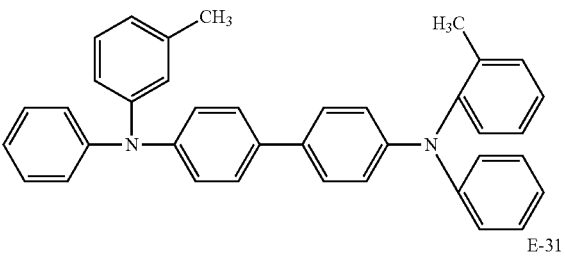
E-30

E-25
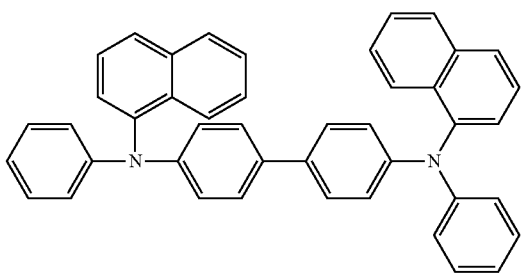
E-31

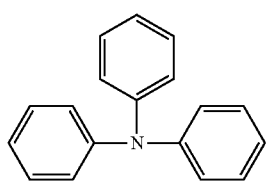

E-26
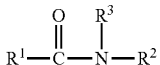
E-32

The compounds of formula (18) are described.

E-27
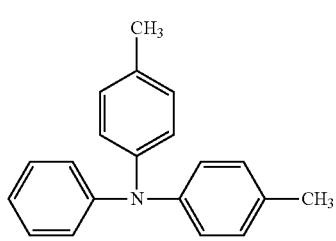

Formula (18)

$$R^1-\overset{O}{\underset{}{C}}-\overset{R^3}{\underset{}{N}}-R^2$$

In the formula, R1 represents an alkyl group or an aryl group; R2 and R3 each independently represents a hydrogen atom, an alkyl group or an aryl group; and the alkyl group and the aryl group may have a substituent.

Of the compounds of formula (18), preferred are those of the following formula (19):

E-28

Formula (19)

$$R^4-\overset{O}{\underset{}{C}}-\overset{R^6}{\underset{}{N}}-R^5$$

In formula (19), R4, R5 and R6 each independently represents an alkyl group or an aryl group. The alkyl group may be linear, branched or cyclic, but preferably has from 1 to 20 carbon atoms, more preferably from 1 to 15 carbon atoms, most preferably from 1 to 12 carbon atoms. For the cyclic alkyl group, especially preferred is a cyclohexyl group. The aryl group preferably has from 6 to 36 carbon atoms, more preferably from 6 to 24 carbon atoms.

E-29
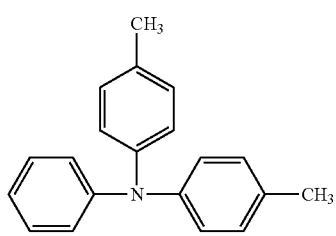

The alkyl group and the aryl group may have a substituent. For the substituent, preferred are a halogen atom (e.g., chlorine, bromine, fluorine and iodine), an alkyl group, an aryl group, an alkoxy group, an aryloxy group, an acyl group, an alkoxycarbonyl group, an aryloxycarbonyl, an acyloxy group, a sulfonylamino group, a hydroxyl group, a cyano group, an amino group and an acylamino group; more preferred are a halogen atom, an alkyl group, an aryl group, an alkoxy group, an aryloxy group, a sulfonylamino group and an acylamino group; even more preferred are an alkyl group, an aryl group, a sulfonylamino group and an acylamino group.

Preferred examples of the compounds of formulae (18) and (19) are mentioned below, to which, however, the invention should not be limited.

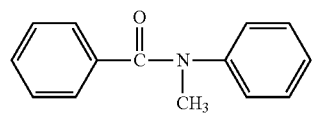
FA-1

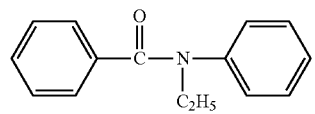
FA-2

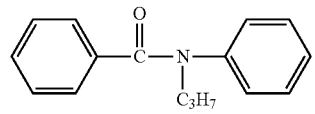
FA-3

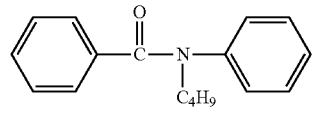
FA-4

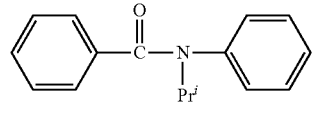
FA-5

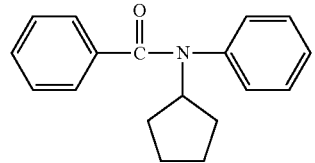
FA-6

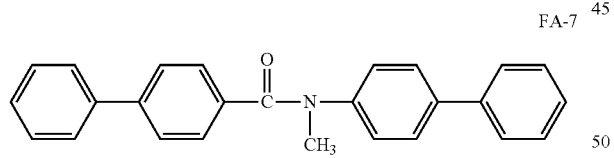
FA-7

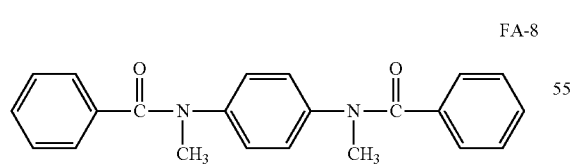
FA-8

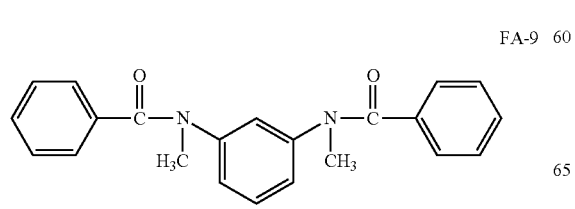
FA-9

-continued

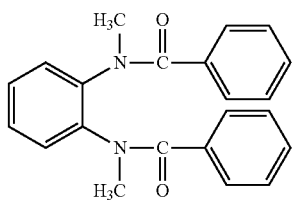
FA-10

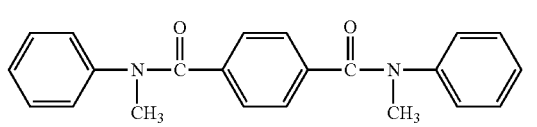
FA-11

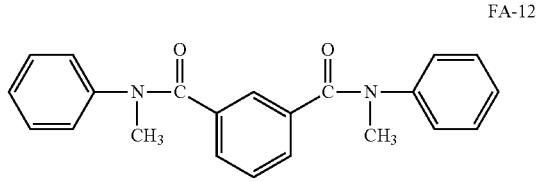
FA-12

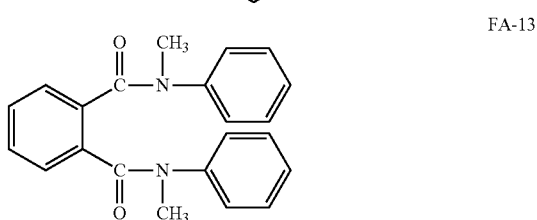
FA-13

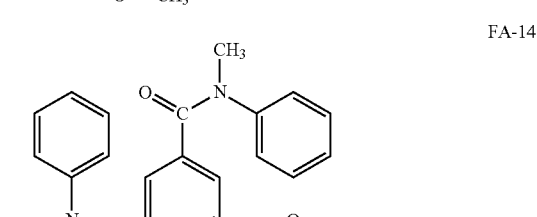
FA-14

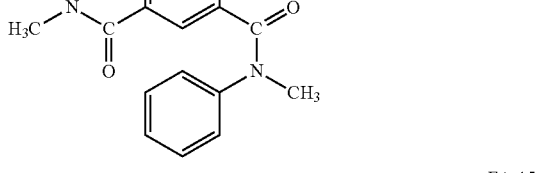
FA-15

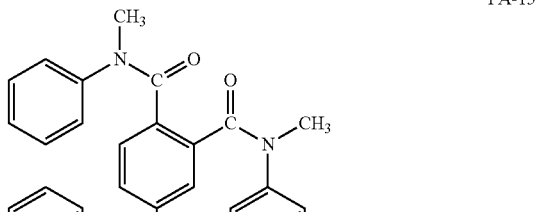
FA-16

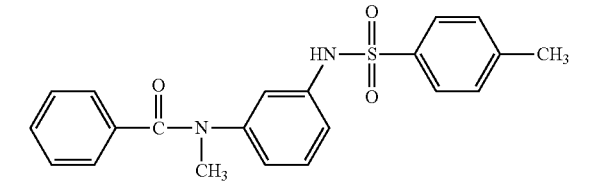

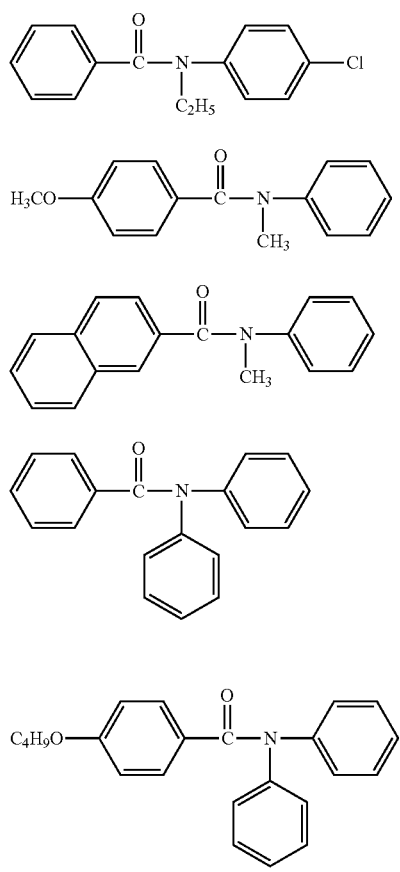
FA-17
FA-18
FA-19
FA-20
FA-21
FA-22
FA-23
FA-24
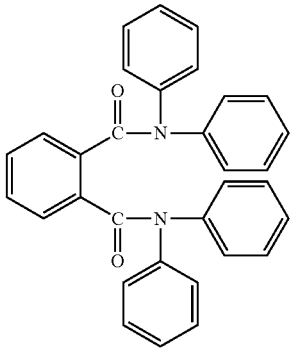
FA-25
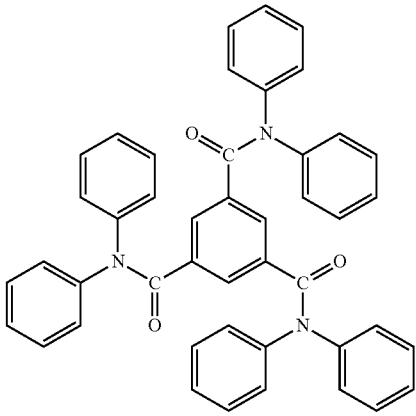
FA-26
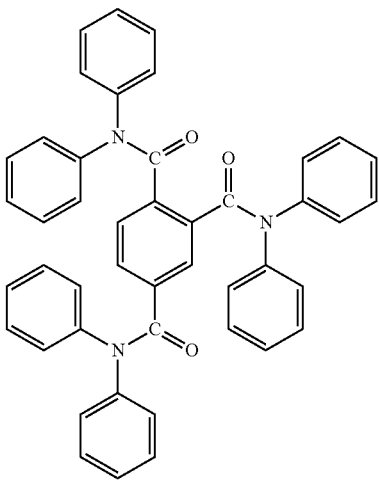
FA-27
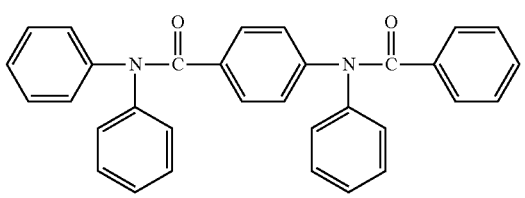
FA-28
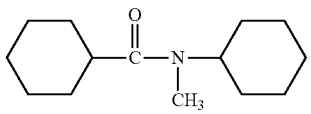
FB-1

FB-2
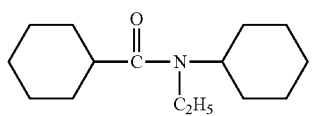
FB-3
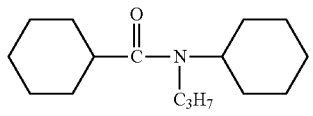
FB-4
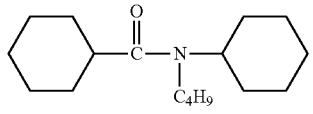
FB-5
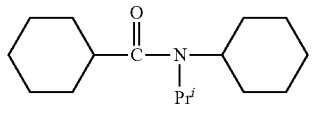
FB-6
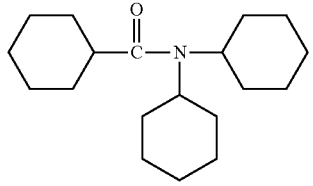
FB-7
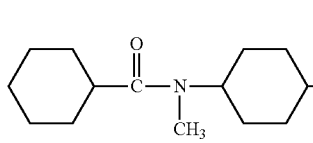
FB-8
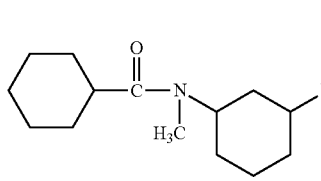
FB-9
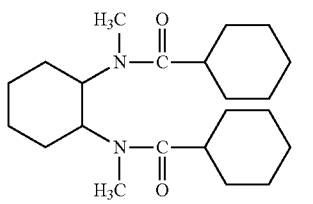
FB-10
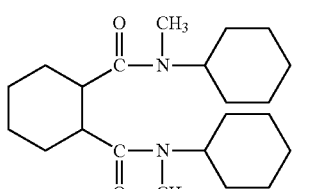
FB-11
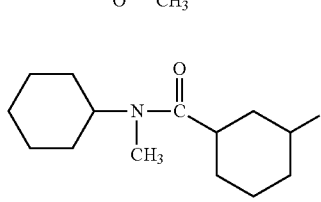
FB-12
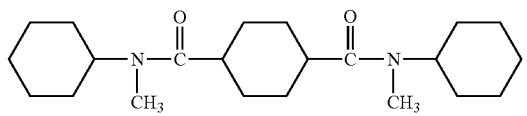
FB-13
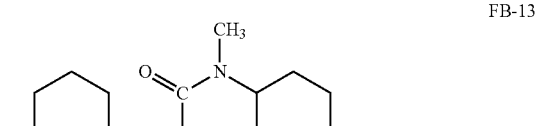
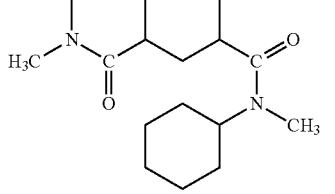
FB-14
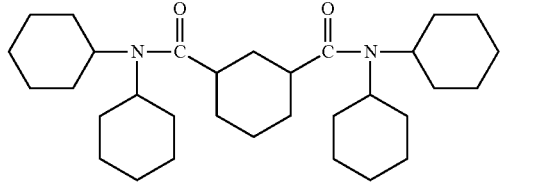
FB-15
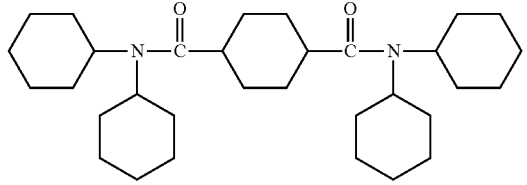
FB-16
FB-17
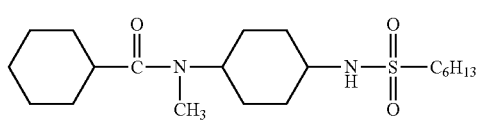
FB-18
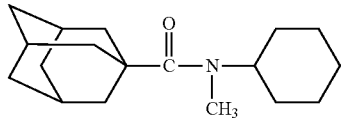

-continued

FB-19, FB-20, FB-21, FB-22, FB-23, FB-24, FC-1, FC-2, FC-3, FC-4, FC-5, FC-6, FC-7, FC-8, FC-9, FC-10, FC-11, FC-12, FC-13

| 71 -continued | 72 -continued |
|---|---|
| FC-14 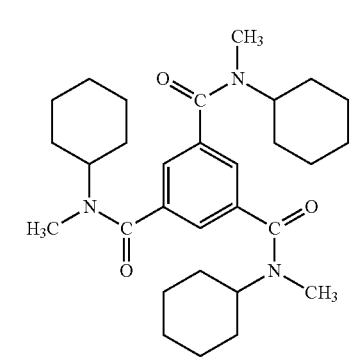 | FC-22 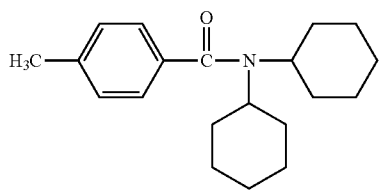 |
| FC-15 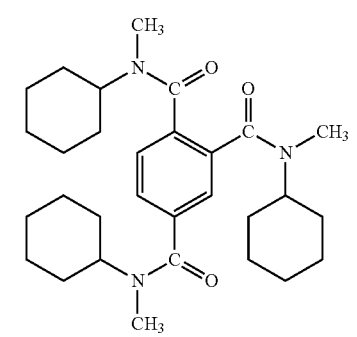 | FC-23 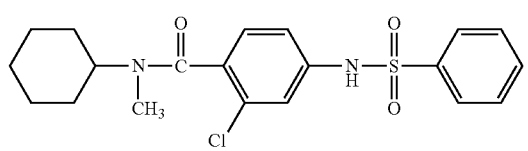 |
| FC-16 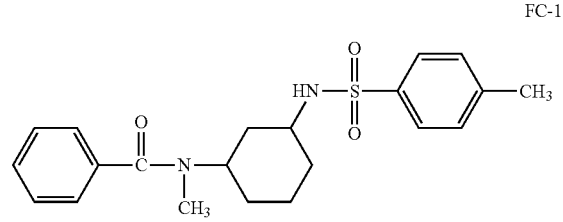 | FC-24 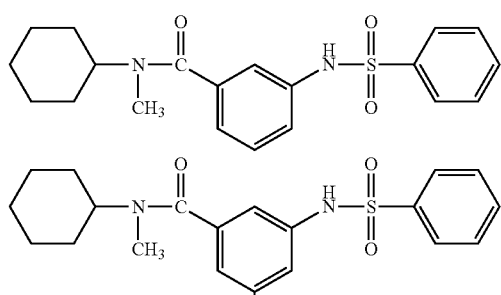 |
| FC-17 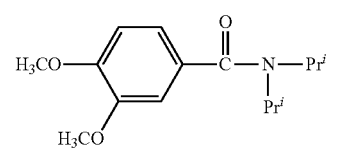 | FD-1 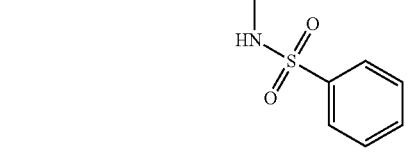 |
| FC-18 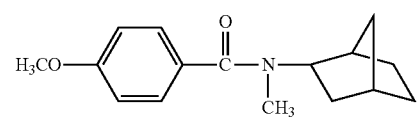 | FD-2 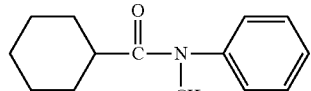 |
| FC-19 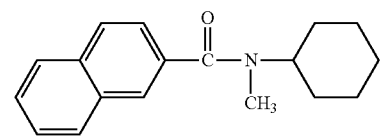 | FD-3 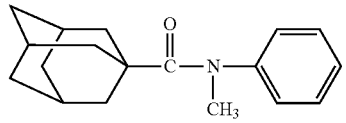 |
| FC-20 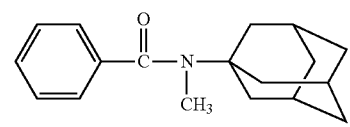 | FD-4 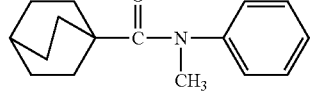 |
| | FD-5 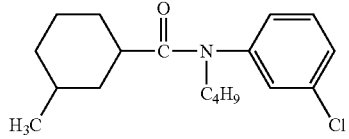 |
| FC-21 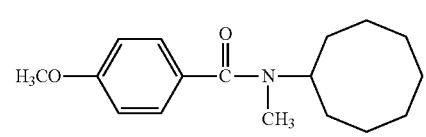 | FD-6 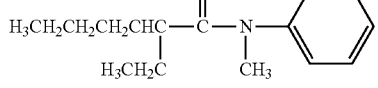 |

FD-7
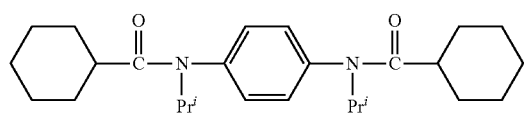
FD-8
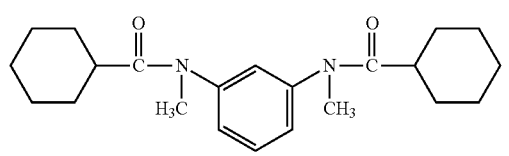
FD-9
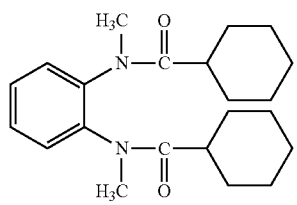
FD-10
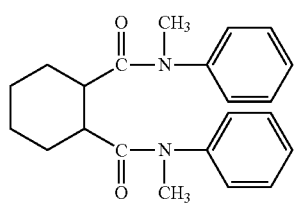
FD-11
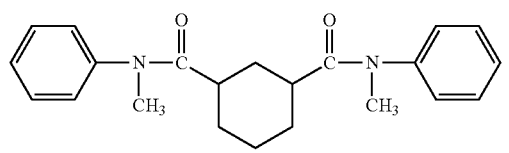
FD-12
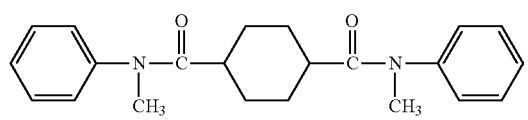
FD-13
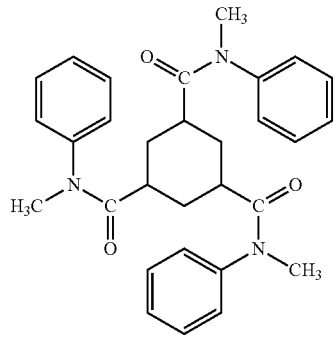
FD-14
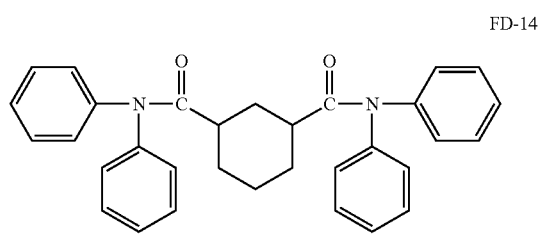
FD-15
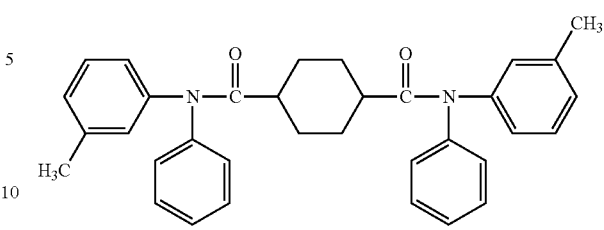
FD-16
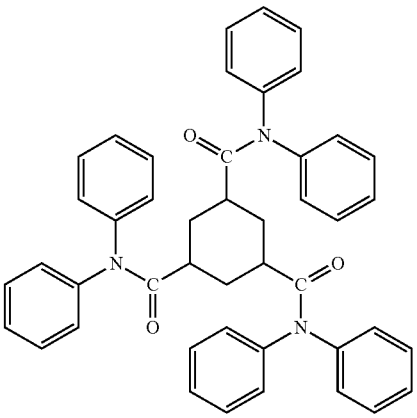
FD-17
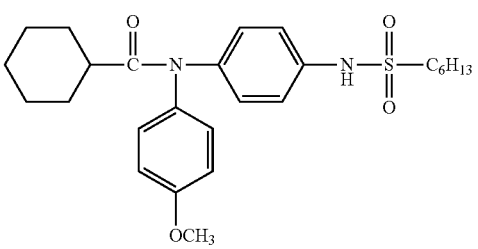
FD-18
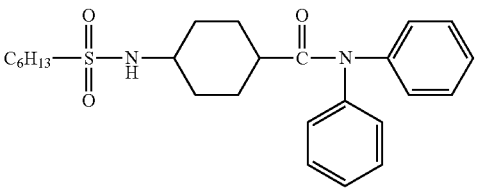
FD-19
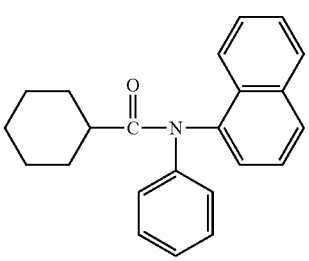

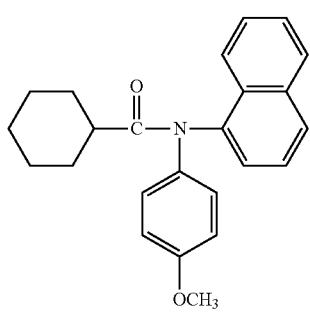

FD-20

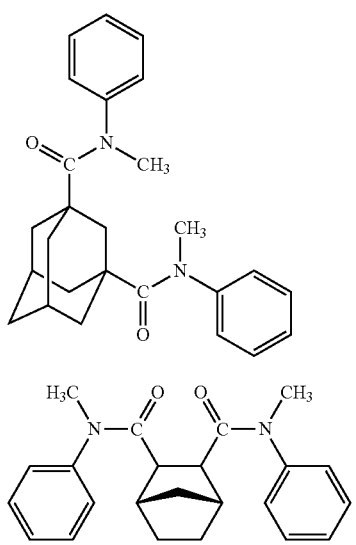

FD-21

FD-22

As a result of our assiduous studies, we, the present inventors have found that, when any of polyalcohol ester compounds, carboxylate compounds, polycyclic carboxylic acid compounds and bisphenol derivatives having an octanol-water partition coefficient (log P) of from 0 to 7 is added to a cellulose acylate film, then the optical anisotropy of the film may be lowered. That is, these compounds are also the compounds capable of lowering the optical anisotropy of cellulose acylate films.

Specific examples of polyalcohol ester compounds, carboxylate compounds, polycyclic carboxylic acid compounds and bisphenol derivatives having an octanol-water partition coefficient (log P) of from 0 to 7 are mentioned below.

(Polyalcohol Ester Compounds)

The polyalcohol esters for use in the invention are esters of a dihydric or more polyhydric alcohol with at least one monocarboxylic acid. Examples of the polyalcohol ester compounds are mentioned below, to which, however, the invention should not be limited.

(Polyalcohols)

Preferred examples of the polyalcohol are adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane, xylitol. Especially preferred are triethylene glycol, tetraethylene glycol, dipropylene glycol, tripropylene glycol, sorbitol, trimethylolpropane, xylitol.

(Monocarboxylic Acids)

The monocarboxylic acid to constitute the polyalcohol ester in the invention is not specifically defined, and may be any of known aliphatic monocarboxylic acids, alicyclic monocarboxylic acids and aromatic monocarboxylic acids. Alicyclic monocarboxylic acids and aromatic monocarboxylic acids are preferred, as they are effective for improving the moisture permeability, the water content and the water retentiveness of cellulose acylate film.

Preferred examples of the monocarboxylic acid are mentioned below, to which, however, the invention should not be limited.

The aliphatic monocarboxylic acid is preferably linear or branched fatty acid having from 1 to 32 carbon atoms, more preferably from 1 to 20 carbon atoms, even more preferably from 1 to 10 carbon atoms. Acetic acid is preferred, as it is effective for improving the compatibility of the ester compound with cellulose ester. Also preferably, acetic acid is combined with any other monocarboxylic acid.

Preferred examples of the aliphatic monocarboxylic acid are saturated fatty acids such as acetic acid, propionic acid, butyric acid, valeric acid, caproic acid, enanthic acid, caprylic acid, pelargonic acid, capric acid, 2-ethyl-hexanecarboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid, lacceric acid; unsaturated fatty acids such as undecylenic acid, oleic acid, sorbic acid, linolic acid, linolenic acid, arachidonic acid. These may have any further substituent.

Preferred examples of the alicyclic monocarboxylic acids are cyclopentanecarboxylic acid, cyclohexanecarboxylic acid, cyclooctanecarboxylic acid and their derivatives.

Preferred examples of the aromatic monocarboxylic acid are benzoic acid and its derivatives prepared by introducing an alkyl group into the benzene ring of benzoic acid; other aromatic monocarboxylic acids having two or more benzene rings such as biphenylcarboxylic acid, naphthalenecarboxylic acid, tetralin-carbolic acid, and their derivatives. Benzoic acid is especially preferred.

One or more different types of carboxylic acids may be in the polyalcohol ester for use in the invention. The OH group in the polyalcohol may be all esterified, or may be partially as it is still free OH. Preferably, the ester has three or more aromatic rings or cycloalkyl rings in one molecule.

Examples of the polyalcohol ester compounds for use herein are mentioned below, to which, however, the invention should not be limited.

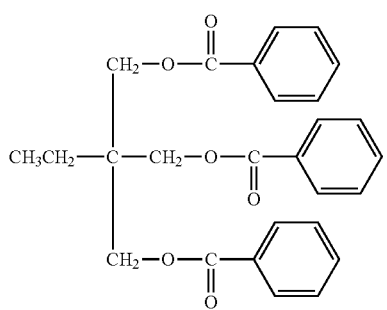

I-1

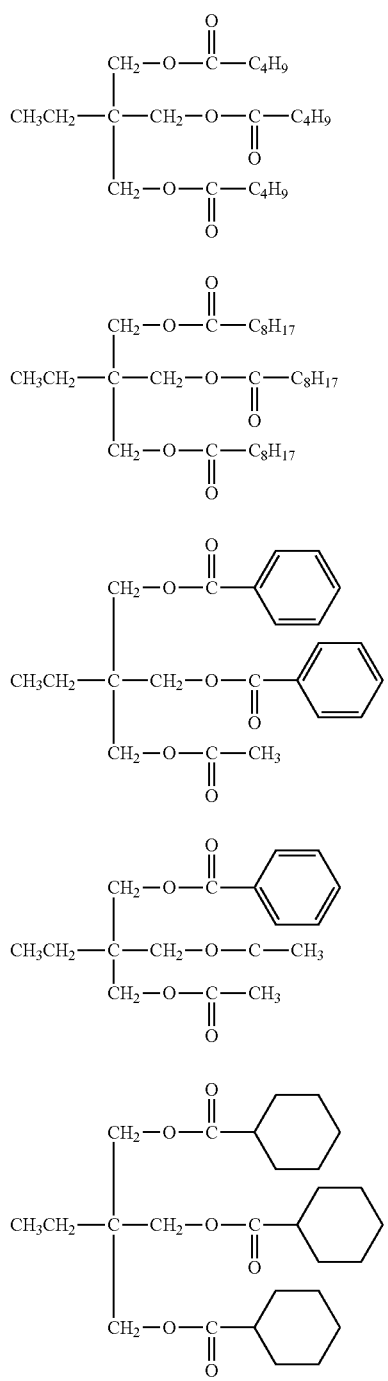

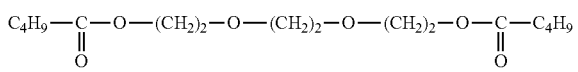

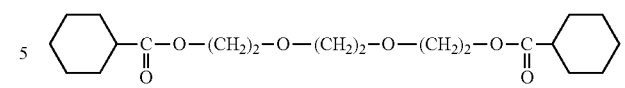

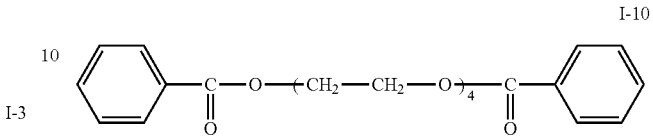

(Carboxylate Compounds)

Examples of carboxylate compounds for use herein are mentioned below, to which, however, the invention should not be limited. Concretely, they are phthalates and citrates. Phthalates include, for example, dimethyl phthalate, diethyl phthalate, dicyclohexyl phthalate, dioctyl phthalate and diethylhexyl phthalate; and citrates include, for example, acetyltriethyl citrate, and acetyltributyl citrate. In addition, also mentioned are butyl oleate, methylacetyl ricinoleate, dibutyl sebacate, triacetin, trimethylolpropane tribenzoate. Alkylphthalylalkyl glycolates are also preferably used for the purpose. Alkyl in alkylphthalylalkyl glycolates is an alkyl group having from 1 to 8 carbon atoms. Alkylphthalylalkyl glycolates include, for example, methylphthalylmethyl glycolate, ethylphthalylethyl glycolate, propylphthalylpropyl glycolate, butylphthalylbutyl glycolate, octylphthalyloctyl glycolate, methylphthalylethyl glycolate, ethylphthalylmethyl glycolate, ethylphthalylpropyl glycolate, propylphthalylethyl glycolate, methylphthalylpropyl glycolate, methylphthalylbutyl glycolate, ethylphthalylbutyl glycolate, butylphthalylmethyl glycolate, butylphthalylethyl glycolate, propylphthalylbutyl glycolate, butylphthalylpropyl glycolate, methylphthalyloctyl glycolate, ethylphthalyloctyl glycolate, octylphthalylmethyl glycolate, octylphthalylethyl glycolate. Preferred for use herein are methylphthalylmethyl glycolate, ethylphthalylethyl glycolate, propylphthalylpropyl glycolate, butylphthalylbutyl glycolate, octylphthalyloctyl glycolate; and more preferred is ethylphthalylethyl glycolate. Two or more of these alkylphthalylalkyl glycolates may be combined and used herein.

Examples of carboxylate compounds for use herein are mentioned below, to which, however, the invention should not be limited.

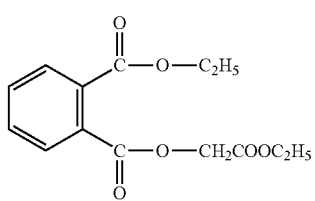

J-2
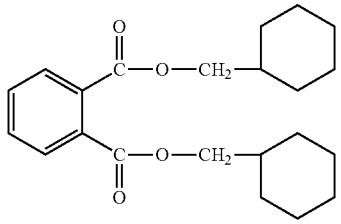

J-3
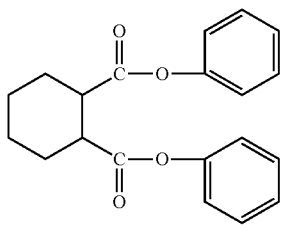

J-4
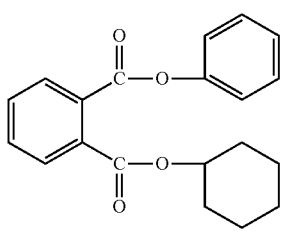

J-5
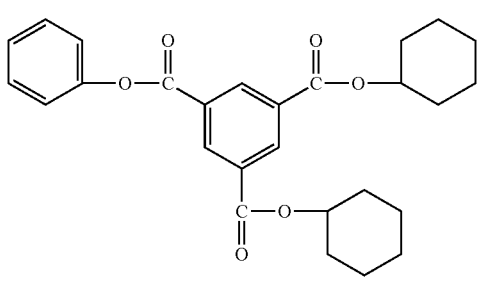

J-6
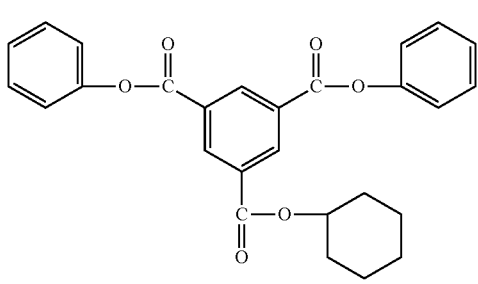

J-7
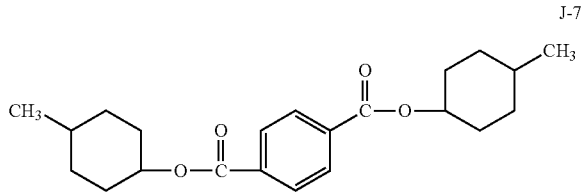

J-8
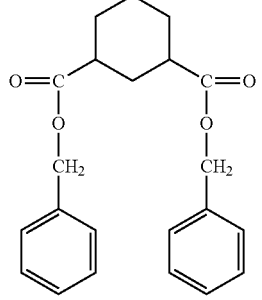

J-9
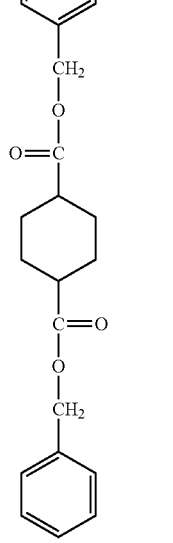

(Polycyclic Carboxylic Acid Compounds)

Polycyclic carboxylic acid compounds for use in the invention are preferably those having a molecular weight of at most 3000, more preferably those having a molecular weight of from 250 to 2000. Regarding the cyclic structure of the compounds, the size of the ring is not specifically defined. Preferably, however, the ring is composed of from 3 to 8 atoms, more preferably it is a 6-membered and/or 5-membered ring. The ring may contain any other atom of carbon, oxygen, nitrogen and silicon, and the bond to form the ring may be partly an unsaturated bond. For example, the 6-membered ring may be a benzene ring or a cyclohexane ring. The compounds for use in the invention may contain a plurality of such cyclic structures, for example, they may have both benzene ring and cyclohexane ring in one molecule, or may have two cyclohexane rings, or may be naphthalene derivatives or anthracene derivatives. More preferably, the compounds contain at least three such cyclic structures in the molecule. Also preferably, at least one bond in the cyclic structure of the compounds does not contain an unsaturated bond. Concretely, typically mentioned are abietic acid derivatives such as abietic acid, dehydroabietic acid, parastrin acid. Chemical formulae of these compounds are mentioned below, which, however, are not limitative.

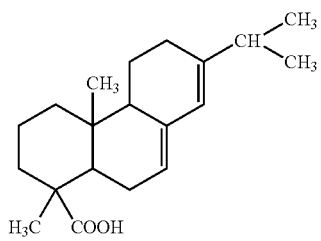
K-1

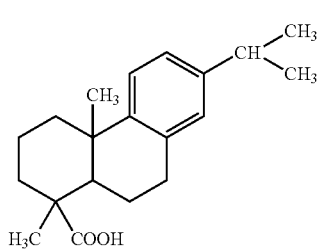
K-2

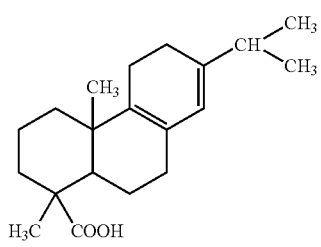
K-3

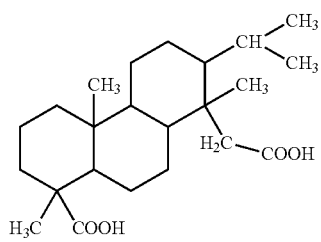
K-4

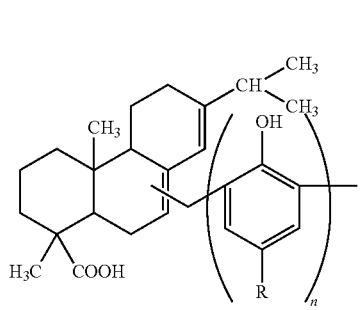
K-5

(Bisphenol Derivatives)

Bisphenol derivatives for use in the invention are preferably those having a molecular weight of at most 10,000. Having a molecular weight that falls within the range, the derivatives may be monomers or may be oligomers or polymers. They may also be copolymers with any other polymer, or they may be modified with a reactive substituent at their terminal. These compounds and their chemical formulae are mentioned below, to which, however, the invention should not be limited.

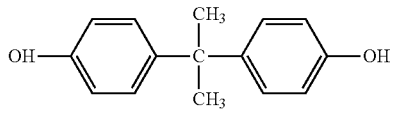
L-1

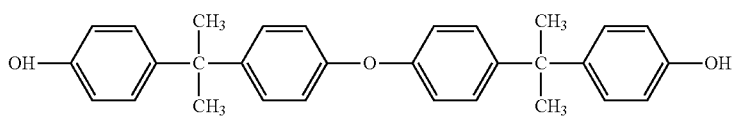
L-2

L-3

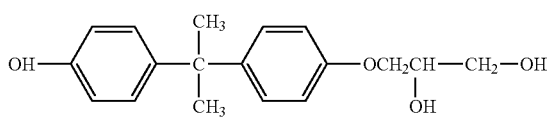
L-4

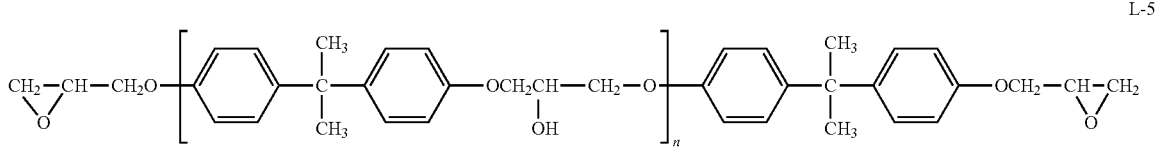
L-5

-continued

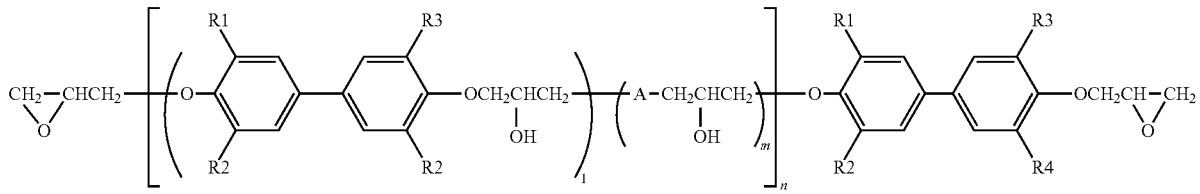

L-6

In the examples of bisphenol derivatives mentioned above, R1 to R4 each represents a hydrogen atom or an alkyl group having from 1 to 10 carbon atoms; l, m and n each indicates the number of repetitive units, and though not specifically defined, they are preferably an integer of from 1 to 100, more preferably an integer of from 1 to 20.

[Wavelength-Dependent Distribution Improver]

Compounds having the ability to reduce the wavelength-dependent optical anisotropy distribution of cellulose acylate film are described. As a result of our assiduous studies, we, the present inventors have succeeded in controlling the wavelength-dependent Re and Rth distribution of a cellulose acylate film by adding from 0.01 to 30% by mass, relative to the cellulose acylate solid content of the film, of at least one compound capable of reducing |Re(400)−Re(700)| and |Rth(400)−Rth(700)| of the film. (Hereafter said compound is called "Wavelength-Dependent Distribution Improver") Regarding the amount of the compound therein, when the cellulose acylate film contains from 0.1 to 30% by mass of the compound, then the wavelength-dependent Re and Rth distribution of the film can be controlled.

Regarding the wavelength-dependent distribution thereof, the values of Re and Rth of cellulose acylate film are generally larger in a short wavelength range than in a long wavelength range. Therefore, it is desired that the small values of Re and Rth in a short wavelength range are increased to thereby reduce the wavelength-dependent Re and Rth distribution. On the other hand, the wavelength-dependent characteristic distribution of compounds having an absorption in a UV range of from 200 to 400 nm is such that the absorbance of the compound is larger in a long wavelength range than in a short wavelength range. When a compound of the type is isotropically inside cellulose acylate film, then the birefringence and therefore the wavelength-dependent Re and Rth distribution of the compound may be larger in the short wavelength range like the wavelength-dependent absorbance distribution thereof.

Accordingly, when a compound having an absorption in a UV range of from 200 to 400 nm and probably having a larger wavelength-dependent Re and Rth distribution in a short wavelength range, such as that mentioned above, is used in a cellulose acylate film, then the wavelength-dependent Re and Rth distribution the film could be controlled. For this, the compound having the ability to control the wavelength-dependent anisotropy distribution of cellulose acylate film must be satisfactorily and uniformly miscible with cellulose acylate. Preferably, the compound of the type has a UV absorption range of from 200 to 400 nm, more preferably from 220 to 395 nm, even more preferably 240 to 390 nm.

In recent liquid-crystal display devices for televisions, notebook-size personal computers and mobile display terminals, the optical members are required to have a high transmittance in order that the display devices can have a high brightness at a smaller power. In this point, when a compound having an absorption in a UV region of from 200 to 400 nm and having the ability to reduce |Re(400)−Re(700)| and |Rth(400)−Rth(700)| of cellulose acylate film is added to the film, it is desired that the film with the compound added thereto could have a high spectral transmittance. Preferably, the cellulose acylate film in the invention has a spectral transmittance at a wavelength of 380 nm of from 45% to 95%, and has a spectral transmittance at a wavelength of 350 nm of at most 10%.

From the viewpoint of the vaporization thereof, it is desirable that the wavelength-dependent anisotropy distribution improver preferred for use in the invention such as that mentioned hereinabove has a molecular weight of from 250 to 1000, more preferably from 260 to 800, even more preferably from 270 to 800, still more preferably from 300 to 800. Having a molecular weight that falls within the range, the improver may have a specific monomer structure or may have an oligomer structure or a polymer structure that comprises plural monomer units bonding to each other.

It is desirable that the wavelength-dependent anisotropy distribution improver does not evaporate away during the process of dope-casting and drying in cellulose acylate film formation.

(Amount of Compound to be Added)

It is desirable that the amount of the above-mentioned wavelength-dependent anisotropy distribution improver preferable for use in the invention is from 0.01 to 30% by mass of cellulose acylate, more preferably from 0.1 to 20% by mass, even more preferably from 0.2 to 10% by mass.

(Method of Addition of Compound)

One or more different types of such wavelength-dependent anisotropy distribution improvers may be used herein either singly or as combined.

Regarding its addition, the wavelength-dependent anisotropy distribution improver may be added to the film-forming dope in any stage of dope preparation or in the last step of dope preparation.

Specific examples of the wavelength-dependent anisotropy distribution improver preferred for use in the invention are benzotriazole compounds, benzophenone compounds, cyano group-containing compounds, oxybenzophenone compounds, salicylate compounds and nickel complex salt compounds, to which, however, the invention should not be limited.

Preferred examples of benzotriazole compounds for use as the wavelength-dependent anisotropy distribution improver in the invention are those of the following formula (101):

wherein $Q^1$ represents a nitrogen-containing aromatic hetero ring; and $Q^2$ represents an aromatic ring.

$Q^1$ is a nitrogen-containing aromatic hetero ring, preferably a 5- to 7-membered nitrogen-containing aromatic hetero ring, more preferably a 5- or 6-membered nitrogen-containing aromatic hetero ring, including, for example, imidazole, pyrazole, triazole, tetrazole, thiazole, oxazole, selenazole, benzotriazole, benzothiazole, benzoxazole, benzoselenazole, thiadiazole, oxadiazole, naphthothiazole, naphthoxazole, azabenzimidazole, purine, pyridine, pyrazine, pyrimidine, pyridazine, triazine, triazaindene, tetrazaindene. More preferably, $Q^1$ is a 5-membered nitrogen-containing aromatic hetero ring, concretely including imidazole, pyrazole, triazole, tetrazole, thiazole, oxazole, benzotriazole, benzothiazole, benzoxazole, thiadiazole, oxadiazole, and is especially preferably benzotriazole.

The nitrogen-containing aromatic hetero ring for $Q^1$ is may have a substituent. For the substituent, the substituents T mentioned below are applicable. Plural substituents, if any, may be condensed to form a condensed ring.

The aromatic ring for $Q^2$ may be an aromatic hydrocarbon ring or an aromatic hetero ring. This may be a single ring or may form a condensed ring with any other ring.

The aromatic hydrocarbon ring is preferably a monocyclic or bicyclic aromatic hydrocarbon ring having from 6 to 30 carbon atoms (e.g., benzene ring, naphthalene ring), more preferably an aromatic hydrocarbon ring having from 6 to 20 carbon atoms, even more preferably from 6 to 12 carbon atoms. Still more preferably, it is a benzene ring.

The aromatic hetero-ring is preferably one that contains a nitrogen atom or a sulfur atom. Examples of the hetero-ring are thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, tetrazaindene. The aromatic hetero-ring is preferably pyridine, triazine or quinoline.

The aromatic ring for $Q^2$ is preferably an aromatic hydrocarbon ring, more preferably a naphthalene ring or a benzene ring, even more preferably a benzene ring. $Q^2$ may have a substituent. For the substituent, preferred are the substituents T mentioned below.

The substituents T include, for example, an alkyl group (preferably having from 1 to 20 carbon atoms, more preferably from 1 to 12 carbon atoms, even more preferably from 1 to 8 carbon atoms, e.g., methyl, ethyl, iso-propyl, tert-butyl, n-octyl, n-decyl, n-hexadecyl, cyclopropyl, cyclopentyl, cyclohexyl), an alkenyl group (preferably having from 2 to 20 carbon atoms, more preferably from 2 to 12 carbon atoms, even more preferably from 2 to 8 carbon atoms, e.g., vinyl, allyl, 2-butenyl, 3-pentenyl), an alkynyl group (preferably having from 2 to 20 carbon atoms, more preferably from 2 to 12 carbon atoms, even more preferably from 2 to 8 carbon atoms, e.g., propargyl, 3-pentynyl), an aryl group (preferably having from 6 to 30 carbon atoms, more preferably from 6 to 20 carbon atoms, even more preferably from 6 to 12 carbon atoms, e.g., phenyl, p-methylphenyl, naphthyl), a substituted or unsubstituted amino group (preferably having from 0 to 20 carbon atoms, more preferably from 0 to 10 carbon atoms, even more preferably from 0 to 6 carbon atoms, e.g., amino, methylamino, dimethylamino, diethylamino, dibenzylamino), an alkoxy group (preferably having from 1 to 20 carbon atoms, more preferably from 1 to 12 carbon atoms, even more preferably from 1 to 8 carbon atoms, e.g., methoxy, ethoxy, butoxy), an aryloxy group (preferably having from 6 to 20 carbon atoms, more preferably from 6 to 16 carbon atoms, even more preferably from 6 to 12 carbon atoms, e.g., phenyloxy, 2-naphthyloxy), an acyl group (preferably having from 1 to 20 carbon atoms, more preferably from 1 to 16 carbon atoms, even more preferably from 1 to 12 carbon atoms, e.g., acetyl, benzoyl, formyl, pivaloyl), an alkoxycarbonyl group (preferably having from 2 to 20 carbon atoms, more preferably from 2 to 16 carbon atoms, even more preferably from 2 to 12 carbon atoms, e.g., methoxycarbonyl, ethoxycarbonyl), an aryloxycarbonyl group (preferably having from 7 to 20 carbon atoms, more preferably from 7 to 16 carbon atoms, even more preferably from 7 to 10 carbon atoms, e.g., phenyloxycarbonyl), an acyloxy group (preferably having from 2 to 20 carbon atoms, more preferably from 2 to 16 carbon atoms, even more preferably from 2 to 10 carbon atoms, e.g., acetoxy, benzoyloxy), an acylamino group (preferably having from 2 to 20 carbon atoms, more preferably from 2 to 16 carbon atoms, even more preferably from 2 to 10 carbon atoms, e.g., acetylamino, benzoylamino), an alkoxycarbonylamino group (preferably having from 2 to 20 carbon atoms, more preferably from 2 to 16 carbon atoms, even more preferably from 2 to 12 carbon atoms, e.g., methoxycarbonylamino), an aryloxycarbonylamino group (preferably having from 7 to 20 carbon atoms, more preferably from 7 to 16 carbon atoms, even more preferably from 7 to 12 carbon atoms, e.g., phenyloxycarbonylamino), a sulfonylamino group (preferably having from 1 to 20 carbon atoms, more preferably from 1 to 16 carbon atoms, even more preferably from 1 to 12 carbon atoms, e.g., methanesulfonylamino, benzenesulfonylamino), a sulfamoyl group (preferably having from 0 to 20 carbon atoms, more preferably from 0 to 16 carbon atoms, even more preferably from 0 to 12 carbon atoms, e.g., sulfamoyl, methylsulfamoyl, dimethylsulfamoyl, phenylsulfamoyl), a carbamoyl group (preferably having from 1 to 20 carbon atoms, more preferably from 1 to 16 carbon atoms, even more preferably from 1 to 12 carbon atoms, e.g., carbamoyl, methylcarbamoyl, diethylcarbamoyl, phenylcarbamoyl), an alkylthio group (preferably having from 1 to 20 carbon atoms, more preferably from 1 to 16 carbon atoms, even more preferably from 1 to 12 carbon atoms, e.g., methylthio, ethylthio), an arylthio group (preferably having from 6 to 20 carbon atoms, more preferably from 6 to 16 carbon atoms, even more preferably from 6 to 12 carbon atoms, e.g., phenylthio), a sulfonyl group (preferably having from 1 to 20 carbon atoms, more preferably from 1 to 16 carbon atoms, even more preferably from 1 to 12 carbon atoms, e.g., mesyl, tosyl), a sulfinyl group (preferably having from 1 to 20 carbon atoms, more preferably from 1 to 16 carbon atoms, even more preferably from 1 to 12 carbon atoms, e.g., methanesulfinyl, benzenesulfinyl), an ureido group preferably having from 1 to 20 carbon atoms, more preferably from 1 to 16 carbon atoms, even more preferably from 1 to 12 carbon atoms, e.g., ureido, methylureido, phenylureido), a phosphoramido group (preferably having from 1 to 20 carbon atoms, more preferably from 1 to 16 carbon atoms, even more preferably from 1 to 12 carbon atoms, e.g., diethylphosphoramido, phenylphosphoramido), a hydroxyl group, a mercapto group, a halogen atom (e.g., fluorine atom, chlorine atom, bromine atom, iodine atom), a cyano group, a sulfo group, a carboxyl group, a nitro group, a hydroxamic acid group, a sulfino group, a hydrazino group, an imino group, a heterocyclic group (preferably having from 1 to 30 carbon atoms, more preferably from 1 to 12 carbon atoms, in which the hetero atom is any of nitrogen atom, oxygen atom or sulfur atom, e.g., imidazolyl, pyridyl, quinolyl, furyl, piperidyl, morpholino, benzoxazolyl, benzimidazolyl, benzothiazolyl), a silyl group (preferably having from 3 to 40 carbon atoms, more preferably from 3 to 30 carbon atoms, even more preferably from 3 to 24 carbon atoms, e.g., trimethylsilyl, triphenylsilyl). These substituents may be further substituted. Two or more substituents, if any, may be the same or different. If possible, they may bond to each other to form a ring.

Of the compounds of formula (101), preferred are those of the following formula (101-A):

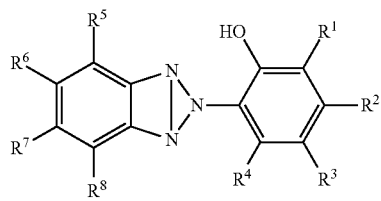

Formula (101-A)

wherein $R^1$, $R^2$, $R^3$, $R^4$, $R^5$, $R^6$, $R^7$ and $R^8$ each independently represents a hydrogen atom or a substituent.

$R^1$, $R^2$, $R^3$, $R^4$, $R^5$, $R^6$, $R^7$, $R^8$ and $R^9$ each independently represents a hydrogen atom or a substituent. For the substituent, referred to are the substituents T mentioned above. These substituents may have any other substituent. The substituents may be condensed to form a condensed cyclic structure.

$R^1$ and $R^3$ are preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group, an aryl group, an alkyloxy group, an aryloxy group or a halogen atom; even more preferably a hydrogen atom, or an alkyl group having from 1 to 12 carbon atoms; still more preferably an alkyl group having from 1 to 12 carbon atoms (preferably having from 4 to 12 carbon atoms).

$R^2$ and $R^4$ are preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group, an aryl group, an alkyloxy group, an aryloxy group or a halogen atom; even more preferably a hydrogen atom, or an alkyl group having from 1 to 12 carbon atoms; still more preferably a hydrogen atom or a methyl group; most preferably a hydrogen atom.

$R^5$ and $R^8$ are preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group, an aryl group, an alkyloxy group, an aryloxy group or a halogen atom; even more preferably a hydrogen atom, or an alkyl group having from 1 to 12 carbon atoms; still more preferably a hydrogen atom or a methyl group; most preferably a hydrogen atom.

$R^6$ and $R^7$ are preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group, an aryl group, an alkyloxy group, an aryloxy group or a halogen atom; even more preferably a hydrogen atom or a halogen atom; still more preferably a hydrogen atom or a chlorine atom.

Of the compounds of formula (101), more preferred are those of the following formula (101-B):

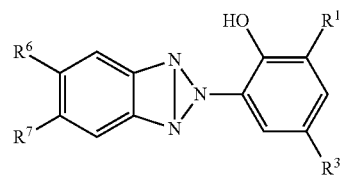

Formula (101-B)

wherein $R^1$, $R^3$, $R^6$ and $R^7$ have the same meanings as those in formula (101-A), and their preferred ranges are also the same as those therein.

Specific examples of the compounds of formula (101) are mentioned below, to which, however, the invention should not be limited.

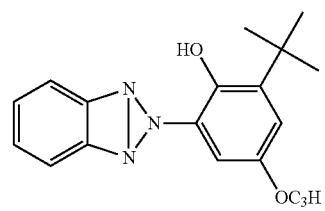

UV-1

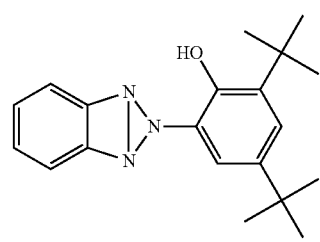

UV-2

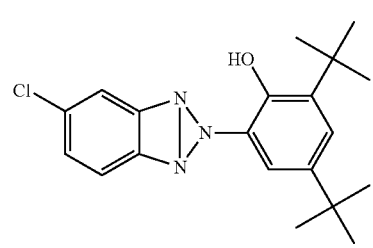

UV-3

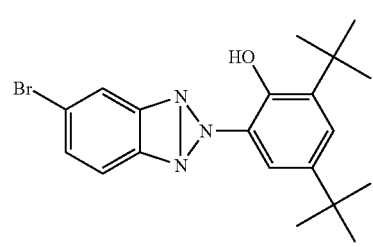

UV-4

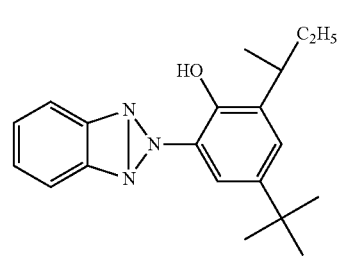

UV-5

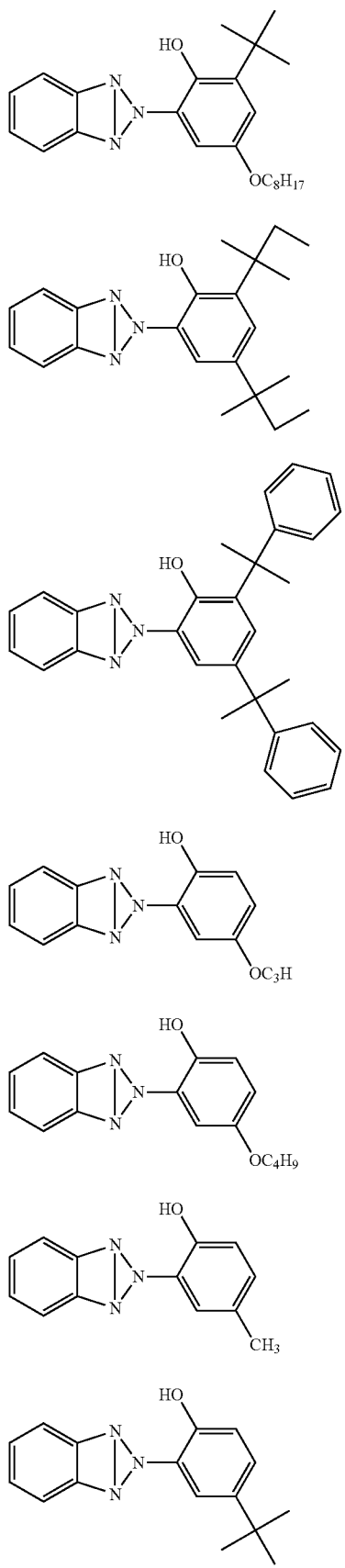
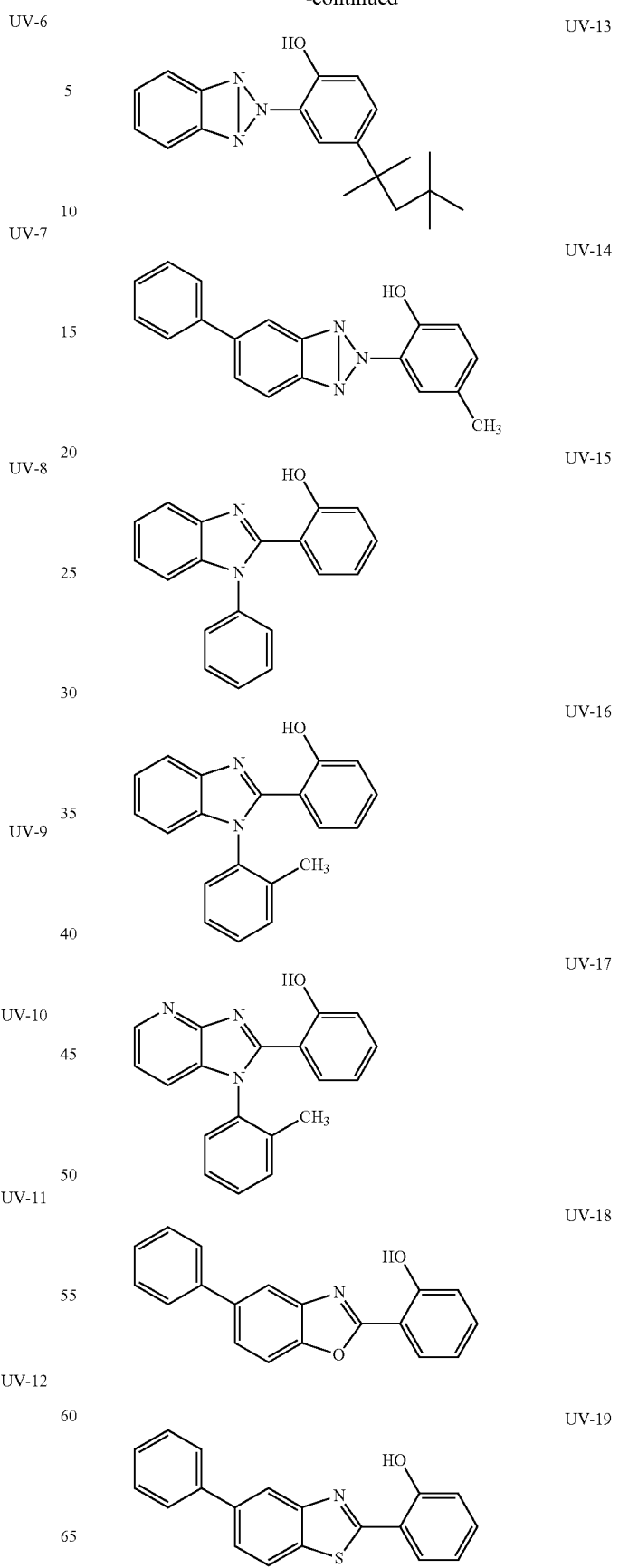

UV-20

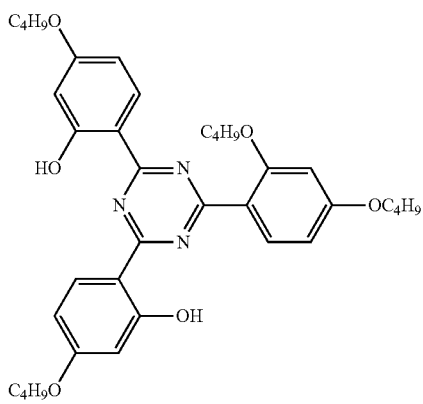

UV-21

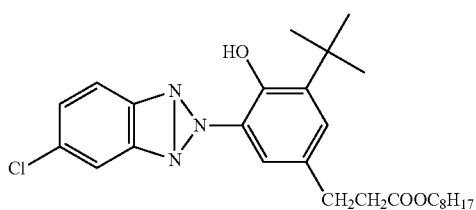

UV-22

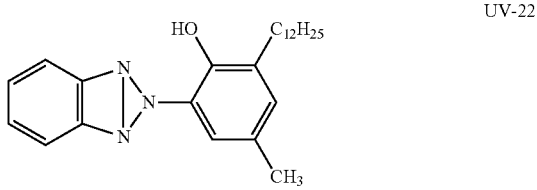

UV-23

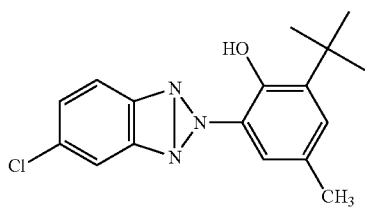

Of the benzotriazole compounds mentioned hereinabove, those having a molecular weight of not smaller than 320 are preferred. We, the present inventors have confirmed that the compounds of the type are advantageous in point of their retentiveness in cellulose acylate films formed with them.

Preferred examples of benzophenone compounds for use as the wavelength-dependent anisotropy distribution improver in the invention are those of the following Formula (102):

Formula (102)

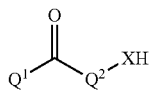

wherein $Q^1$ and $Q^2$ each independently represents an aromatic ring; X represents NR (where R represents a hydrogen atom or a substituent), an oxygen atom or a sulfur atom.

The aromatic ring for $Q^1$ and $Q^2$ may be an aromatic hydrocarbon ring or an aromatic hetero ring. It may be a single ring or may form a condensed ring with any other ring.

The aromatic hydrocarbon ring for $Q^1$ and $Q^2$ is preferably a monocyclic or bicyclic aromatic hydrocarbon ring having from 6 to 30 carbon atoms (e.g., benzene ring, naphthalene ring), more preferably an aromatic hydrocarbon ring having from 6 to 20 carbon atoms, even more preferably from 6 to 12 carbon atoms. Still more preferably, it is a benzene ring.

The aromatic hetero ring for $Q^1$ and $Q^2$ is preferably an aromatic hetero ring that contains at least any one of an oxygen atom, a nitrogen atom or a sulfur atom. Examples of the hetero-ring are furan, pyrrole, thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, tetrazaindene. The aromatic hetero-ring is preferably pyridine, triazine or quinoline.

The aromatic ring for $Q^1$ and $Q^2$ is preferably an aromatic hydrocarbon ring, more preferably an aromatic hydrocarbon ring having from 6 to 10 carbon atoms, still more preferably a substituted or unsubstituted benzene ring.

$Q^1$ and $Q^2$ may have a substituent, for which preferred are the substituents T mentioned below. However, the substituent does not include a carboxylic acid, a sulfonic acid and a quaternary ammonium salt. If possible, the substituents may bond to each other to form a cyclic structure.

X represents NR (where R represents a hydrogen atom or a substituent, and for the substituent, referred to are the substituents T mentioned below), an oxygen atom or a sulfur atom. X is preferably NR (where R is preferably an acyl group or a sulfonyl group which may be substituted), or O, more preferably O.

The substituents T include, for example, an alkyl group (preferably having from 1 to 20 carbon atoms, more preferably from 1 to 12 carbon atoms, even more preferably from 1 to 8 carbon atoms, e.g., methyl, ethyl, iso-propyl, tert-butyl, n-octyl, n-decyl, n-hexadecyl, cyclopropyl, cyclopentyl, cyclohexyl), an alkenyl group (preferably having from 2 to 20 carbon atoms, more preferably from 2 to 12 carbon atoms, even more preferably from 2 to 8 carbon atoms, e.g., vinyl, allyl, 2-butenyl, 3-pentenyl), an alkynyl group (preferably having from 2 to 20 carbon atoms, more preferably from 2 to 12 carbon atoms, even more preferably from 2 to 8 carbon atoms, e.g., propargyl, 3-pentynyl), an aryl group (preferably having from 6 to 30 carbon atoms, more preferably from 6 to 20 carbon atoms, even more preferably from 6 to 12 carbon atoms, e.g., phenyl, p-methylphenyl, naphthyl), a substituted or unsubstituted amino group (preferably having from 0 to 20 carbon atoms, more preferably from 0 to 10 carbon atoms, even more preferably from 0 to 6 carbon atoms, e.g., amino, methylamino, dimethylamino, diethylamino, dibenzylamino), an alkoxy group (preferably having from 1 to 20 carbon atoms, more preferably from 1 to 12 carbon atoms, even more preferably from 1 to 8 carbon atoms, e.g., methoxy, ethoxy, butoxy), an aryloxy group (preferably having from 6 to 20 carbon atoms, more preferably from 6 to 16 carbon atoms, even more preferably from 6 to 12 carbon atoms, e.g., phenyloxy, 2-naphthyloxy), an acyl group (preferably having from 1 to 20 carbon atoms, more preferably from 1 to 16 carbon atoms, even more preferably from 1 to 12 carbon atoms, e.g., acetyl, benzoyl, formyl, pivaloyl), an alkoxycarbonyl group (preferably having from 2 to 20 carbon atoms, more preferably from 2 to 16 carbon atoms, even more preferably from 2 to 12 carbon atoms, e.g., methoxycarbonyl, ethoxycarbonyl), an aryloxycarbonyl group (preferably having from 7 to 20 carbon atoms, more preferably from 7 to 16 carbon atoms, even more preferably from 7 to 10 carbon atoms, e.g., phenyloxycarbonyl), an acyloxy group (preferably having from 2 to 20 carbon atoms, more preferably from 2 to 16 carbon atoms, even more preferably from 2 to 10 carbon atoms, e.g., acetoxy, benzoyloxy), an acylamino group (preferably having from 2 to 20 carbon atoms, more preferably from 2 to 16 carbon atoms, even more preferably from 2 to 10 carbon atoms, e.g., acetylamino, benzoylamino), an alkoxycarbonylamino group (preferably having from 2 to 20 carbon atoms, more preferably from 2 to 16 carbon atoms, even more preferably from 2 to 12 carbon atoms, e.g., methoxycarbonylamino), an aryloxycarbonylamino group (preferably having from 7 to 20 carbon atoms, more preferably from 7 to 16 carbon atoms, even more preferably from 7 to 12 carbon atoms, e.g., phenyloxycarbonylamino), a sulfonylamino group (preferably having from 1 to 20 carbon atoms, more preferably from 1 to 16 carbon atoms, even more preferably from 1 to 12 carbon atoms, e.g., methanesulfonylamino, benzenesulfonylamino), a sulfamoyl group (preferably having from 0 to 20 carbon atoms, more preferably from 0 to 16 carbon atoms, even more preferably from 0 to 12 carbon atoms, e.g., sulfamoyl, methylsulfamoyl, dimethylsulfamoyl, phenylsulfamoyl), a carbamoyl group (preferably having from 1 to 20 carbon atoms, more preferably from 1 to 16 carbon atoms, even more preferably from 1 to 12 carbon atoms, e.g., carbamoyl, methylcarbamoyl, diethylcarbamoyl, phenylcarbamoyl), an alkylthio group (preferably having from 1 to 20 carbon atoms, more preferably from 1 to 16 carbon atoms, even more preferably from 1 to 12 carbon atoms, e.g., methylthio, ethylthio), an arylthio group (preferably having from 6 to 20 carbon atoms, more preferably from 6 to 16 carbon atoms, even more preferably from 6 to 12 carbon atoms, e.g., phenylthio), a sulfonyl group (preferably having from 1 to 20 carbon atoms, more preferably from 1 to 16 carbon atoms, even more preferably from 1 to 12 carbon atoms, e.g., mesyl, tosyl), a sulfinyl group (preferably having from 1 to 20 carbon atoms, more preferably from 1 to 16 carbon atoms, even more preferably from 1 to 12 carbon atoms, e.g., methanesulfinyl, benzenesulfinyl), an ureido group preferably having from 1 to 20 carbon atoms, more preferably from 1 to 16 carbon atoms, even more preferably from 1 to 12 carbon atoms, e.g., ureido, methylureido, phenylureido), a phosphoramido group (preferably having from 1 to 20 carbon atoms, more preferably from 1 to 16 carbon atoms, even more preferably from 1 to 12 carbon atoms, e.g., diethylphosphoramido, phenylphosphoramido), a hydroxyl group, a mercapto group, a halogen atom (e.g., fluorine atom, chlorine atom, bromine atom, iodine atom), a cyano group, a sulfo group, a carboxyl group, a nitro group, a hydroxamic acid group, a sulfino group, a hydrazino group, an imino group, a heterocyclic group (preferably having from 1 to 30 carbon atoms, more preferably from 1 to 12 carbon atoms, in which the hetero atom is any of nitrogen atom, oxygen atom or sulfur atom, e.g., imidazolyl, pyridyl, quinolyl, furyl, piperidyl, morpholino, benzoxazolyl, benzimidazolyl, benzothiazolyl), a silyl group (preferably having from 3 to 40 carbon atoms, more preferably from 3 to 30 carbon atoms, even more preferably from 3 to 24 carbon atoms, e.g., trimethylsilyl, triphenylsilyl). These substituents may be further substituted. Two or more substituents, if any, may be the same or different. If possible, they may bond to each other to form a ring.

Of the compounds of formula (102), preferred are those of the following formula (102-A):

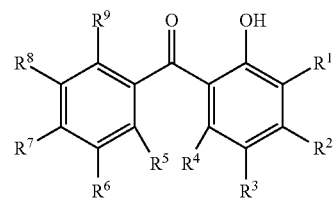

Formula (102-A)

wherein $R^1$, $R^2$, $R^3$, $R^4$, $R^5$, $R^6$, $R^7$, $R^8$ and $R^9$ each independently represents a hydrogen atom or a substituent.

$R^1$, $R^2$, $R^3$, $R^4$, $R^5$, $R^6$, $R^7$, $R^8$ and $R^9$ each independently represents a hydrogen atom or a substituent. For the substituent, referred to are the substituents T mentioned above. These substituents may have any other substituent. The substituents may be condensed to form a condensed cyclic structure.

$R^1$, $R^3$, $R^4$, $R^5$, $R^6$, $R^8$ and $R^9$ are preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group, an aryl group, an alkyloxy group, an aryloxy group or a halogen atom; even more preferably a hydrogen atom, or an alkyl group having from 1 to 12 carbon atoms; still more preferably a hydrogen atom or a methyl group; most preferably a hydrogen atom.

$R^2$ is preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group having from 1 to 20 carbon atoms, an amino group having from 0 to 20 carbon atoms, an alkoxy group having from 1 to 12 carbon atoms, an aryloxy group having from 6 to 12 carbon atoms, or a hydroxyl group; even more preferably an alkoxy group having from 1 to 20 carbon atoms; still more preferably an alkoxy group having from 1 to 12 carbon atoms.

$R^7$ is preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group having from 1 to 20 carbon atoms, an amino group having from 0 to 20 carbon atoms, an alkoxy group having from 1 to 12 carbon atoms, an aryloxy group having from 6 to 12 carbon atoms, or a hydroxyl group; even more preferably a hydrogen atom, or an alkoxy group having from 1 to 20 carbon atoms (preferably having from 1 to 12 carbon atoms, more preferably having from 1 to 8 carbon atoms, still more preferably a methyl group); especially preferably a methyl group or a hydrogen atom.

Of the compounds of formula (102), more preferred are those of the following formula (102-B):

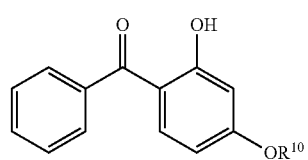

Formula (102-B)

wherein $R^{10}$ represents a hydrogen atom, a substituted or unsubstituted alkyl group, a substituted or unsubstituted alkenyl group, a substituted or unsubstituted alkynyl group, or a substituted or unsubstituted aryl group.

$R^{10}$ is a hydrogen atom, a substituted or unsubstituted alkyl group, a substituted or unsubstituted alkenyl group, a substituted or unsubstituted alkynyl group, or a substituted or unsubstituted aryl group. For the substituent, referred to are the substituents T mentioned above.

K is preferably a substituted or unsubstituted alkyl group, more preferably a substituted or unsubstituted alkyl group having from 5 to 20 carbon atoms, even more preferably a substituted or unsubstituted alkyl group having from 5 to 12 carbon atoms (e.g., n-hexyl group, 2-ethylhexyl group, n-octyl group, n-decyl group, n-dodecyl group, benzyl group), still more preferably a substituted or unsubstituted alkyl group having from 6 to 12 carbon atoms (e.g., 2-ethylhexyl group, n-octyl group, n-decyl group, n-dodecyl group, benzyl group).

The compounds of formula (102) may be produced according to a known method such as that described in JP-A 11-12219.

Specific examples of the compounds of formula (102) are mentioned below, to which, however, the invention should not be limited.

UV-101
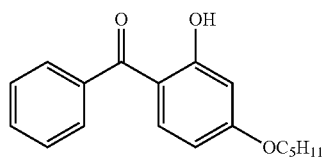

UV-102
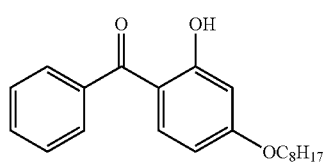

UV-103
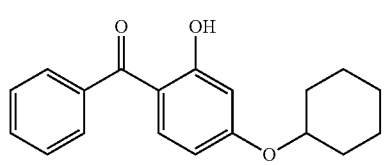

UV-104
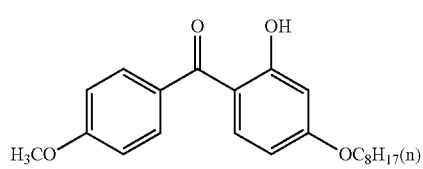

UV-105
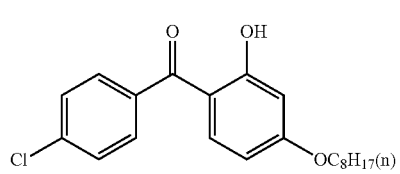

UV-106
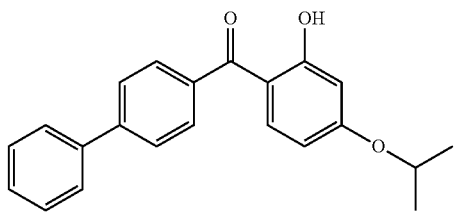

UV-107
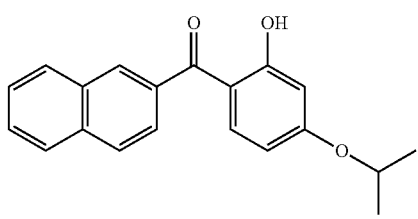

UV-108
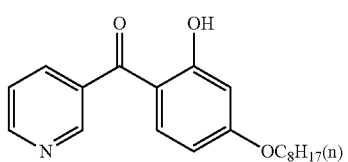

UV-109
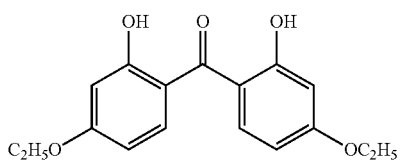

UV-110
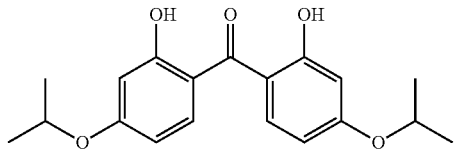

UV-111
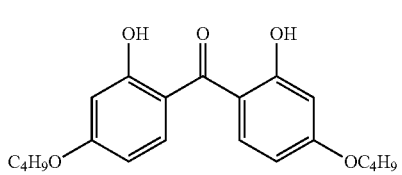

UV-112
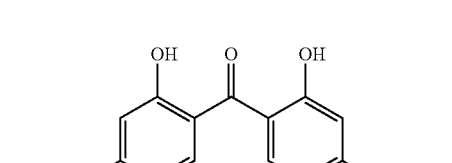

UV-113
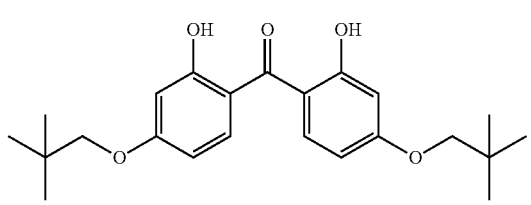

-continued

UV-114
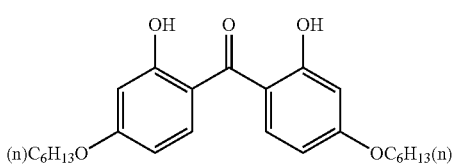

UV-115
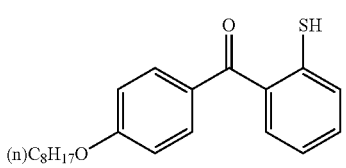

UV-116
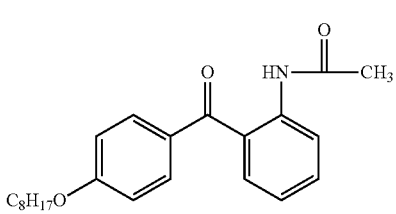

UV-117
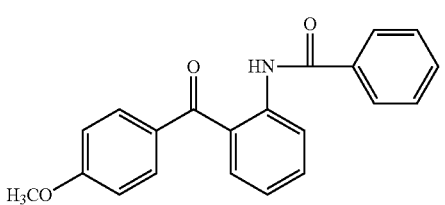

UV-118
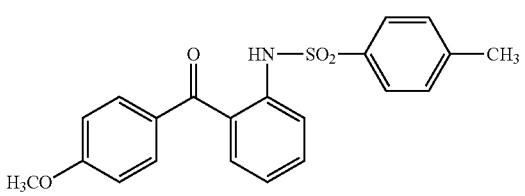

UV-119
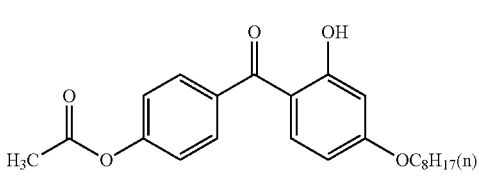

UV-120
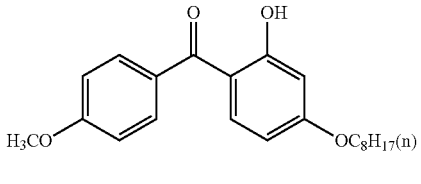

UV-121
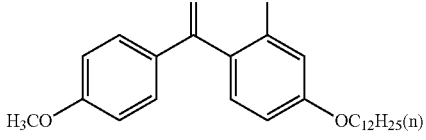

Preferred examples of cyano group-containing compounds for use as the wavelength-dependent anisotropy distribution improver in the invention are those of the following Formula (103):

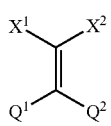

Formula (103)

wherein $Q^1$ and $Q^2$ each independently represents an aromatic ring; $X^1$ and $X^2$ each independently represent a hydrogen atom or a substituent, and at least one of these is a cyano group, a carboxyl group, a sulfo group, or an aromatic heterocyclic group.

The aromatic ring for $Q^1$ and $Q^2$ may be an aromatic hydrocarbon ring or an aromatic hetero ring, and it may be a single ring or may form a condensed ring with any other ring.

The aromatic hydrocarbon ring is preferably a monocyclic or bicyclic aromatic hydrocarbon ring having from 6 to 30 carbon atoms (e.g., benzene ring, naphthalene ring), more preferably an aromatic hydrocarbon ring having from 6 to 20 carbon atoms, even more preferably from 6 to 12 carbon atoms. Still more preferably, it is a benzene ring.

The aromatic hetero-ring is preferably one that contains a nitrogen atom or a sulfur atom as a hetero atom. Examples of the hetero-ring are thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, tetrazaindene. The aromatic hetero-ring is preferably pyridine, triazine or quinoline.

The aromatic ring for $Q^1$ and $Q^2$ is preferably an aromatic hydrocarbon ring, more preferably a benzene ring.

$Q^1$ and $Q^2$ may have a substituent, for which referred to are the substituents T mentioned below. The substituents T include, for example, an alkyl group (preferably having from 1 to 20 carbon atoms, more preferably from 1 to 12 carbon atoms, even more preferably from 1 to 8 carbon atoms, e.g., methyl, ethyl, iso-propyl, tert-butyl, n-octyl, n-decyl, n-hexadecyl, cyclopropyl, cyclopentyl, cyclohexyl), an alkenyl group (preferably having from 2 to 20 carbon atoms, more preferably from 2 to 12 carbon atoms, even more preferably from 2 to 8 carbon atoms, e.g., vinyl, allyl, 2-butenyl, 3-pentenyl), an alkynyl group (preferably having from 2 to 20 carbon atoms, more preferably from 2 to 12 carbon atoms, even more preferably from 2 to 8 carbon atoms, e.g., propargyl, 3-pentynyl), an aryl group (preferably having from 6 to 30 carbon atoms, more preferably from 6 to 20 carbon atoms, even more preferably from 6 to 12 carbon atoms, e.g., phenyl, p-methylphenyl, naphthyl), a substituted or unsubstituted amino group (preferably having from 0 to 20 carbon atoms, more preferably from 0 to 10 carbon atoms, even more preferably from 0 to 6 carbon atoms, e.g., amino, methylamino, dimethylamino, diethylamino, dibenzylamino), an alkoxy group (preferably having from 1 to 20 carbon atoms, more preferably from 1 to 12 carbon atoms, even more preferably from 1 to 8 carbon atoms, e.g., methoxy, ethoxy, butoxy), an aryloxy group (preferably having from 6 to 20 carbon atoms, more preferably from 6 to 16 carbon atoms, even more preferably from 6 to 12 carbon atoms, e.g., phenyloxy, 2-naphthyloxy), an acyl group (preferably having from 1 to 20 carbon atoms, more preferably from 1 to 16 carbon atoms, even more preferably from 1 to 12 carbon atoms, e.g., acetyl, benzoyl, formyl, pivaloyl), an alkoxycarbonyl group (preferably having from 2 to 20 carbon atoms, more preferably from 2 to 16 carbon atoms, even more preferably from 2 to 12 carbon atoms, e.g., methoxycarbonyl, ethoxycarbonyl), an aryloxycarbonyl group (preferably having from 7 to 20 carbon atoms, more preferably from 7 to 16 carbon atoms, even more preferably from 7 to 10 carbon atoms, e.g., phenyloxycarbonyl), an acyloxy group (preferably having from 2 to 20 carbon atoms, more preferably from 2 to 16 carbon atoms, even more preferably from 2 to 10 carbon atoms, e.g., acetoxy, benzoyloxy), an acylamino group (preferably having from 2 to 20 carbon atoms, more preferably from 2 to 16 carbon atoms, even more preferably from 2 to 10 carbon atoms, e.g., acetylamino, benzoylamino), an alkoxycarbonylamino group (preferably having from 2 to 20 carbon atoms, more preferably from 2 to 16 carbon atoms, even more preferably from 2 to 12 carbon atoms, e.g., methoxycarbonylamino), an aryloxycarbonylamino group (preferably having from 7 to 20 carbon atoms, more preferably from 7 to 16 carbon atoms, even more preferably from 7 to 12 carbon atoms, e.g., phenyloxycarbonylamino), a sulfonylamino group (preferably having from 1 to 20 carbon atoms, more preferably from 1 to 16 carbon atoms, even more preferably from 1 to 12 carbon atoms, e.g., methanesulfonylamino, benzenesulfonylamino), a sulfamoyl group (preferably having from 0 to 20 carbon atoms, more preferably from 0 to 16 carbon atoms, even more preferably from 0 to 12 carbon atoms, e.g., sulfamoyl, methylsulfamoyl, dimethylsulfamoyl, phenylsulfamoyl), a carbamoyl group (preferably having from 1 to 20 carbon atoms, more preferably from 1 to 16 carbon atoms, even more preferably from 1 to 12 carbon atoms, e.g., carbamoyl, methylcarbamoyl, diethylcarbamoyl, phenylcarbamoyl), an alkylthio group (preferably having from 1 to 20 carbon atoms, more preferably from 1 to 16 carbon atoms, even more preferably from 1 to 12 carbon atoms, e.g., methylthio, ethylthio), an arylthio group (preferably having from 6 to 20 carbon atoms, more preferably from 6 to 16 carbon atoms, even more preferably from 6 to 12 carbon atoms, e.g., phenylthio), a sulfonyl group (preferably having from 1 to 20 carbon atoms, more preferably from 1 to 16 carbon atoms, even more preferably from 1 to 12 carbon atoms, e.g., mesyl, tosyl), a sulfinyl group (preferably having from 1 to 20 carbon atoms, more preferably from 1 to 16 carbon atoms, even more preferably from 1 to 12 carbon atoms, e.g., methanesulfinyl, benzenesulfinyl), an ureido group preferably having from 1 to 20 carbon atoms, more preferably from 1 to 16 carbon atoms, even more preferably from 1 to 12 carbon atoms, e.g., ureido, methylureido, phenylureido), a phosphoramido group (preferably having from 1 to 20 carbon atoms, more preferably from 1 to 16 carbon atoms, even more preferably from 1 to 12 carbon atoms, e.g., diethylphosphoramido, phenylphosphoramido), a hydroxyl group, a mercapto group, a halogen atom (e.g., fluorine atom, chlorine atom, bromine atom, iodine atom), a cyano group, a sulfo group, a carboxyl group, a nitro group, a hydroxamic acid group, a sulfino group, a hydrazino group, an imino group, a heterocyclic group (preferably having from 1 to 30 carbon atoms, more preferably from 1 to 12 carbon atoms, in which the hetero atom is any of nitrogen atom, oxygen atom or sulfur atom, e.g., imidazolyl, pyridyl, quinolyl, furyl, piperidyl, morpholino, benzoxazolyl, benzimidazolyl, benzothiazolyl), a silyl group (preferably having from 3 to 40 carbon atoms, more preferably from 3 to 30 carbon atoms, even more preferably from 3 to 24 carbon atoms, e.g., trimethylsilyl, triphenylsilyl). These substituents may be further substituted. Two or more substituents, if any, may be the same or different. If possible, they may bond to each other to form a ring.

$X^1$ and $X^2$ each are a hydrogen atom or a substituent, and at least one of these is a cyano group, a carboxyl group, a sulfo group, or an aromatic heterocyclic group. For the substituent for $X^1$ and $X^2$, referred to are the substituents T mentioned above. The substituent for $X^1$ and $X^2$ may be substituted with any other substituent, and $X^1$ and $X^2$ may be condensed to form a cyclic structure.

$X^1$ and $X^2$ are preferably a hydrogen atom, an aryl group, a cyano group, a nitro group, a carbonyl group, a sulfonyl group or an aromatic hetero ring; more preferably a cyano group, a carbonyl group, a sulfonyl group or an aromatic hetero ring; even more preferably a cyano group or a carbonyl group; still more preferably a cyano group, or an alkoxycarbonyl group (—C(=O)OR where R represents an alkyl group having from 1 to 20 carbon atoms, an aryl group having from 6 to 12 carbon atoms or their combination).

Of the compounds of formula (103), preferred are those of the following formula (103-A):

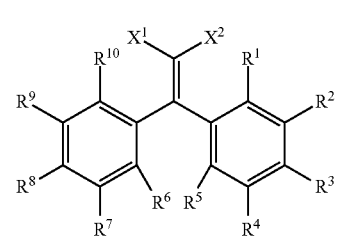

Formula (103-A)

wherein $R^1$, $R^2$, $R^3$, $R^4$, $R^5$, $R^6$, $R^7$, $R^8$, $R^9$ and $R^{10}$ each independently represents a hydrogen atom or a substituent; $X^1$ and $X^2$ have the same meanings as those in formula (103), and their preferred ranges are also the same as those therein.

$R^1$, $R^2$, $R^3$, $R^4$, $R^5$, $R^6$, $R^7$, $R^8$, $R^9$ and $R^{10}$ each independently represents a hydrogen atom or a substituent. For the substituent, referred to are the substituents T mentioned above. These substituents may have any other substituent. The substituents may be condensed to form a condensed cyclic structure.

$R^1$, $R^2$, $R^4$, $R^5$, $R^6$, $R^7$, $R^9$ and $R^{10}$ are preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group, an aryl group, an alkyloxy group, an aryloxy group or a halogen atom; even more preferably a hydrogen atom, or an alkyl group having from 1 to 12 carbon atoms; still more preferably a hydrogen atom or a methyl group; most preferably a hydrogen atom.

$R^3$ and $R^8$ are preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group having from 1 to 20 carbon atoms, an amino group having from 0 to 20 carbon atoms, an alkoxy group having from 1 to 12 carbon atoms, an aryloxy group having from 6 to 12 carbon atoms, or a hydroxyl group; even more preferably a hydrogen atom, or an alkoxy group having from 1 to 12 carbon atoms; still more preferably an alkoxy group having from 1 to 12 carbon atoms; further preferably a hydrogen atom.

Of the compounds of formula (103), more preferred are those of the following formula (103-B):

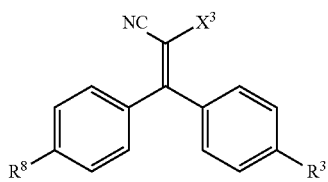

Formula (103-B)

wherein $R^3$ and $R^8$ have the same meanings as those in formula (103-A), and their preferred ranges are also the same as therein; $X^3$ represents a hydrogen atom or a substituent.

$X^3$ represents a hydrogen atom or a substituent. For the substituent, referred to are the substituents T mentioned above. If possible, the substituent may be further substituted with any other substituent. $X^3$ is preferably a hydrogen atom, an alkyl group, an aryl group, a cyano group, a nitro group, a carbonyl group, a sulfonyl group or an aromatic hetero ring; more preferably a cyano group, a carbonyl group, a sulfonyl group or an aromatic hetero ring; even more preferably a cyano group or a carbonyl group; still more preferably a cyano group or an alkoxycarbonyl group (—C(=O)OR where R is an alkyl group having from 1 to 20 carbon atoms, an aryl group having from 6 to 12 carbon atoms or their combination).

Of the compounds of formula (103), even more preferred are those of the following formula (103-C):

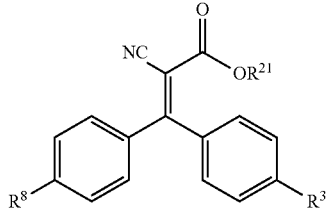

Formula (103-C)

wherein $R^3$ and $R^8$ have the same meanings as those in formula (103-A), and their preferred ranges are also the same as therein; $R^{21}$ represents an alkyl group having from 1 to 20 carbon atoms.

When $R^3$ and $R^8$ are both hydrogen atoms, then $R^{21}$ is preferably an alkyl group having from 2 to 12 carbon atoms, more preferably an alkyl group having from 4 to 12 carbon atoms, even more preferably an alkyl group having from 6 to 12 carbon atoms, still more preferably an n-octyl group, a tert-octyl group, a 2-ethylhexyl group, an n-decyl group or an n-dodecyl group; most preferably a 2-ethylhexyl group.

When $R^3$ and $R^8$ are not hydrogen atoms, then $R^{21}$ is preferably an alkyl group having at most 20 carbon atoms with which the molecular weight of the compound of formula (103-C) could be at least 300.

The compounds of formula (103) for use in the invention can be produced according to the method described in *Journal of American Chemical Society*, Vol. 63, p. 3452 (1941).

Specific examples of the compounds of formula (103) are mentioned below, to which, however, the invention should not be limited.

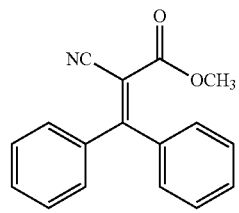

UV-201

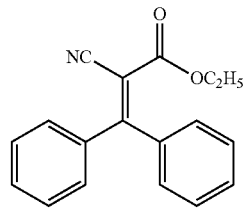

UV-202

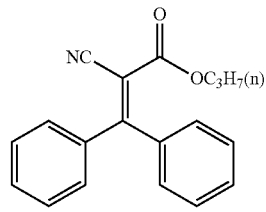

UV-203

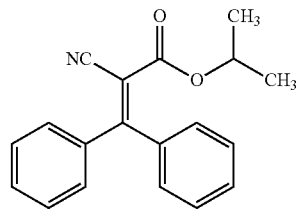

UV-204

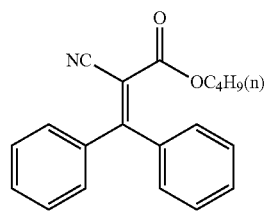

UV-205

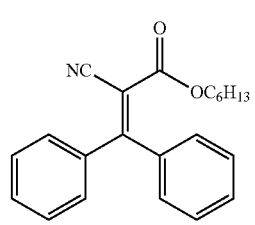

UV-206

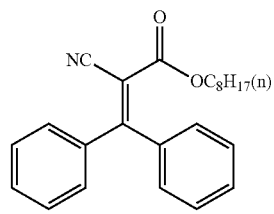

UV-207

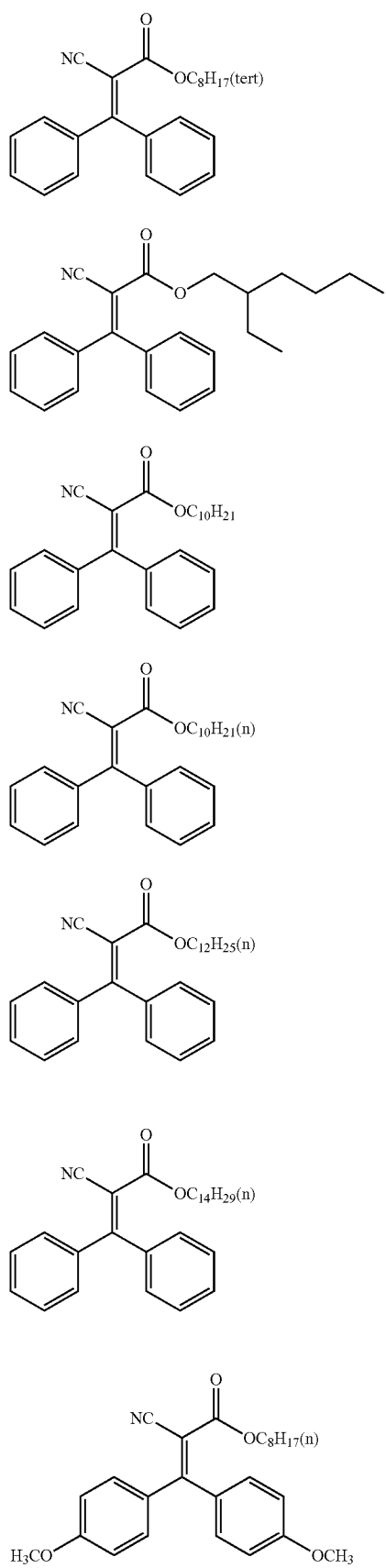
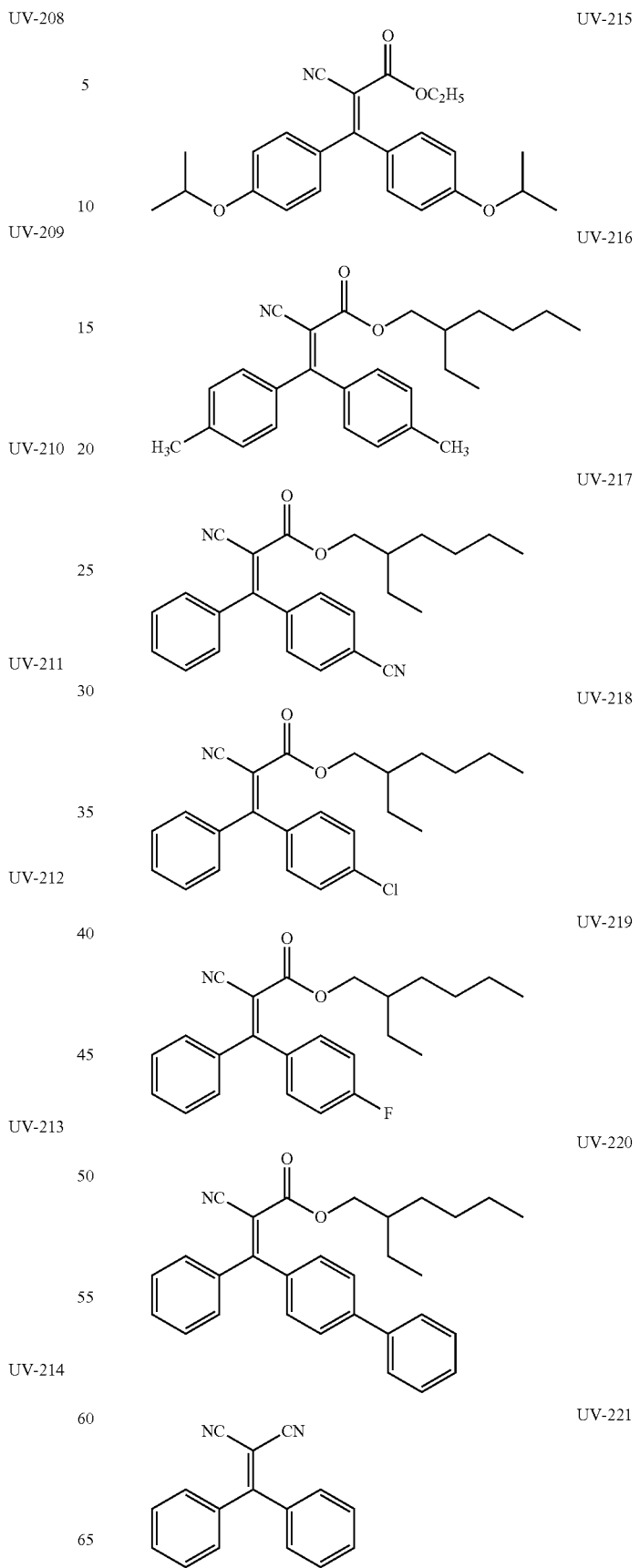

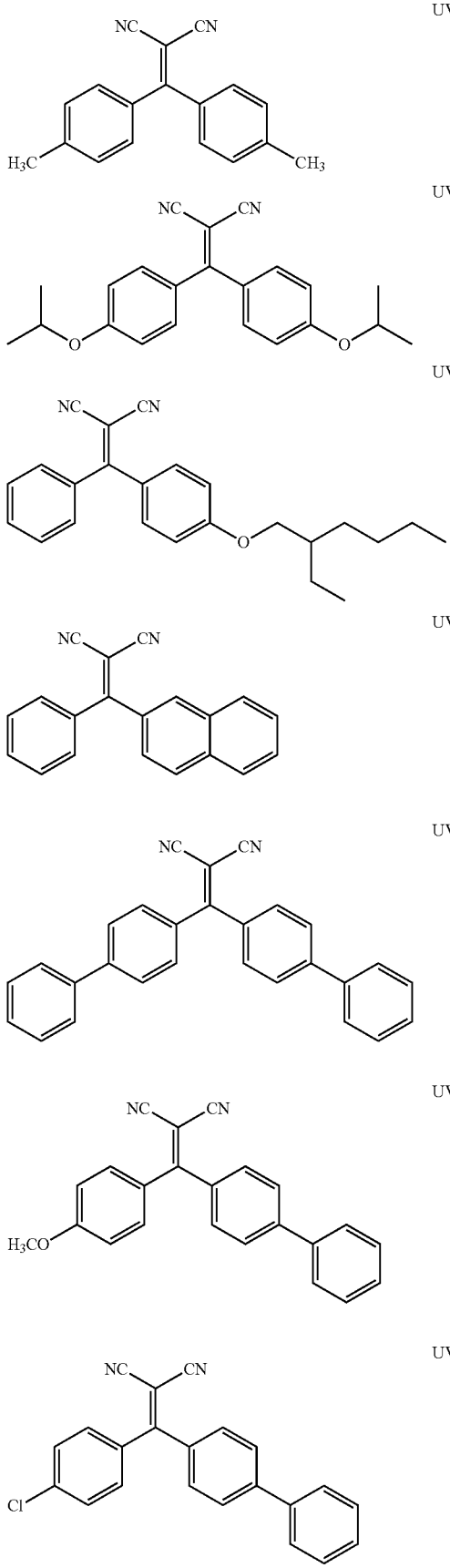
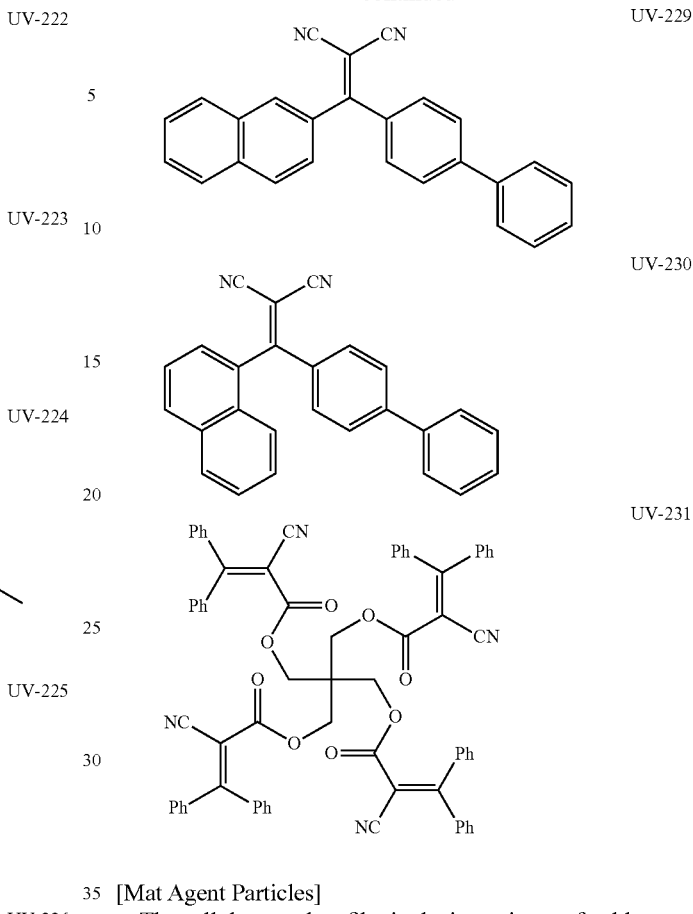

[Mat Agent Particles]

The cellulose acylate film in the invention preferably contains particles serving as a mat agent. The particles for use herein include silicon dioxide, titanium dioxide, aluminium oxide, zirconium oxide, calcium carbonate, talc, clay, calcined kaolin, calcined calcium silicate, calcium silicate hydrate, aluminium silicate, magnesium silicate and calcium phosphate. The particles are preferably silicon-having ones as the haze of the films containing them may be low. Especially preferred is silicon dioxide. Particles of silicon dioxide for use herein preferably have a primary mean particle size of at most 20 nm and have an apparent specific gravity of at least 70 g/liter. More preferred are particles having a small primary mean particle size of from 5 to 16 nm, since the haze of the films containing them is lower. The apparent specific gravity is more preferably from 90 to 200 g/liter, even more preferably from 100 to 200 g/liter. Particles having a larger apparent specific gravity may give a dispersion having a higher concentration, and are therefore preferable since the haze of the films containing them could be lower and since the solid deposits in the film may be reduced.

The particles generally form secondary particles having a mean particle size of from 0.1 to 3.0 μm, and in the film, they exist as aggregates of primary particles, therefore forming protrusions having a size of from 0.1 to 3.0 μm in the film surface. Preferably, the secondary mean particle size is from 0.2 μm to 1.5 μm, more preferably from 0.4 μm to 1.2 μm, most preferably from 0.6 μm to 1.1 μm. The primary and secondary particle sizes are determined as follows: The particles in a film are observed with a scanning electromicroscope, and the diameter of the circle that is circumscribed around the particle is referred to as the particle size. 200 particles are observed at random in different sites, and their data are averaged to give the mean particle size thereof.

For silicon dioxide particles, herein usable are commercial products of Aerosil R972, R972V, R974, R812, 200, 200V, 300, R202, OX50, TT600 (all by Nippon Aerosil). Zirconium oxide particles are also commercially available, for example, as Aerosil R976 and R811 (both by Nippon Aerosil), and are usable herein.

Of those, Aerosil 200V and Aerosil R972V are silicon dioxide particles having a primary mean particle size of at most 20 nm and having an apparent specific gravity of at least 70 g/liter, and these are especially preferred for use herein since they are effective for reducing the friction coefficient of optical films not increasing the haze thereof.

In the invention, for obtaining a cellulose acylate film that contains particles having a small secondary mean particle size, there may be employed some methods for preparing a dispersion of particles. For example, one method for it comprises previously preparing a dispersion of particles by stirring and mixing a solvent and particles, then adding the resulting dispersion to a small amount of a cellulose acylate solution separately prepared, and thereafter further mixing it with a main cellulose acylate dope. This method is desirable since the dispersibility of silicon dioxide particles is good and since the dispersion of silicon dioxide particles prepared hardly reaggregates. Apart from it, also employable herein is a method comprising adding a small amount of a cellulose ester to a solvent, dissolving them with stirring, and fully mixing the resulting dispersion of particles with a dope in an in-line mixer. The invention should not be limited to these methods. When silicon dioxide particles are mixed and dispersed in a solvent, the silicon dioxide concentration in the resulting dispersion is preferably from 5 to 30% by mass, more preferably from 10 to 25% by mass, most preferably from 15 to 20% by mass. Relative to the amount of the particles therein, the dispersion having a higher concentration may have a smaller haze, and is therefore favorable since the haze of the films with it may be lowered and the solid deposits may be reduced in the films. Finally, the amount of the mat agent to be in the cellulose acylate dope is preferably from 0.01 to 1.0 g/m$^2$, more preferably from 0.03 to 0.3 g/m$^2$, most preferably from 0.08 to 0.16 g/m$^2$.

The solvent may be a lower alcohol, preferably methyl alcohol, ethyl alcohol, propyl alcohol, isopropyl alcohol or butyl alcohol. The solvent usable herein except such lower alcohols is not specifically defined, for which, however, preferred are those generally used in cellulose ester film formation.

[Plasticizer, Antioxidant, Release Agent]

In addition to the optical anisotropy-lowering compound and the wavelength-dependent anisotropy dispersion improver mentioned above, the cellulose acylate film of the invention may contain various additives (e.g., plasticizer, UV inhibitor, antioxidant, release agent, IR absorbent) added thereto in the process of producing it and in accordance with the use of the film. The additives may be solid or oily. In other words, they are not specifically defined in point of their melting point and boiling point. For example, UV-absorbing materials may be mixed at 20° C. or lower and at 20° C. or higher; and the same may apply to mixing plasticizers. For example, this is described in JP-A 2001-151901. Further, IR-absorbing dyes are described in, for example, JP-A 2001-194522. The time when the additives are added may be anytime in the process of preparing dopes. As the case may be, the additives may be added in the final step of the process of preparing dopes. The amount of each additive to be added is not specifically defined so far as the additive could exhibit its function. When the cellulose acylate film has a multi-layer structure, then the type and the amount of the additives to be added to each layer may differ. For example, this is described in JP-A 2001-151902, and the technique is well known in the art. Its details are described in Hatsumei Kyokai's Disclosure Bulletin No. 2001-1745 (issued Mar. 15, 2001 by Hatsumei Kyokai), pp. 16-12, and the materials described therein are preferably used in the invention.

[Blend Ratio of Compounds]

In the cellulose acylate film of the invention, the overall amount of the compounds having a molecular weight of at most 3000 is preferably from 5 to 45% relative to the mass of cellulose acylate, more preferably from 10 to 40%, even more preferably from 15 to 30%. As so mentioned hereinabove, the compounds include an optical anisotropy-lowering compound, a wavelength-dependent anisotropy dispersion improver, a UV inhibitor, a plasticizer, an antioxidant, fine particles, a release agent and an IR absorbent. Preferably, they have a molecular weight of at most 3000, more preferably at most 2000, even more preferably at most 1000. If the overall amount of these compounds is smaller than 5%, then it may be problematic in that the properties of the cellulose acylate alone may be too noticeable in the film and, for example, the optical properties and the physical strength of the film may readily fluctuate depending on the change of the ambient temperature and humidity. If, however, the overall amount of the compounds is larger than 45%, then the compounds will be over the limit of their miscibility in the cellulose acylate film and it may be also problematic in that the excess compounds may deposit in the film surface and the film may be thereby whitened (bleeding out from film).

[Organic Solvent in Cellulose Acylate Solution]

In the invention, the cellulose acylate film is produced preferably according to a solvent-casting method, in which a cellulose acylate is dissolved in an organic solvent to prepare a solution (dope) and the dope is formed into films. The organic solvent preferably used as the main solvent in the invention is selected from esters, ketones and ethers having from 2 to 12 carbon atoms, and halogenohydrocarbons having from 1 to 7 carbon atoms. Esters, ketones and ethers for use herein may have a cyclic structure. Compounds having any two or more functional groups of esters, ketones and ethers (i.e., —O—, —CO— and —COO—) may also be used herein as the main solvent, and for example, they may have any other functional group such as alcoholic hydroxyl group. The number of the carbon atoms that constitute the main solvent having two or more functional groups may fall within the range the compound having any of those functional groups.

For the cellulose acylate film of the invention, chlorine-based halogenohydrocarbons may be used as the main solvent, or non-chlorine solvents as in Hatsumei Kyokai's Disclosure Bulletin 2001-1745 (pp. 12-16) may also be used as the main solvent. Anyhow, the main solvent is not limitative for the cellulose acylate film of the invention.

In addition, the solvents for the cellulose acylate solution and the film and also methods for dissolution therein are disclosed in the following patent publications, and these are preferred embodiments for use in the invention. For example, they are described in JP-A 2000-95876, 12-95877, 10-324774, 8-152514, 10-330538, 9-95538, 9-95557, 10-235664, 12-63534, 11-21379, 10-182853, 10-278056, 10-279702, 10-323853, 10-237186, 11-60807, 11-152342, 11-292988, 11-60752, 11-60752. These patent publications disclose not only the solvents preferred for cellulose acylate for the invention but also the physical properties of their solutions as well as the substances that may coexist along with them, and these are also preferred embodiments for use in the invention.

[Method for Producing Cellulose Acylate Film]

[Dissolution Step]

Preparing the cellulose acylate solution (dope) in the invention is not specifically defined in point of its dissolution process. It may be prepared at room temperature or may be prepared in a mode of cooling dissolution or high-temperature dissolution or in a mode of their combination. A process comprising a step of preparing the cellulose acylate solution for use in the invention and a subsequent step of concentration and filtration of the solution is described in detail in Hatsumei Kyokai's Disclosure Bulletin 2001-1745 (issued Mar. 15, 2001, by Hatsumei Kyokai), pp. 22-25, and this is preferably employed in the invention.

(Transparency of Dope Solution)

Preferably, the dope transparency of the cellulose acylate solution in the invention is at least 85%, more preferably at least 88%, even more preferably at least 90%. We, the present inventors have confirmed that various additives well dissolve in the cellulose acylate dope solution in the invention. A concrete method for determining the dope transparency is described. A dope solution is put into a glass cell having a size of 1 cm$^2$, and its absorbance at 550 nm is measured with a spectrophotometer (UV-3150 by Shimadzu). The solvent alone is measured as a blank, and the transparency of the cellulose acylate solution is calculated from the ratio of the solution absorbance to the blank absorbance.

[Casting, Drying and Winding Step]

Next, a process of forming a film from the cellulose acylate solution in the invention is described. For the method and the equipment for producing the cellulose acylate film in the invention, herein employable are the solvent-casting method and the solvent-casting equipment heretofore generally used in the art for cellulose triacetate film formation. A dope (cellulose acylate solution) prepared in a dissolver (tank) is once stored in a storage tank, in which the dope is defoamed and is thus finally prepared. From the dope take-out mouth of the tank, the dope is taken out and fed into a pressure die via a metering pressure gear pump capable of feeding it with accuracy, for example, based on the revolution number thereof, and then the dope is uniformly cast onto the endlessly-running cast member of a metal support via the slit of the pressure die, and at a peel point to which the metal support makes nearly one revolution, the still wet dope film (this may be referred to as a web) is peeled from the metal support. While both ends of the thus-obtained web are clipped to ensure its width, the web is conveyed with a tenter and dried, and then further conveyed with rolls in a drier in which the web is completely dried, and thereafter this is wound up around a winder to predetermined width. The combination of the tenter and the drier with rolls may vary depending on the object of the film to be produced. When the essential applications of the cellulose acylate film of the invention are for functional protective films for optical structures in electronic displays or for silver halide photographic materials, then additional coating devices may be fitted to the solvent casting apparatus for producing the film. The additional devices are for further processing the surface of the film by forming thereon a subbing layer, an antistatic layer, an antihalation layer and a protective layer. This is described in detail in Hatsumei Kyokai's Disclosure Bulletin 2001-1745 (issued Mar. 15, 2001, by Hatsumei Kyokai), pp. 25-30. It includes casting (including co-casting), metal support, drying and peeling, and these are preferably employed in the invention.

Preferably, the thickness of the cellulose acylate film of the invention is from 10 to 120 μm, more preferably from 20 to 100 μm, even more preferably from 30 to 90 μm.

The width of the cellulose acylate film may be smaller than 1350 mm, but is preferably at least 1350 mm, more preferably at least 2000 mm, even more preferably at least 3000 mm. When the cellulose acylate film has a width of at least 1350 mm, then it may accept an enlarged width of polarizers for which the film is used as a protective film. For example, in a process of producing polarizers that includes a step of blanking out the protective films for them, two or more sheets for larger-size panels than 35-inch panels may be blanked out in the direction of the width of the polymer film. Accordingly, the producibility of polarizers is thereby improved.

The length of the cellulose acylate film may be smaller than 1500 m, but is preferably at least 1500 m, more preferably at least 2000 m, even more preferably at least 3000 m. The film is preferably longer, and when its length is at least 1500 m, then longer polarizers may be produced with it. The loss frequency in process switching may be reduced, and the production cost of the polarizers may be thereby reduced.

[Evaluation of Physical Properties of Cellulose Acylate Film]

[Glass Transition Temperature Tg of Film]

The glass transition temperature Tg of the cellulose acylate film in the invention falls between 80 and 165° C. From the viewpoint of the heat resistance of the film, Tg preferably falls between 100 and 160° C., more preferably between 110 and 150° C. The glass transition temperature Tg is determined as follows: 10 mg of a sample of the cellulose acylate film of the invention is heated from room temperature up to 200° C. at a heating rate of 5° C./min, and the quantity of heat of the sample is measured with a differential scanning calorimeter (DSC 2910 by T.A. Instrument), and the glass transition temperature Tg of the film is calculated from it.

[Haze of Film]

Preferably, the haze of the cellulose acylate film in the invention falls between 0.01 and 2.0%, more preferably between 0.05 and 1.5%, even more preferably between 0.1 and 1.0%. The film transparency is a matter of importance when the film serves as an optical film. The haze may be determined as follows: A sample of the cellulose acylate film of the invention having a size of 40 mm×80 mm is measured with a haze meter (HGM-2DP by Suga Test Instruments) at 25° C. and 60% RH, according to JIS K-6714.

[Humidity Dependence of Re and Rth of Film]

Preferably, the humidity-dependent change of the in-plane retardation Re and the thickness-direction retardation Rth of the cellulose acylate film in the invention is as small as possible. Concretely, the difference between Rth at 25° C. and 10% RH and Rth at 25° C. and 80% RH, ΔRth (=Rth10% RH−Rth80% RH) falls between 0 and 50 nm, more preferably between 0 and 40 nm, even more preferably between 0 and 35 nm.

[Equivalent Water Content of Film]

The equivalent water content of the cellulose acylate film in the invention is described. When the film is used as a protective film for polarizers, then the equivalent water content thereof at 25° C. and 80% RH is preferably from 0 to 4%, more preferably from 0.1 to 3.5%, even more preferably from 1 to 3% irrespective of the film thickness, in order not to detract from the adhesiveness of the film to water-soluble polymer such as polyvinyl alcohol. If the equivalent water content is higher than 4%, then it is undesirable since the humidity-dependent retardation of the film may be too great when the film is used as a support for optically-compensatory films.

The water content is determined as follows: A sample of the cellulose acylate film of the invention having a size of 7 mm×35 mm is analyzed with a water content analyzer combined with a sample drier (CA-03, VA-05, both by Mitsubishi Chemical), according to a Karl-Fisher method. The amount of water (g) in the sample thus measured is divided by the weight of the sample (g).

[Moisture Permeability of Film]

Preferably, the moisture permeability of the cellulose acylate film to be used for optically-compensatory sheets of the invention, as determined at a temperature of 60° C. and at a humidity of 95% RH according to JIS Z0288 and converted in terms of a standard film thickness of 80 μm, is from 400 to 2000 g/m²·24 h, more preferably from 500 to 1800 g/m²·24 h, even more preferably from 600 to 1600 g/m²·24 h. If it is over than 2000 g/m²·24 h, then the humidity-dependent absolute values Re and Rth of the film may be significantly higher than 0.5 nm/% RH. In addition, it is also unfavorable when an optically-anisotropic layer is laminated on the cellulose acylate film of the type of the invention to fabricate an optically-compensatory film, since the humidity-dependent absolute values Re and Rth of the sheet may also be significantly higher than 0.5 nm/% RH. When the optically-compensatory sheet or the polarizer of the type is built in liquid-crystal display devices, then it may cause discoloration and viewing angle reduction. On the other hand, if the moisture permeability of the cellulose acylate film is smaller than 400 g/m²·24 h, then the film may interfere with drying of adhesive when it is stuck to both faces of a polarizing film to fabricate a polarizer, or that is, the film may cause adhesion failure in the polarizer.

When the thickness of the cellulose acylate film is larger, then the moisture permeability thereof may be smaller; and when the thickness is smaller, then the moisture permeability may be larger. Accordingly, the moisture permeability of every sample having a different thickness must be determined, as converted in terms of a standard film thickness of 80 μm. Depending on the film thickness thereof, the moisture permeability of the film is determined as follows: Moisture permeability as converted in terms of standard film thickness of 80 μm=(measured moisture permeability)×(measured film thickness μm/80 μm). Regarding the method of measuring the moisture permeability, referred to are the methods described in Physical Properties of Polymer II (Polymer Experimental Lecture 4, Kyoritsu Publishing), pp. 285-297, "Determination of Vapor Permeation (mass method, temperature method, vapor pressure method, adsorption method)". Briefly, a sample of the cellulose acylate film having a size of 70 mmϕ is conditioned at 25° C. and 90% RH, and at 60° C. and 95% RH both for 24 hours. Using a permeability tester (KK-709007 by Toyo Seiki), the water content per unit area of the sample is measured (g/m²) according to JIS Z-0208, and the moisture permeability of the sample is calculated as follows: Moisture permeability=weight of conditioned sample−weight of unconditioned sample.

[Dimensional Change of Film]

The dimensional stability of the cellulose acylate film of the invention is preferably as follows: The dimensional change of the film after stored at 60° C. and 90% RH for 24 hours (high-humidity storage), and the dimensional change of the film after stored at 90° C. and 5% RH for 24 hours (high-temperature storage) are both at most 0.5%. More preferably, the dimensional change is at most 0.3%, even more preferably at most 0.15%.

A concrete method for the measurement is described. Two samples of the cellulose acylate film of the invention, having a size of 30 mm×120 mm, are prepared and conditioned at 25° C. and 65% % H for 24 hours. Using an automatic pin gauge (by Shinto Kagaku), holes of 6 mmϕ are formed on both sides of the samples each at intervals of 100 mm. The original hole-to-hole distance is L0. One sample is processed at 60° C. and 90% RH for 24 hours, and then the hole-to-hole distance is measured (L1); and the other sample is processed at 90° C. and 5% RH for 24 hours, and the hole-to-hole distance is measured (L2). The minimum gauge limit in every measurement is 1/1000 mm. The dimensional change is determined as follows: Dimensional change at 60° C. and 90% RH (high-humidity storage)={|L0−L1|/L0}×100. Dimensional change at 90° C. and 5% RH (high-temperature storage)={|L0−L2|/L0}×100.

[Elastic Modulus of Film]

(Elastic Modulus)

Preferably, the elastic modulus of the cellulose acylate film in the invention is from 200 to 500 kgf/mm², more preferably from 240 to 470 kgf/mm², even more preferably from 270 to 440 kgf/mm². A concrete method for measuring it is as follows: Using a universal tensile tester, Toyo Boldwin's STM T50BP, a sample of the film is pulled in an atmosphere of 23° C. and 70% RH at a pulling rate of 10%/min, and its stress to yield 0.5% elongation is measured. This is the elastic modulus of the sample.

[Photoelasticity Coefficient of Film]

(Photoelasticity Coefficient)

Preferably, the photoelasticity coefficient of the cellulose acylate film in the invention is at most $50\times10^{-13}$ cm²/dyne, more preferably at most $30\times10^{-13}$ cm²/dyne, even more preferably at most $20\times10^{-13}$ cm²/dyne. A concrete method for measuring it is as follows: A tensile stress is imparted to a sample of the cellulose acylate film of the invention having a size of 12 mm×120 mm, in the direction of the major axis thereof, whereupon the retardation of the sample is measured with an ellipsometer (Nippon Bunko's M150), and the photoelasticity coefficient of the sample is derived from the retardation change thereof relative to the stress applied to the sample.

[Methods for Evaluation of Cellulose Acylate Film in the Invention]

For evaluating the cellulose acylate film in the invention, it is analyzed and tested according to the methods mentioned below.

[Retardation of Transparent Support]

In this description, the retardation values Re and Rth of the cellulose acylate film (transparent support) are calculated on the basis of the following: Re(λ) and Rth(λ) indicate the in-plane retardation and the thickness-direction retardation, respectively, at a wavelength λ. Using KOBRA 21ADH (by Oji Keisoku Kiki), light having a wavelength of λ nm is given to a film sample in the normal line direction of the sample, and Re of the sample is thereby measured.

Also using KOBRA 21ADH, Rth(λ) is determined on the basis of the three retardation data, Re(λ) as above, the retardation value measured by applying light having a wavelength of λ nm to the sample in the direction tilted by +40° relative to the normal line direction of the film with the slow axis (judged by KOBRA 21ADH) as the tilt axis (rotation axis) thereof, and the retardation value measured by applying light having a wavelength of λ nm to the sample in the direction tilted by −40° relative to the normal line direction of the film with the slow axis as the tilt axis (rotation axis) thereof. Further, an estimated value of the mean refractive index of the sample, 1.48 and the film thickness thereof are inputted thereinto, and KOBRA 21ADH gives nx, ny, nz and Rth. The retardation at a wavelength that could not be directly measured may be obtained through fitting, using a Cauthy's formula and based on the retardation value at a wavelength near to the intended wavelength.

In the invention, the polymer film having a small optical anisotropy (Re, Rth) is preferably such that the in-plane retardation thereof at a wavelength of 630 nm, Re(630) is at most 10 nm ($0 \leq Re(630) \leq 10$), and the absolute value of the thickness-direction retardation thereof, Rth(630) is at most 25 nm ($|Rth(630)| \leq 25$ nm). (formula (i)) More preferably, $0 \leq Re(630) \leq 5$ and $|Rth(630)| \leq 20$ nm; even more preferably, $0 \leq Re(630) \leq 2$ and $|Rth(630)| \leq 15$ nm.

As a result of our assiduous studies, we, the present inventors have succeeded in reducing the fluctuation of Re and Rth of a polymer film at different wavelengths 400 nm and 700 nm, $|Re(400)-Re(700)|$ and $|Rth(400)-Rth(700)|$ by adding to the polymer film a compound having an absorption in a UV region of from 200 to 400 nm wavelength and therefore capable of preventing film coloration and having the ability to control the wavelength-dependent anisotropy ($Re(\lambda)$ and $Rth(\lambda)$) distribution of the film.

The polymer film having a reduced wavelength-dependent anisotropy distribution of the invention preferably satisfies $|Re(400)-Re(700)| \leq 10$ and $|Rth(400)-Rth(700)| \leq 35$ (formula (ii)), more preferably $|Re(400)-Re(700)| \leq 5$ and $|Rth(400)-Rth(700)| \leq 25$, even more preferably $|Re(400)-Re(700)| \leq 3$ and $|Rth(400)-Rth(700)| \leq 15$.

(In-Plane Retardation Fluctuation ($\Delta Re(\lambda)$, $\Delta Rth(\lambda)$) of Film)

Samples of the polymer film in the invention are prepared. Concretely, 15 samples are cut at intervals of 30 mm in the direction of the width of the film, and 50 samples are cut at intervals of 50 mm in the casting direction of the film, each having a size of 30 mm×40 mm. According to the methods mentioned above, $Re(\lambda)$ and $Rth(\lambda)$ of each sample are measured, and the absolute value of the difference between the maximum value and the minimum value thus measured is obtained. They are in-plane retardation fluctuation (in-plane anisotropy fluctuation, $\Delta Re(\lambda)$, $\Delta Rth(\lambda)$) of the film, indicating the fluctuation of in-plane the optical properties of the film.

As a result of our assiduous studies, we, the present inventors have found that the in-plane fluctuation of $Re(\lambda)$ and $Rth(\lambda)$ of the film is preferably as follows, with reference to the difference between the maximum value and the minimum value of the data of the film, $\Delta Re(\lambda)$ and $\Delta Rth(\lambda)$: $\Delta Re(\lambda) \leq 5$ nm (Formula (iii)) and $\Delta Rth(\lambda) \leq 10$ nm (Formula (iv)); more preferably, $\Delta Re(\lambda) \leq 3$ nm and $\Delta Rth(\lambda) \leq 6$ nm even more preferably, $\Delta Re(\lambda) \leq 2$ nm and $\Delta Rth(\lambda) \leq 4$ nm. When the fluctuation is controlled to fall within the range and when the film is used, for example, as a protective film for polarizers, then the light leakage fluctuation through the film in light-shielding with a cross Nicol polarizer could be lower than the level easily detectable with the unaided eye; and when it is used as a protective film for polarizers for liquid-crystal panels, then the light leakage fluctuation through the film in liquid-crystal panels is not easily detectable.

[Detection of Slow Axis]

The slow axis is detected and determined from the orientation angle determined in the above-mentioned retardation measurement.

[Direction of Slow Axis]

When the cellulose acylate film of the invention is used as a protective film for polarizing elements, then it is desirable that the slow axis of the cellulose acylate film is nearly in the MD direction or the TD direction (vertical direction against the machine conveying direction.) of the film since polarizing elements generally have an absorption axis in the machine conveying direction (MD direction). When the slow axis of the film is parallel to or vertical to polarizing elements, then light leakage through the film or discoloration of the film may be reduced. "Nearly" as referred to herein means that the angle between the slow axis of the film and the MD or TD direction thereof is from 0 to 10°, preferably from 0 to 5°.

(Molecule Orientation Axis)

A sample of 70 mm×100 mm is conditioned at 25° C. and 60% RH for 2 hours. Using an automatic birefringence meter (Oji Keisoku Kiki's KOBRA 21ADH), the molecule orientation axis is computed from the retardation measured by changing the incident angle in vertical light introduction.

(Axis Shifting)

Using an automatic birefringence meter (Oji Keisoku Kiki's KOBRA 21ADH), the axis shifting angle is measured. 20 points at regular intervals in the entire width of the sample in the width direction are measured, and the absolute values thus measured are averaged. The range of the slow axis angle (axis shifting) is as follows: 20 points at regular intervals in the entire width of the sample in the width direction are measured, and the difference between the mean value of the four points having given larger four absolute values of axis shifting, and the mean value of the four points having given smaller four absolute values of axis shifting is obtained.

(Transmittance)

Using a transparency meter (AKA phototube colorimeter by Kotaki Seisakusho) at 25° C. and 60% RH, the visible light (615 nm) transmittance of a sample of 20 mm×70 mm is measured.

(Spectral Characteristic)

Using a spectral photometer (U-3210 by Hitachi) at 25° C. and 60% RH, the transmittance of a sample of 13 mm×40 mm is measured within a wavelength range of from 300 to 450 nm. The inclination width is obtained as (wavelength for 72%)−(wavelength for 5%). The limiting wavelength is represented by (inclination width/2)+(wavelength for 5%). The absorption end is represented by a wavelength for transmittance 0.4%. The transmittance of the sample at 380 nm and 350 nm is obtained.

[Surface Property of Film]

(Surface Shape)

The surface property of the cellulose acylate film of the invention is described. Preferably, the arithmetic mean roughness (Ra) of the surface roughness of the film, according to JIS B0601-1994, is at most 0.1 µm, and the maximum height (Ry) thereof is at most 0.5 µm. More preferably, the arithmetic mean roughness (Ra) is at most 0.05 µm, and the maximum height (Ry) is at most 0.2 µm. The profile of the recesses and the projections of the film surface may be analyzed with an atomic force microscope (AFM).

(Surface Energy)

The surface energy of the cellulose acylate film of the invention is measured as follows: A sample of the film is put on a horizontal bed horizontally thereto, and a predetermined amount of water and methylene iodide are applied onto the surface of the sample. After a predetermined period of time, the contact angle of the film surface with water and with methylene iodide is measured. From the data of the thus-measured contact angle, the surface energy of the sample is derived according to an Owens method.

(Surface Energy Fluctuation)

The in-plane surface energy fluctuation of the polymer film of the invention, $\Delta E$ is obtained as follows: 15 samples are cut at intervals of 30 mm in the direction of the width of the film, and 50 samples are cut at intervals of 50 mm in the casting direction of the film, each having a size of 30 mm×40 mm. According to the methods mentioned above, the contact angle of each sample with water and with methylene iodide is measured, from which the surface energy of each sample is computed. Further, the absolute value of the difference between the maximum value and the minimum value of the data measured, ΔE is obtained, indicating the in-plane surface energy fluctuation of the film. When the in-plane surface energy fluctuation of the film is too large, then it causes a difference in wetting with saponification agent-washing solution or neutralizing solution in alkali-dipping saponification and in drying after the treatment that will be mentioned hereinunder, therefore producing patches of stains, or causes unevenness in the properties of the film, especially in the workability thereof into polarizers. As a result, for example, the durability of polarizers with the film may be uneven and the quality of polarizers may lower. The surface energy fluctuation is preferably ΔE≤10, more preferably ΔE≤5, even more preferably ΔE≤3.

[Additive Retentiveness in Film]

The cellulose acylate film of the invention is required to well retain various compounds added thereto. Concretely, when the cellulose acylate film is stored at 80° C. and 90% RH for 48 hours, the mass change of the film is preferably from 0 to 5%, more preferably from 0 to 3%, even more preferably from 0 to 2%.

<Method of Evaluation of Additive Retentiveness in Film>

A sample is cut into a size of 10 cm×10 cm, and stored at 23° C. and 55% RH for 24 hours, and its mass is measured. Then, this is stored at 80±5° C. and 90±10% RH for 48 hours. After processed, the surface of the sample is gently wiped, and then further stored at 23° C. and 55% RH for 1 day, and the mass of the sample is again measured. The additive retentiveness in the sample is calculated as follows:

Additive Retentiveness(mass %)={(mass before storage−mass after storage)/(mass before storage)}×100.

[Mechanical Characteristics of Film]
(Curl)

The curl value in the width direction of the cellulose acylate film of the invention is preferably from −10/m to +10/m. The cellulose acylate film is subjected to surface treatment as will be mentioned hereinunder, or rubbed before coated with an optically-anisotropic layer, or coated or laminated with an orientation layer or an optically-anisotropic layer. For these treatments, the film is processed while it is a long film. If the curl value of the long, cellulose acylate film in the width direction thereof falls outside the scope as above, then the film may be difficult to handle and it may be cut or broken. If so, in addition, the edges and the center part of the film may be strongly contacted with conveyor rolls to give dust, and, as a result, much impurity may deposit on the film. In that condition, the frequency of spot defects and coating streaks may be over the acceptable level. In addition, when the curl value is controlled to fall within the defined range, then it is favorable since a trouble of color mottles that may often occur when coated with an optically-anisotropic layer may be reduced, and, in addition, the film may be prevented from catching bubbles when laminated with a polarizing film.

The curl value may be determined according to the method defined by the American National Standard Institute (ANSI/ASCPH1.29-1985).

(Tear Strength)

Preferably, the cellulose acylate film of the invention having a thickness of from 20 to 80 μm has a tear strength of at least 2 g, measured according to the tear test method of JISK7128-2:1998 (Elmendorf tear test method), more preferably from 5 to 25 g, even more preferably from 6 to 25 g.

Also preferably, the tear strength of the film having a thickness of 60 μm is at least 8 g, more preferably from 8 to 15 g. Concretely, a sample piece having a size of 50 mm×64 mm is conditioned at 25° C. and 65% RH, and then tested with a light load tear strength tester to measure its tear strength.

[Solvent Remaining in Film]

It is desirable that the cellulose acylate film of the invention is dried under the condition under which the solvent amount remaining in the film could be from 0.01 to 1.5% by mass, more preferably from 0.01 to 1.0% by mass. The solvent amount to remain in the transparent support for use in the invention is controlled to at most 1.5%, whereby the film curling may be reduced. More preferably, it is at most 1.0%. The essential reason for it may be because, since the solvent amount to remain in the film formed according to the above-mentioned solvent casting method is reduced, the free volume of the film could be reduced.

[Moisture-Absorbing Expansion Coefficient of Film]

Preferably, the moisture-absorbing expansion coefficient of the cellulose acylate film of the invention is at most $30 \times 10^{-5}$/% RH, more preferably at most $15 \times 10^{-5}$/% RH, even more preferably at most $10 \times 10^{-5}$/% RH. The moisture-absorbing expansion coefficient of the film is preferably smaller, but in general, it may be at least $1.0 \times 10^{-5}$/% RH. The moisture-absorbing expansion coefficient means the change of the length of a sample when the relative humidity around the sample is changed at a constant temperature. When the moisture-absorbing expansion coefficient is controlled as above and when the cellulose acylate film of the invention is used as a support for optically-compensatory films, then frame-like transmittance increase, or that is, strain-caused light leakage can be prevented while the optically-compensatory function of the optically-compensatory films is kept as such.

[Functional Layer]

The applications of the cellulose acylate film of the invention include optical applications and photographic materials. The optical applications of the film are especially preferably for liquid-crystal display devices, more preferably those that comprise a liquid-crystal cell carrying liquid crystal between two electrode substrates, two polarizing elements disposed on both sides thereof, and at least one optically-compensatory sheet disposed between the liquid-crystal cell and the polarizing element. For the liquid-crystal display devices, preferred are TN, IPS, FLC, AFLC, OCB, STN, ECB, VA and HAN.

When the cellulose acylate film of the invention is used for these optical applications, various functional layers may be added to it. The layers are, for example, antistatic layer, cured resin layer (transparent hard coat layer), antireflection layer, easily-adhesive layer, antiglare layer, optically-compensatory layer, orientation layer, liquid-crystal layer. These functional layers and their materials that may be used for the cellulose acylate film of the invention include surfactant, lubricant, mat agent, antistatic layer and hard coat layer, and they are described in detail in Hatsumei Kyokai's Disclosure Bulletin 2001-1745 (issued Mar. 15, 2001, by Hatsumei Kyokai), pp. 32-45, and are preferably used also in the invention.

[Use (Polarizer)]

Use of the cellulose acylate film of the invention is described.

The optical film of the invention is useful for a protective film for polarizers. A polarizer comprises a polarizing element and a protective film that protects both surfaces of the element; and a protective film is attached to one surface of the polarizer and a separate film is to the other surface thereof. The protective film and the separate film are for the purpose of protecting the polarizers while the polarizers are shipped or transported or while they are inspected. In this case, the protective film is for the purpose of protecting the surface of the polarizers, and this is on the other side opposite to the side thereof to be attached to a liquid-crystal plate. The separate film is for the purpose of protecting the adhesive layer attached to the polarizers, and this is on the side of the polarizers to be attached to a liquid-crystal plate.

A liquid-crystal display device generally comprises a liquid crystal-containing substrate sandwiched between two polarizers. The polarizer-protective film formed of the optical film of the invention may be disposed in any site of the device to exhibit excellent display visibility. In particular, on the polarizer-protective film on the outermost surface on the display side of a liquid-crystal display device, provided are a transparent hard coat layer, an antiglare layer and an antireflection layer. Therefore, it is desirable that the polarizer-protective film is disposed in the area on this site.

In producing the polarizer of the invention in which the cellulose acylate film is used as the protective film for a polarizing film (that is, as the protective film for the polarizer), the adhesiveness of the surface of the film on the side thereof to be stuck to the polarizing film that comprises polyvinyl alcohol as the main ingredient thereof must bettered. If the adhesiveness is insufficient, then the workability of the polarizer to be fitted to the panel of liquid-crystal display devices and others may be poor or the durability thereof may also be poor, and, as a result, the polarizer of the type will be problematic in use thereof for a long period of time. For bettering the adhesiveness, an adhesive agent may be used. Regarding its ingredient, the adhesive may be any of polyvinyl alcohol adhesives with polyvinyl alcohol or polyvinyl butyral; or vinylic latexes of butyl acrylate, etc. The adhesiveness may be taken into consideration based on the surface energy of the film. So far as the surface energy of the adhesive layer in which the adhesive is polyvinyl alcohol that is the same as the main ingredient of polarizing film, or comprises, as the main ingredient thereof, polyvinyl alcohol or vinylic latex is nearer the surface energy of the protective film, then the adhesiveness of the protective film as well as the workability and the durability of the protective film-stuck polarizer may be better. From these, the surface energy of the side to be stuck to a polarizing film or adhesive layer is preferably controlled to fall within a desired range, for example, by hydrophilicating the surface of the film or layer, whereby the adhesiveness of the protective film to the polarizing film that comprises polyvinyl alcohol as the main ingredient thereof may be fully increased.

The cellulose acylate of the film contains an additive having the ability to control the in-plane retardation and the thickness-direction retardation of the film and to control the wavelength-dependent retardation distribution of the film. Therefore, the surface of the film is relatively hydrophobic. Accordingly, the above-mentioned hydrophilication treatment for improving the adhesiveness of the film is necessary for further improving the workability and the durability of the polarizers with the film.

The surface energy of the film before the surface treatment such as hydrophilication thereof is preferably from 30 mN/m to 50 mN/n, more preferably from 40 mN/m to 48 mN/m. This is because, since the film contains the retardation-controlling additive as above added thereto, the film surface is hydrophobic, and therefore the treatment of the film of the type for improving the humidity-dependent optical characteristics and mechanical characteristics thereof as well as the adhesiveness thereof to fabricate polarizers is easier. If the surface energy before the treatment is lower than 30 mN/m, then large energy may be needed for bettering the adhesiveness of the film through the hydrophilication, and, as a result, it may worsen the film characteristics and may be inconsistent with the producibility of the film. On the other hand, if the surface energy before the treatment is larger than 50 mN/m, then the film itself may be too hydrophilic and therefore the humidity-dependency of the optical properties and the mechanical characteristics of the film may be too great, and such is problematic.

Depending on the additive used, on the degree of drying and on the adhesive used, the surface energy of polyvinyl alcohol is generally from 60 mN/m to 80 mN/m. Therefore, the surface energy of the protective film after the treatment such as hydrophilication mentioned below, to a polarizer is preferably from 50 mN/m to 80 mN/m, more preferably from 60 mN/m to 75 mN/m, even more preferably from 65 mN/m to 75 mN/m.

[Surface Treatment Such as Hydrophilication]

The hydrophilication of the transparent support may be attained in any known method. For example, the film surface may be modified through corona discharge treatment, glow discharge treatment, UV irradiation, flame treatment, ozone treatment, acid treatment or alkali treatment. The glow discharge treatment as referred to herein may be with a low-temperature plasma that may be generated in a low-pressure gas at from $10^{-3}$ to 20 Torr, or may be preferably plasma treatment under atmospheric pressure. Gas capable of being excited by plasma means one that may be excited by plasma under the condition as above, including, for example, argon, helium, neon, krypton, xenon, nitrogen, carbon dioxide, flons such as tetrafluoromethane, and their mixtures. These are described in detail in Hatsumei Kyokai's Disclosure Bulletin No. 2001-1745 (issued Mar. 15, 2001, by Hatsumei Kyokai), pp. 30-32, and they are preferably used in the invention.

[Re and Rth Change Before and after Film Surface Treatment]

Preferably, the polymer film of the invention satisfies the following formulae (v) and (vi) in point of the Re and Rth change thereof before and after surface treatment.

$$|Re-Re'|\leq 10, \qquad (v)$$

$$|Rth-Rth'|\leq 20. \qquad (vi)$$

More preferably, |Re−Re'|≤8 nm and |Rth−Rth'|≤15 nm; even more preferably |Re−Re'|≤5 nm and |Rth−Rth'|≤10 nm.

In these, Re indicates the in-plane film retardation (nm) before surface treatment; Re' indicates the in-plane film retardation (nm) after surface treatment; Rth indicates the thickness-direction retardation (nm) before surface treatment; and Rth' indicates the thickness-direction retardation (nm) after surface treatment.

Within the range as above, the optical properties of the protective film are good, and when the film is used in polarizers, optically-compensatory films and liquid-crystal display devices, it does not cause light leakage through it.

[Alkali Saponification]

Of the treatments mentioned above, alkali saponification is especially favorable for the surface treatment of the cellulose acylate film of the invention. The treatment includes the following methods.

(1) Dipping Method:

The film (e.g., antireflection film) is dipped in an alkali solution under a suitable condition, whereby the entire surface thereof reactive with alkali is completely saponified. This does not require any specific equipment, and is therefore favorable in view of its cost. The alkali solution is preferably an aqueous sodium hydroxide solution. Preferably, the concentration of the solution is from 0.5 to 3 mol/liter, more preferably from 1 to 2 mol/liter. Also preferably, the temperature range of the alkali solution is from 25 to 70° C., more preferably from 30 to 60° C.

After dipped in an alkali solution, the film is well washed with water so that the alkali component may not remain in the film, or it is dipped in a dilute acid so as to neutralize the alkali component.

Through the saponification, the main surface opposite to the main surface having an antireflection layer of the transparent support is hydrophilicated. The protective film for polarizers is used in such a manner that the hydrophilicated surface of the transparent support is adhered to a polarizing film.

The hydrophilicated surface of the film is effective for improving the adhesiveness thereof to a polarizing film that comprises polyvinyl alcohol as the main ingredient thereof.

For the saponification, it is more desirable that the contact angle with water of the film of the transparent support opposite to the side having a high-refractivity layer is smaller, in view of the adhesiveness of the film to a polarizing film. On the other hand, however, in the dipping method, the main surface having a high-refractivity layer of the film is also damaged with alkali, and therefore it is important that the reaction condition is controlled to a necessary minimum limit. When the contact angle with water of the support on the main surface of the opposite side thereof is used as the index of the damage of the antireflection layer by alkali, then it is preferably from 20 degrees to 50 degrees, more preferably from 30 degrees to 50 degrees, even more preferably from 40 degrees to 50 degrees in case where the support is cellulose triacetate. Within the range, the damage of the antireflection film is substantially out of problem and the adhesiveness thereof to a polarizing film is kept as such.

[Re and Rth Change Before and after Film Surface Saponification]

The polymer film of the invention preferably satisfies the above formulae (v) and (vi) in point of the Re and Rth change thereof before and after the alkali saponification of the film surface.

The alkali saponification is concretely as follows: A film sample having a size of 10 cm×10 cm is dipped in an aqueous sodium hydroxide solution of 1.5 mol/liter at 55° C., then it is neutralized in a sulfuric acid solution of 0.05 mol/liter at 30° C., and it is washed in a water bath at room temperature and then dried at 100° C. The process is for the alkali saponification.

[Dissolution of Compound in Alkali Saponification Solution]

Preferably, the polymer film of the invention contains a compound having a molecular weight of at most 3000, more preferably at most 2000, even more preferably at most 1000 as the compound capable of lowering the optical anisotropy, and, when the surface of the transparent film is saponified with an alkali, the dissolution of the compound in the alkali solution is at most 20% by mass, more preferably at most 15% by mass, even more preferably at most 10% by mass.

Within the range as above, the alkali saponification is favorable since the alkali solution used does not worsen the processed film (the properties of the processed film).

A concrete method of determining the dissolution is described. A film sample having a size of 100 cm×100 cm is dipped in a container with 5 liters of an aqueous sodium hydroxide solution of 1.5 mol/liter therein, at 55° C. for 30 minutes, and then the low-molecular compound having dissolved in the alkali solution is analyzed through liquid chromatography. The dissolution of the compound is obtained according to the following numerical formula:

(Dissolution in alkali solution)(mass %)=(content of low-molecular compound in alkali solution)/(content of low-molecular compound in film before saponification).

[Absorption Spectrum of Saponification Solution]

It is desirable that the alkali solution used for alkali saponification of the film of the transparent film of the invention is deteriorated as small as possible. The absorbance at 450 nm of the alkali solution used for alkali saponification of the surface of the transparent film of the invention is preferably at most 0.1, more preferably at most 0.08, even more preferably at most 0.05. If the alkali saponification solution is deteriorated, it may become yellowish. The degree of yellowing of the solution is determined in terms of the absorption spectrum thereof at 450 nm.

Within the range as above, the alkali solution is favorable since its properties are good and it well functions as it is.

A concrete method of determining the absorbance is described. The same film sample as that used for determination of the dissolution thereof is saponified, and 10 ml of the alkali solution used is collected. This is analyzed for its absorbance at 450 nm, using a spectrophotometer Shimadzu's UV3100.

[Time Necessary for Saponification Treatment]

For the polymer film of the invention, it is preferred that the time necessary for the alkali saponification treatment to make the surface energy preferable is shorter. By shorten the time necessary for the alkali saponification treatment, it can be possible to enhance the productivity. Concretely, preferably the time necessary to make the surface energy 50 mN/m or more is within 1 minute, more preferably within 45 seconds, even more preferable within 30 seconds, by the alkali saponification treatment using 1.5 N of NaOH at temperature condition 55° C.

In addition, as another preferred range, more preferably the time necessary to make the surface energy 60 mN/m or more is within the above-described range, even more preferably the time necessary to make the surface energy 65 mN/m or more is within the above-described range, by the alkali saponification treatment using 1.5 N of NaOH at temperature condition 55° C.

(2) Coating Method with Alkali Solution:

For preventing the antireflection film from being damaged in the above-mentioned dipping method, preferably used is a method of coating the film with an alkali solution by applying an alkali solution to the main surface alone of the polymer film opposite to the main surface thereof having an antireflection film thereon, then heating it, washing it with water and drying it. The details of the alkali solution and the treatment with it are described in JP-A 2002-82226 and pamphlet of International Laid-Open No. 02/46809. However, the method requires additional equipment and step for coating the film with alkali solution, and is therefore inferior to the above-mentioned dipping method (1) in point of its cost.

[Plasma Treatment]

The plasma treatment employable herein includes vacuum glow discharge treatment and atmospheric pressure glow discharge treatment, as well as flame plasma treatment. These are described, for example, in JP-A 6-123062, 11-293011 and 11-5857, which are applicable to the invention.

The plasma treatment is for treating the surface of a plastic film in plasma, whereby the treated surface is highly hydrophilicated. For example, in a glow-discharge plasma generation device, the film to be hydrophilicated is put between a pair of facing electrodes, and a plasma-excitable vapor is introduced into the device, and a high-frequency voltage is applied to the electrodes, whereby the vapor is excited by the generated plasma and glow discharge is effected between the electrodes for attaining the intended surface treatment. In particular, atmospheric glow discharge treatment is preferred.

The plasma-excitable vapor is a vapor capable of being excited by plasma under the condition as above, including, for example, argon, helium, neon, krypton, xenon, nitrogen, carbon dioxide, flons such as tetrafluoromethane, and their mixtures.

An inert gas such as argon or neon may be combined with a reactive gas capable of imparting a polar functional group such as a carboxyl group, a hydroxyl group or a carbonyl group to the surface of a plastic film, and the resulting mixed gas may be used as an excitable gas. The reactive gas includes, for example, hydrogen, oxygen, nitrogen, as well as water vapor, ammonia gas. In addition, low-boiling-point organic compounds such as lower hydrocarbons and ketones may also be used, if desired. However, in view of their handlability, preferred are hydrogen, oxygen, carbon dioxide, nitrogen and water vapor. When water vapor is used, it may be prepared by bubbling water with any other gas. If desired, the gas thus prepared by such bubbling may be mixed with water vapor.

The frequency of the high-frequency voltage to be applied to the gas is preferably from 1 kHz to 100 kHz, more preferably from 1 kHz to 10 kHz.

The glow-discharge plasma treatment may be effected in vacuum or under atmospheric pressure.

In vacuum glow-discharge plasma treatment, the reactive gas as above must be introduced into the device so as to keep the discharge atmosphere falling within a range of from 0.005 5o 20 Torr for effective discharge. To increase the treatment speed, it is desirable that a high output condition is employed under a pressure as high as possible, but if the electric field is too much increased, then the substrate may be thereby damaged.

In atmospheric glow discharge treatment where plasma discharge is attained under around atmospheric pressure, an inert gas such as helium or argon etc. is needed for stable discharge. If at least 60% of the plasma-excitable gas is not an inert gas, then stable discharge could not occur. However, if the inert gas is too much and if the proportion of the reactive gas is too small, then the treatment speed may lower. If the electric field is too much increased, it may damage the substrate.

In atmospheric plasma treatment where plasma is generated through pulse electrolysis, the inert gas as above is not always necessary, and the reactive gas concentration may be increased and the reaction speed may be therefore increased.

Another flame plasma treatment comprises surface treatment with plasma by applying flame treatment with burner to the surface of a film to be surface-treated. For example, a mixed gas comprising a flammable gas such as paraffin gas (e.g., town gas, natural gas, methane gas, propane gas, butane gas) and an oxidizing gas (e.g., air or oxygen optionally along with flaming aid and oxidizing agent) is fired, and the surface of a film is treated with the resulting flame.

In general, the flame from a burner comprises an outer flame and an inner flame, and the outer flame is a pale blue part generally referred to as a blue gas flame, and this is generated by heating the unreacted (unfired) gas of the inner flame part. The temperature of the outer flame is high, and the flame part not in blue is the other inner flame in which oxygen application is relatively small and which is relatively at lower temperature.

The flame within 30 mm from the top of the inner flame generates much plasma, and, as so described in detail in JP-A 11-184042, the flame is restricted by a baffle plate disposed around it and the substrate surface is treated with the flame thus restricted within 30 mm from the top of the inner flame. In that manner, plasma treatment with the thus-restricted flame is possible.

The time for which the flame is applied to the substrate may be from 0.001 to 2 seconds in terms of the time for which the substrate is kept in contact with the flame. Preferably, the time is from 0.01 to 1 second. If it is too long, the surface may be too much damaged; but if too short, the oxidation reaction could hardly occur and the adhesiveness of the treated surface could not increase.

The burner to be used for this purpose may be any one from which the flame could be uniformly applied to the surface of the substrate to be subjected to plasma treatment. Plural burners disposed for the substrate may also be used.

The blend ratio of the flammable gas and the oxidizing gas for the flame treatment may differ, depending on the type of the gases. For example, when propane gas and air are mixed, then the preferred blend ratio of propane gas/air may be from 1/15 to 1/22, more preferably from 1/16 to 1/19 by volume. When natural gas and air are mixed, then the preferred blend ratio may be from 1/6 to 1/10, more preferably from 1/7 to 1/9. The size ratio of the inner flame to the outer flame may differ, depending on the type of the flammable gas, the type of the oxidizing gas, the blend ratio of the two, and the gas-feeding speed.

Examples of the plasma treatment device are illustrated. FIG. 1 shows an example of an atmospheric plasma treatment device; and FIG. 2 shows a continuous vacuum plasma treatment device.

FIG. 1 is a cross-sectional view showing an example of an atmospheric plasma treatment device. Concretely, in the atmospheric plasma generation device in FIG. 1, a sample 2 to be subjected to plasma treatment is disposed between two facing electrodes (both upper and lower electrodes are indicated by 1). It is desirable that a dielectric member 3 such as glass, ceramic or polyimide film is disposed on the surface of the upper and/or lower electrodes for the purpose of preventing spark discharge during plasma excitation. A plasma-excitable vapor such as a mixed vapor of argon and helium is introduced into the atmospheric plasma generation device via the inlet mouth 4. After the inside air is purged with the thus-introduced vapor, the vapor is discharged out of the device via the outlet mouth 5. Next, a high-frequency voltage of, for example, 3000 Hz and 4200 V is applied between the electrodes, and the introduced gas is thereby excited by the generated plasma and the intended glow discharge is effected for a predetermined period of time to thereby modify the surface of the substrate in the device.

Figure 2:
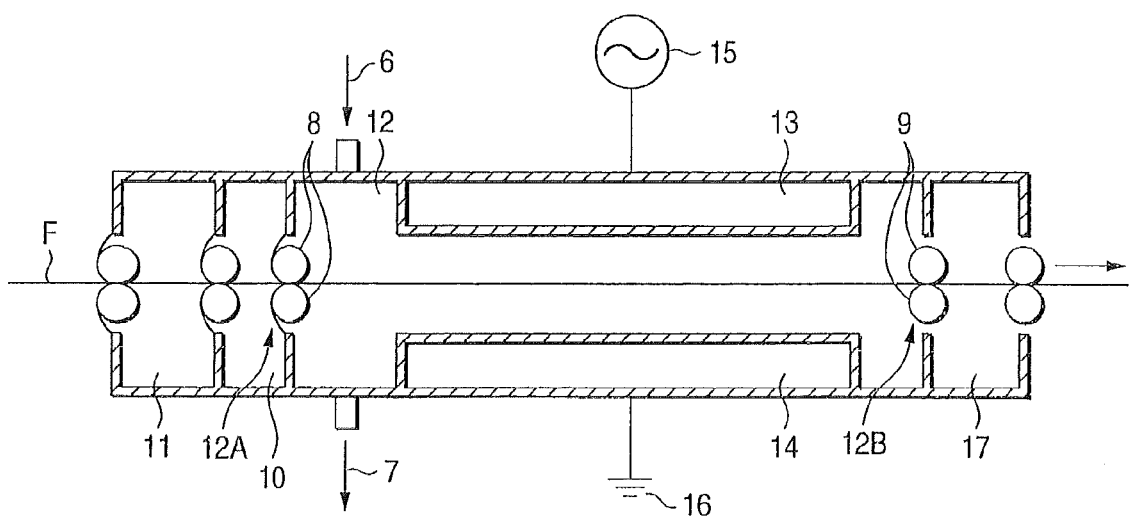
FIG. 2 is a cross-sectional view showing one example of a continuous vacuum plasma treatment device applicable to the plasma treatment in the invention.

FIG. 2 is a cross-sectional view showing one example of a continuous vacuum plasma treatment device. This comprises a processing chamber 12 formed by partitioning the device cavity with an inlet slit 12A and an outlet slit 12B for a sample film F, in which a long film continuously introduced thereinto is subjected to continuous plasma treatment in vacuum.

The processing chamber 12 is provided with a pair of facing plate electrodes 13 and 14. One electrode 13 of the pair of electrodes 13 and 14 is connected with a high-frequency power source 15, and the other electrode is grounded via an earth 16. In that manner, an electric field may be applied between the pair of electrodes 13 and 14.

A processing gas is introduced into the device through a gas inlet mouth 6, and the processing chamber is degassed to vacuum via the gas outlet mouth 7 by the action of a degassing pump.

In the example of FIG. 2, a pre-degassing chambers 10 and 11 are disposed on the side of the film intake slit. A pre-degassing chamber 17 is also disposed on the side of the film takeout slit, adjacent to the processing chamber 12. The partitioning of the chamber is attained by nip rolls 8 and 9, which, however, are not limitative. In this, 15 indicates a high-frequency power source.

The pre-degassing chambers may be disposed as illustrated, for example, two are on the side of the film F intake mouth and one is on the side of the film F takeout mouth. However, this arrangement is not limitative. Apart from it, one pre-degassing chamber may be disposed on both the film F intake and takeout mouths; or two such chambers may be disposed on both the two mouths.

For the flame plasma treatment to be employed herein, preferred is the device described in JP-A 9-355097.

Figure 3:
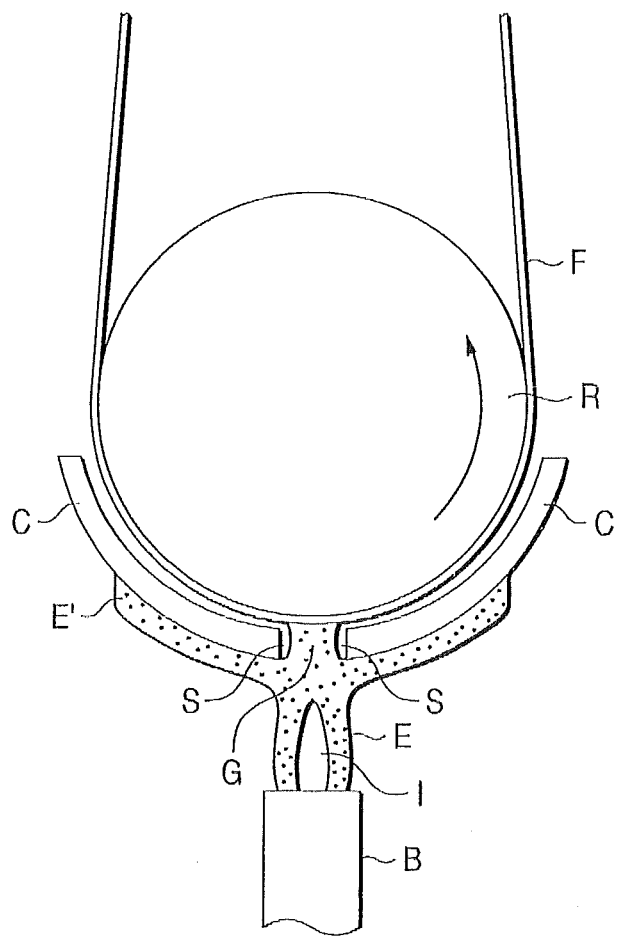
FIG. 3 is a cross-sectional view showing an example of a plasma treatment device with flame applicable to the plasma treatment in the invention, Wherein 1 denotes an electrode, 2 denotes a sample, 4 denotes an inlet mouth, 5 denotes an outlet mouth, F denotes a sample film, 12 denotes a processing chamber, 13 and 14 denote electrodes, 15 denotes a high-frequency power source, 6 denotes an inlet mouth, 7 denotes an outlet mouth, B denotes a burner, C denotes a baffle plate (outer flame control device), E and E' denote outer flames, G denotes an effective flame, I denotes an inner flame and S denotes an effective processing pore (slit).

FIG. 3 shows an example of a plasma treatment device with flame. In general, the flame from a burner comprises an outer flame and an inner flame, and the outer flame is a pale blue part generally referred to as a blue gas flame, and this is generated by heating the unreacted (unfired) gas of the inner flame part. The temperature of the outer flame is high, and the flame part not in blue is the other inner flame in which oxygen application is relatively small and which is relatively at lower temperature.

The outer flame part contains much flame unnecessary for plasma treatment, and if the outer flame part expands, the treatment will be uncontrollable. Therefore, as in FIG. 3, a baffle plate (outer flame control device) C is disposed by which the unnecessary outer flame E' is kept outside the baffle plate (outer flame control device) C so as not to be in contact with the support to be processed. In that condition, the effective flame (controlled flame) G alone is applied to the surface of the sample film F to be processed with controlling the flame treatment, and the object is thereby attained. FIG. 3 shows the burner B, the outer flame E, the inner flame I, the outer flame E' shielded outside the baffle plate and having expanded outside it, the effective flame G, and the effective treatment slit S, further showing the mode of applying the effective flame G to the surface of the sample film F via the effective treatment slit S.

[Corona Discharge Treatment]

For the surface treatment, corona discharge treatment is the most popular method, and it may be attained by any known method, for example, as in JP-B 48-5043 and 47-51905, JP-A 47-28067, 49-83767, 51-41770 and 51-131576. The corona generator for use in the corona treatment may be any commercially-available corona processor generally employed in the current art for surface modification of plastic films. In particular, a corona processor equipped with multi-knife electrodes by Softal comprises a large number of electrodes and is so designed that air is fed between the electrodes. This is effective for overheating of films and for removal of low-molecular substances that may deposit on films, and therefore its energy efficiency is extremely high and it enables high-efficiency corona treatment. Accordingly, the corona processor of the type is especially useful in the invention.

The corona treatment condition may differ, depending on the type of the protective film used, the type of the adhesive agent used and the type of the corona processor employed. In general, the energy density in one treatment process is preferably from 20 to 400 W·min/m$^2$ or so. Low-energy treatment as much as possible is preferred to high-energy treatment, since the protective film may be prevented from being deteriorated and the additives to the protective film may be prevented from being bled out on the surface of the film, and the treatment is therefore effective for improving the adhesiveness of the film. If one treatment is insufficient, the treatment may be repeated two or more times whereby the adhesiveness of the treated film may increase further.

When the polymer film of the invention is used as a protective film for polarizers, then the surface energy of at least one surface of the polymer film must be controlled to fall with a suitable range. For this, the above-mentioned surface treatment of the film is effected. On the other hand, when the polymer film of the invention is subjected to such surface treatment, then there may be a possibility of vaporization/dissolution/decomposition of the additives in the polymer film, whereby the optical properties and the film properties of the polymer film as well as the durability thereof may worsen or lower. If the additives vaporize or dissolve, then they may contaminate the processing system and may therefore lower the processability of the system, and, after all, continuous treatment would be impossible. Accordingly, the reduction in the amount of the additives in the film must be inhibited. Concretely, it is desirable that the change of the additive amount through the surface treatment is at most 0.2% of the overall amount of the additives, more preferably at most 0.1%, even more preferably at most 0.01%.

[Use (Optically-Compensatory Film)]

The polymer film of the invention has many applications. When it is used for an optically-compensatory film in liquid-crystal display devices, it is especially effective. An optically-compensatory film is generally used in liquid-crystal display devices, and this is an optical member for compensating retardation. The optically-compensatory film has the same meaning as that of a phase retarder and an optically-compensatory sheet. The optically-compensatory film has a property of birefringence, and it is used for the purpose of removing coloration of display panels of liquid-crystal display devices and for improving the viewing angle characteristics of the devices. The polymer film of the invention has a small optical anisotropy in such that its Re and Rth satisfy $0 \le e \le 10$ nm and $|Rth| \le 25$ nm; and it has a reduced wavelength-dependent anisotropy distribution in such that $|Re(400)-Re(700)| \le 10$ and $|Rth(400)-Rth(700)| \le 35$. Accordingly, the film does not have any superfluous anisotropy. When the film is combined with an optically-anisotropic layer having a birefringence, then it may exhibit the optical properties of the optically-anisotropic layer.

Accordingly, when the polymer film of the invention is used as an optically-compensatory film in liquid-crystal display devices, Re and Rth of the optically-anisotropic layer combined with it are preferably as follows: Re=0 to 200 nm; and $|Rth|=0$ to 400 nm (Formula (iX)). Within the ranges, any and every optically-anisotropic layer may be combined with the film of the invention. Specifically, the film of the invention may be combined with an optically-anisotropic layer of any type required in optically-compensatory films, not limited by the optical properties and the driving system of the liquid-crystal cell in the liquid-crystal display device in which the film is to be used. The optically-anisotropic layer to be combined with the film may be formed of a composition containing a liquid-crystal compound, or may be formed of a polymer film having a property of birefringence.

The liquid-crystal compound is preferably a discotic liquid-crystal compound or a rod-shaped liquid-crystal compound.

(Discotic Liquid-Crystal Compound)

Examples of the discotic liquid-crystal compound usable in the invention are described in various references (C. Destrade et al., *Mol. Cryst. Liq. Cryst.*, Vol. 71, p. 111 (1981); *Quarterly Journal of Outline of Chemistry*, by the Chemical Society of Japan, No. 22, Chemistry of Liquid Crystal, Chap. 10, Sec. 2 (1994); B. Kohne et al., *Angew. Chem. Soc. Chem. Comm.*, p. 1794 (1985); J. Zhang et al., *J. Am. Chem. Soc.*, Vol. 116, p. 2655 (1994)).

Preferably, the discotic liquid-crystal molecules are fixed as aligned in the optically-anisotropic layer in the invention, most preferably fixed therein through polymerization. The polymerization of discotic liquid-crystal molecules is described in JP-A 8-27284. For fixing discotic liquid-crystal molecules through polymerization, a polymerizable group must be bonded to the disc core of each discotic liquid-crystal molecule as a substituent thereto. However, if such a polymerizable group is directly bonded to the disc core, then the molecules could hardly keep their orientation during polymerization. Accordingly, a linking group is introduced between the disc core and the polymerizable group to be bonded thereto. Such polymerizable group-having discotic liquid-crystal molecules are disclosed in JP-A 2001-4387.

(Rod-Shaped Liquid-Crystal Compound)

Examples of the rod-shaped liquid-crystal compound usable in the invention are azomethines, azoxy compounds, cyanobiphenyls, cyanophenyl esters, benzoates, phenyl cyclohexanecarboxylates, cyanophenylcyclohexanes, cyano-substituted phenylpyrimidines, alkoxy-substituted phenylpyrimidines, phenyldioxanes, tolans, and alkenylcyclohexylbenzonitriles. Not only such low-molecular liquid-crystal compounds, but also high-molecular liquid-crystal compounds may also be usable herein.

In the optically-anisotropic layer, it is desirable that the rod-shaped liquid-crystal molecules are fixed in an aligned state, most preferably they are fixed through polymerization. Examples of the polymerizable rod-shaped liquid-crystal compound usable in the invention are described in *Macromol. Chem.*, Vol. 190, p. 2255 (1989); *Advanced Materials*, Vol. 5, p. 107 (1993); U.S. Pat. Nos. 4,683,327, 5,622,648, 5,770,107; pamphlets of International Laid-Open Nos. 95/22586, 95/24455, 97/00600, 98/23580, 98/52905; JP-A 1-272551, 6-16616, 7-110469, 11-80081, 2001-328973.

(Optically-Anisotropic Layer of Polymer Film)

As described in the above, the optically-anisotropic layer may be formed of a polymer film. The polymer film is formed from a polymer capable of expressing optical anisotropy. Examples of the polymer are polyolefin (e.g., polyethylene, polypropylene, norbornene-based polymer), polycarbonate, polyarylate, polysulfone, polyvinyl alcohol, polymethacrylate, polyacrylate and cellulose ester (e.g., cellulose triacetate, cellulose diacetate). Copolymers or mixtures of these polymers may also be usable herein.

The optical anisotropy of the polymer film is preferably generated by stretching. The stretching is preferably monoaxial stretching or biaxial stretching. Concretely, preferred is machine-direction monoaxial stretching to be attained by utilizing the peripheral speed difference between two or more rolls; or tenter stretching to be attained by clipping both sides of a polymer film and stretching it in the width direction; or biaxial stretching comprising a combination of these. If desired, two or more polymer films may be used so that the overall optical properties of these two or more films may satisfy the above-mentioned conditions. Preferably, the polymer film is produced according to a solvent casting method in order that the birefringence unevenness of the film is reduced as much as possible. Preferably, the thickness of the polymer film falls between 20 and 500 µm, most preferably between 40 and 100 µm.

(Constitution of General Liquid-Crystal Display Device)

For the polymer film to form the optically-anisotropic layer, usable is at least one polymer material selected from polyamide, polyimide, polyester, polyether ketone, polyamidimide-polyester imide, and polyaryl-ether ketone. This is dissolved in a solvent, then the resulting solution is applied to a substrate, and the solvent is evaporated away to form a film on the film. This method is favorably employed herein. In this case, also preferred is a method of stretching the polymer film and the substrate so as to make the film have optical anisotropy, and the film thus processed may be used as an optically-anisotropic layer. The transparent film of the invention is preferably used as the support in these embodiments. Another preferred method is as follows: The polymer film is formed on a different substrate, and this is peeled from it, and then this is stuck to the transparent film of the invention to give an optically-anisotropic layer having a laminate structure. In this method, the polymer film may be thinned, and its thickness is preferably at most 50 µm, more preferably from 1 to 20 µm.

(Constitution of General Liquid-Crystal Display Device)

When the cellulose acylate film of the invention is used as an optically-compensatory film, the transmission axis of the polarizer element for it may be at any angle to the slow axis of the optically-compensatory film of the cellulose acylate film. A liquid-crystal display device comprises a liquid-crystal cell that carries a liquid crystal between two electrode substrates, two polarizing elements disposed on both sides of the cell, and at least one optically-compensatory film disposed between the liquid-crystal cell and the polarizing element.

The liquid-crystal layer of the liquid-crystal cell is generally formed by introducing a liquid crystal into the space formed by two substrates via a spacer put therebetween, and sealed up in it. A transparent electrode layer is formed on a substrate as a transparent film that contains a conductive substance. The liquid-crystal cell may further have a gas barrier layer, a hard coat layer or an undercoat layer (for adhesion to transparent electrode layer). These layers are generally formed on a substrate. The substrate of the liquid-crystal cell generally has a thickness of from 50 µm to 2 mm.

(Type of Liquid-Crystal Display Device)

The cellulose acylate film of the invention may be used for liquid-crystal cells of various display modes. Various display modes such as TN (twisted nematic), IPS (in-plane switching), FLC (ferroelectric liquid-crystal), AFLC (anti-ferroelectric liquid-crystal), OCB (optically-compensatory bent), STN (super-twisted nematic), VA (vertically aligned), ECB (electrically-controlled birefringence) and HAN (hybrid aligned nematic) modes have been proposed. Also proposed are other display modes with any of the above-mentioned display modes aligned and divided. The transparent film of the invention is effective in liquid-crystal display devices of any display mode. Further, it is also effective in any of transmission-type, reflection-type and semitransmission-type liquid-crystal display devices.

(TN-Mode Liquid-Crystal Display Device)

The cellulose acylate film of the invention may be used as a support of the optically-compensatory sheet in TN-mode liquid-crystal cell-having TN-mode liquid-crystal display devices. TN-mode liquid-crystal cells and TN-mode liquid-crystal display devices are well known from the past. The optically-compensatory sheet to be used in TN-mode liquid-crystal display devices is described in JP-A 3-9325, 6-148429, 8-50206, 9-26572. In addition, it is also described in Mori et al's reports (*Jpn. J. Appl. Phys.*, Vol. 36 (1997), p. 143; *Jpn. J. Appl. Phys.*, Vol. 36 (1997), p. 1068).

(STN-Mode Liquid-Crystal Display Device)

The cellulose acylate film of the invention may be used as a support of the optically-compensatory sheet in STN-mode liquid-crystal cell-having STN-mode liquid-crystal display devices. In general, the rod-shaped liquid-crystal molecules in the liquid-crystal cell in an STN-mode liquid-crystal display device are twisted at an angle within a range of from 90 to 360 degrees, and the product of the refractivity anisotropy ($\Delta n$) of the rod-shaped liquid-crystal molecules and the cell gap (d), $\Delta$nd falls between 300 and 1500 nm. The optically-compensatory sheet to be used in STN-mode liquid-crystal display devices is described in JP-A 2000-105316.

(VA-Mode Liquid-Crystal Display Device)

The cellulose acylate film of the invention is especially favorable for a support of the optically-compensatory sheet in VA-mode liquid-crystal cell-having VA-mode liquid-crystal display devices. Preferably, the optically-compensatory sheet for use in VA-mode liquid-crystal display devices has a retardation Re of from 0 to 150 nm and a retardation Rth of from 70 to 400 nm. More preferably, the retardation Re of the sheet is from 20 to 70 nm. When two optically-anisotropic polymer films are used in a VA-mode liquid-crystal display device, then the retardation Rth of the films preferably falls between 70 and 250 nm. When one optically-anisotropic polymer film is used in a VA-mode liquid-crystal display device, then the retardation Rth of the film preferably falls between 150 and 400 nm. The VA-mode liquid-crystal display devices for the invention may have an orientation-divided system, for example, as in JP-A 10-123576.

(IPS-Mode Liquid-Crystal Display Device, and ECB-Mode Liquid-Crystal Display Device)

The cellulose acylate film of the invention is also favorable for a support of the optically-compensatory sheet and for a protective film of the polarizer in IPS-mode or ECB-mode liquid-crystal cell-having IPS-mode liquid-crystal display devices and ECB-mode liquid-crystal display devices. In these modes, the liquid-crystal material is aligned nearly in parallel to the film face in black display, and the liquid-crystal molecules are aligned in parallel to the surface of the substrate when no voltage is applied to the device for black display. In these embodiments, the polarizer that comprises the cellulose acylate film of the invention contributes to enlarging the viewing angle and to improving the image contrast. In these embodiments, the retardation value of the optically-anisotropic layer disposed between the protective film of the polarizer and the liquid crystal cell is preferably at most 2 times the value of $\Delta n \cdot d$ of the liquid-crystal layer. Also preferably, the absolute value of Rth, |Rth| is at most 25 nm, more preferably at most 20 nm, even more preferably at most 15 nm. Accordingly, the cellulose acylate film of the invention is favorably used.

(OCB-Mode Liquid-Crystal Display Device, and HAN-Mode Liquid-Crystal Display Device)

The cellulose acylate film of the invention is also favorable for a support of the optically-compensatory sheet in OCB-mode liquid-crystal cell-having OCB-mode liquid-crystal display devices and HAN-mode liquid-crystal cell-having HAN-mode liquid-crystal display devices. Preferably, the optically-compensatory sheet for use in OCB-mode liquid-crystal display devices and HAN-mode liquid-crystal display devices is so designed that the direction in which the absolute value of the retardation of the sheet is the smallest does not exist both in the in-plane direction and in the normal line direction of the optically-compensatory sheet. The optical properties of the optically-compensatory sheet for use in OCB-mode liquid-crystal display devices and HAN-mode liquid-crystal display devices are determined, depending on the optical properties of the optically-anisotropic layer, the optical properties of the support and the positional relationship between the optically-anisotropic layer and the support. The optically-compensatory sheet for use in OCB-mode liquid-crystal display devices and HAN-mode liquid-crystal display devices is described in JP-A 9-197397. It is described also in Mori et al's reports (*Jpn. J. Appl. Phys.*, Vol. 38 (1999), p. 2837).

(Reflection-Type Liquid-Crystal Display Device)

The cellulose acylate film of the invention is also favorably used for an optically-compensatory film in TN-mode, STN-mode, HAN-mode or GH (guest-host)-mode reflection-type liquid-crystal display devices. These display modes are well known from the past. TN-mode reflection-type liquid-crystal devices are described in JP-A 10-123478, pamphlet of International Laid-Open No. 98/48320, and Japanese Patent 3022477. The optically-compensatory film for use in reflection-type liquid-crystal display devices is described in pamphlet of International Laid-Open No. 00/65384.

(Other Liquid-Crystal Display Devices)

The cellulose acylate film of the invention is also favorably used as a support of the optical compensatory sheet in ASM (axially symmetric aligned microcell)-mode liquid-crystal cell-having ASM-mode liquid-crystal display devices. The liquid-crystal cell in ASM-mode devices is characterized in that it is supported by a resin spacer capable of controlling and varying the thickness of the cell. The other properties of the cell are the same as those of the liquid-crystal cell in TN-mode devices. ASM-mode liquid-crystal cells and ASM-mode liquid-crystal display devices are described in Kume et al's report (Kume et al., *SID* 98 *Digest* 1089 (1998)).

(Hard Coat Film, Antiglare Film, Antireflection Film)

The cellulose acylate film of the invention is favorably applied to hard coat films, antiglare films and antireflection films. For the purpose of improving the visibility of flat panel displays such as LCD, PDP, CRT, EL, any or all of a hard coat layer, an antiglare layer and an antireflection layer may be fitted to one or both faces of the cellulose acylate film of the invention. Preferred embodiments of such antiglare films and antireflection films are described in Hatsumei Kyokai's Disclosure Bulletin 2001-1745 (issued Mar. 15, 2001, by Hatsumei Kyokai), pp. 54-57, and the cellulose acylate film of the invention may be favorably used in these.

(Photographic Film Support)

The cellulose acylate film usable in the invention is applicable to supports of silver halide photographic materials. Various materials and formulations and methods for processing them are described in some patent publications, and they may apply to the invention. Regarding the techniques, JP-A 2000-105445 has detailed descriptions of color negative films, and the cellulose acylate film of the invention is favorably used in these. Also preferably, the film of the invention is applicable to supports of color reversal silver halide photographic materials, and various materials and formulations and methods for processing them described in JP-A 11-282119 are applicable to the invention.

(Transparent Substrate)

Since the cellulose acylate film of the invention has nearly zero optical anisotropy and has good transparency, it may be substitutable for the glass substrate for liquid-crystal cells in liquid-crystal display devices, or that is, it may be usable as a transparent support for sealing up the driving liquid crystals in the devices.

Since the transparent substrate for sealing up liquid crystal must have a good gas-barrier property, a gas-barrier layer may be optionally fitted to the surface of the cellulose acylate film of the invention, if desired. The morphology and the material of the gas-barrier layer are not specifically defined. For example, SiO$_2$ may be deposited on at least one face of the cellulose acylate film of the invention, or a polymer coating layer of a vinylidene-based polymer or a vinyl alcohol-based polymer having a relatively higher gas-barrier property may be formed on the film of the invention. These techniques may be suitably selected for use in the invention.

When the film of the invention is used as a transparent substrate for sealing up liquid crystal, a transparent electrode may be fitted to it for driving liquid crystal through voltage application thereto. The transparent electrode is not specifically defined. For example, a metal film or a metal oxide film may be laminated on at least one surface of the cellulose acylate film of the invention so as to form a transparent electrode on it. Above all, a meal oxide film is preferred in view of the transparency, the electroconductivity and the mechanical characteristics of the film; and a thin film of indium oxide essentially comprising tin oxide and containing from 2 to 15% of zinc oxide is more preferred. These techniques are described in detail, for example, in JP-A 2001-125079 and 2000-22760.

EXAMPLES

Examples of the invention are mentioned below, to which, however, the invention should not be limited.

Example 1

Fabrication of Cellulose Acylate Films, Surface Treatment and Lamination Test of Polarizer <Preparation of Cellulose Acylate Solutions T-1 to T-5>

A composition described in Table 1 was put into a mixing tank, and stirred therein with stirring to dissolve the constitutive component, thereby preparing cellulose acylate solutions T-1 to T-5.

TABLE 1

| Components of Cellulose Acylate Solution (unit: part by mass) | | | | | | | |
|---|---|---|---|---|---|---|---|
| Cellulose Acylate Solution | Methylene Chloride | Methanol | 1-Butanol | Cellulose Acylate | | TPP | BDP |
| | | | | degree of substitution | amount added | | |
| T-1 | 300 | 54 | 11 | 2.86 (acetyl) | 100 | 7.8 | 3.9 |
| T-2 | 300 | 54 | 11 | 2.86 (acetyl) | 100 | no | no |
| T-3 | 300 | 54 | 11 | 2.92 (acetyl) | 100 | no | no |
| T-4 | 300 | 54 | 11 | 2.06 (acetyl) 0.79 (propyl) | 100 | no | no |
| T-5 | 300 | 54 | 11 | 1.00 (acetyl) 1.70 (propyl) | 100 | no | no |

TPP: triphenyl phosphate
BDP: biphenyldiphenyl phosphate

<Preparation of Additive Solutions U-1 to U-7>

A composition described in Table 2 was put into a different mixing tank and heated with stirring to dissolve the components, thereby preparing additive solutions U-1 to U-7. (In the Table, "Optical Anisotropy-lowering Agent" means "compound capable of lowering the optical anisotropy")

TABLE 2

| Components of Additive Solution (unit: part by mass) | | | | |
|---|---|---|---|---|
| Additive Solution | Methylene Chloride | Methanol | Optical Anisotropy-lowering Agent | Wavelength-Dependent Anisotropy Distribution Improver |
| U-1 | 80 | 20 | no | No |
| U-2 | 80 | 20 | 45 (A-19) | 5 (UV-102) |
| U-3 | 80 | 20 | 25 (A-19) | 5 (UV-102) |
| U-4 | 80 | 20 | 60 (A-19) | 10 (UV-102) |
| U-5 | 80 | 20 | 45 (B-30) | 5 (UV-102) |
| U-6 | 80 | 20 | 45 (I-3) | 5 (UV-102) |
| U-7 | 80 | 20 | 45 (L-1) | 5 (UV-102) |

<Fabrication of Cellulose Acylate Film Sample 001>

44 parts by mass of the additive solution U-1 was added to 477 parts by mass of the cellulose acylate solution T-1, and well stirred to prepare a dope. The dope was cast onto a drum cooled at 0° C., through a casting slit. The film formed was peeled off from the drum, having a solvent content of 70% by mass, and with its both sides in the width direction thereof being fixed to a pin tenter (as in FIG. 3 in JP-A 4-1009), this was dried to have a solvent content of from 3 to 5% by mass in such a manner that the draw ratio in the transverse direction (direction vertical to the machine direction) could be 2%. Next, the film was conveyed between rolls in a heat treatment device and was further dried therein. Thus, a cellulose acylate film sample 001 having a thickness of 80 μm was produced.

<Fabrication of Cellulose Acylate Film Sample 101>

44 parts by mass of the additive solution U-2 was added to 465 parts by mass of the cellulose acylate solution T-2, and well stirred to prepare a dope. In the same manner as that for producing the cellulose acylate film sample 001, the dope was formed into a cellulose acylate film sample 101 having a thickness of 80 μm.

<Fabrication of Cellulose Acylate Film Samples 102 to 113>

Cellulose acylate film samples 102 to 113 each having a thickness of about 80 μm were produced in the same manner as that for producing the cellulose acylate film sample 101, for which, however, a combination of the cellulose acylate solution and the additive solution as in Table 3 was used in place of the cellulose acylate solution T-2 and the additive solution U-2.

TABLE 3

| Cellulose Acylate Film Sample | Cellulose Acylate Solution Designation | Cellulose Acylate Solution Amount Added (part by mass) | Additive Solution Designation | Additive Solution Amount Added (part by mass) |
|---|---|---|---|---|
| 001 | T-1 | 477 | U-1 | 44 |
| 101 | T-2 | 465 | U-2 | 44 |
| 102 | T-2 | 465 | U-3 | 44 |
| 103 | T-2 | 465 | U-4 | 44 |
| 104 | T-2 | 465 | U-5 | 44 |
| 105 | T-2 | 465 | U-6 | 44 |
| 106 | T-2 | 465 | U-7 | 44 |
| 107 | T-3 | 465 | U-2 | 44 |
| 108 | T-3 | 465 | U-3 | 44 |
| 109 | T-3 | 465 | U-4 | 44 |
| 110 | T-4 | 465 | U-2 | 44 |
| 111 | T-4 | 465 | U-3 | 44 |
| 112 | T-5 | 465 | U-2 | 44 |
| 113 | T-5 | 465 | U-3 | 44 |

<Preparation of Cellulose Acylate Solution T-6>

The following composition was put into a mixing tank and stirred to dissolve the components, thereby preparing a cellulose acylate solution T-6.

<Composition of Cellulose Acylate Solution T-6>

| | |
|---|---|
| Cellulose acylate having a degree of acetylation of 2.86 | 100.0 mas. pts. |
| Methylene chloride (first solvent) | 402.0 mas. pts. |
| Methanol (second solvent) | 60.0 mas. pts. |

<Preparation of Mat Agent Solution>

20 parts by mass of silica particles having a mean particle size of 16 nm (Aerosil R972 by Nippon Aerosil) and 80 parts by mass of methanol were well stirred and mixed for 30 minutes to prepare a dispersion of silica particles. The dispersion was put into a disperser along with the following composition thereinto, and further stirred therein for at least 30 minutes to dissolve the components, thereby preparing a mat agent solution.

(Composition of Mat Agent Solution)

| | |
|---|---|
| Dispersion of silica particles having a mean particle size of 16 nm | 10.0 mas. pts. |
| Methylene chloride (first solvent) | 76.3 mas. pts. |
| Methanol (second solvent) | 3.4 mas. pts. |
| Cellulose acylate solution (T-6) | 10.3 mas. pts. |

<Preparation of Additive Solution U-8>

The following composition was put into a mixing tank, and heated with stirring to dissolve the components, thereby preparing an additive solution U-8.

(Composition of Additive Solution U-8)

| | |
|---|---|
| Optical anisotropy-lowering compound (A-19) | 90.0 mas. pts. |
| Wavelength-dependent anisotropy distribution improver (UV-102) | 9.0 mas. pts. |
| Methylene chloride (first solvent) | 58.4 mas. pts. |
| Methanol (second solvent) | 8.7 mas. pts. |
| Cellulose acylate solution (T-6) | 12.8 mas. pts. |

<Fabrication of Cellulose Acylate Film Sample 114>

94.6 parts by mass of the cellulose acylate solution (T-6), 1.3 parts by mass of the mat agent solution, and 4.1 parts by mass of the additive solution (U-8) were separately filtered, and then mixed. Using a band caster, the mixture was cast on a band. In the above-mentioned composition, the ratio by mass of the optical anisotropy-lowering compound and the wavelength-dependent anisotropy distribution improver to cellulose acylate was 12% and 1.2% by mass, respectively. The film having a remaining solvent content of 30% was peeled away from the band, and dried at 140° C. for 40 minutes. Thus, a cellulose acylate film having a width of 1300 mm and a length of 100 m was produced. The remaining solvent content of the thus-produced cellulose acylate film was 0.2%, and the thickness of the film was 80 μm.

<Fabrication of Cellulose Acylate Film Sample 115>

A cellulose acylate film sample 115 was produced in the same manner as that for the production of the cellulose acylate film 114, which, however, had a width of 1850 mm and a length of 3000 m.

<Fabrication of Cellulose Acylate Film Sample 116>

A cellulose acylate film sample 116 was produced in the same manner as that for the production of the cellulose acylate film 114, which, however, had a width of 2200 mm and a length of 2100 m.

[Surface Treatment]

The cellulose acylate film sample 101 produced herein was subjected to surface treatment as follows.

(Treatment 1)

The cellulose acylate film sample 101 of the invention produced was dipped in an aqueous 2.0 N sodium hydroxide solution at 70° C. for 30 seconds. Then, this was washed in a wash water bath at room temperature, and neutralized with 0.1 N sulfuric acid at 30° C. Again, this was washed in a wash water bath at room temperature, and dried with hot air at 100° C. In that manner, the surface of the cellulose acylate film was alkali-saponified to give a saponified film sample 101A.

(Treatment 2)

The cellulose acylate film sample 101 of the invention produced was dipped in an aqueous 0.2 N sodium hydroxide solution at 35° C. for 5 minutes. Then, this was washed in a wash water bath at room temperature, and neutralized with 0.1 N sulfuric acid at 30° C. Again, this was washed in a wash water bath at room temperature, and dried with hot air at 100° C. In that manner, the surface of the cellulose acylate film was alkali-saponified to give a saponified film sample 101B.

(Treatment 3)

The cellulose acylate film sample 101 of the invention produced was surface-treated through plasma treatment as follows: Concretely, upper and lower electrodes of brass each having a diameter of 50 mm were provided in a reactor, and, as a dielectric, a 100 μm-thick polyimide having a larger size than that of the electrodes was stuck to each electrode. On the lower electrode, a film sample having a size of 150 mm×150 mm was put, and the electrodes were positioned to have an electrode-electrode distance of 20 mm. Air in the container was purged with argon. After air was completely purged with the argon gas, a high-frequency voltage at 3000 Hz and 4200 V was applied between the upper and lower electrodes, and this caused red-purple glow discharge for plasma excitation. The film sample 101 was treated for 5 seconds in the manner as herein, and the treated sample is a sample 101C.

(Treatment 4)

The cellulose acylate film sample 101 of the invention produced was treated in the same manner as that of (Treatment 3), for which, however, the treatment time was 20 seconds. The treated film sample is a sample 101D.

(Treatment 5)

A film sample 101E was produced in the same manner as that of (Treatment 3), for which, however, 10% of argon gas was substituted with oxygen.

(Treatment 6)

A film sample 101F was produced in the same manner as that of (Treatment 4), for which, however, 10% of argon gas was substituted with oxygen.

(Treatment 7)

The cellulose acylate film sample 101 of the invention produced was surface-treated through corona treatment as follows: Concretely, one surface of the film sample 101 was subjected to double corona discharge treatment under a condition of 80 W/m$^2$/min to give a film sample 101G. For the corona discharge treatment, used was a corona processor with multi-knife electrodes by Softal.

<Surface Treatment of Film Samples 001, 102 to 116>

Like the film sample 101, the film samples 001, 102 to 116 produced herein were also subjected to the surface treatment as in Tables 4 to 9. Thus treated, the film samples are called by their numbers with any of A to G added thereto according to the treatment methods for them.

<Determination of Additive Amount Before an after Surface Treatment>

The amount of the additive in each film sample was determined according to the method mentioned below. Concretely, 0.1 g of a sample was taken out, and dissolved in 2 ml of methylene chloride through ultrasonication for 30 minutes. Methanol was added to it to make 5 ml. Thus prepared, this is a sample solution. The sample solution was analyzed through HPLC. From the thus-determined data of the additive amount, the change of the additive amount in the sample before and after surface treatment is obtained. The ratio (%) of the additive amount in the treated sample to that in the untreated sample is computed.

<Determination of Surface Energy>

The surface energy of each film sample produced herein was determined as follows: Concretely, a sample was put on a horizontal bed horizontally thereto, and a predetermined amount of water and methylene iodide were applied onto the surface of the sample. After a predetermined period of time, the contact angle of the sample surface with water and with methylene iodide was measured. From the data of the thus-measured contact angle, the surface energy of the sample was derived according to an Owens method.

<Evaluation of Optical Properties>

The film samples produced herein were evaluated in point of their optical properties of Re(630), Rth(630), |Re(400)–Re(700)| and |Rth(400)–Rth(700)|, and the direction of their slow axis was detected.

[Lamination Test of Polarizer]

The surface-treated film samples and the film samples with no surface treatment were tested for their adhesiveness in fabricating polarizers.

That is, a rolled polyvinyl alcohol film having a thickness of 80 μm was continuously stretched 5-fold in an aqueous iodine solution, and dried to prepare a polarizing film. Two sheets of the adhesive-coated film sample 101A were prepared, and these were stuck to each other with the polarizing film being sandwiched between them. Thus, a polarizer protected with the cellulose acylate film 101A on both surfaces was obtained. In this, the slow axis of the cellulose acylate film sample 101 on both side of the polarizer was so controlled that it could be parallel to the transmission axis of the polarizing film. In the same manner as herein, other polarizers were fabricated using any of the other surface-treated film samples and the non-treated film samples (cellulose acylate film samples as in Table 5 to Table 9).

<Adhesiveness>

The thus-fabricated polarizer samples were tested for their adhesiveness, according to the method mentioned below. Concretely, each polarizer sample was folded at 90 degrees repeatedly for five times all at a predetermined site thereof, and the adhesiveness of each sample was evaluated in point of the presence or absence of delamination of the folded part of the sample.

A: No delamination found.

B: Delamination found.

<Workability>

The polarizer samples fabricated herein were tested for their workability, according to the method mentioned below. Concretely, the polarizer sample was cut with a single-edged cutter knife, and its workability was evaluated in point of the presence or absence of delamination around the cut part of the sample.

A: No delamination found.

B: Delamination found.

<Adhesiveness Durability 1>

The polarizer samples fabricated herein were tested for their adhesiveness durability, according to the method mentioned below. Concretely, the polarizer sample was kept under a condition of 60° C./90% RH for 200 hours, and then its adhesiveness durability was evaluated in point of the presence or absence of delamination of the sample after stored.

A: No delamination found.

B: Delamination found.

<Adhesiveness Durability 2>

The polarizer samples fabricated herein were tested for their adhesiveness durability, according to the method mentioned below. Concretely, the polarizer sample was kept at 80° C. for 200 hours, and then its adhesiveness durability was evaluated in point of the presence or absence of delamination of the sample after stored.

A: No delamination found.

B: Delamination found.

[Time Necessary for Saponification Treatment]

With respect to produced film samples 001, 102, 104, 105, 106 and 108, the surface treatment was conducted in the same method as described above (treatment 1) except for conducting alkali saponification treatment using 1.5 N of NaOH alkali solution at temperature condition 55° C. with each processing time set by every 10 seconds from 10 second to 180 second, and the surface energy of the surface-treated film surface was obtained by the same method as described above, then each of the time necessary to make the surface energy 50 mN/m or more, 60 mN/m or more and 65 mN/m or more was obtained and the time necessary for the surface treatment was evaluated.

The test results and evaluation of the film samples and the polarizers fabricated herein are shown in Table 4 to Table 10 and a part of the Table 11.

TABLE 4

Details of Cellulose Acylate Film Samples

| Cellulose Acylate Film Sample | Cellulose Acylate Solution designation | amount added (mas. pt.) | Additive Solution designation | amount added (mas. pt.) | Before Surface Treatment surface energy | contact angle water | contact angle iodide |
|---|---|---|---|---|---|---|---|
| 001 | T-1 | 477 | U-1 | 44 | 49 | 65 | 28 |
| 101 | T-2 | 465 | U-2 | 44 | 46 | 75 | 28 |
| 102 | T-2 | 465 | U-3 | 44 | 47 | 73 | 28 |
| 103 | T-2 | 465 | U-4 | 44 | 47 | 74 | 27 |
| 104 | T-2 | 465 | U-5 | 44 | 47 | 72 | 29 |
| 105 | T-2 | 465 | U-6 | 44 | 47 | 74 | 28 |
| 106 | T-2 | 465 | U-7 | 44 | 47 | 72 | 29 |
| 107 | T-3 | 465 | U-2 | 44 | 47 | 73 | 27 |
| 108 | T-3 | 465 | U-3 | 44 | 47 | 71 | 29 |
| 109 | T-3 | 465 | U-4 | 44 | 46 | 75 | 28 |
| 110 | T-4 | 465 | U-2 | 44 | 47 | 74 | 27 |
| 111 | T-4 | 465 | U-3 | 44 | 47 | 71 | 28 |
| 112 | T-5 | 465 | U-2 | 44 | 47 | 72 | 29 |
| 113 | T-5 | 465 | U-3 | 44 | 47 | 73 | 29 |
| 114 | T-6/mat agent solution/U-8 = 94.6/1.3/4.1 | | | | 47 | 72 | 27 |
| 115 | T-6/mat agent solution/U-8 = 94.6/1.3/4.1 | | | | 47 | 72 | 27 |
| 116 | T-6/mat agent solution/U-8 = 94.6/1.3/4.1 | | | | 47 | 72 | 27 |

TABLE 5

| Cellulose Acylate Film Sample | Film Sample | Surface Treatment | Remarks | Before Surface Treatment surface energy | Before Surface Treatment contact angle water | Before Surface Treatment contact angle iodide | After Surface Treatment surface energy water | After Surface Treatment contact angle water | After Surface Treatment contact angle iodide | Polarizer Workability Test adhesiveness | Polarizer Workability Test workability | Polarizer Workability Test durability 1 | Polarizer Workability Test durability 2 | Change of Additive Amount before and after treatment (%) |
|---|---|---|---|---|---|---|---|---|---|---|---|---|---|---|
| 001 | 001 | no treatment | comparative sample | 49 | 65 | 28 | — | — | — | B | B | B | B | — |
| 001A | 001 | treatment 1 | comparative sample | 49 | 65 | 28 | 61 | 40 | 32 | A | A | A | A | <0.02% |
| 101 | 101 | no treatment | comparative sample | 46 | 75 | 28 | — | — | — | B | B | B | B | — |
| 101A | 101 | treatment 1 | sample of the invention | 46 | 75 | 28 | 66 | 30 | 33 | A | A | A | A | 1% |
| 101B | 101 | treatment 2 | comparative sample | 46 | 75 | 28 | 49 | 65 | 31 | B | B | B | B | 0.10% |
| 101C | 101 | treatment 3 | sample of the invention | 46 | 75 | 28 | 61 | 40 | 32 | A | A | A | A | <0.02% |
| 101D | 101 | treatment 4 | sample of the invention | 46 | 75 | 28 | 63 | 36 | 32 | A | A | A | A | <0.02% |
| 101E | 101 | treatment 5 | sample of the invention | 46 | 75 | 28 | 62 | 38 | 33 | A | A | A | A | <0.02% |
| 101F | 101 | treatment 6 | sample of the invention | 46 | 75 | 28 | 66 | 31 | 32 | A | A | A | A | <0.02% |
| 101G | 101 | treatment 7 | sample of the invention | 46 | 75 | 28 | 57 | 46 | 36 | A | A | A | A | <0.02% |

TABLE 6

| Cellulose Acylate Film Sample | Film Sample | Surface Treatment | Remarks | Before Surface Treatment surface energy | Before Surface Treatment contact angle water | Before Surface Treatment contact angle iodide | After Surface Treatment surface energy | After Surface Treatment contact angle water | After Surface Treatment contact angle iodide | Polarizer Workability Test adhesiveness | Polarizer Workability Test workability | Polarizer Workability Test durability 1 | Polarizer Workability Test durability 2 | Change of Additive Amount before and after treatment (%) |
|---|---|---|---|---|---|---|---|---|---|---|---|---|---|---|
| 001 | 001 | no treatment | comparative sample | 49 | 65 | 28 | — | — | — | B | B | B | B | — |
| 001A | 001 | treatment 1 | comparative sample | 49 | 65 | 28 | 61 | 40 | 32 | A | A | A | A | 1% |
| 102 | 102 | no treatment | comparative sample | 47 | 73 | 28 | — | — | — | B | B | B | B | — |
| 102A | 102 | treatment 1 | sample of the invention | 47 | 73 | 28 | 66 | 31 | 32 | A | A | A | A | 1% |
| 102D | 102 | treatment 4 | sample of the invention | 47 | 73 | 28 | 64 | 35 | 31 | A | A | A | A | <0.02% |
| 102F | 102 | treatment 6 | sample of the invention | 47 | 73 | 28 | 66 | 31 | 32 | A | A | A | A | <0.02% |
| 103 | 103 | no treatment | comparative sample | 47 | 74 | 27 | — | — | — | B | B | B | B | — |
| 103A | 103 | treatment 1 | sample of the invention | 47 | 74 | 27 | 66 | 30 | 33 | A | A | A | A | 1% |
| 103D | 103 | treatment 4 | sample of the invention | 47 | 74 | 27 | 34 | 34 | 33 | A | A | A | A | <0.02% |
| 103F | 103 | treatment 6 | sample of the invention | 47 | 74 | 27 | 65 | 32 | 31 | A | A | A | A | <0.02% |
| 104 | 104 | no treatment | comparative sample | 47 | 72 | 29 | — | — | — | B | B | B | B | — |
| 104A | 104 | treatment 1 | sample of the invention | 47 | 72 | 29 | 65 | 32 | 33 | A | A | A | A | 1% |
| 104D | 104 | treatment 4 | sample of the invention | 47 | 72 | 29 | 62 | 39 | 31 | A | A | A | A | <0.02% |
| 104F | 104 | treatment 6 | sample of the invention | 47 | 72 | 29 | 65 | 32 | 32 | A | A | A | A | <0.02% |
| 105 | 105 | no treatment | comparative sample | 47 | 74 | 28 | — | — | — | B | B | B | B | — |
| 105A | 105 | treatment 1 | sample of the invention | 47 | 74 | 28 | 67 | 29 | 31 | A | A | A | A | 1% |
| 105D | 105 | treatment 4 | sample of the invention | 47 | 74 | 28 | 64 | 35 | 31 | A | A | A | A | <0.02% |
| 105F | 105 | treatment 6 | sample of the invention | 47 | 74 | 28 | 65 | 33 | 32 | A | A | A | A | <0.02% |
| 106 | 106 | no treatment | comparative sample | 47 | 72 | 29 | — | — | — | B | B | B | B | — |

TABLE 6-continued

| Cellulose Acylate Film Sample | Film Sample | Surface Treatment | Remarks | Before Surface Treatment | | | After Surface Treatment | | | Polarizer Workability Test | | | | Change of Additive Amount before and after treatment (%) |
|---|---|---|---|---|---|---|---|---|---|---|---|---|---|---|
| | | | | surface energy | contact angle water | contact angle iodide | surface energy | contact angle water | contact angle iodide | adhesiveness | workability | durability 1 | durability 2 | |
| 106A | 106 | treatment 1 | sample of the invention | 47 | 72 | 29 | 65 | 33 | 31 | A | A | A | A | 1% |
| 106D | 106 | treatment 4 | sample of the invention | 47 | 72 | 29 | 62 | 38 | 32 | A | A | A | A | <0.02% |
| 106F | 106 | treatment 6 | sample of the invention | 47 | 72 | 29 | 64 | 34 | 32 | A | A | A | A | <0.02% |

TABLE 7

| Cellulose Acylate Film Sample | Film Sample | Surface Treatment | Remarks | Before Surface Treatment | | | After Surface Treatment | | | Polarizer Workability Test | | | | Change of Additive Amount before and after treatment (%) |
|---|---|---|---|---|---|---|---|---|---|---|---|---|---|---|
| | | | | Surface energy | contact angle water | contact angle iodide | surface energy | contact angle water | contact angle iodide | adhesiveness | workability | durability 1 | durability 2 | |
| 001 | 001 | no treatment | comparative sample | 49 | 65 | 28 | — | — | — | B | B | B | B | — |
| 001A | 001 | treatment 1 | comparative sample | 49 | 65 | 28 | 61 | 40 | 32 | A | A | A | A | 1% |
| 107 | 107 | no treatment | comparative sample | 47 | 73 | 27 | — | — | — | B | B | B | B | — |
| 107A | 107 | treatment 1 | sample of the invention | 47 | 73 | 27 | 65 | 31 | 33 | A | A | A | A | 1% |
| 107D | 107 | treatment 4 | sample of the invention | 47 | 73 | 27 | 63 | 38 | 32 | A | A | A | A | <0.02% |
| 107F | 107 | treatment 6 | sample of the invention | 47 | 73 | 27 | 65 | 33 | 32 | A | A | A | A | <0.02% |
| 108 | 108 | no treatment | comparative sample | 47 | 71 | 29 | — | — | — | B | B | B | B | — |
| 108A | 108 | treatment 1 | sample of the invention | 47 | 71 | 29 | 65 | 32 | 30 | A | A | A | A | 1% |
| 108D | 108 | treatment 4 | sample of the invention | 47 | 71 | 29 | 64 | 35 | 31 | A | A | A | A | <0.02% |
| 108F | 108 | treatment 6 | sample of the invention | 47 | 71 | 29 | 64 | 35 | 32 | A | A | A | A | <0.02% |
| 109 | 109 | no treatment | comparative sample | 46 | 75 | 28 | — | — | — | B | B | B | B | — |

TABLE 7-continued

| Cellulose Acylate Film Sample | Film Sample | Surface Treatment | Remarks | Before Surface Treatment | | | After Surface Treatment | | | Polarizer Workability Test | | | | Change of Additive Amount before and after treatment (%) |
|---|---|---|---|---|---|---|---|---|---|---|---|---|---|---|
| | | | | Surface energy | contact angle | | surface energy | contact angle | | adhesiveness | workability | durability 1 | durability 2 | |
| | | | | | water | iodide | | water | iodide | | | | | |
| 109A | 109 | treatment 1 | sample of the invention | 46 | 75 | 28 | 65 | 32 | 31 | A | A | A | A | 1% |
| 109D | 109 | treatment 4 | sample of the invention | 46 | 75 | 28 | 63 | 35 | 33 | A | A | A | A | <0.02% |
| 109F | 109 | treatment 6 | sample of the invention | 46 | 75 | 28 | 64 | 34 | 30 | A | A | A | A | <0.02% |

TABLE 8

| Cellulose Acylate Film Sample | Film Sample | Surface Treatment | Remarks | Before Surface Treatment | | | After Surface Treatment | | | Polarizer Workability Test | | | | Change of Additive Amount before and after treatment (%) |
|---|---|---|---|---|---|---|---|---|---|---|---|---|---|---|
| | | | | surface energy | contact angle | | surface energy | contact angle | | adhesiveness | workability | durability 1 | durability 2 | |
| | | | | | water | iodide | | water | iodide | | | | | |
| 001 | 001 | no treatment | comparative sample | 49 | 65 | 28 | — | — | — | B | B | B | B | — |
| 001A | 001 | treatment 1 | comparative sample | 49 | 65 | 28 | 61 | 40 | 32 | A | A | A | A | 1% |
| 110 | 110 | no treatment | comparative sample | 47 | 74 | 27 | — | — | — | B | B | B | B | — |
| 110A | 110 | treatment 1 | sample of the invention | 47 | 74 | 27 | 67 | 28 | 32 | A | A | A | A | 1% |
| 110D | 110 | treatment 4 | sample of the invention | 47 | 74 | 27 | 63 | 36 | 31 | A | A | A | A | <0.02% |
| 110F | 110 | treatment 6 | sample of the invention | 47 | 74 | 27 | 65 | 33 | 31 | A | A | A | A | <0.02% |
| 111 | 111 | no treatment | comparative sample | 47 | 71 | 28 | — | — | — | B | B | B | B | — |
| 111A | 111 | treatment 1 | sample of the invention | 47 | 71 | 28 | 66 | 30 | 33 | A | A | A | A | 1% |
| 111D | 111 | treatment 4 | sample of the invention | 47 | 71 | 28 | 67 | 32 | 33 | A | A | A | A | <0.02% |
| 111F | 11 | treatment 6 | sample of the invention | 47 | 71 | 28 | 64 | 35 | 32 | A | A | A | A | <0.02% |
| 112 | 112 | no treatment | comparative sample | 47 | 72 | 29 | — | — | — | B | B | B | B | — |

TABLE 8-continued

| Cellulose Acylate Film Sample | Film Sample | Surface Treatment | Remarks | Before Surface Treatment | | | After Surface Treatment | | | Polarizer Workability Test | | | | Change of Additive Amount before and after treatment (%) |
|---|---|---|---|---|---|---|---|---|---|---|---|---|---|---|
| | | | | surface energy | contact angle water | contact angle iodide | surface energy water | contact angle water | contact angle iodide | adhe- sive- ness | work- ability | dura- bility 1 | dura- bility 2 | |
| 112A | 112 | treatment 1 | sample of the invention | 47 | 72 | 29 | 65 | 32 | 31 | A | A | A | A | 1% |
| 112D | 112 | treatment 4 | sample of the invention | 47 | 72 | 29 | 63 | 37 | 32 | A | A | A | A | <0.02% |
| 112F | 112 | treatment 6 | sample of the invention | 47 | 72 | 29 | 63 | 36 | 31 | A | A | A | A | <0.02% |
| 113 | 113 | no treatment | comparative sample | 47 | 73 | 29 | — | — | — | B | B | B | B | — |
| 113A | 113 | treatment 1 | sample of the invention | 47 | 73 | 29 | 64 | 34 | 31 | A | A | A | A | 1% |
| 113D | 113 | treatment 4 | sample of the invention | 47 | 73 | 29 | 61 | 39 | 32 | A | A | A | A | <0.02% |
| 113F | 113 | treatment 6 | sample of the invention | 47 | 73 | 29 | 65 | 32 | 33 | A | A | A | A | <0.02% |

TABLE 9

| Cellulose Acylate Film Sample | Film Sample | Surface Treatment | Remarks | Before Surface Treatment | | | After Surface Treatment | | | Polarizer Workability Test | | | | Change of Additive Amount before and after treatment (%) |
|---|---|---|---|---|---|---|---|---|---|---|---|---|---|---|
| | | | | surface energy | contact angle water | contact angle iodide | surface energy water | contact angle water | contact angle iodide | adhe- sive- ness | work- ability | dura- bility 1 | dura- bility 2 | |
| 001 | 001 | no treatment | comparative sample | 49 | 65 | 28 | — | — | — | B | B | B | B | — |
| 001A | 001 | treatment 1 | comparative sample | 49 | 65 | 28 | 61 | 40 | 32 | A | A | A | A | 1% |
| 114 | 114 | no treatment | comparative sample | 47 | 72 | 27 | — | — | — | B | B | B | B | — |
| 114A | 114 | treatment 1 | sample of the invention | 47 | 72 | 27 | 65 | 33 | 32 | A | A | A | A | 1% |
| 114D | 114 | treatment 4 | sample of the invention | 47 | 72 | 27 | 62 | 38 | 31 | A | A | A | A | <0.02% |
| 114F | 114 | treatment 6 | sample of the invention | 47 | 72 | 27 | 63 | 36 | 31 | A | A | A | A | <0.02% |
| 114G | 114 | treatment 7 | sample of the invention | 47 | 72 | 27 | 58 | 45 | 35 | A | A | A | A | <0.02% |

TABLE 9-continued

| Cellulose Acylate Film Sample | Film Sample | Surface Treatment | Remarks | Before Surface Treatment | | | After Surface Treatment | | | Polarizer Workability Test | | | | Change of Additive Amount before and after treatment (%) |
|---|---|---|---|---|---|---|---|---|---|---|---|---|---|---|
| | | | | surface energy | contact angle | | surface energy | contact angle | | adhe- sive- ness | work- ability | dura- bility 1 | dura- bility 2 | |
| | | | | | water | iodide | | water | iodide | | | | | |
| 115A | 115 | treatment 1 | sample of the invention | 47 | 72 | 27 | 63 | 36 | 31 | A | A | A | A | 1% |
| 116A | 116 | treatment 1 | sample of the invention | 47 | 72 | 27 | 64 | 35 | 32 | A | A | A | A | 1% |

TABLE 10

| Cellulose Acylate Film Sample | Time of Surface Treatment (sec) Surface Energy | | |
|---|---|---|---|
| | 50 mN/m | 60 mN/m | 65 mN/m |
| 001 | 80 | 110 | 170 |
| 102 | 20 | 30 | 40 |
| 104 | 20 | 30 | 40 |
| 105 | 50 | 70 | 80 |
| 106 | 40 | 60 | 70 |
| 108 | 30 | 50 | 60 |

The above results confirm that, when the film samples of the invention (with respect to optical properties, referring to Table 11.) are subjected to surface treatment so as to control their surface energy thereof, then they may have good workability to give polarizers and the thus-produced polarizers may have good durability (Film samples having A to G at the end of the name).

The change of the additive amount in the films before and after surface treatment confirms that, in the dry surface treatment such as plasma treatment and corona treatment (Film samples having C to G at the end of the name), the reduction in the additive amount in the treated films is lower than the detectable limit and therefore there is little probability that the properties and the durability of the films may worsen owing to the fluctuation in the additive amount. On the other hand, in wet treatment such as alkali saponification ((Film samples having A and B at the end of the name), the additives having been dissolved out of the films may remain as such in the alkali saponification solution or may be decomposed therein, and the processing solution may be thereby contaminated. With respect to this viewpoint, dry surface treatment such as plasma treatment or corona treatment is preferred.

Example 2

Evaluation of Film Fitted in IPS-Mode Liquid-Crystal Display Device

The cellulose acylate film produced in Example 1 was fitted to a liquid-crystal display device and tested for its optical properties. In this Example, an IPS-mode liquid-crystal cell was used; while in the other Examples, VA-mode and OCB-mode liquid-crystal cells were used. The application of the polarizer and the optically-compensatory film produced by the use of the polymer film of the invention is not limited by the driving mode of these liquid-crystal display devices.

Using the cellulose acylate film sample 101A produced in Example 1, a polarizer 101A was fabricated in the same manner as in Example 1. To this, fitted was a monoaxially-oriented optically-compensatory film formed of an Arton film (by JSR) so as to make it have an optically-compensatory function. In this structure, the slow axis of the in-plane retardation of the optically-compensatory film was made perpendicular to the transmission axis of the polarizer 101A, whereby the visible characteristics of this structure was improved with no change in the in-plane properties thereof. The in-plane retardation Re of the optically-compensatory film was 270 nm; the thickness-direction retardation Rth thereof was 0 nm; and the Nz factor thereof was 0.5.

Two pairs of the laminate of the polarizer 101A and the optically-compensatory film were prepared, and these were stacked up together with a liquid crystal cell in such a manner that the optically-compensatory film of each laminate could be on the side of the liquid-crystal cell in an order of "laminate of polarizer 101A and optically-compensatory film+IPS-mode liquid-crystal cell+laminate of optically-compensatory film and polarizer 101A". With this laminate structure built therein, a liquid-crystal display was constructed. In this, the transmission axis of the upper and lower polarizers was made perpendicular to each other, and the transmission axis of the upper polarizer 101A was made parallel to the major axis direction of the liquid-crystal molecules in the cell (or that is, the slow axis of the optically-compensatory layer was perpendicular to the major axis of the liquid-crystal molecules in the cell). Conventional liquid-crystal cell, electrode and substrate generally used in IPS were used herein as they were. The orientation of the liquid-crystal cell was horizontal orientation, and the liquid crystal had positive dielectric anisotropy. These were all commercially-available ones for IPS-mode liquid-crystal devices. The physical properties of the liquid-crystal cell are as follows: An of liquid crystal is 0.099; the cell gaps of the liquid-crystal layer is 3.0 μm; the pretilt angle is 5 degrees; the rubbing direction is at 75 degrees in both the upper and lower substrates.

Also in the same manner as that for the polarizer 101A in Example 1, other polarizers were fabricated by the use of the other cellulose acylate film samples 001A, 101B to 101G, 102A to 116A, and 102F to 114F produced in Example 1. Similarly, an optically-compensatory film was laminated on it, and two pairs of each laminate were prepared. With these built therein together with an IPS-mode liquid-crystal cell, display devices were constructed.

TABLE 11

| Cellulose Acylate Film Sample | Film Sample | Treatment Method | Remarks | Re(80) 630 nm | Rth(80) 630 nm | direction of in-plane slow axis | ΔRe | ΔRth | Light Leakage in through IPS panel in black display (%) |
|---|---|---|---|---|---|---|---|---|---|
| 001A | 001 | treatment 1 | comparative sample | 4.8 | 40.2 | MD | 1.3 | 41 | 0.48 |
| 101A | 101 | treatment 1 | sample of the invention | 2.1 | 14.8 | MD | 0.8 | 12.5 | 0.05 |
| 101B | 101 | treatment 2 | comparative sample | 2.1 | 14.8 | MD | 0.8 | 12.5 | 0.06 |
| 101C | 101 | treatment 3 | sample of the invention | 2.1 | 14.8 | MD | 0.8 | 12.5 | 0.04 |
| 101D | 101 | treatment 4 | sample of the invention | 2.1 | 14.8 | MD | 0.8 | 12.5 | 0.05 |
| 101E | 101 | treatment 5 | sample of the invention | 2.1 | 14.8 | MD | 0.8 | 12.5 | 0.04 |
| 101F | 101 | treatment 6 | sample of the invention | 2.1 | 14.8 | MD | 0.8 | 12.5 | 0.04 |
| 101G | 101 | treatment 7 | sample of the invention | 2.1 | 14.8 | MD | 0.8 | 12.5 | 0.06 |
| 102A | 102 | treatment 1 | sample of the invention | 1.8 | 17.3 | MD | 0.6 | 11.7 | 0.11 |
| 102F | 102 | treatment 6 | sample of the invention | 1.8 | 17.3 | MD | 0.6 | 11.7 | 0.13 |
| 103A | 103 | treatment 1 | sample of the invention | 1.7 | 11.7 | MD | 0.8 | 12.9 | 0.06 |
| 103F | 103 | treatment 6 | sample of the invention | 1.7 | 11.7 | MD | 0.8 | 12.9 | 0.08 |
| 104A | 104 | treatment 1 | sample of the invention | 1.2 | 4.9 | MD | 0.9 | 13.5 | 0.04 |
| 104F | 104 | treatment 6 | sample of the invention | 1.2 | 4.9 | MD | 0.9 | 13.5 | 0.05 |
| 105A | 105 | treatment 1 | sample of the invention | 2.2 | 5.2 | MD | 0.6 | 11.3 | 0.05 |
| 105F | 105 | treatment 6 | sample of the invention | 2.2 | 5.2 | MD | 0.6 | 11.3 | 0.04 |
| 106A | 106 | treatment 1 | sample of the invention | 1.1 | 4.9 | MD | 0.4 | 10.9 | 0.07 |
| 106F | 106 | treatment 6 | sample of the invention | 1.1 | 4.9 | MD | 0.4 | 10.9 | 0.06 |
| 107A | 107 | treatment 1 | sample of the invention | 0.4 | −2.1 | TD | 0.5 | 13.4 | 0.04 |
| 107F | 107 | treatment 6 | sample of the invention | 0.4 | −2.1 | TD | 0.5 | 13.4 | 0.03 |
| 108A | 108 | treatment 1 | sample of the invention | 0.5 | −4.9 | TD | 0.6 | 12.1 | 0.04 |
| 108F | 108 | treatment 6 | sample of the invention | 0.5 | −4.9 | TD | 0.6 | 12.1 | 0.05 |
| 109A | 109 | treatment 1 | sample of the invention | 0.4 | −5.1 | TD | 0.4 | 12.7 | 0.06 |
| 109F | 109 | treatment 6 | sample of the invention | 0.4 | −5.1 | TD | 0.4 | 12.7 | 0.06 |
| 110A | 110 | treatment 1 | sample of the invention | 0.8 | −4.7 | MD | 0.2 | 12.5 | 0.07 |
| 110F | 110 | treatment 6 | sample of the invention | 0.8 | −4.7 | MD | 0.2 | 12.5 | 0.08 |
| 111A | 111 | treatment 1 | sample of the invention | 1 | −7.5 | MD | 0.1 | 11.3 | 0.04 |
| 111F | 111 | treatment 6 | sample of the invention | 1 | −7.5 | MD | 0.1 | 11.3 | 0.06 |
| 112A | 112 | treatment 1 | sample of the invention | 0.9 | −4.5 | MD | 0.2 | 13.5 | 0.06 |
| 112F | 112 | treatment 6 | sample of the invention | 0.9 | −4.5 | MD | 0.2 | 13.5 | 0.03 |
| 113A | 113 | treatment 1 | sample of the invention | 0.8 | −7.8 | MD | 0.1 | 11.1 | 0.05 |
| 113F | 113 | treatment 6 | sample of the invention | 0.8 | −7.8 | MD | 0.1 | 11.1 | 0.04 |
| 114A | 114 | treatment 1 | sample of the invention | 1.8 | −6.8 | MD | 0.7 | 12.3 | 0.07 |
| 114F | 114 | treatment 6 | sample of the invention | 1.8 | −6.8 | MD | 0.7 | 12.3 | 0.06 |
| 115A | 115 | treatment 1 | sample of the invention | 1.2 | −5.2 | MD | 0.6 | 12.3 | 0.07 |
| 116A | 116 | treatment 1 | sample of the invention | 1.5 | −7.9 | MD | 0.7 | 12.3 | 0.07 |

In the liquid-crystal display devices constructed in the manner as above, the degree of light leakage in black display was determined in the azimuth direction of 45 degrees and in the polar angle direction of 70 degrees from the display front, and the data obtained are given in Table 11. The devices with the smaller data give smaller light leakage in the oblique direction of 45 degrees and therefore have better display contrast. Accordingly, the viewing angle characteristics of liquid-crystal display devices can be evaluated on the basis of the data. The degree of light leakage through the devices of the invention is from 1/50 to 1/4 and is small. In addition, the color change in display of the devices of the invention is also small. This is because the wavelength-dependent anisotropy (Re, Rth) distribution of the cellulose acylate film samples of the invention is small (that is, the films of the invention have lower wavelength dependency in point of their anisotropy), and therefore the films may have the same and uniform optically-compensatory properties at any and every wavelength. In addition, we, the present inventors have found that, even though the method of surface treatment of the polymer film of the invention is changed, all the treated films could have good display properties so far as the surface energy of the treated films falls within a predetermined range and so far as the films have good workability to give polarizers and good durability as polarizers. As mentioned above, it is understood that the optically-compensatory films and polarizers fabricated by the use of the polymer film of the invention have good viewing angle characteristics and are free from display color change.

Example 3

Evaluation of Film Fitted in VA-Mode or OCB-Mode Liquid-Crystal Display Device

The cellulose acylate films produced in Example 1 were tested, as fitted to or mounted on a liquid-crystal display device described in Example 1 of JP-A 10-48420, a discotic liquid-crystal molecules-containing optically-anisotropic layer and a polyvinyl alcohol-coated orientation film described in Example 1 of JP-A 9-26572, a VA-mode liquid-crystal display device described in FIGS. 2 to 9 of JP-A 2000-154261, and an OCB-mode liquid-crystal display device described in FIGS. 10 to 15 of JP-A 2000-154261. In all of these, the films were good in point of both image contrast and viewing angle characteristics.

Example 4

Properties of Optically-Compensatory Film

According to the method described in Example 1 of JP-A 7-333433, optically-compensatory films were fabricated by the use of the cellulose acylate film samples of the invention produced in Example 1. Thus obtained, the optically-compensatory films had good viewing angle characteristics on all sides. Accordingly, this confirms that the cellulose acylate film of the invention is excellent in point of its optical applications.

Example 5

Fabrication of Cellulose Acylate Films, Surface Treatment and Lamination Test of Polarizer <Preparation of Cellulose Acylate Solution T-11 to T-13>

A composition shown in Table 12 was put into a mixing tank and stirred under heat to dissolve the components, thereby preparing cellulose acylate solutions T-11 to T-13.

TABLE 12

| | Components of Cellulose Acylate Solution (unit: part by mass) | | | | | | |
|---|---|---|---|---|---|---|---|
| Cellulose | | | | Cellulose Acylate | | | |
| Acylate Solution | Methylene Chloride | Methanol | 1-Butanol | degree of substitution | amount added | TPP | BDP |
| T-11 | 300 | 54 | 11 | 2.86 (acetyl) | 100 | 7.8 | 3.9 |
| T-12 | 300 | 54 | 11 | 2.86 (acetyl) | 100 | no | no |
| T-13 | 300 | 54 | 11 | 2.94 (acetyl) | 100 | no | no |

<Evaluation of pKa and Solubility in Aqueous NaOH Solution of Compounds Capable of Lowering Optical Anisotropy>

Compounds capable of lowering optical anisotropy (hereinunder referred to as "optical anisotropy-lowering agent") were analyzed in point of their pKa and their solubility in 1.5 mol/liter NaOH at 55° C., according to the methods described hereinabove. Regarding their pKa, the compounds were analyzed as to whether or not their pKa>14 (not lower than 14). Regarding their solubility, the compounds were analyzed as to whether or not 1% compound could dissolve in the solution in visual observation. The data are given in Table 13.

TABLE 13

| | Characteristics of Compounds | | | |
|---|---|---|---|---|
| Optical Anisotropy-lowering Agent | Wavelength-Dependent Anisotropy Distribution Improver | pKa | log P | Solubility |
| C-419 | — | >14 | 3.3 | <1% |
| C-430 | — | >14 | 4.2 | <1% |
| A-42 | — | >14 | 3.4 | <1% |
| HS-1 | — | 13 | 2.2 | >1% |
| HS-2 | — | >14 | 0.5 | >1% |
| PL-10 | — | >14 | 2.6 | <1% |
| PL-43 | — | >14 | 5 | <1% |
| D-7 | — | >14 | 3.9 | <1% |
| E-1 | — | >14 | 2.9 | <1% |
| FA-1 | — | >14 | 2.7 | <1% |
| FB-2 | — | >14 | 3.8 | <1% |

TABLE 13-continued

| | Characteristics of Compounds | | | |
|---|---|---|---|---|
| Optical Anisotropy-lowering Agent | Wavelength-Dependent Anisotropy Distribution Improver | pKa | log P | Solubility |
| FB-6 | — | >14 | 5.3 | <1% |
| — | UV-112 | >14 | 7.3 | <1% |

HS-1:

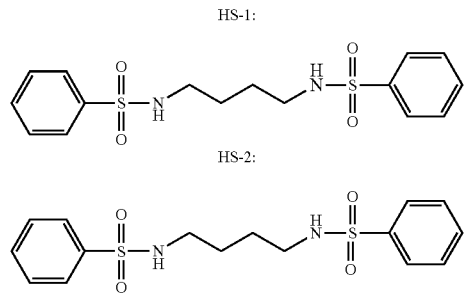

HS-2:

<Preparation of Additive Solution U-11 to U-35>

A composition shown in Table 14 was put into a mixing tank and heated with stirring to dissolve the components, thereby preparing additive solutions U-11 to U-35.

TABLE 14

Components of Additive Solution (unit: part by mass)
Formulation

| Additive Solution | Methylene Chloride amount added | Methanol amount added | Optical Anisotropy-lowering Agent | | Wavelength-Dependent Anisotropy Distribution Improver | |
|---|---|---|---|---|---|---|
| | | | compound | amount added | compound | amount added |
| U-11 | 80 mas. pts. | 20 mas. pts. | — | — | — | — |
| U-12 | 80 mas. pts. | 20 mas. pts. | C-419 | 50 mas. pts. | — | — |
| U-13 | 80 mas. pts. | 20 mas. pts. | C-430 | 50 mas. pts. | — | — |
| U-14 | 80 mas. pts. | 20 mas. pts. | A-42 | 50 mas. pts. | — | — |
| U-15 | 80 mas. pts. | 20 mas. pts. | HS-1 | 50 mas. pts. | — | — |
| U-16 | 80 mas. pts. | 20 mas. pts. | HS-2 | 50 mas. pts. | — | — |
| U-17 | 80 mas. pts. | 20 mas. pts. | PL-10 | 50 mas. pts. | — | — |
| U-18 | 80 mas. pts. | 20 mas. pts. | PL-43 | 50 mas. pts. | — | — |
| U-19 | 80 mas. pts. | 20 mas. pts. | D-7 | 50 mas. pts. | — | — |
| U-20 | 80 mas. pts. | 20 mas. pts. | E-1 | 50 mas. pts. | — | — |
| U-21 | 80 mas. pts. | 20 mas. pts. | FA-1 | 50 mas. pts. | — | — |
| U-22 | 80 mas. pts. | 20 mas. pts. | FB-2 | 50 mas. pts. | — | — |
| U-23 | 80 mas. pts. | 20 mas. pts. | FB-6 | 50 mas. pts. | — | — |
| U-24 | 80 mas. pts. | 20 mas. pts. | C-419 | 50 mas. pts. | UV-102 | 5 mas. pts. |
| U-25 | 80 mas. pts. | 20 mas. pts. | C-430 | 50 mas. pts. | UV-102 | 5 mas. pts. |
| U-26 | 80 mas. pts. | 20 mas. pts. | A-42 | 50 mas. pts. | UV-102 | 5 mas. pts. |
| U-27 | 80 mas. pts. | 20 mas. pts. | HS-1 | 50 mas. pts. | UV-102 | 5 mas. pts. |
| U-28 | 80 mas. pts. | 20 mas. pts. | HS-2 | 50 mas. pts. | UV-102 | 5 mas. pts. |
| U-29 | 80 mas. pts. | 20 mas. pts. | PL-10 | 50 mas. pts. | UV-102 | 5 mas. pts. |
| U-30 | 80 mas. pts. | 20 mas. pts. | PL-43 | 50 mas. pts. | UV-102 | 5 mas. pts. |
| U-31 | 80 mas. pts. | 20 mas. pts. | D-7 | 50 mas. pts. | UV-102 | 5 mas. pts. |
| U-32 | 80 mas. pts. | 20 mas. pts. | E-1 | 50 mas. pts. | UV-102 | 5 mas. pts. |
| U-33 | 80 mas. pts. | 20 mas. pts. | FA-1 | 50 mas. pts. | UV-102 | 5 mas. pts. |
| U-34 | 80 mas. pts. | 20 mas. pts. | FB-2 | 50 mas. pts. | UV-102 | 5 mas. pts. |
| U-35 | 80 mas. pts. | 20 mas. pts. | FB-6 | 50 mas. pts. | UV-102 | 5 mas. pts. |

<Fabrication of Cellulose Acylate Film Sample 002>

44 parts by mass of the additive solution U-11 was added to 477 parts by mass of the cellulose acylate solution T-11, and well stirred to prepare a dope. The dope was cast onto a drum cooled at 0° C., through a casting slit. The film formed was peeled off from the drum, having a solvent content of 70% by mass, and with its both sides in the width direction thereof being fixed to a pin tenter (as in FIG. 3 in JP-A 4-1009), this was dried to have a solvent content of from 3 to 5% by mass in such a manner that the draw ratio in the transverse direction (direction vertical to the machine direction) could be 2%. Next, the film was conveyed between rolls in a heat treatment device and was further dried therein. Thus, a cellulose acylate film sample 002 having a thickness of 80 μm was produced. This had a length (in the casting direction) of 100 m and a width (in the in-plane vertical direction to the casting direction) of 1 m.

<Fabrication of Cellulose Acylate Film Sample 201>

44 parts by mass of the additive solution U-12 was added to 465 parts by mass of the cellulose acylate solution T-12, and well stirred to prepare a dope. In the same manner as that for producing the cellulose acylate film sample 002, the dope was formed into a cellulose acylate film sample 201 having a thickness of 80 μm.

<Fabrication of Cellulose Acylate Film Samples 202 to 227>

Cellulose acylate film samples 202 to 227 each having a thickness of about 80 μm were produced in the same manner as that for producing the cellulose acylate film sample 201, for which, however, a combination of the cellulose acylate solution and the additive solution as in Table 15 was used in place of the cellulose acylate solution T-12 and the additive solution U-12.

TABLE 15

| Cellulose Acylate Film | Cellulose Acylate Solution | | Additive Solution | |
|---|---|---|---|---|
| | compound | amount added | compound | amount added |
| 002 | T-11 | 477 mas. pts. | U-11 | 44 mas. pts. |
| 201 | T-12 | 455 mas. pts. | U-12 | 44 mas. pts. |
| 202 | T-12 | 455 mas. pts. | U-13 | 44 mas. pts. |

TABLE 15-continued

| Cellulose Acylate Film | Cellulose Acylate Solution compound | amount added | Additive Solution compound | amount added |
|---|---|---|---|---|
| 203 | T-12 | 455 mas. pts. | U-14 | 44 mas. pts. |
| 204 | T-12 | 455 mas. pts. | U-15 | 44 mas. pts. |
| 205 | T-12 | 455 mas. pts. | U-16 | 44 mas. pts. |
| 206 | T-12 | 455 mas. pts. | U-17 | 44 mas. pts. |
| 207 | T-12 | 455 mas. pts. | U-18 | 44 mas. pts. |
| 208 | T-12 | 455 mas. pts. | U-19 | 44 mas. pts. |
| 209 | T-12 | 455 mas. pts. | U-20 | 44 mas. pts. |
| 210 | T-12 | 455 mas. pts. | U-21 | 44 mas. pts. |
| 211 | T-12 | 455 mas. pts. | U-22 | 44 mas. pts. |
| 212 | T-12 | 455 mas. pts. | U-23 | 44 mas. pts. |
| 213 | T-12 | 455 mas. pts. | U-24 | 44 mas. pts. |
| 214 | T-12 | 455 mas. pts. | U-25 | 44 mas. pts. |
| 215 | T-12 | 455 mas. pts. | U-26 | 44 mas. pts. |
| 216 | T-12 | 455 mas. pts. | U-27 | 44 mas. pts. |
| 217 | T-12 | 455 mas. pts. | U-28 | 44 mas. pts. |
| 218 | T-12 | 455 mas. pts. | U-29 | 44 mas. pts. |
| 219 | T-12 | 455 mas. pts. | U-30 | 44 mas. pts. |
| 220 | T-12 | 455 mas. pts. | U-31 | 44 mas. pts. |
| 221 | T-12 | 455 mas. pts. | U-32 | 44 mas. pts. |
| 222 | T-12 | 455 mas. pts. | U-33 | 44 mas. pts. |
| 223 | T-12 | 455 mas. pts. | U-34 | 44 mas. pts. |
| 224 | T-12 | 455 mas. pts. | U-35 | 44 mas. pts. |
| 225 | T-13 | 455 mas. pts. | U-31 | 35 mas. pts. |
| 226 | T-13 | 455 mas. pts. | U-33 | 35 mas. pts. |
| 227 | T-13 | 455 mas. pts. | U-35 | 35 mas. pts. |

<Preparation of Cellulose Acylate Solution T-14>

The following composition was put into a mixing tank and stirred to dissolve the components, thereby preparing a cellulose acylate solution T-14.
(Composition of Cellulose Acylate Solution T-14)

| | |
|---|---|
| Cellulose acylate having a degree of acetylation of 2.86 | 100.0 mas. pts. |
| Methylene chloride (first solvent) | 402.0 mas. pts. |
| Methanol (second solvent) | 60.0 mas. pts. |

(Preparation of Mat Agent Solution)

20 parts by mass of silica particles having a mean particle size of 16 nm (Aerosil R972 by Nippon Aerosil) and 80 parts by mass of methanol were well stirred and mixed for 30 minutes to prepare a dispersion of silica particles. The dispersion was put into a disperser along with the following composition thereinto, and further stirred therein for at least 30 minutes to dissolve the components, thereby preparing a mat agent solution.
(Composition of Mat Agent Solution)

| | |
|---|---|
| Dispersion of silica particles having a mean particle size of 16 nm | 10.0 mas. pts. |
| Methylene chloride (first solvent) | 76.3 mas. pts. |
| Methanol (second solvent) | 3.4 mas. pts. |
| Cellulose acylate solution (T-14) | 10.3 mas. pts. |

(Preparation of Additive Solution U-36)

The following composition was put into a mixing tank, and heated with stirring to dissolve the components, thereby preparing an additive solution U-36.
(Composition of Additive Solution U-36)

| | |
|---|---|
| Optical anisotropy-lowering compound (FB-2) | 90.0 mas. pts. |
| Wavelength-dependent anisotropy distribution improver (UV-102) | 9.0 mas. pts. |
| Methylene chloride (first solvent) | 58.4 mas. pts. |
| Methanol (second solvent) | 8.7 mas. pts. |
| Cellulose acylate solution (T-14) | 12.8 mas. pts. |

(Fabrication of Cellulose Acylate Film Sample 228)

94.6 parts by mass of the cellulose acylate solution (T-14), 1.3 parts by mass of the mat agent solution, and 4.1 parts by mass of the additive solution (U-36) were separately filtered, and then mixed. Using a band caster, the mixture was cast on a band. In the above-mentioned composition, the ratio by mass of the optical anisotropy-lowering compound and the wavelength-dependent anisotropy distribution improver to cellulose acylate was 12% and 1.2% by mass, respectively. The film having a remaining solvent content of 30% was peeled away from the band, and dried at 140° C. for 40 minutes. This is a cellulose acylate film sample 228. The remaining solvent content of the thus-produced cellulose acylate film was 0.2%, and the thickness of the film was 80 μm.
[Surface Treatment]

The cellulose acylate film sample 002 produced herein was subjected to surface treatment as follows.
(Treatment 1)

The cellulose acylate film sample 002 produced was dipped in an aqueous 1.5 N sodium hydroxide solution at 55° C. for 2 minutes. Then, this was washed in a wash water bath at room temperature, and neutralized with 0.1 N sulfuric acid at 30° C. Again, this was washed in a wash water bath at room temperature, and dried with hot air at 100° C. In that manner, the surface of the cellulose acylate film was alkali-saponified to give a saponified film sample 002A.
(Treatment 2)

The cellulose acylate film sample 002 produced was dipped in an aqueous 0.1 N sodium hydroxide solution at 20° C. for 10 minutes. Then, this was washed in a wash water bath at room temperature, and neutralized with 0.1 N sulfuric acid at 30° C. Again, this was washed in a wash water bath at room temperature, and dried with hot air at 100° C. In that manner, the surface of the cellulose acylate film was alkali-saponified to give a saponified film sample 002B.
(Surface Treatment of Film Samples 201 to 228)

Like the film sample 002, the film samples 201 to 228 produced herein were also subjected to the surface treatment as in Table 17. Thus treated, the film samples are called by their numbers with any of A or B added thereto according to the treatment methods for them.
<Determination of Surface Energy>

The surface energy of each film sample produced herein was determined as follows: Concretely, in the center part of the film to be analyzed, a sample piece was cut out, having a size of 30 mm×40 mm. This was conditioned at 25° C. and 60% RH for 2 hours, and then put on a horizontal bed horizontally thereto, and a predetermined amount (20 μl) of water and methylene iodide were applied onto the surface of the sample. After a predetermined period of time (30 seconds), the contact angle of the sample surface with water and with methylene iodide was measured. From the data of the thus-measured contact angle, the surface energy of the sample was derived according to an Owens method. 15 samples were cut out of the film at intervals of 30 mm in the direction of the width of the film, and 50 samples were at intervals of 50 mm in the casting direction of the film. In the same manner as above, these were analyzed for their surface energy, and the absolute value, ΔE, of the difference between the maximum value and the minimum value thus measured was obtained. This indicates the index of the surface energy fluctuation of the film.

<Evaluation of Optical Properties>

The film samples produced herein were evaluated in point of their optical properties of Re(630), Rth(630), |Re(400−Re(700)| and |Rth(400−Rth(700)|, as well as the distribution of Re(630) and Rth(630), ΔRe(630) and ΔRth(630), and the direction of their slow axis was detected.

<Evaluation of Cross Nicol Unevenness>

The film sample produced was put between two polarizers in cross Nicol, and checked for the presence or absence of film unevenness in the vertical direction and in the oblique direction. This is for evaluating the surface condition of the film sample.

A: No unevenness found.
    B: Some unevenness found but negligible.
    C: Unevenness found.

[Lamination Test of Polarizer]

The surface-treated film samples and the film samples with no surface treatment were tested for their adhesiveness in fabricating polarizers.

That is, a rolled polyvinyl alcohol film having a thickness of 80 μm was continuously stretched 5-fold in an aqueous iodine solution, and dried to prepare a polarizing film. Two sheets of the adhesive-coated film sample 201A were prepared, and these were stuck to each other with the polarizing film being sandwiched between them. Thus, a polarizer protected with the cellulose acylate film 201A on both surfaces was obtained. In this, the slow axis of the cellulose acylate film sample 201 on both side of the polarizer was so controlled that it could be parallel to the transmission axis of the polarizing film. In the same manner as herein, other polarizers were fabricated using any of the other surface-treated film samples and the non-treated film samples (cellulose acylate film samples as in Table 16 and Table 17).

<Adhesiveness>

The thus-fabricated polarizer samples were tested for their adhesiveness, according to the method mentioned below. Concretely, each polarizer sample was folded at 90 degrees repeatedly for five times all at a predetermined site thereof, and the adhesiveness of each sample was evaluated in point of the presence or absence of delamination of the folded part of the sample.

A: No delamination found.
    B: Delamination found.

<Workability>

The polarizer samples fabricated herein were tested for their workability, according to the method mentioned below. Concretely, the polarizer sample was cut with a single-edged cutter knife, and its workability was evaluated in point of the presence or absence of delamination around the cut part of the sample.

A: No delamination found.
    B: Delamination found.

<Adhesiveness Durability 1>

The polarizer samples fabricated herein were tested for their adhesiveness durability, according to the method mentioned below. Concretely, the polarizer sample was kept under a condition of 60° C./90% RH for 200 hours, and then its adhesiveness durability was evaluated in point of the presence or absence of delamination of the sample after stored and in point of the presence of absence of cross Nicol unevenness of the sample after stored.

1) Delamination:
    A: No delamination found.
    B: Delamination found.
2) Unevenness:
    A: No unevenness found.
    B: Unevenness found.

<Adhesiveness Durability 2>

The polarizer samples fabricated herein were tested for their adhesiveness durability, according to the method mentioned below. Concretely, the polarizer sample was kept at 80° C. for 200 hours, and then its adhesiveness durability was evaluated in point of the presence or absence of delamination of the sample after stored and in point of the presence of absence of cross Nicol unevenness of the sample after stored.

1) Delamination:
    A: No delamination found.
    B: Delamination found.
2) Unevenness:
    A: No unevenness found.
    B: Unevenness found.

The test results and the evaluations of the film samples and the polarizers fabricated herein are shown in Table 16 and Table 17.

TABLE 16

Properties of Films before surface treatment

| Cellulose Acylate Film | Surface Energy calculated value of surface energy (mNm$^{-1}$) | contact angle(°) water | contact angle(°) methylene iodide | Surface Condition cross Nicol unevenness | ΔRth(630) (nm) | ΔRe(630) (nm) | Polarizer Working Test adhesiveness | work-ability | Durability 1 delamination | Durability 1 unevenness | Durability 2 delamination | Durability 2 unevenness |
|---|---|---|---|---|---|---|---|---|---|---|---|---|
| 002 | 49 | 64 | 28 | A | 1 | 2 | B | B | B | A | B | A |
| 201 | 46 | 73 | 28 | A | 2 | 2 | B | B | B | A | B | A |
| 202 | 47 | 76 | 27 | A | 1 | 2 | B | B | B | A | B | A |
| 203 | 47 | 73 | 27 | A | 2 | 1 | B | B | B | A | B | A |
| 204 | 48 | 72 | 26 | A | 2 | 2 | B | B | B | A | B | A |
| 205 | 47 | 72 | 28 | A | 2 | 1 | B | B | B | A | B | A |
| 206 | 47 | 75 | 27 | A | 2 | 2 | B | B | B | A | B | A |
| 207 | 47 | 75 | 27 | A | 1 | 2 | B | B | B | A | B | A |
| 208 | 48 | 72 | 26 | A | 2 | 1 | B | B | B | A | B | A |
| 209 | 47 | 73 | 27 | A | 1 | 2 | B | B | B | A | B | A |
| 210 | 47 | 76 | 27 | A | 2 | 2 | B | B | B | A | B | A |
| 211 | 46 | 75 | 28 | A | 1 | 2 | B | B | B | A | B | A |

TABLE 16-continued

Properties of Films before surface treatment

| Cellulose Acylate Film | Surface Energy calculated value of surface energy (mNm⁻¹) | contact angle(°) water | contact angle(°) methylene iodide | Surface Condition cross Nicol unevenness | ΔRth(630) (nm) | ΔRe(630) (nm) | adhesiveness | Polarizer Working Test workability | Durability 1 delamination | Durability 1 unevenness | Durability 2 delamination | Durability 2 unevenness |
|---|---|---|---|---|---|---|---|---|---|---|---|---|
| 212 | 46 | 75 | 28 | A | 1 | 1 | B | B | B | A | B | A |
| 213 | 47 | 73 | 28 | A | 2 | 1 | B | B | B | A | B | A |
| 214 | 47 | 75 | 27 | A | 1 | 1 | B | B | B | A | B | A |
| 215 | 47 | 73 | 28 | A | 2 | 1 | B | B | B | A | B | A |
| 216 | 47 | 72 | 27 | A | 2 | 2 | B | B | B | A | B | A |
| 217 | 47 | 72 | 28 | A | 2 | 2 | B | B | B | A | B | A |
| 218 | 46 | 75 | 28 | A | 2 | 1 | B | B | B | A | B | A |
| 219 | 46 | 75 | 28 | A | 1 | 2 | B | B | B | A | B | A |
| 220 | 47 | 72 | 27 | A | 2 | 2 | B | B | B | A | B | A |
| 221 | 47 | 73 | 27 | A | 1 | 2 | B | B | B | A | B | A |
| 222 | 46 | 76 | 29 | A | 2 | 2 | B | B | B | A | B | A |
| 223 | 46 | 75 | 28 | A | 1 | 1 | B | B | B | A | B | A |
| 224 | 46 | 75 | 28 | A | 1 | 2 | B | B | B | A | B | A |
| 225 | 47 | 75 | 27 | A | 2 | 2 | B | B | B | A | B | A |
| 226 | 47 | 73 | 27 | A | 2 | 1 | B | B | B | A | B | A |
| 227 | 46 | 75 | 28 | A | 1 | 2 | B | B | B | A | B | A |
| 228 | 47 | 72 | 28 | A | 1 | 2 | B | B | B | A | B | A |

A: unevenness was not found. B: unevenness was slightly found, but not distinct. C: unevenness was found and distinct.

TABLE 17

Properties of Films after surface treatment

| Cellulose Acylate Film | Surface Treatment | Rth(630) | \|Rth(450)-Rth(700)\| | Re(600) | \|Re(450)-Re(700)\| | direction of slow axis |
|---|---|---|---|---|---|---|
| 002A | treatment 1 | 44 | 27 | 2 | 2 | MD |
| 002B | treatment 2 | 44 | 27 | 2 | 2 | MD |
| 201A | treatment 1 | −10 | 32 | 2 | 2 | MD |
| 202A | treatment 1 | −5 | 33 | 1 | 2 | MD |
| 203A | treatment 1 | 5 | 31 | 1 | 1 | MD |
| 204A | treatment 1 | −2 | 32 | 2 | 1 | MD |
| 204B | treatment 2 | 6 | 34 | 2 | 2 | MD |
| 205A | treatment 1 | −12 | 32 | 1 | 2 | MD |
| 205B | treatment 2 | −4 | 33 | 2 | 2 | MD |
| 206A | treatment 1 | −6 | 30 | 2 | 1 | MD |
| 207A | treatment 1 | −2 | 32 | 2 | 2 | MD |
| 208A | treatment 1 | −8 | 31 | 1 | 1 | MD |
| 209A | treatment 1 | 5 | 30 | 2 | 1 | MD |
| 210A | treatment 1 | −15 | 26 | 1 | 2 | MD |
| 211A | treatment 1 | −14 | 32 | 2 | 1 | MD |
| 212A | treatment 1 | −16 | 32 | 1 | 1 | MD |
| 213A | treatment 1 | 5 | 18 | 2 | 2 | MD |
| 214A | treatment 1 | 9 | 17 | 2 | 1 | MD |
| 215A | treatment 1 | 18 | 18 | 1 | 1 | MD |
| 216A | treatment 1 | 13 | 18 | 2 | 2 | MD |
| 216B | treatment 2 | 20 | 20 | 2 | 2 | MD |
| 217A | treatment 1 | 4 | 17 | 2 | 1 | MD |
| 217B | treatment 2 | 13 | 19 | 2 | 2 | MD |
| 218A | treatment 1 | 9 | 18 | 2 | 2 | MD |
| 219A | treatment 1 | 12 | 18 | 1 | 1 | MD |
| 220A | treatment 1 | 8 | 19 | 2 | 2 | MD |
| 221A | treatment 1 | 19 | 18 | 1 | 2 | MD |
| 222A | treatment 1 | 0 | 14 | 2 | 2 | MD |
| 223A | treatment 1 | 2 | 17 | 2 | 1 | MD |
| 224A | treatment 1 | 0 | 18 | 1 | 2 | MD |
| 225A | treatment 1 | 8 | 19 | 2 | 2 | MD |
| 226A | treatment 1 | 0 | 14 | 2 | 2 | TD |
| 227A | treatment 1 | 0 | 18 | 1 | 2 | TD |
| 228A | treatment 1 | 1 | 18 | 1 | 1 | TD |

TABLE 17-continued

Properties of Films after surface treatment

| Cellulose Acylate Film | Surface Energy | | | | Surface Condition | | | polarizer | | durability 1 | | durability 2 | |
|---|---|---|---|---|---|---|---|---|---|---|---|---|---|
| | calculated value of surface energy (mNm⁻¹) | contact angle (°) | | surface energy distribution ΔE calculated value (mNm⁻¹) | cross Nicol uneven-ness | ΔRe (630) | ΔRth (630) | adhe-sive-ness | work-ability | delami-nation | uneven-ness | delami-nation | uneven-ness |
| | | water | methylene chloride | | | | | | | | | | |
| 001A | 66 | 30 | 33 | 4 | A | 2 | 2 | A | A | A | A | A | A |
| 001B | 65 | 40 | 32 | 2 | A | 2 | 2 | C | C | C | A | C | A |
| 201A | 63 | 36 | 32 | 4 | A | 2 | 1.5 | A | A | A | A | A | A |
| 202A | 62 | 37 | 33 | 5 | A | 2 | 2 | A | A | A | A | A | A |
| 203A | 66 | 31 | 32 | 3 | A | 1 | 3 | A | A | A | A | A | A |
| 204A | 61 | 40 | 32 | 18 | C | 2 | 12 | A | A | A | C | A | C |
| 204B | 45 | 65 | 42 | 4 | A | 1 | 2 | C | C | C | A | C | A |
| 205A | 63 | 36 | 33 | 14 | B | 1 | 15 | A | A | A | B | A | B |
| 205B | 45 | 64 | 43 | 3 | A | 2 | 2 | B | B | B | A | B | A |
| 206A | 62 | 38 | 33 | 8 | B | 2 | 7 | A | A | A | A | A | A |
| 207A | 62 | 37 | 33 | 3 | A | 2 | 2 | A | A | A | A | A | A |
| 208A | 66 | 30 | 32 | 5 | A | 1 | 2 | A | A | A | A | A | A |
| 209A | 62 | 39 | 31 | 4 | A | 2 | 1.5 | A | A | A | A | A | A |
| 210A | 64 | 35 | 32 | 4 | A | 2 | 2 | A | A | A | A | A | A |
| 211A | 63 | 36 | 32 | 3 | A | 2 | 1 | A | A | A | A | A | A |
| 212A | 62 | 39 | 32 | 4 | A | 1 | 1 | A | A | A | A | A | A |
| 213A | 63 | 36 | 32 | 4 | A | 1 | 1.5 | A | A | A | A | A | A |
| 214A | 62 | 37 | 33 | 4 | A | 1 | 2 | A | A | A | A | A | A |
| 215A | 66 | 31 | 32 | 3 | A | 1 | 3 | A | A | A | A | A | A |
| 216A | 61 | 40 | 32 | 16 | C | 2 | 12 | A | A | A | C | A | C |
| 216B | 46 | 64 | 42 | 4 | A | 2 | 2 | C | C | C | A | C | A |
| 217A | 63 | 36 | 33 | 12 | B | 2 | 15 | A | A | A | B | A | B |
| 217B | 46 | 63 | 43 | 4 | A | 1 | 2 | B | B | B | A | B | A |
| 218A | 62 | 38 | 33 | 7 | B | 1 | 7 | A | A | A | A | A | A |
| 219A | 62 | 37 | 33 | 2 | A | 2 | 2 | A | A | A | A | A | A |
| 220A | 66 | 30 | 32 | 4 | A | 2 | 2 | A | A | A | A | A | A |
| 221A | 62 | 39 | 31 | 4 | A | 2 | 1.5 | A | A | A | A | A | A |
| 222A | 64 | 35 | 32 | 2 | A | 2 | 2 | A | A | A | A | A | A |
| 223A | 63 | 36 | 32 | 3 | A | 1 | 1 | A | A | A | A | A | A |
| 224A | 62 | 39 | 32 | 5 | A | 2 | 1 | A | A | A | A | A | A |
| 225A | 66 | 30 | 32 | 3 | A | 2 | 2 | A | A | A | A | A | A |
| 226A | 64 | 35 | 32 | 2 | A | 1 | 2 | A | A | A | A | A | A |
| 227A | 62 | 39 | 32 | 3 | A | 2 | 1 | A | A | A | A | A | A |
| 228A | 62 | 38 | 33 | 3 | A | 2 | 2 | A | A | A | A | A | A |

A: unevenness was not found. B: unevenness was slightly found, but not distinct. C: unevenness was found and distinct.

The above results confirm that the film samples of the invention fabricated by the use of the compound described herein may have reduced optical anisotropy. In addition, the results further confirm that, when a compound having a pKa of at least 14 and having a small solubility in alkali saponification solution is used, then the in-plane optical properties of the film may be evenly stabilized, and additionally, when the surface energy of the film is controlled to fall within a predetermined range, then the film may have good workability to give polarizers, and the polarizers fabricated by the use of the film may have good durability.

Example 6

Evaluation of Film Fitted in IPS-Mode Liquid-Crystal Display Device

The cellulose acylate film produced in Example 5 was fitted to a liquid-crystal display device and tested for its optical properties. In this Example, an IPS-mode liquid-crystal cell was used; while in the other Examples, VA-mode and OCB-mode liquid-crystal cells were used. The application of the polarizer and the optically-compensatory film produced by the use of the polymer film of the invention is not limited by these driving modes of these liquid-crystal display devices.

Using the cellulose acylate film sample 201A produced in Example 5, a polarizer 201A was fabricated in the same manner as in Example 5. To this, fitted was a monoaxially-oriented optically-compensatory film formed of an Arton film (by JSR) so as to make it have an optically-compensatory function. In this structure, the slow axis of the in-plane retardation of the optically-compensatory film was made perpendicular to the transmission axis of the polarizer 201A, whereby the visible characteristics of this structure was improved with no change in the in-plane properties thereof. The in-plane retardation Re of the optically-compensatory film was 270 nm; the thickness-direction retardation Rth thereof was 0 nm; and the Nz factor thereof was 0.5.

Two pairs of the laminate of the polarizer 201A and the optically-compensatory film were prepared, and these were stacked up together with a liquid crystal cell in such a manner that the optically-compensatory film of each laminate could be on the side of the liquid-crystal cell in an order of "laminate of polarizer 201A and optically-compensatory film+IPS-mode liquid-crystal cell+laminate of optically-compensatory film and polarizer 201A". With this laminate structure built therein, a liquid-crystal display was constructed. In this, the transmission axis of the upper and lower polarizers was made perpendicular to each other, and the transmission axis of the upper polarizer 201A was made parallel to the major axis direction of the liquid-crystal molecules in the cell (or that is, the slow axis of the optically-compensatory layer was perpendicular to the major axis of the liquid-crystal molecules in the cell). Conventional liquid-crystal cell, electrode and substrate generally used in IPS were used herein as they were. The orientation of the liquid-crystal cell was horizontal orientation, and the liquid crystal had positive dielectric anisotropy. These were all commercially-available ones for IPS-mode liquid-crystal devices. The physical properties of the liquid-crystal cell are as follows: An of liquid crystal is 0.099; the cell gaps of the liquid-crystal layer is 3.0 µm; the pretilt angle is 5 degrees; the rubbing direction is at 75 degrees in both the upper and lower substrates.

Also in the same manner as that for the polarizer 201A in Example 5, other polarizers were fabricated by the use of the other cellulose acylate film samples. Similarly, an optically-compensatory film was laminated on it, and two pairs of each laminate were prepared. With these built therein together with an IPS-mode liquid-crystal cell, display devices were constructed.

In the liquid-crystal display devices constructed in the manner as above, the degree of light leakage in black display was determined in the azimuth direction of 45 degrees and in the polar angle direction of 70 degrees from the display front, and the data obtained are given in Table 18. The devices with the smaller data give smaller light leakage in the oblique direction of 45 degrees and therefore have better display contrast. Accordingly, the viewing angle characteristics of liquid-crystal display devices can be evaluated on the basis of the data. The degree of light leakage through the devices of the invention is from 1/50 to 1/4 and is small. In addition, the color change in display of the devices of the invention is also small. This is because the wavelength-dependent anisotropy (Re, Rth) distribution of the cellulose acylate film samples of the invention is small (that is, the films of the invention have lower wavelength dependency in point of their anisotropy), and therefore the films may have the same and uniform optically-compensatory properties at any and every wavelength. In addition, we, the present inventors have found that, even though the method of surface treatment of the polymer film of the invention is changed, all the treated films could have good display properties so far as the surface energy of the treated films falls within a predetermined range and so far as the films have good workability to give polarizers and good durability as polarizers. As mentioned above, it is understood that the optically-compensatory films and polarizers fabricated by the use of the polymer film of the invention have good viewing angle characteristics and are free from display color change.

TABLE 18

| Cellulose acylate Film Sample | Remarks | Light Leakage Black Display on IPS Panel (%) | Unevenness in Black Display on IPS Panel (%) |
|---|---|---|---|
| 002A | comparative sample | 0.54 | 0 |
| 201A | sample of the invention | 0.12 | 0 |
| 202A | sample of the invention | 0.11 | 0 |

TABLE 18-continued

| Cellulose acylate Film Sample | Remarks | Light Leakage Black Display on IPS Panel (%) | Unevenness in Black Display on IPS Panel (%) |
|---|---|---|---|
| 203A | sample of the invention | 0.13 | 0 |
| 204A | sample of the invention | 0.12 | 0 |
| 205A | sample of the invention | 0.14 | 0 |
| 206A | sample of the invention | 0.11 | 0 |
| 210A | sample of the invention | 0.12 | 0 |
| 212A | sample of the invention | 0.12 | 0 |
| 214A | sample of the invention | 0.06 | 0 |
| 215A | sample of the invention | 0.09 | 0 |
| 216A | sample of the invention | 0.08 | 0 |
| 218A | sample of the invention | 0.13 | 0 |
| 220A | sample of the invention | 0.06 | 0 |
| 221A | sample of the invention | 0.04 | 0 |
| 223A | sample of the invention | 0.04 | 0 |
| 225A | sample of the invention | 0.06 | 0 |
| 225A | sample of the invention | 0.06 | 0 |
| 227A | sample of the invention | 0.04 | 0 |

Example 7

Evaluation of Film Fitted in VA-Mode or OCB-Mode Liquid-Crystal Display Device

The cellulose acylate films produced in Example 5 were tested, as fitted to or mounted on a liquid-crystal display device described in Example 1 of JP-A 10-48420, a discotic liquid-crystal molecules-containing optically-anisotropic layer and a polyvinyl alcohol-coated orientation film described in Example 1 of JP-A 9-26572, a VA-mode liquid-crystal display device described in FIGS. 2 to 9 of JP-A 2000-154261, and an OCB-mode liquid-crystal display device described in FIGS. 10 to 15 of JP-A 2000-154261. In all of these, the films were good in point of both image contrast and viewing angle characteristics.

Example 8

Properties of Optically-Compensatory Film

According to the method described in Example 1 of JP-A 7-333433, optically-compensatory films were fabricated by the use of the cellulose acylate film samples of the invention produced in Example 5. Thus obtained, the filter films had good viewing angle characteristics on all sides. Accordingly, this confirms that the cellulose acylate film of the invention is excellent in point of its optical applications.

When the cellulose acylate film, of which Re and Rth are small in a visible light range having a wavelength of from 400 to 800 nm and of which the wavelength-dependent Re and Rth fluctuation is also small, is further improved by controlling the surface energy condition thereof so as to make it have good workability into protective films for polarizers and supports for optically-compensatory films and to make it have good durability as the worked films, then the film is applicable to the field of image display devices that have reduced wavelength-dependent anisotropy distribution therefore having improved color display capability.

Example 9

Properties of Optically-Compensatory Film

According to the method described in Example 1 of JP-A 2003-315541, optically-compensatory film samples were fabricated by the use of the polymer film samples of the invention as described below. A polyimide produced from 2,2'-bis(3,4-dicarboxyphenyl)hexafluoropropane dianhydride (6FDA) and 2,2'-bis(trifluoromethyl)-4,4'-diaminobiphenyl (TFMB) and having a weight-average molecular mass (Mw) of 70,000 and Δn of about 0.04 was dissolved in a solvent of cyclohexane to prepare a 25 wt % solution thereof. This was applied to the polymer film sample 114 of the invention produced in Example 1 (thickness, 80 µm). Next, this was heated at 100° C. for 10 minutes and then monoaxially stretched by 15% in the machine direction at 160° C., therefore producing an optically-compensatory film comprising the polymer film sample 114 of the invention coated with a 6 µm-thick polyimide film. The optical properties of the optically-compensatory film are as follows: The optically-compensatory film had Re=72 nm and Rth=220 nm, its orientation axis shifting angle was within ±0.3 degrees, and it had a birefringent layer with nx>ny>nz.

Comparative Example

An optically-compensatory film coated with a 6 µm-thick polyimide film was fabricated in the same manner as above, for which, however, the polyimide was applied to the film sample 001 (thickness, 80 µm) in place of the polymer film sample 114. The optical properties of the optically-compensatory film are as follows: Re=75 nm, Rth=280 nm.
(Evaluation of Film Fitted in VA-Mode Liquid-Crystal Display Device)

The optically-compensatory film fabricated in Example 9 and Comparative Example was subjected to alkali saponification on the side thereof not coated with the polyamide film. This was stuck to a polarizing element with a polyvinyl alcohol adhesive, or that is, the film was directly stuck to the polarizing element. In this, the nx direction of the optically-compensatory film was made to be perpendicular to the absorption axis of the polarizing element. The optically-compensatory film was laminated to a VA-mode liquid-crystal panel with an adhesive in such a manner that the film could be on the side of the liquid-crystal cell. On the other side of the liquid-crystal cell in this, only the polarizer was stuck to the VA-mode liquid-crystal panel with an adhesive in such a manner that the absorption axis of the polarizers could be perpendicular to each other. Thus constructed, the liquid-crystal display device was tested for its viewing angle characteristics. As a result, the optically-compensatory film with the polymer film sample 114 of the invention of Example 1 was better than the optically-compensatory film with the sample 001 in point of the viewing angle characteristics on all sides. Accordingly, this confirms that the polymer film of the invention is excellent when used as a retardation film for VA-mode devices.

Example 10

Fabrication of Polymer Film

A cellulose acylate was used as a material for the polymer film of the invention.
<Preparation of Cellulose Acylate Solution>
The following composition was put into a mixing tank and stirred to dissolve the components, thereby preparing a cellulose acylate solution. Three types of cellulose acylate were used, each having a different degree of acylation (Ac/OH=2.86/0.14), (Ac/OH=2.92/0.08), (Ac/Pro/OH=1.9/0.8/0/3) in which Ac indicates a degree of acetyl substitution, Pro indicates a degree of propionyl substitution and OH indicates an unsubstituted hydroxyl group, and the ratio is in terms of the degree of acylation.
(Composition of Cellulose Acylate Solution)

| | |
|---|---|
| Cellulose acylate | 100.0 mas. pts. |
| Methylene chloride (first solvent) | 402.0 mas. pts. |
| Methanol (second solvent) | 60.0 mas. pts. |

<Preparation of Mat Agent Solution>
20 parts by mass of silica particles having a mean particle size of 16 nm (Aerosil R972 by Nippon Aerosil) and 80 parts by mass of methanol were well stirred and mixed for 30 minutes to prepare a dispersion of silica particles. The dispersion was put into a disperser along with the following composition thereinto, and further stirred therein for at least 30 minutes to dissolve the components, thereby preparing a mat agent solution.
(Composition of Mat Agent Solution)

| | |
|---|---|
| Dispersion of silica particles having a mean particle size of 16 nm | 10.0 mas. pts. |
| Methylene chloride (first solvent) | 76.3 mas. pts. |
| Methanol (second solvent) | 3.4 mas. pts. |
| Above cellulose acylate solution | 10.3 mas. pts. |

<Preparation of Additive Solution>
The following composition was put into a mixing tank, and heated with stirring to dissolve the components, thereby preparing an additive solution. The optical anisotropy-lowering compound and the wavelength-dependent anisotropy distribution improver are shown in Table 19.
(Composition of Additive Solution)

| | |
|---|---|
| Optical anisotropy-lowering compound | 49.3 mas. pts. |
| Wavelength-dependent anisotropy distribution improver | 7.6 mas. pts. |
| Methylene chloride (first solvent) | 58.4 mas. pts. |
| Methanol (second solvent) | 8.7 mas. pts. |
| Cellulose acylate solution | 12.8 mas. pts. |

<Fabrication of Cellulose Acylate Film Samples 301 to 305>
94.6 parts by mass of the above cellulose acylate solution, 1.3 parts by mass of the mat agent solution, and 4.1 parts by mass of the additive solution were separately filtered, and then mixed. Using a band caster, the mixture was cast on a band. In the above-mentioned composition, the ratio by mass of the optical anisotropy-lowering compound and the wavelength-dependent anisotropy distribution improver to cellulose acylate was 12% and 1.2% by mass, respectively. The film having a remaining solvent content of 30% was peeled away from the band, and dried at 130° C. for 20 minutes.

Thus, a cellulose acylate film having a remaining solvent content of smaller than 0.1% and having a thickness of 80 μm was fabricated.

Comparative Example

A comparative film sample 003A was fabricated in the same manner as in Example 10, for which, however, the optical anisotropy-lowering compound and the wavelength-dependent anisotropy distribution improver were not used.

Similarly, a comparative film sample 003B was fabricated in the same manner as in Example 10, for which, however, a plasticizer for cellulose acylate, TPP (triphenyl phosphate) was used in place of the optical anisotropy-lowering compound.

On the other hand, the sample of the invention contains a low-molecular compound highly compatible with cellulose acylate, and the degree of dissolution of the compound into alkali saponification solution is small. Therefore, the absorbance at 450 nm of the saponification solution is small. In other words, the low-molecular compound did not dissolve out of the film before and after the saponification treatment but remained in the film, and, as a result, the Re and Rth change of the film before and after saponification could be reduced.

The alkali saponification cycle is concretely as follows: A film sample having a size of 10 cm×10 cm is dipped in an aqueous 1.5 N sodium hydroxide solution at 55° C. for 2 minutes, then neutralized with 0.1 N sulfuric acid solution at 30° C., washed in a wash water bath at room temperature and dried at 100° C.

TABLE 19

| Sample No. | Remarks | Polymer Material compound* | ratio of acylation | Low-Molecular Compound optical anisotropy-lowering agent | wavelength-dependent anisotropy distribution improver | Film Retardation (before saponification) Re (nm) | Rth (nm) |
|---|---|---|---|---|---|---|---|
| 003A | comparative sample | CA | Ac/OH = 2.86/0.14 | — | — | 5.2 | 36 |
| 301 | sample of the invention | CA | Ac/OH = 2.86/0.14 | A-19 | — | 1.9 | 7.2 |
| 302 | sample of the invention | CA | Ac/OH = 2.86/0.14 | A-19 | UV-102 | 1.9 | 14.9 |
| 303 | sample of the invention | CA | Ac/OH = 2.86/0.14 | FB-6 | UV-102 | 0.1 | −2.1 |
| 003B | comparative sample | CA | Ac/OH = 2.86/0.14 | TPP | — | 4.3 | 37 |
| 304 | sample of the invention | CA | Ac/OH = 2.92/0.08 | A-19 | UV-102 | 0.5 | −4.2 |
| 305 | sample of the invention | CAP | Ac/Pro/OH = 1.9/0.8/0.3 | A-19 | UV-102 | 3.5 | 11.2 |

| Sample No. | Film (after saponification) Retardation Re' (nm) | Rth' (nm) | direction of in-plane slow axis | surface energy calculated value (mNm$^{-1}$) | Retardation Change before and after saponification \|Re-Re'\| (nm) | \|Rth-Rth'\| (nm) | Alkali Saponification Solution dissolution of low-molecular compound | absorbance (450 nm) |
|---|---|---|---|---|---|---|---|---|
| 002 | 17 | 66 | MD | 71 | 11.8 | 30 | — | 0.15 |
| 301 | 2.0 | 9.5 | MD | 65 | 0.1 | 2.3 | 15 | 0.04 |
| 302 | 2.0 | 15 | MD | 62 | 0.1 | 0.1 | 0.5 | 0.04 |
| 303 | 0.7 | −1.5 | MD | 64 | 0.63 | 0.6 | 0.6 | 0.02 |
| 003 | 11 | 59 | MD | 65 | 6.7 | 22 | 25 | 0.07 |
| 304 | 0.6 | −3.9 | TD | 62 | 0.05 | 0.3 | 0.4 | 0.01 |
| 305 | 4.4 | 14 | MD | 61 | 0.9 | 2.3 | 0.2 | 0.03 |

Compound:: CA = cellulose acylate, CAP = cellulose acylate propionate

The sample of the invention fabricated in Example 10 and the comparative samples were evaluated, and their data are shown in Table 19. The polymer film sample containing a preferred compound for the invention has smaller Re and Rth than those of the comparative samples. In general, a low-molecular compound imparts hydrophobicity to cellulose acylate film, but in the comparative film sample 003A, since a low-molecular compound is not used at all, the film surface is hydrophilic and is readily corroded by alkali solution. The comparative sample 003B contains a compound not compatible with cellulose acylate film, and therefore the compound is readily dissolved out of the film into alkali solution. As a result, the film is readily corroded by alkali solution, and its Re and Rth readily change.

When the cellulose acylate film, of which Re and Rth are small in a visible light range having a wavelength of from 400 to 800 nm and of which the wavelength-dependent Re and Rth fluctuation is also small, is further improved by controlling the surface energy condition thereof so as to make it have good workability into protective films for polarizers and supports for optically-compensatory films and to make it have good durability as the worked films, then the film is applicable to the field of image display devices that have reduced wavelength-dependent anisotropy distribution therefore having improved color display capability.

INDUSTRIAL APPLICABILITY

According to the invention, a polymer film having a reduced optical anisotropy and having a reduced wavelength-dependent Re and Rth distribution can be produced. When the polymer film is used in a polarizer for image display devices such as liquid-crystal display devices, then the visibility such as the angle dependency and the contrast of the display image may be bettered. In addition, the workability of the polymer film to produce polarizers is bettered, and further the durability of the polarizer with the polymer film is also bettered. In addition, using the polymer film of the invention has made it possible to provide optical materials such as optically-compensatory films and polarizers having good viewing angle characteristics, and to provide liquid-crystal display devices that comprise such optical materials.

The entire disclosure of each and every foreign patent application from which the benefit of foreign priority has been claimed in the present application is incorporated herein by reference, as if fully set forth.

The invention claimed is:

1. A polymer film that has an in-plane retardation $Re_{(\lambda)}$ and a thickness-direction retardation $Rth_{(\lambda)}$ (where $\lambda$ indicates a wavelength (nm)) satisfying formulae (i) and (ii), and that further has a surface energy of at least one surface is from 50 mN/m to 80 mN/m:

$$0 \leq Re_{(630)} \leq 1.7 \text{ nm, and } |Rth_{(630)}| \leq 15.0; \qquad \text{(i)}$$

and $$|Re_{(400)} - Re_{(700)}| \leq 2 \text{ nm, and } |Rth_{(400)} - Rth_{(700)}| \leq 20 \text{ nm}, \qquad \text{(ii)}$$

wherein a polymer material to form the film comprises a cellulose acylate.

2. The polymer film according to claim 1, wherein an in-plane distribution of the surface energy of the polymer film, $\Delta E$ is 10 or less.

3. The polymer film according to claim 1, wherein at least one surface of the polymer film is surface-treated, and a surface energy of the surface-treated surface is from 30 mN/m to 50 mN/m before a surface treatment, and a surface energy of the surface-treated surface is from 50 mN/m to 80 mN/m after the surface treatment.

4. The polymer film according to claim 1, wherein an in-plane distribution of $Re_{(\lambda)}$ and $Rth_{(\lambda)}$, $\Delta Re_{(\lambda)}$ and $\Delta Rth_{(\lambda)}$ satisfy formula (iii) and (iv):

$$\Delta Re_{(\lambda)} \leq 5; \qquad \text{(iii)}$$

and $$\Delta Rth_{(\lambda)} \leq 10. \qquad \text{(iv)}$$

5. The polymer film according to claim 3, wherein a Re and Rth change before and after the surface treatment satisfy formula (v) and (vi):

$$|Re - Re'| \leq 10; \qquad \text{(v)}$$

and $$|Rth - Rth'| \leq 20, \qquad \text{(vi)}$$

wherein Re indicates an in-plane retardation (nm) of the film before the surface treatment;
Re' indicates an in-plane retardation (nm) of the film after the surface treatment;
Rth indicates a thickness-direction retardation (nm) of the film before the surface treatment; and
Rth' indicates a thickness-direction retardation (nm) of the film after the surface treatment.

6. The polymer film according to claim 1, which comprises at least one compound capable of lowering an optical anisotropy,
wherein an amount of the at least one compound capable of lowering an optical anisotropy is from 0.01 to 20% by mass of the cellulose acylate.

7. The polymer film according to claim 6, which comprises the at least one compound capable of lowering an optical anisotropy that satisfies formula (vii) within a range satisfying formula (viii):

$$(Rth_A - Rth_0)/A \leq -1.0, \qquad \text{(vii)}$$

$$0.01 \leq A \leq 30, \qquad \text{(viii)}$$

wherein $Rth_A$ indicates Rth (nm) of a film containing A % by mass of the at least one compound;
$Rth_0$ indicates Rth (nm) of a film not containing the at least one compound; and
A indicates a mass % of the at least one compound relative to a mass of a starting polymer for a film as 100.

8. The polymer film according to claim 1, which comprises at least one compound capable of lowering $|Re_{(400)} - Re_{(700)}|$ and $|Rth_{(400)} - Rth_{(700)}|$.

9. The polymer film according to claim 3, wherein the surface treatment is an alkali saponification.

10. The polymer film according to claim 6, wherein a degree of dissolution of the at least one compound capable of lowering an optical anisotropy in an alkali solution in an alkali saponification treatment of the polymer film is 20% by mass or less.

11. The polymer film according to claim 9, wherein an absorbance at 450 nm of an alkali solution after the alkali saponification treatment of the film surface is 0.1 or less.

12. The polymer film according to claim 6, wherein a pKa of the at least one compound capable of lowering an optical anisotropy is 14 or more.

13. The polymer film according to claim 3, wherein the surface treatment is a plasma treatment.

14. The polymer film according to claim 3, wherein the surface treatment is a corona treatment.

15. The polymer film according to claim 1, wherein an acyl substituent in the cellulose acylate is substantially an acetyl group alone, a total degree of substitution is from 2.80 to 2.99, and a mean degree of polymerization of the polymer is from 180 to 550.

16. The polymer film according to claim 1, wherein an acyl substituent in the cellulose acylate comprises substantially at least two of acetyl group/propionyl group/butanoyl group, and a total degree of acyl substitution of the cellulose acylate is from 2.50 to 3.00.

17. An optically-compensatory film, which comprises an optically-anisotropic layer formed on a polymer film according to claim 1, and wherein the optically-anisotropic layer satisfies formula (ix):

$$Re = 0 \text{ to } 200 \text{ (nm), and } |Rth| = 0 \text{ to } 400 \text{ (nm)}. \qquad \text{(ix)}$$

18. A polarizer which comprises, as a protective film for a polarizing element, at least one sheet of a polymer film according to claim 1.

19. A liquid-crystal display device, which comprises a polymer film according to claim 1.

20. A VA or IPS liquid-crystal display device, which comprises a polymer film according to claim 1.

* * * * *